(12) United States Patent
Rudolf

(10) Patent No.: US 7,512,571 B2
(45) Date of Patent: Mar. 31, 2009

(54) ASSOCIATIVE MEMORY DEVICE AND METHOD BASED ON WAVE PROPAGATION

(76) Inventor: Paul Rudolf, 2439 Blue Quail, San Antonio, TX (US) 78232

( * ) Notice: Subject to any disclaimer, the term of this patent is extended or adjusted under 35 U.S.C. 154(b) by 921 days.

(21) Appl. No.: 10/648,855

(22) Filed: Aug. 26, 2003

(65) Prior Publication Data
US 2004/0193789 A1    Sep. 30, 2004

Related U.S. Application Data

(60) Provisional application No. 60/407,011, filed on Aug. 29, 2002.

(51) Int. Cl.
G06F 15/18 (2006.01)
(52) U.S. Cl. .................. 706/14; 706/12; 706/46
(58) Field of Classification Search .......... 706/14, 706/12, 46; 711/108
See application file for complete search history.

(56) References Cited

U.S. PATENT DOCUMENTS

| | | |
|---|---|---|
| 4,495,644 A | 1/1985 | Parks et al. |
| 4,701,879 A | 10/1987 | Scarr |
| 4,974,202 A | 11/1990 | Mukohzaka |
| 5,109,426 A | 4/1992 | Parks |
| 5,420,937 A | 5/1995 | Davis |
| 5,483,480 A | 1/1996 | Yoneda |
| 5,485,418 A | 1/1996 | Hiraki et al. |
| 5,511,134 A | 4/1996 | Kuratomi et al. |
| 5,515,477 A | 5/1996 | Sutherland |
| 5,524,177 A | 6/1996 | Suzuoka |
| 5,526,298 A | 6/1996 | Mukohzaka |
| 5,544,255 A | 8/1996 | Smithies et al. |
| 5,568,416 A | 10/1996 | Kawana et al. |
| 5,579,411 A | 11/1996 | Shou et al. |
| 5,615,112 A | 3/1997 | Liu Sheng et al. |
| 5,619,718 A | 4/1997 | Correa |
| 5,659,626 A | 8/1997 | Ot et al. |
| 5,671,292 A | 9/1997 | Lee et al. |
| 5,696,838 A | 12/1997 | Chiu et al. |
| 5,699,449 A | 12/1997 | Javidl |
| 5,740,274 A | 4/1998 | Ono et al. |
| 5,748,852 A | 5/1998 | Mahler |
| 5,757,287 A | 5/1998 | Kitamura et al. |
| 5,799,098 A | 8/1998 | Ort et al. |

(Continued)

OTHER PUBLICATIONS

Paul G. Rudolf, Computer modeling wave propagation with a variation of the Helmholtz-Kirchhoff relation, Mar. 1990, Applied Optics, 998-1003.*

(Continued)

Primary Examiner—Joseph P Hirl
(74) Attorney, Agent, or Firm—Jackson Walker L.L.P.; Christopher J. Rourk

(57) ABSTRACT

An associative, or content-addressable, memory device and method based on waves is described. In this invention, arbitrary inputs are written as patterns which are interpreted as values of complex waves, discretized or analog, on one or more buffers. Information is transported via wave propagation from the buffers to a cortex or to multiple cortices, where the patterns are associated using a mathematical operation for storage purposes or de-associated through the corresponding inverse operation for retrieval purposes. The present associative memory is shown to emulate important behavioral properties of the human brain, including higher-brain functions such as learning from experience, forming generalizations or abstractions, and autonomous operation.

78 Claims, 74 Drawing Sheets

U.S. PATENT DOCUMENTS

| | | | |
|---|---|---|---|
| 5,802,208 | A | 9/1998 | Podilchuk et al. |
| 5,819,007 | A * | 10/1998 | Elghazzawi .................. 706/46 |
| RE36,041 | E | 1/1999 | Turk et al. |
| 5,857,030 | A | 1/1999 | Gaborski et al. |
| 5,869,822 | A | 2/1999 | Meadows, II et al. |
| 5,893,085 | A | 4/1999 | Phillips et al. |
| 5,901,244 | A | 5/1999 | Souma et al. |
| 5,924,052 | A | 7/1999 | Palm |
| 5,926,555 | A | 7/1999 | Ort et al. |
| 5,933,363 | A | 8/1999 | Shindo |
| 5,960,101 | A | 9/1999 | Lo et al. |
| 5,974,350 | A | 10/1999 | Davis, Jr. et al. |
| 5,995,641 | A | 11/1999 | Yamaguchi |
| 5,995,652 | A | 11/1999 | Chiu et al. |
| 6,012,640 | A * | 1/2000 | Liu ........................ 235/462.25 |
| 6,038,338 | A | 3/2000 | Nguyen |
| 6,067,536 | A | 5/2000 | Maruyama et al. |
| 6,069,696 | A | 5/2000 | McQueen et al. |
| 6,078,884 | A | 6/2000 | Downey |
| 6,081,620 | A | 6/2000 | Anderholm |
| 6,094,646 | A | 7/2000 | Runkler et al. |
| 6,108,437 | A | 8/2000 | Lin |
| 6,118,889 | A | 9/2000 | Izuno et al. |
| 6,125,426 | A | 9/2000 | Yoneda et al. |
| 6,148,093 | A | 11/2000 | McConnell et al. |
| 6,157,731 | A | 12/2000 | Hu et al. |
| 6,192,351 | B1 | 2/2001 | Persaud |
| 6,195,638 | B1 | 2/2001 | Ilan et al. |
| 6,212,290 | B1 | 4/2001 | Gagne et al. |
| 6,236,740 | B1 | 5/2001 | Lee |
| 6,272,241 | B1 | 8/2001 | Tattersall |
| 6,272,476 | B1 | 8/2001 | Shi et al. |
| 6,278,798 | B1 * | 8/2001 | Rao ........................... 382/154 |
| 6,292,575 | B1 | 9/2001 | Bortolussi et al. |
| 6,301,370 | B1 | 10/2001 | Steffens et al. |
| 6,311,173 | B1 | 10/2001 | Levin et al. |
| 6,327,581 | B1 | 12/2001 | Platt |
| 6,332,137 | B1 | 12/2001 | Horl et al. |
| 6,337,926 | B2 | 1/2002 | Takahashi |
| 2002/0078431 | A1 * | 6/2002 | Reps .......................... 717/100 |

OTHER PUBLICATIONS

Hideo Yuasa, An autonomous decentralized recognition system having a dispersive wave property, IEEE, 1997, 0-8186-7783-X/97, 75-82.*

O. A. Grebenkin, A model of wave associative processing, IEEE, 10.1109/RNNNS.19922268630, Oct. 1992, 870-880.*

T. Joachims, Text Categorization with Support Vector Machines, Proceedings of European Conference on Machine Learning(ECML), 1998 7 pps.

Y. Lecun, et al., "Comparison of Learning Algorithms for Handwritten Digit Recognition," Proceedings ICANN'95-International Conference on Artificial Neural Networks, vol. II, pp. 1-9, EC2, 1995.

S. Pankanti, S. Prabhakar and A.K. Jain, "On the Individuality of Fingerprints," IEEE Transactions on Pattern Analysis and Machine Intelligence, vol. 24, No. 8, Aug. 2002 (in Press), 8 pps.

Paul G. Rudolf, et al., "Computer Modeling Wave Propagation with a Variation of the Helmholtz-Kirchhoff Relation", Applied Optics, vol. 29 No. 7, Mar. 1, 1990, 6 pps.

PCT International Preliminary Examination Report for Corresponding PCT Application (PCT/US03/26536), mailed Feb. 28, 2007, 4 pgs.

Rudolf et al., "Computer Modeling Wave Propagation With a Variation of the Helmholtz-Kirchhoff Relation," *Applied Optics,* vol. 29, No. 7, Mar. 1990 (pp. 996-1003).

Yuasa et al., "An Autonomous Decentralized Recognition System Having a Dispersive Wave Property," *IEEE,* 1997, 0-8186-7783-X/97 (pp. 75-82).

Grebenkin et al., "A Model of Wave Associative Processing," *IEEE,* 10.1109/RNNNS/1992268630, Oct. 1992 (pp. 870-880).

\* cited by examiner

Transport information from buffer to cortex or cortex to buffer

Associate two or more patterns

De-associate a pattern from a stored cortex

$$\acute{D} = \langle C | \acute{R}_{i,n} \rangle$$

Export buffer information

Generate an internal identification pattern (IIP)

Decode a retrieved internal identification pattern (IIP)

Learn for autonomous identification

Adaptively improve identification performance through experience

Adaptively improve identification performance through experience (continued)

Adaptively improve identification performance through experience (continued)

Wave propagation circuitry block diagram for hardwired circuitry-based embodiment

4100

4200

4300

4400

4500

4600

4700

4800

4801

4900

4901

← 5000

← 5001

← 5100

← 5101

← 5200

← 5201

5300

5301

5400

5401

5500

5501

6000

6001

6100

6101

6200

6201

← 6300

← 6301

← 6400

← 3800

← 6501

← 4800

← 6601

← 4900

← 6701

← 5000

← 6801

5100

6901

5200

7001

7100

7200

← 5000

← 7601

← 5200

← 7701

← 5400

← 7801

← 3800

← 8301

← 5300

← 8401

← 8500

← 8501

← 5400

← 8601

← 5500

← 8701

← 8800

← 8801

8900

8901

9000

9100

3800

9201

← 5300

← 9301

← 8500

← 9401

← 5400

← 9501

← 5500

← 9601

← 8800

← 9701

← 8900

← 9801

← 4800

← 9901

← 4900

← 10001

← 5000

← 10101

← 5100

← 10201

← 5200

← 10301

← 10400

← 10401

← 10500

← 10501

← 10502

← 10503

← 10504

← 11000

← 11100

← 11200

← 11300

← 11400

← 11500

← 11600

← 10503

← 12001

← 12100

← 12200

← 12300

← 12400

← 13100

← 13200

← 13300

← 13400

← 13500

← 13600

13700

13800

13900

14000

14100

14200

Figure 143
Figure 144
Figure 145
Figure 145
Figure 146
Figure 147
Figure 148

← 14900

← 15000

← 15100

Flowchart for software embodiment: Overall Control

Flowchart for software embodiment: Overall Control (continued)

Flowchart for software embodiment: Create IIP

Flowchart for software embodiment: Learn (continued)

Flowchart for software embodiment: Recognize (continued)

Flowchart for software embodiment: Draw IIP

Flowchart for software embodiment: Draw IIP (continued)

Flowchart for software embodiment: Import

Flowchart for software embodiment: Retrieve

Figure 159A

Flowchart for software embodiment: Read IIP

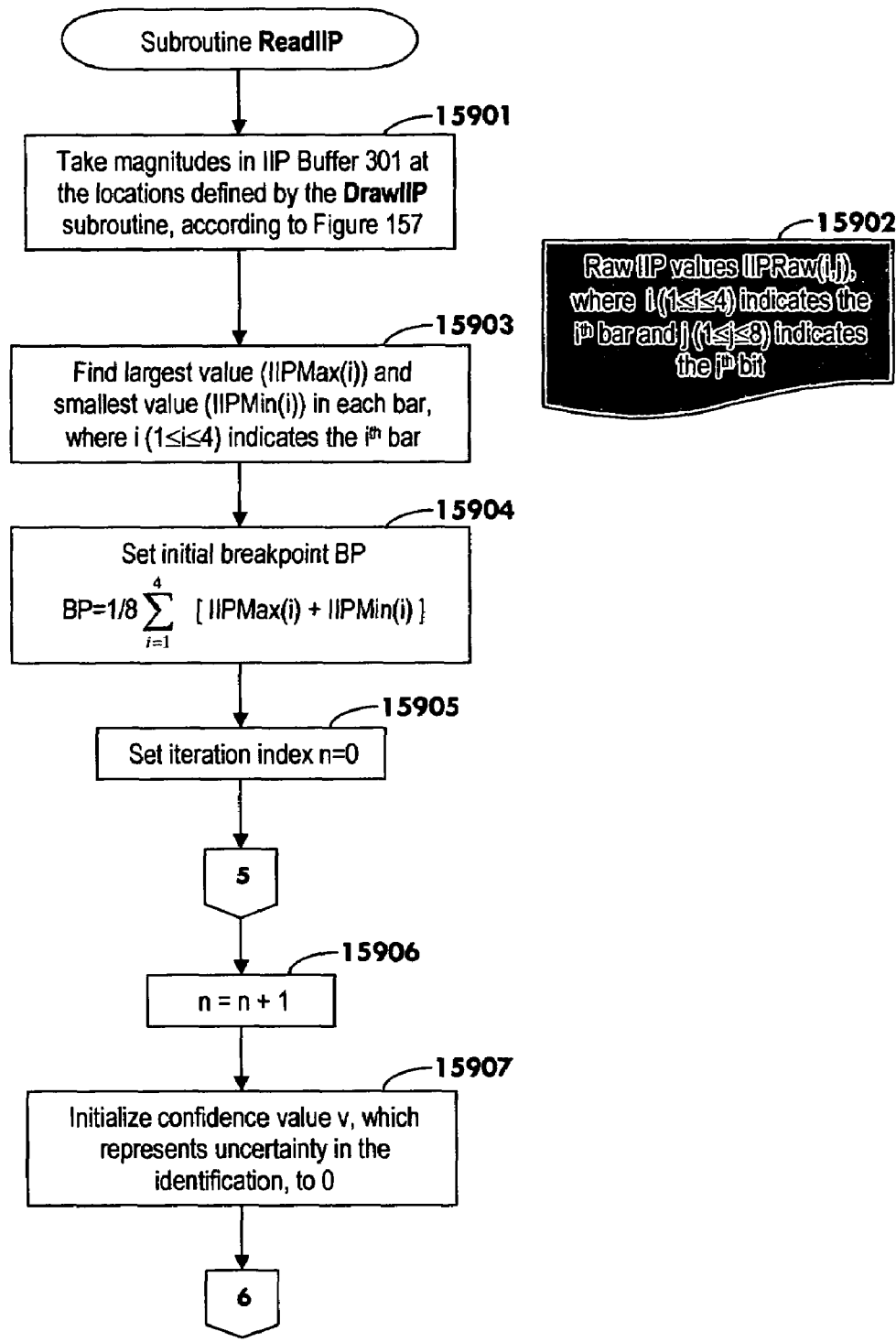

Subroutine ReadIIP

15901 — Take magnitudes in IIP Buffer 301 at the locations defined by the DrawIIP subroutine, according to Figure 157

15902 — Raw IIP values IIPRaw(i,j), where i (1≤i≤4) indicates the $i^{th}$ bar and j (1≤j≤8) indicates the $j^{th}$ bit 15903 — Find largest value (IIPMax(i)) and smallest value (IIPMin(i)) in each bar, where i (1≤i≤4) indicates the $i^{th}$ bar 15904 — Set initial breakpoint BP $$BP = 1/8 \sum_{i=1}^{4} [\,IIPMax(i) + IIPMin(i)\,]$$

15905 — Set iteration index n=0

5

15906 — n = n + 1

15907 — Initialize confidence value v, which represents uncertainty in the identification, to 0

6

Flowchart for software embodiment: Read IIP (continued)

Flowchart for software embodiment: Read IIP (continued)

Flowchart for software embodiment: Read IIP (continued)

ASSOCIATIVE MEMORY DEVICE AND METHOD BASED ON WAVE PROPAGATION

CROSS REFERENCE TO RELATED APPLICATION

This application is related to U.S. provisional patent application No. 60/407,011, filed on Aug. 29, 2002, entitled ASSOCIATIVE MEMORY DEVICE AND METHOD BASED ON WAVE PROPAGATION, the entire contents of which are incorporated herein by this reference. The Applicant hereby claim the benefits of this earlier pending provisional application under 35 U.S.C. Section 119(e).

INCORPORATION BY REFERENCE

The Tables referred to herein are filed herewith on the following CD-ROM/CD-R compact discs, and are such Tables are incorporated herein by reference. The information on the two (2) CD-ROM/CD-R compact discs are identical.

CD-ROM/CD-R compact disc Copy 1 has the following identifying information on the label: "Associative Memory Device and Method Based on Wave Propagation", "Inventor: Paul Rudolf", "Attorney: Mike Cameron", "Docket: 121306.00002", "Copy 1". Included on said CD-ROM/CD-R compact disc Copy 1 is the Text File "CharliePatent.txt", created on Jan. 19, 2002. The Text File "CharliePatent.txt", is 194,560 bytes (190KB) in size. The machine format is IBM-PC and the operating system is MS-DOS or MS-Windows. The ASCII file can be read through a word processor using the plain text encoding format. Alternatively, the ASCII file can be read using a standard text editor, such as MS-NotePad.

CD-ROM/CD-R compact disc Copy 2 has the following identifying information on the label: "Associative Memory Device and Method Based on Wave Propagation", "Inventor: Paul Rudolf", "Attorney: Mike Cameron", "Docket: 121306.00002", "Copy 2". Included on said CD-ROM/CD-R compact disc Copy 2 is the Text File "CharliePatent.txt", created on Jan. 19, 2002. The Text File "CharliePatent.txt", is 194,560 bytes (190KB) in size. The machine format is IBM-PC and the operating system is MS-DOS or MS-Windows. The ASCII file can be read through a word processor using the plain text encoding format. Alternatively, the ASCII file can be read using a standard text editor, such as MS-NotePad.

response." In contrast to standard computer memory systems, patterns are recalled intrinsically rather than being indexed by a computer address in RAM or on a storage device such as a hard drive.

The major types of previously developed associative memories devices and methods are discussed herein. The advantages of the present invention over the previously developed devices and methods are then discussed. Inasmuch as associative memories are frequently used for pattern recognition, the present invention is also contrasted with general pattern recognition methods as well as with methods developed for specific applications, such as fingerprint identification, face recognition, and signature verification. General types of associative memories include those utilizing optical or holographic processing, those utilizing custom circuit assemblies, and those based on neural networks.

Optical/Holographic Associative Memories

One class of associative memories comprises a combination of physical optical elements such as lenses, mirrors, lasers, and photodiodes with standard electronic processing elements, like computer CPUs. An optical associative memory disclosed by Mukohzaka in U.S. Pat. No. 4,974,202 and U.S. Pat. No. 5,526,298 employs a combination of spatial light modulation tubes, lens arrays, and electronic components to convert patterns between electrical and optical formats. Association of input patterns with their respective desired responses is handled by formation of an electronic autocorrelation memory matrix, which is converted to optical form and stored via spatial light modulation tubes. A pattern to be recalled is optically processed by an inverse image formation system and introduced to the memory matrix for recognition.

There are several disadvantages to Mukohzaka's optical associative memory that are overcome by the present invention. First, multiple inputs of each pattern to be learned must be introduced to the system. Second, a feedback loop of multiple learning iterations must be performed for the memory matrix to converge to a form usable for successful recall. Finally, as a system dependent upon physical optical components such as photoelectric sensors, lenses, and shutters, it is constrained by defects, degradation, and inherent resolution and measurement limitations in those devices.

LENGTHY TABLES

The patent contains a lengthy table section. A copy of the table is available in electronic form from the USPTO web site (http://seqdata.uspto.gov/?pageRequest=docDetail&DocID=US07512571B2). An electronic copy of the table will also be available from the USPTO upon request and payment of the fee set forth in 37 CFR 1.19(b)(3).

BACKGROUND OF THE INVENTION

1. Field of the Invention

The present invention relates to devices and methods for implementing associative memories, or content-addressable memories, based on wave propagation characteristics.

2. Description of Related Art

Sutherland, in U.S. Pat. No. 5,515,477, discloses an associative memory is "one in which stimulus/response pairs of information are stored in such a way that the introduction of a stimulus pattern results in the recall of a memory-associated A second example of an optical associative memory is disclosed by Scarr in U.S. Pat. No. 4,701,879. It consists of a matched optical holographic filter with three planes coupled to a digital computing system. An input signal is converted to a binary representation on the input plane. Coherent illumination directs the binary input through a thin spherical lens onto a Fourier transform plane (FTP), on which a hologram is formed. When a pattern is to be recalled, it travels from the input plane through the first spherical lens to the FTP. The stored hologram on the FTP passes through the second spherical lens to reform an associated image on an output plane. Photodetectors in the output plane can be used by the attached digital computing system to process the recalled pattern.

The present invention has several advantages over the Scarr disclosure. In Scarr, any defects or misalignments in the optical arrays would lead to malformed holograms and thus poorly recalled patterns. Also, the system needs to be tuned carefully so that autocorrelation terms in the hologram are not overwhelmed by noise created by cross-correlation terms, especially for more complicated input patterns. Finally, Scarr notes that data page storage capacity is limited by the relatively low density of detectors that can be arranged together on the input plane given current sensor technology.

Circuit-based Associative Memories

A second class of associative memories is based upon custom-built electronic circuits, which can be integrated into standard computers. Examples of this type of associative memory system are those disclosed by Keiichi, et al., U.S. Pat. No. 5,568,416, Hiraki and Hata, U.S. Pat. No. 5,485,418, Shindo, U.S. Pat. No. 5,933,363, Correa, U.S. Pat. No. 5,619,718 and Yoneda, U.S. Pat. No. 5,483,480 and Yoneda, U.S. Pat. No. 6,125,426

The disclosed systems implement a content-addressable memory by connecting binary input registers with an array of additional registers that hold stored sequences of binary numbers. The array of storage registers is connected to a decoder array by a series of match lines that include transmission gates. When a pattern is input to be recalled, the memory does a global bitwise comparison across all the stored patterns. Segments of the input pattern that match stored patterns cause the precharged transmission lines to be discharged, and a sense amplifier is typically used to measure the extent of agreement with previously stored data and, thus, to decode the input data.

There are several disadvantages of circuit-based associative memories compared to the present invention. First, each successful retrieval operation will involve the discharging of one and possibly many transmission lines, each of which must be recharged prior to the next retrieval operation. Thus, there are both timing and electrical power consumption limitations inherent in this class of associative memories. Second, this type of system does not admit a clear possibility of improvement of learning or generalization of stored patterns via incorporation of new data.

Neural Network-Based Associative Memories

A third class of associative memories is based upon neural networks. Neural networks comprise massively parallel adaptive processing elements, or nodes, with hierarchically structured interconnections, or synapses. Each processing element is analogous to a neuron in a biological system. The strength of the connection between any two elements in a neural network is characterized by a numerical parameter called a weight. The "memory" of a neural network is captured by the set of synaptic weights.

Pattern recognition using a neural network is generally accomplished in two phases. In the training phase, an input data set is used to determine the weight parameters that define the neural model. This trained neural model is then used in the retrieving phase to process real test patterns and yield classification results. Exemplary pattern recognition systems based on neural networks include those disclosed by Ono and Osawa, U.S. Pat. No. 5,740,274, Javidi, U.S. Pat. No. 5,699,449, Suzuoka, U.S. Pat. No. 5,524,177, Maruyama, et al., U.S. Pat. No. 6,067,536, Kuratomi and Ogawa, U.S. Pat. No. 5,511,134, Tattersall, U.S. Pat. No. 6,272,241, and Hori, et al., U.S. Pat. No. 6,332,137.

There are disadvantages to using neural networks for many real-world pattern recognition tasks. First, in order to resolve patterns accurately, in many cases the size of the network needed becomes prohibitive for real-world applications. Second, in many cases, very large sets of input data (tens of thousands of inputs) are required in order to train the network. In fact, in order to attempt to handle inevitable variations between data presented to be learned and then recalled, neural networks often need to have been presented with multiple submissions of a specific input pattern. Even with redundant learning patterns, training of neural networks can be challenging. For example, in Suzuoka, U.S. Pat. No. 5,524,177, it is disclosed that "the memorization of the patterns becomes difficult very rapidly for the higher noise level" in the energy-minimization-based neural network model disclosed therein. Third, the commonly used gradient-descent approach for calculating weights results in information loss and decreased accuracy as numerical truncation errors propagate throughout the system. Fourth, even versions that address error propagation, such as Boltzmann machines, are limited in their commercial applicability by the long execution times that can be required to reach optimal solutions to classification problems.

Some inventors have attempted to improve the behavior of neural network-based pattern recognition systems by devising hybrid systems, which include components that use complementary recognition approaches, such as fuzzy logic as disclosed in Persaud, U.S. Pat. No. 6,192,351, binary decision trees as disclosed by Gaborski, et al., U.S. Pat. No. 5,857,030, geometric correlation as disclosed in Chiu, et al., U.S. Pat. No. 5,696,838 and U.S. Pat. No. 5,995,652 and competitive learning algorithms as disclosed in Nguyen, U.S. Pat. No. 6,038,338.

While the hybrid nature of these combination techniques is claimed to lessen the impact somewhat of some of the neural network limitations noted above, significant shortcomings still persist in each of the hybrid systems relative to the present invention. For example, the neural net/geometric correlation system of Chiu, et al. U.S. Pat. No. 5,696,838 and U.S. Pat. No. 5,995,652, is limited by its neural net's reliance upon a binarized (black/white) form of input data rather than a grayscale or continuous one. Also, because that system relies upon breaking an original single input pattern into multiple sub-patterns, computation time and storage requirements both increase exponentially as the size of the original input pattern increases.

In the Sutherland patent, supra, a neural network-based associative memory system is disclosed which cited an ability to control the extent to which "a most recently encoded relationship will displace earlier stimulus-response mappings." However, the present invention has several advantages relative to the Sutherland invention. First, multiple, "training" input signals are required to modify the correlation matrix so that the invention of Sutherland can successfully recognize an input pattern; the system cannot recognize a pattern introduced only once. A second disadvantage stems from the system's method for encoding input data. The Sutherland invention uses a complex number representation in which the magnitude of the complex number reflects a degree of confidence and the phase angle encodes the actual input value through a sigmoidal transformation. That is, all possible real-valued input signals (from $-\infty$ to $+\infty$) are mapped via a sigmoid function to the interval $(-1, +1)$. While bounding input signals effectively, this preprocessing step has the negative consequence of making some input signals hard to distinguish from one another after the transformation. Indeed, Sutherland discloses that "These [complex] numbers require a relatively low numeric resolution (8-16-bit dynamic range) to facilitate very high coding densities."

General Classes of Pattern Recognition Methods

Representative types of pattern recognition methods include expert systems, fuzzy logic systems, support vector machines, pattern-matching circuits, among other techniques.

Expert Systems

One class of pattern recognition techniques is based on expert systems, which are computer applications constructed to simulate the judgment or behavior of a person who is an expert in a particular field. In general, an expert system possesses a knowledge base of experience and a plurality of rules to define how the knowledge base should be applied in various situations. As applied to pattern recognition problems, expert systems typically involve a set of explicit rules (effectively, sets of "if/then" statements) that are processed by an inferential engine to identify input patterns. One example of such an expert system is that of Lui Sheng, et al. U.S. Pat. No. 5,615,112. The Lui system is based on a combined knowledge-base/database including class and attribute definitions and "if/then" rules to execute against input data. A second representative expert system is that of Leghazzawi, U.S. Pat. No. 5,819,007, which differed from prior expert systems in that its rules are applied in a parallel fashion, rather than in a serial, decision-tree mode. Thus, a single rule that is erroneously applied does not necessarily lead to a false identification.

As a class, expert systems possess several important disadvantages relative to the present invention. First, many expert systems use binary ("yes/no") decisions to determine the result of each specific rule. Such expert systems are inherently limited in their ability to handle noise or uncertainty in making identification decisions. Second, the rule sets to be used by the expert systems must be generated—either explicitly by human experts or heuristically by other ad hoc procedures. As such, it can be difficult to determine whether enough rules have been written and indeed whether those are the correct rules to apply. Third, as pattern recognition problems grow in complexity, the number of required rules goes up, as do the processing time and the effort required to maintain the rule sets. Finally, unlike the present invention, expert systems do not exhibit the property of learning or improving their identification performance beyond the explicit rules they possess.

Fuzzy Logic

Based on the initial work of Lotfi Zadeh during the 1960s, fuzzy logic is an extension of conventional Boolean logic that defines a continuous range of truth values between the standard Boolean endpoints of 0 (completely false) and 1 (completely true). Thus, fuzzy logic represents vagueness mathematically and provides a framework for dealing with imprecision in problems such as pattern recognition. A typical fuzzy logic recognition system includes a rule set, membership functions, and an inference engine. The membership functions allow the inference engine to apply one or more rules to an input pattern based on how well it satisfies the conditions for each rule. For instance, a pattern with a particular feature might partially satisfy two different membership functions and thus trigger two different rules. Examples of fuzzy logic pattern recognition systems include those of Palm, U.S. Pat. No. 5,924,052, Davis, et al., U.S. Pat. No. 5,974,350, Runkler and Bezdek, U.S. Pat. No. 6,094,646, Phillips and Nettles, U.S. Pat. No. 5,893,085, Liu, U.S. Pat. No. 6,012,640 Shi and Lin, U.S. Pat. No. 6,272,476, and Mahler, U.S. Pat. No. 5,748,852.

While fuzzy logic systems have advantages over conventional Boolean expert systems, the former possess significant limitations for real-world pattern recognition applications, compared with the capabilities of the present invention. Membership functions must be defined, either heuristically by humans based on their intuition or statistically based on ground truth data. As such, it is difficult to define membership functions that will work optimally for a broad range of complex input patterns. The accuracy of fuzzy logic systems can be significantly reduced by inadequate definitions of membership functions. Furthermore, essentially the same disadvantages of the rule sets of expert systems apply also to those of fuzzy logic systems (e.g., potentially incomplete or incorrect rule sets, large rule sets with long execution times and heavy maintenance burdens, etc.)

Pattern-Matching Circuits

A number of pattern recognition systems are based on the design of specialized circuits to carry out the identification process. In the system disclosed by Takahashi, et al., U.S. Pat. No. 6,337,926, an input image is scanned, rotated at multiple angles, and stored for reference. For recall purposes, a set of image masks is defined to scan across an image to be identified, and statistical operations are performed within each masking area to determine whether the image presented matches any of the stored reference images. The invention disclosed in Kitamura, et al., U.S. Pat. No. 5,757,287, uses a shade template memory circuit to encode the shading characteristics of an input image into a template, and then for recall, a shade pattern matching circuit attempts to link the unidentified pattern to the registered image that is the closest match. The system disclosed by Shou, et al., U.S. Pat. No. 5,579,411, includes a circuit that matches an input image with a template based on a correlation function. In this latter case, correlation functions are applied to each of the registered images, and then an image to be identified is processed similarly and matched based upon the closest correlation results. A variant disclosed by Lee and Moon, U.S. Pat. No. 5,671,292, takes an even simpler approach in that images are modeled as having two threshold values. For recognition, the threshold values of an input pattern are compared against those of the previously stored patterns, and the stored pattern with the closest threshold values is presented as the identification.

While pattern recognition systems that utilize specialized circuits, such as those noted above, do generally operate at high speeds, they are significantly limited in breadth of applicability due to a number of disadvantages. Typically, these systems feature relatively simple analysis capabilities and thus can have difficulty recognizing patterns that are complex, have significant noise levels, or show data corruption. In addition, such systems do not generally possess any ability to improve their identification performance over time through adaptive learning or generalization.

General Feature Extraction Methods

Another important class of pattern recognition systems is based on various approaches for feature extraction. The system disclosed in Downey, U.S. Pat. No. 6,078,884, primarily targeted toward speech recognition, uses a frame generator to divide an input pattern into segments, a feature extractor to derive sets of characteristics from the data, a noise generator to account for background noise that permeates input signals, and a classifier processor, such as one that uses hidden Markov models (HMMs), to classify the data and find the stored template that best matches an unidentified input. The system disclosed by Ilan and Goldberger, U.S. Pat. No. 6,195,638, focused on aural data, uses a method of dynamic time warping to fold input patterns onto each other in order to compare feature sets more accurately.

The invention disclosed in Souma and Kenji, U.S. Pat. No. 5,901,244, uses feature extraction and feature vector matching in two distinct phases to avoid the problem of feature vectors becoming indistinguishable from each other. The first phase does an initial mapping to a likely area of matching feature vectors, and the second phase uses a projection method to define a partial vector subspace in which the best possible match is more readily calculated.

The invention disclosed in Anderholm, U.S. Pat. No. 6,081,620, extracts line segments from an image, groups them into features within cells defined with the overall image, and uses the pixel counts within the resulting cells as pattern templates to be matched using Bayesian statistics and genetic algorithms. Another geometrically oriented system, is disclosed by Rao, U.S. Pat. No. 6,278,798. It detects corners and edges within two-dimensional images and attempts to match those detected features to ones that would result from transforming (translating, rotating, or scaling) any of a set of three-dimensional models stored in memory.

The system of McQueen disclosed in U.S. Pat. No. 6,069,696, captures the spectral response of reflections from an object to be identified and uses the locations, amplitudes, and widths of energy peaks as the features to classify objects.

Finally, Levin, et al., U.S. Pat. No. 6,311,173, discloses an invention that utilizes generalized association rules to aid in the process of classifying objects according to features or attributes. Whereas simple association rules are equivalent to basic "if/then" statements for sorting input data, generalized association rules include multiple conditions that can include multiple Boolean operators (OR, AND, NOT, . . . ) to allow more sophisticated decision-making. The aim of these generalized rules is to avoid the "overtraining" that can cause a trained system not to be as responsive to real-world data that were not represented in the original training sets.

While the above mentioned systems seem to work reasonably well in certain specific application areas, they have disadvantages relative to the present invention. In particular, methods based on feature extraction generally suffer from the problem that the features chosen by the system designer might not be optimal for all types of input patterns and that noise and data corruption can cause incorrect identifications if certain key attributes or features are missing or otherwise obstructed. The present invention overcomes these disadvantages.

Support Vector Machines

Support vector machines (SVMs) represent a relatively recent development in the area of trainable classifiers. SVMs are reported to perform better than Bayesian networks in text classification (See T. Joachims, "Text categorization with support vector machines," *Proceedings of European Conference on Machine Learning (ECML)*, 1998), and better than neural networks in decoding handwritten characters (See Y. LeCun, et al., "Comparison of learning algorithms for handwritten digit recognition," *Proceedings ICANN'95—International Conference on Artificial Neural Networks*, Vol. II, pages 53-60. EC2, 1995). SVMs classify or recognize input patterns using N-dimensional feature vectors, that is, sets of N identifiable features used to classify data. SVMs are trained by submitting known input vectors along with their proper classifications and then adjusting parameters to define hyperplanes that separate groups of feature vectors in one class from those belonging to other classes. Thus, training an SVM involves solving a constrained optimization problem. The computational requirements of solving these optimization problems can be too large for real-world applications, as the matrices involved can quickly exceed the memory and computing capacity of many computers. Some researchers have developed approaches to ease the computational burden of training SVMs. For example, the support vector machine disclosed by Platt, U.S. Pat. No. 6,327,581, uses analytic, rather than numerical, solutions to the smaller quadratic subproblems, and thus seems to perform better than versions that rely solely upon numerical solutions.

Nonetheless, SVMs exhibit several disadvantages relative to the present invention. In many cases, the number of examples required for successful training can be large enough to make real-world applications difficult. Also, in some cases, a significant number of input feature vectors are unseparable, that is, they cannot easily be separated into distinct classes using hyperplanes. While workarounds such as so-called "slack" points and cost functions exist, they add further design and computational tasks. Finally, the reliance of SVMs upon explicitly chosen sets of features can be problematic. For example, in Platt, supra, it states "There are some degenerate cases where different examples have the same input feature vectors. This could prevent the joint optimization from making forward progress."

Application-Specific Pattern Recognition Methods

Numerous sets of pattern recognition methods have been developed for use in specific application areas. Representative techniques in fingerprint identification, face recognition, and signature matching are disclosed below.

Fingerprint Identification

Because fingerprints are believed to be unique to each individual, fingerprint identification has long been important in criminal justice and more recently in biometric security. Consequently, extensive research work has been done to develop fingerprint identification (1:N) and verification (1:1) methods. Most of the methods are based upon the extraction, analysis, and comparison of fingerprint features, such as ridge flow patterns and frequency, positions of singularities like cores and deltas, minutia points (which are ridge endings and ridge bifurcations), and pore locations (See S. Pankanti, S. Prabhakar, and A. K. Jain, "On the Individuality of Fingerprints," *IEEE Transactions on Pattern Analysis and Machine Intelligence*, Vol. 24, No. 8, August 2002). Quite a few fingerprint matching systems are primarily based on minutiae matching, although some systems use minutiae in combination with some of the other fingerprint features noted above.

A fingerprint identification method disclosed by Ort, et al. U.S. Pat. No. 5,659, 626, U.S. Pat. No. 5,799,098, and U.S. Pat. No. 5,926,555, aligns prints using ridge angle maps and then extracts minutiae by applying Gabor and minutia filters. Identification is accomplished using the minutiae information together with data on the number of ridges between cores and deltas. The invention disclosed in Yamaguchi, U.S. Pat.

No. 5,995,641 uses minutiae matching and calculates average luminance statistics so that libraries of fingerprint images can be kept consistent over time. The system disclosed by Davis U.S. Pat. No. 5,420,937, extracts minutiae by scanning the print to detect ridge pixels and tracing out the paths of the ridges using "tracker" pixels. The method disclosed by Lo and Bavarian, U.S. Pat. No. 5,960,101, does an initial round of minutiae matching followed by a second matching in which their system uses ridge counts and angular displacements to refine the search for matching prints.

Other methods have been used. The system disclosed by Meadows and Pouratian, U.S. Pat. No. 5,869,822, generates a composite number based on characteristics like block orientation, row flow, print width, ridge flow, ridge counting, and average brightness. An average composite number is calculated from several prints upon registration, which must then be matched to yield a positive identification. The invention of Gagne and Puterko disclosed in U.S. Pat. No. 6,212,290, calculates ridge counts along various horizontal, vertical, and diagonal lines that cross each fingerprint. The ridge counts are used as a non-minutiae numerical identifier.

These methods disclosed have several disadvantages that are overcome by the present invention. Systems that match extracted features like minutiae are susceptible to errors caused when genuine features are missed or when spurious features are mistakenly identified. In Ort, et al., supra, it states that such problems can arise from "over inking, low contrast, scratches, pencil marks" and from "acquired artifacts in the fingerprint itself, such as cuts, scrapes, abrasions, and scars." Similarly, Pankanti, et al. note that sources of variability in multiple impressions of the same finger arise from "non-uniform contact (with the sensor), irreproducible contact, inconsistent contact, and imaging artifacts" and hence that "the probability of false correspondences increases significantly" (See Pankanti, S. Prabhakar, and A. K. Jain, "On the Individuality of Fingerprints," *IEEE Transactions on Pattern Analysis and Machine Intelligence*, Vol. 24, No. 8, August 2002 (in Press)). These types of problems are exacerbated when only a partial print is available, as in the forensic analysis of latent prints.

Face Recognition

Face recognition is another important area of biometrics security. As with fingerprint identification methods, many face recognition systems are geared towards extracting specific features of the human face, representing the features in some fashion, and then performing a match of the features of a newly presented face to those corresponding to faces already registered.

For example, the approach of Lin, as disclosed in U.S. Pat. No. 6,108,437, is to extract at least two features (eyes, nose, mouth, . . . ) from a digital image of a face through template matching circuits specific to each characteristic. A neural network is used to assign a confidence measure to each. After the features of registered faces are stored in a database, new faces are identified by finding the feature set closest to that of the face to be recognized. Alternatively, Podilchuk and Zhang disclose in U.S. Pat. No. 5,802,208, signal compression techniques like the discrete cosine transform to encode face images into a "codebook." Then an image to be recognized is similarly processed and matched against the codebooks corresponding to registered faces by minimizing the total error. A two-layer neural network is employed by Javidi, as disclosed in U.S. Pat. No. 5,699,449, to learn a set of face images and then identify new inputs based on the weight values established. In Javidi's invention, the first layer of the neural network is implemented optically using a laser, an optical non-linear joint transform correlator, and an LCD or optical film. While the optical components do offer rapid processing, they have the disadvantage of limitations arising from alignment, wear, and resolution limits associated with those physical devices.

In Turk and Pentland's face recognition system, as disclosed in U.S. Pat. No. RE36,041, the system represents face images as input vectors in a multidimensional image space and projects the input vector into a much smaller face subspace, formed by eigenvectors determined by principal component analysis. The eigenvectors, or eigenfaces, represent the variation among the set of face images and are used to characterize the learned faces. For recognition purposes, an input face is processed in similar fashion, and identification is made by finding the stored eigenface closest to the input's eigenface within the face subspace. The invention of Bortolussi, et al., as disclosed in U.S. Pat. No. 6,292,575, also uses eigenface matching.

A still different approach, elastic bundle graph matching, is disclosed in Steffens, et al., U.S. Pat. No. 6,301,370. That invention applies two-dimension Gabor wavelets at characteristic landmarks (eyes, mouth, nose, . . . ) to calculate "jets." That process is repeated for multiple inputs of the same face to yield bundles of jets at each landmark for a person's face. For recognition purposes, the same process is applied to an input image, and the resulting jets are compared with the bundles of jets of the stored faces to find the best match.

These systems and methods possess disadvantages that are overcome by the present invention. First, face recognition systems that employ neural networks encounter the same difficulties noted earlier for neural network-based associative memories. Second, systems that rely upon extraction of specific landmark features can produce erroneous results when the landmark features (eyes, nose, mouth, . . . ) either are difficult to classify due to noise or other variations in the image or are missing entirely, as is the case where a person's eyes are obscured by sunglasses.

Signature Matching

The verification of handwritten signatures is another pattern recognition problem of considerable interest, especially to the banking and financial services industries. Disclosed methods of signature verification differ based upon both the features or characteristics selected for analysis and the techniques used for comparing a newly presented signature to the stored data. For example, the system of Izuno, et al., as disclosed in U.S. Pat. No. 6,118,889, captures x (horizontal) and y (vertical) coordinate data as well as pressure readings taken throughout the course of a signature. The invention disclosed by Parks, et al., U.S. Pat. No. 4,495,644, measures velocities, accelerations, turning points, and pen-up and pen-down times and locations. Mean values and standard deviations for each measured characteristic are then used for verification. Because Parks found that many false rejections arose from natural variations (hesitations in signing a name, etc.), he adapted his earlier invention disclosed in U.S. Pat. No. 5,109, 426, to attempt to remove those variations in the event of a rejection and then to determine whether the modified trial signature would be acceptable. Smithies and Newman's system as disclosed in U.S. Pat. No. 5,544,255, measures size, shape, and relative positioning of the curves, loops, lines, dots, and crosses of the signature along with the relative speed of the inscription. They then use mean values and standard deviations to calculate confidence levels.

The invention of McConnell and Leistad disclosed in U.S. Pat. No. 6,148,093, abstracts the measurement process away from simply the written signature and measures six degrees of freedom of the writing instrument, capturing the three-dimensional position and rotation about three orthogonal axes over the time of the inscription. Another approach, taken in the system of Lee and disclosed at U.S. Pat. No. 6,236,740 measures the ratio of axial and lateral forces applied by a writing stylus to calculate the relative angle of the stylus throughout the signing process. The variations of the relative angle about a mean value are recorded as an identifying characteristic, which is then used as a reference value for verification. A more abstract approach is taken by Hu, et al. in U.S. Pat. No. 6,157,731. Their invention uses a hidden Markov model (HMM) to statistically represent the geometric features and timing characteristics of a signature. Multiple inputs of a given signature are used to "train" an HMM for that individual. The model represents the signing process as a sequence of states with transition probabilities and with explicit state durations to reflect how a person pauses while signing his or her name. For verification, a newly presented signature is analyzed in a similar way and a probability is calculated to estimate how well the new input matches the characteristics of the previously trained HMM. If the probability exceeds a predefined threshold value, then the signature is approved. Hu, et al. also present the concept of an overall complexity measure for each HMM to be used as a second distinguishing characteristic.

The primary disadvantage of the prior art methods compared with the present invention relates to the ability to allow for natural variations between the extracted features of previously registered signatures and those of ones to be verified. A number of the prior art systems suffer from an unacceptably high number of false rejections of genuine signatures. While some of these methods (for example, that of Parks disclosed in U.S. Pat. No. 5,109,426) make explicit attempts to reduce the occurrence of false negatives, those adjunct techniques are frequently ad hoc and require a fair amount of direct tuning by human experts.

OBJECTS OF THE INVENTION

Accordingly, the objects of this invention include the following:

Mimic Memory-Related Properties of the Human Brain:

It is an object of the disclosed associative memory device and method to emulate the following behavioral properties of the human brain.

Associative operation: Retrieval of prior inputs (also referred to as a memory or memories) functions in an associative way. That is, the presentation of a stimulus or prompt to the system yields a response associated with the stimulus or prompt. In this way, the recording medium (also referred to as the cortex) of the associative memory device and method is addressable by content rather than by lookup addresses.

Analog operation: The associative memory device and method functions in a non-digital manner, though some or all operation may be emulated in a digital domain. It accommodates continuous (as well as discrete) values in input patterns.

Distributed storage: The cortex stores an input, or association, spread across the entire recording medium, not just in a block. That is, a recorded input has no defined location in the cortex, as opposed to standard digital systems, which require a specific address and take up a certain area.

Persistence of stored data despite cortex damage: Prior inputs are able to be retrieved by the system, even if part of the associative memory device is damaged or part even destroyed.

Holistic treatment of inputs: The associative memory device and method interprets and processes an input pattern at once, in its entirety, rather than element by element.

Recording of data in the stored pattern: The information stored by the associative memory device is encoded in the pattern with which it was written on its recording medium.

Superposition of stored records: The associative memory device and method accommodates multiple records, or associations, being overlaid on top of each other in the recording medium, or cortex.

Emulate Higher Brain Functions

It is a further object of the disclosed associative memory device and method to emulate the following higher functions of the human brain.

Retrieval with a partial input: The associative memory device and method is able to recall a stored memory even if presented an incomplete part of the pattern originally stored.

Retrieval with an erroneous input: The associative memory device and method is able to recall a stored memory even if presented an input that differs in some significant details from the pattern originally stored.

Memory modification with experience: The associative memory device and method is able to incorporate new inputs and feedback on its retrievals in order to improve its recognition performance.

Formation of abstractions: As a result of the memory modification property, the associative memory device and method is able to form generalizations, or abstractions, that reflect the updated learning by the system.

Operate Autonomously

It is a further object of this associative memory device and method to operate autonomously, without constant human intervention.

Automated learning/registration: The associative memory device and method is able to accept an input pattern to be learned and, further, to receive arbitrary sets of information, commands, and corresponding threshold confidence levels to be associated with said input. For example, related information might include pictures, signatures, employee histories, etc. A possible command with a confidence criterion could be "Unlock the door if the confidence estimate in the identification is 90% or better."

Confidence level estimation: The associative memory device and method is able to internally generate an estimate of how accurate an identification, or correct response to a given stimulus, is.

Identification and appropriate reaction(s): Based upon the recognition(s) made, the associative memory device and method is able to retrieve, as accurately as possible, the appropriate identifying code; to generate the confidence estimate in its identification; to look up any information files associated with the retrieved pattern during registration; and to launch an appropriate set of actions based on the commands and corresponding threshold confidence levels previously defined by the system operator.

Support Wide-Scale Use

It is a further object of this associative device and method to integrate easily into multiple application settings across a broad range of uses:

Computer interface: The associative memory device interfaces easily with standard digital computers.

Universal input/output capability: The associative memory device is able to accept input/output (I/O) from any device, or sensor, such as scanners, digital cameras, microphones, odor detectors, etc.

Ease of mass production: The associative memory device is mass-producible and mass-marketable.

BRIEF SUMMARY OF THE INVENTION

Elements of the Invention

Details of the construction and operation of the present associative memory device and method will become evident through the complete description and figures that follow this section. The key elements of the invention are first enumerated.

Core Elements

Use of waves: The present invention uses the propagation of waves for information transport and storage.

Invertible association process: The present invention employs an association process based on any one of a class of invertible mathematical functions.

Superposition of stored associations: The capacity of the present invention to superpose multiple associations in its recording medium derives from the ability to add, or combine, waves.

Suppression of erroneous retrievals: With an appropriate choice of an invertible association function that displays the distributive property over addition, the present invention is shown to avoid erroneous retrievals of stored data, a crucial capability for any associative memory system. The use of the word "distributive" in the foregoing sentence is meant in the formal sense of a mathematical property. For example, the mathematical distributive property of multiplication over addition is given by the equation a (b+c)=ab+ac.

Integration Elements

Input/output buffers: The present invention employs one or more components called buffers to enable data to be sent into and then retrieved from the core of the associative memory system, the cortex.

Use of the Kirchhoff wave equation: The present invention makes use of the Kirchhoff wave equation in the manner described by the inventor in "Computer modeling wave propagation with a variation of the Helmholtz-Kirchhoff relation," *Applied Optics*, Vol. 29, No. 7, 1 Mar. 1990, to interpret the data within binary files on a digital computer as the discretized values of complex wave fields.

Use of raw binary data: The present invention can use input binary information stripped of any application-specific header or footer information. This ensures that the invention can process any computer data file regardless of the driver, I/O device, or application.

Autonomous Operation Elements

Generation of a unique, machine-readable pattern: The present invention can generate a unique pattern or internal identification pattern ("IIP") that may have built-in redundant features and is machine-readable. As used in the preceding sentence, machine-readable means it is possible for a computer or other device to determine the originating identifier code given the IIP. The IIP is associated with a file to be stored.

Code extraction: During the identification phase, the present invention uses an inverse procedure to extract, as accurately as possible, multiple, redundant copies of the identifier code from a retrieved pattern, or IIP, to make an identification. If the file has not previously been learned by the current invention, then no readable pattern is retrieved by the system.

Confidence estimation: Relying upon features described herein, such as contrast ratio, the redundancy designed into the original IIP and noise level, the present invention can evaluate the consistency of the retrieved, redundant copies of the identifier code to calculate a confidence estimate. This estimate can then be used by the system to output appropriate sets of user-defined instructions. For example, an instruction may be: "Unlock the door if the identification is at least 95% certain."

Figure 120A:
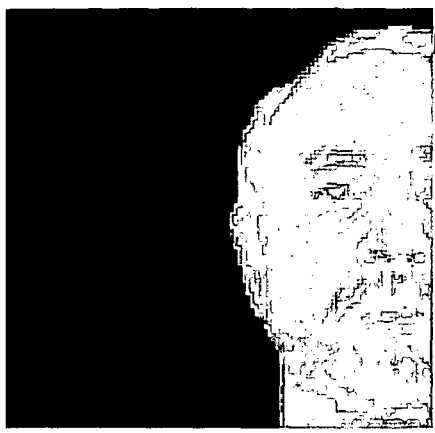
Figure 120B:
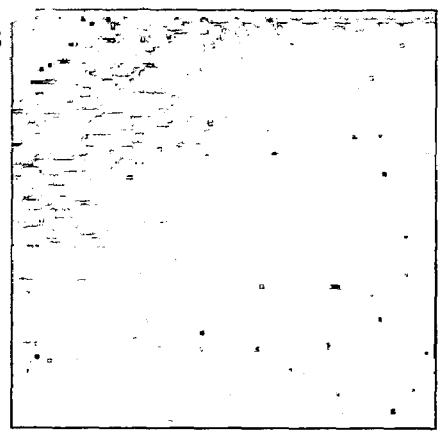

FIGS. 120(a) and 120(b) are two images used to test operation of the software based embodiment of the present invention.

Figure 121:
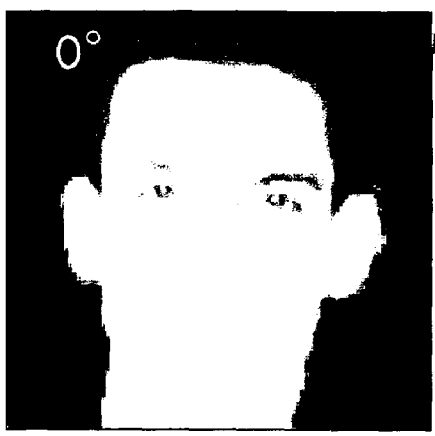

FIG. 121 is an image used to test operation of the software based embodiment of the present invention.

Figure 122:
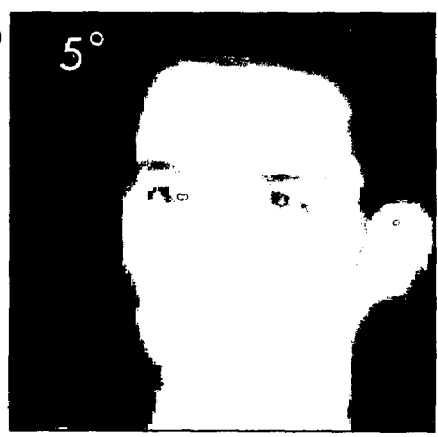

FIG. 122 is an image used to test operation of the software based embodiment of the present invention.

Figure 123:
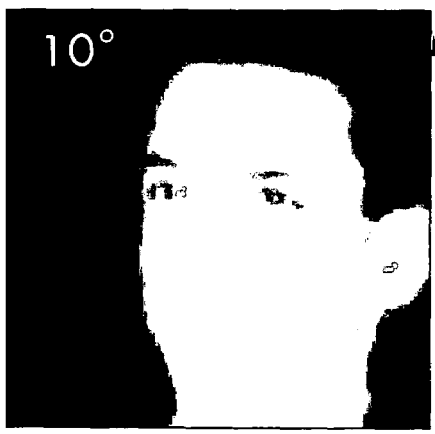

FIG. 123 is an image used to test operation of the software based embodiment of the present invention.

Figure 124:
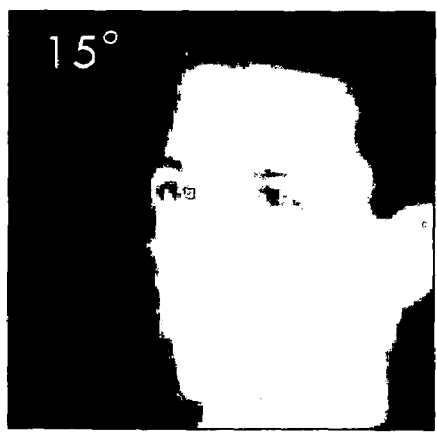

FIG. 124 is an image used to test operation of the software based embodiment of the present invention.

Figure 125:
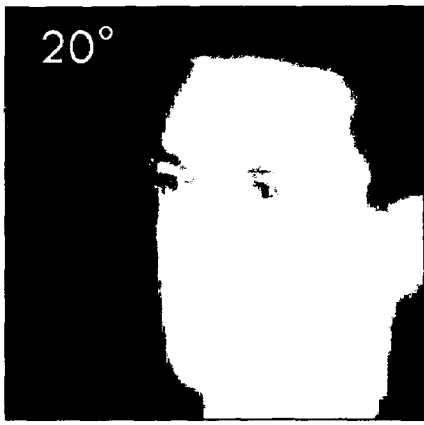

FIG. 125 is an image used to test operation of the software based embodiment of the present invention.

Figure 126:
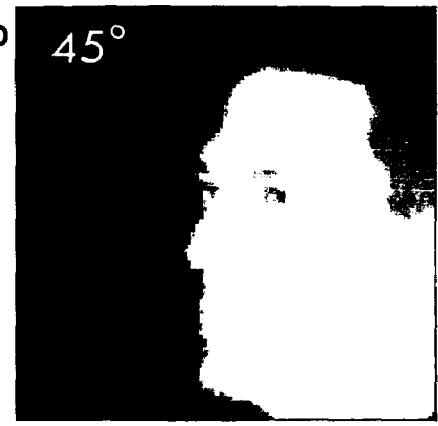

FIG. 126 is an image used to test operation of the software based embodiment of the present invention.

Figure 127:
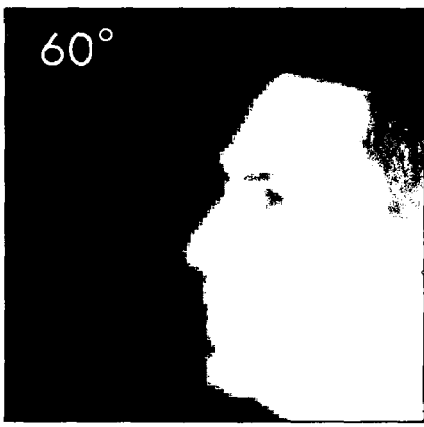

FIG. 127 is an image used to test operation of the software based embodiment of the present invention.

Figure 128:
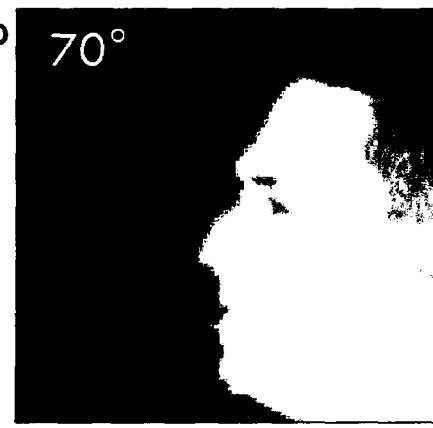

FIG. 128 is an image used to test operation of the software based embodiment of the present invention.

Figure 129:
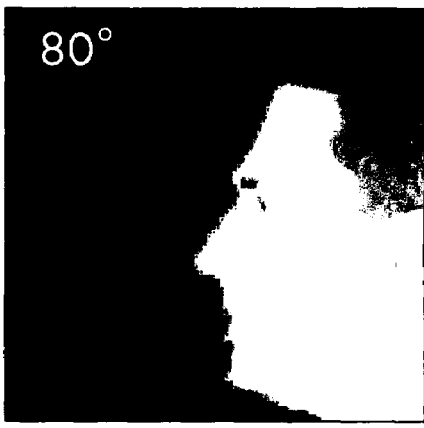

FIG. 129 is an image used to test operation of the software based embodiment of the present invention.

Figure 130:
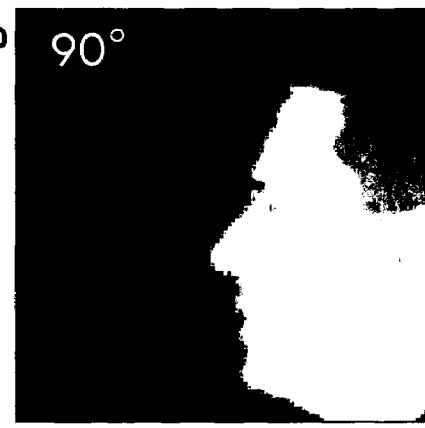

FIG. 130 is an image used to test operation of the software based embodiment of the present invention.

Figure 131:
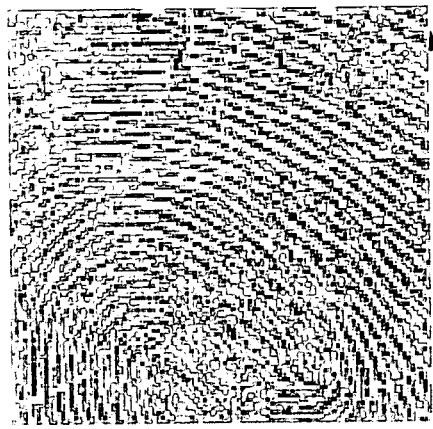

FIG. 131 is an image used to test operation of the software based embodiment of the present invention.

Figure 132:
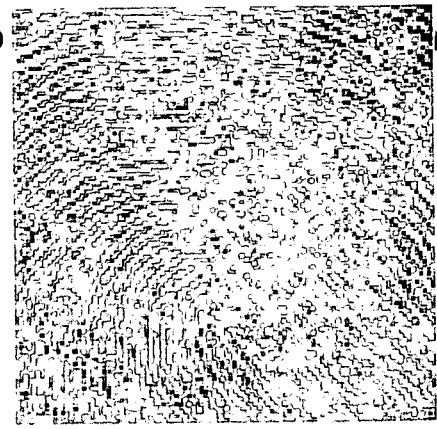

FIG. 132 is an image used to test operation of the software based embodiment of the present invention.

Figure 133:
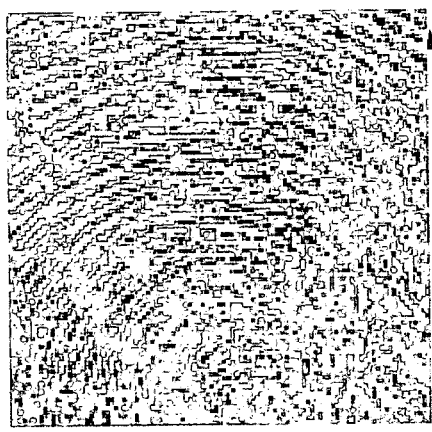

FIG. 133 is an image used to test operation of the software based embodiment of the present invention.

Figure 134:
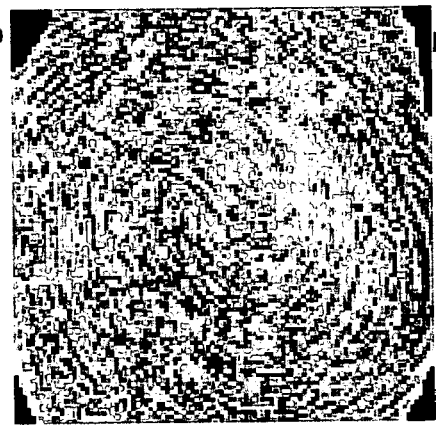

FIG. 134 is an image used to test operation of the software based embodiment of the present invention.

Figure 135:
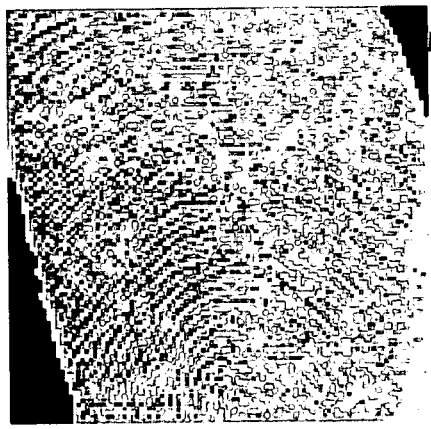

FIG. 135 is an image used to test operation of the software based embodiment of the present invention.

Figure 136:
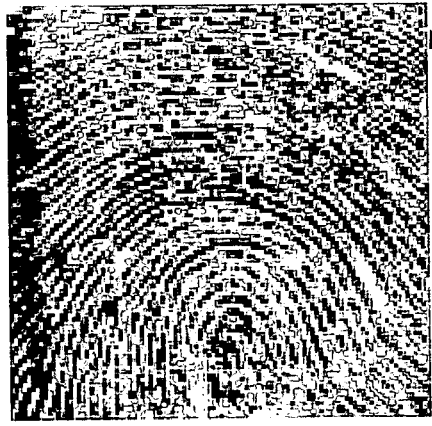

FIG. 136 is an image used to test operation of the software based embodiment of the present invention.

Figure 137:
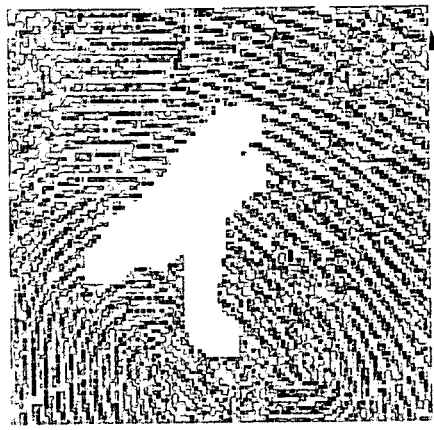

FIG. 137 is an image used to test operation of the software based embodiment of the present invention.

Figure 138:
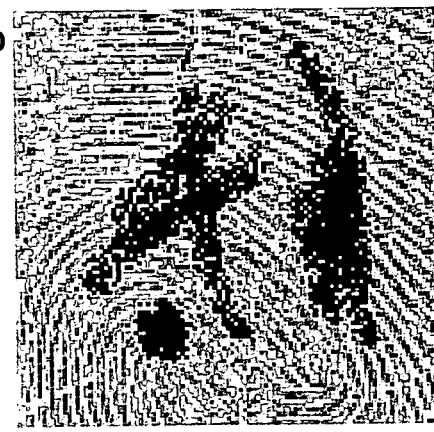

FIG. 138 is an image used to test operation of the software based embodiment of the present invention.

Figure 139:
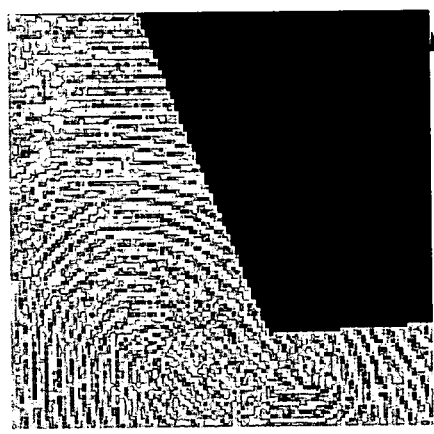

FIG. 139 is an image used to test operation of the software based embodiment of the present invention.

Figure 140:

FIG. 140 is an image used to test operation of the software based embodiment of the present invention.

Figure 141:

FIG. 141 is an image used to test operation of the software based embodiment of the present invention.

Figure 142:
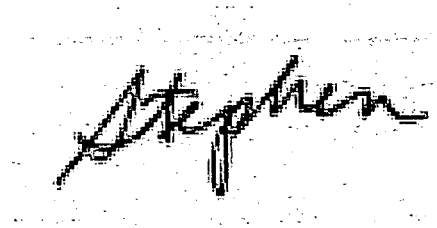

FIG. 142 is an image used to test operation of the software based embodiment of the present invention.

FIG. 143 is an image used to test operation of the software based embodiment of the present invention.

FIG. 144 is an image used to test operation of the software based embodiment of the present invention.

FIG. 145 is an image used to test operation of the software based embodiment of the present invention.

FIG. 146 is an image used to test operation of the software based embodiment of the present invention.

FIG. 147 is an image used to test operation of the software based embodiment of the present invention.

FIG. 148 is an image used to test operation of the software based embodiment of the present invention.

Figure 149:

FIG. 149 is an image used to test operation of the software based embodiment of the present invention.

Figure 150:

FIG. 150 is an image used to test operation of the software based embodiment of the present invention.

Figure 151:

FIG. 151 is an image used to test operation of the software based embodiment of the present invention.

Figure 152A:
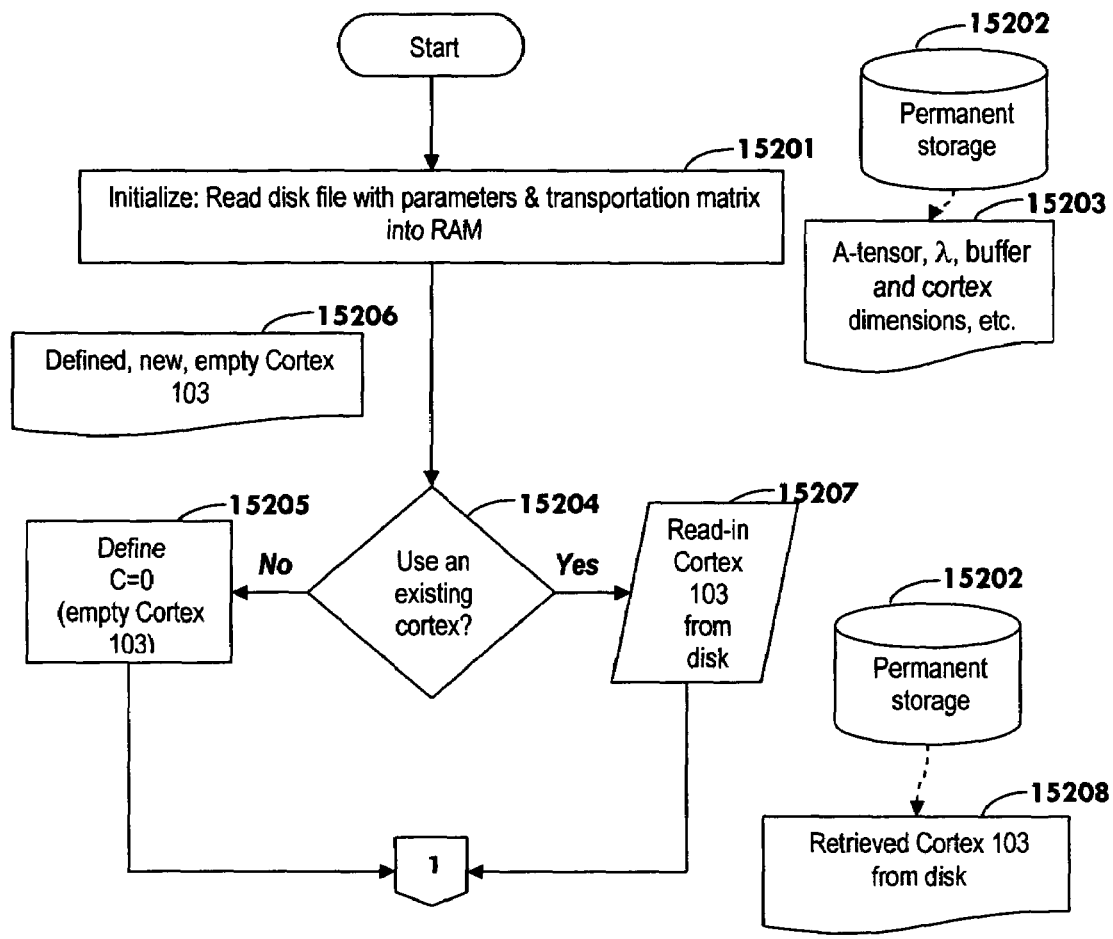
Figure 152B:
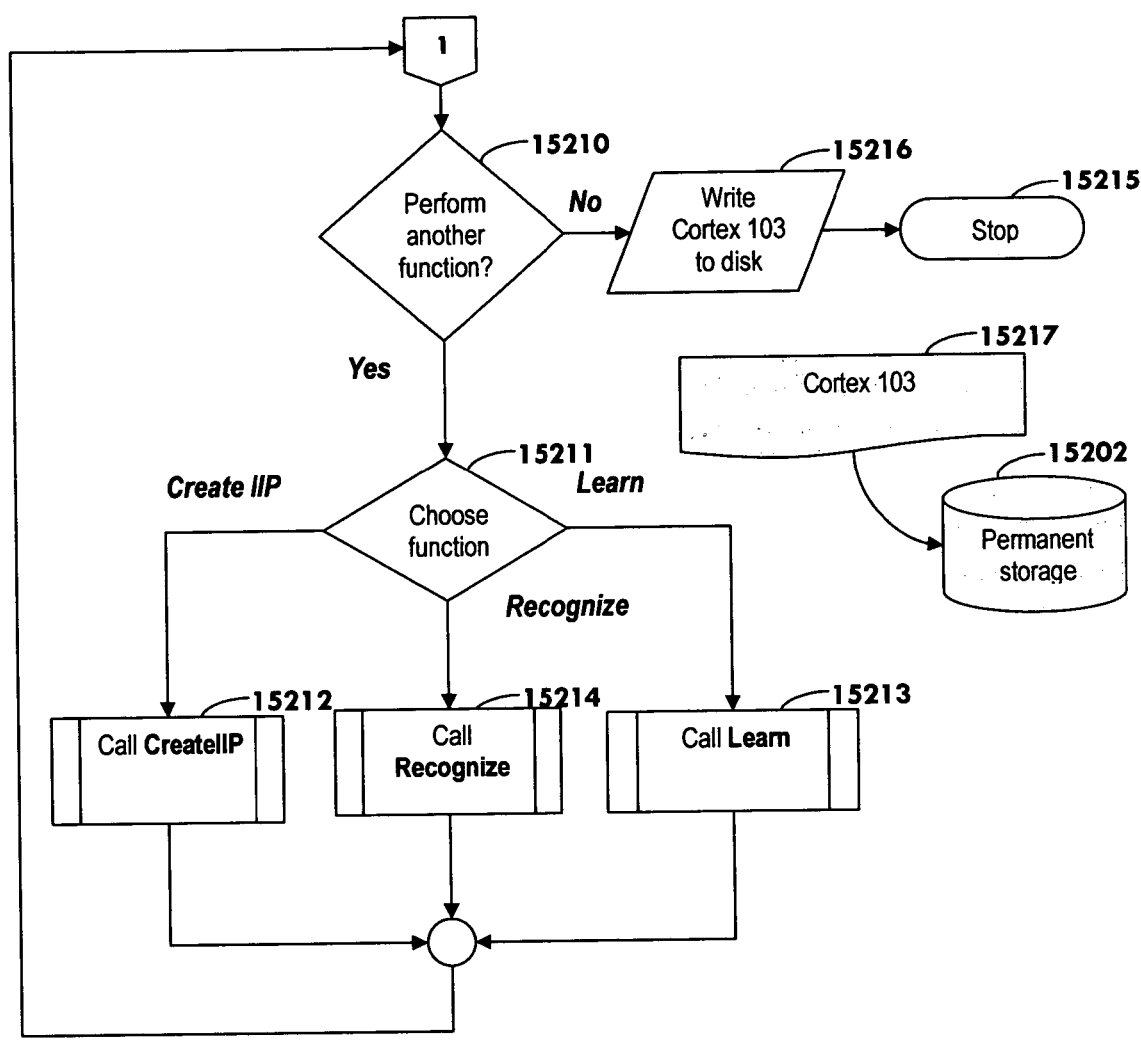

FIGS. 152(*a*) and 152(*b*) illustrate a flow chart for a software embodiment of the present invention.

Figure 153:
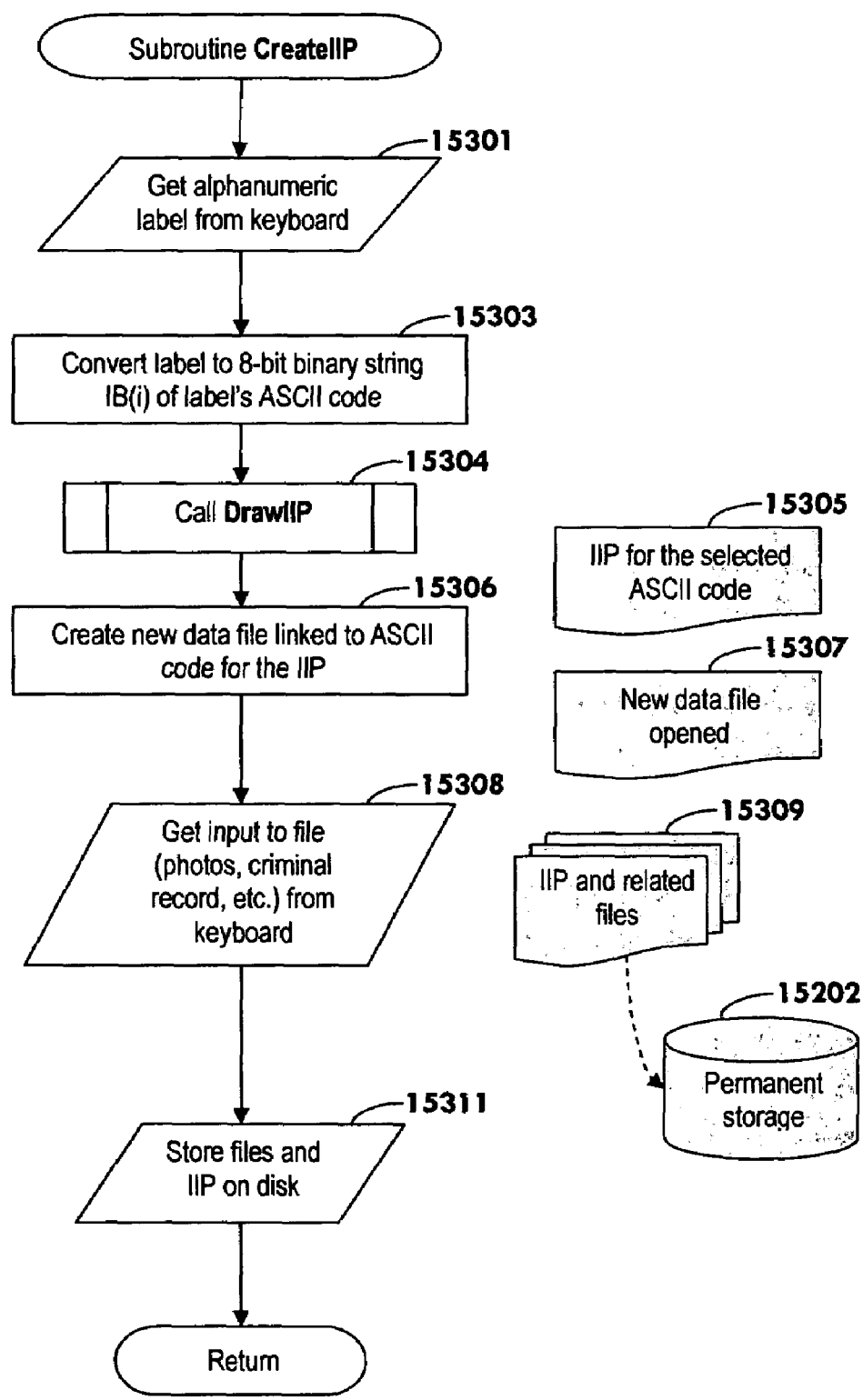

FIG. 153 illustrates a flow chart for a software embodiment of the present invention for the subroutine which creates an internal identification pattern (IIP).

Figure 154A:
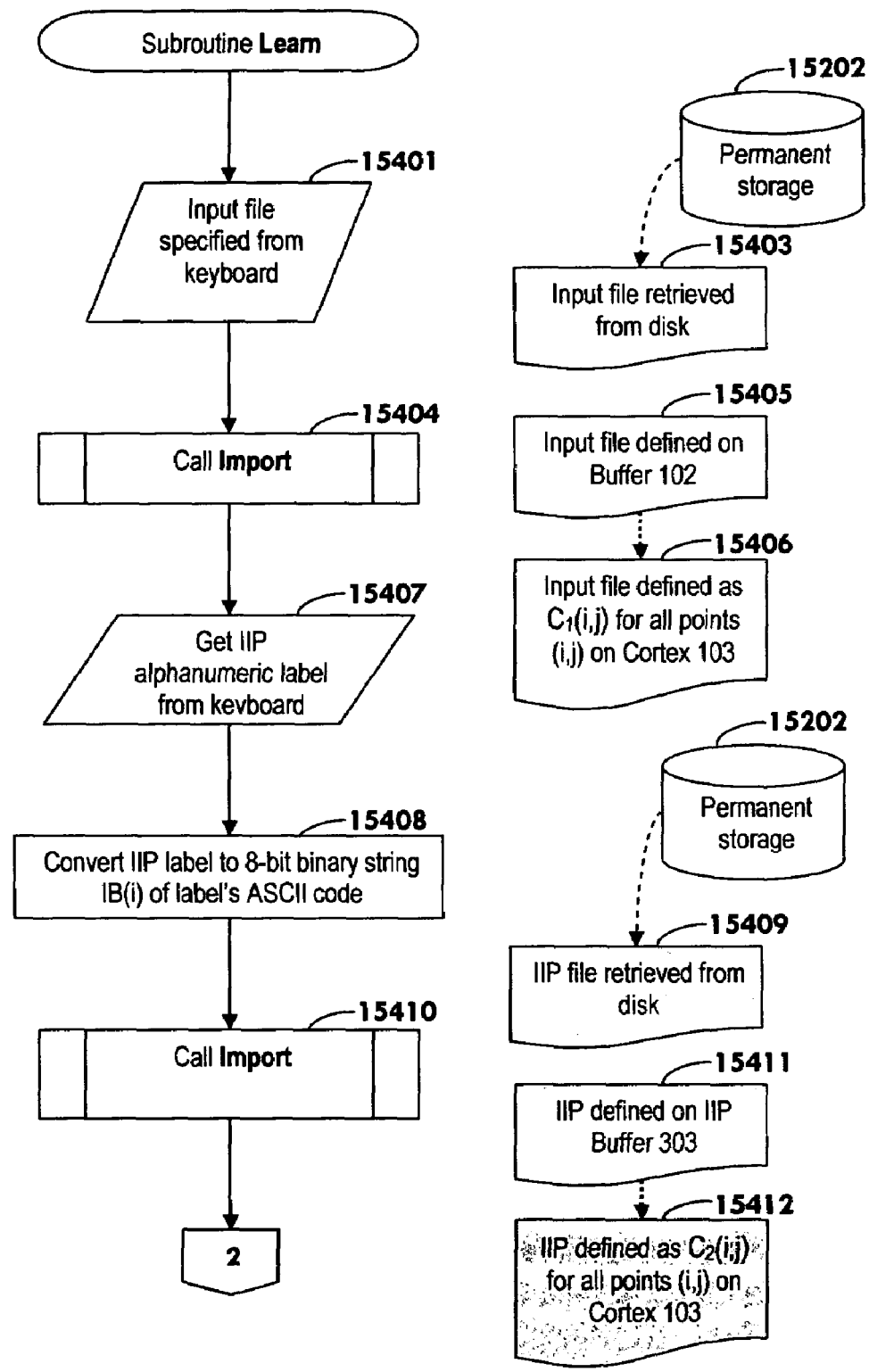
Figure 154B:
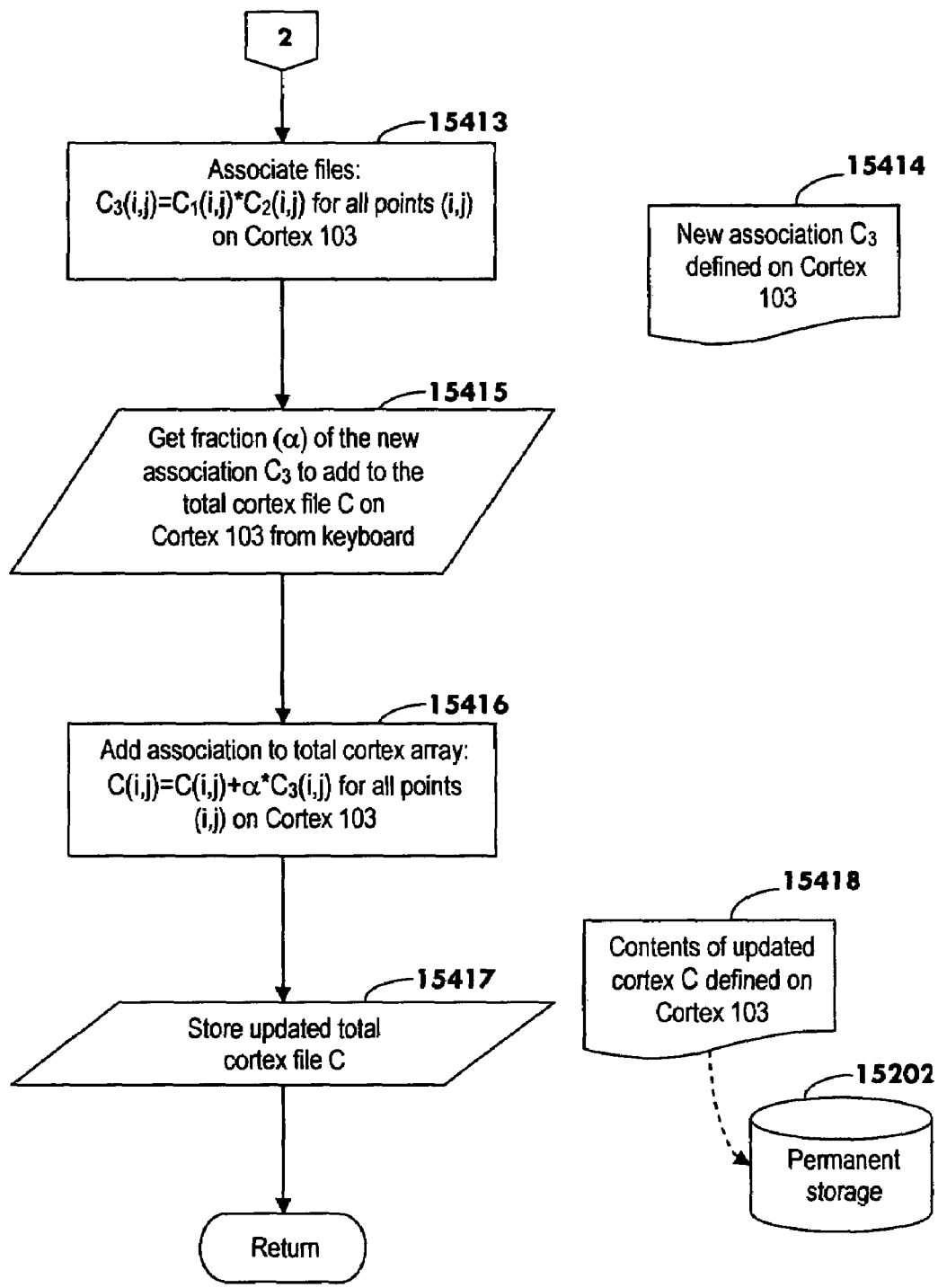

FIGS. 154(*a*) and 154(*b*) illustrate a flow chart for a software embodiment of the present invention for the learning process using an internal identification pattern (IIP).

Figure 155A:
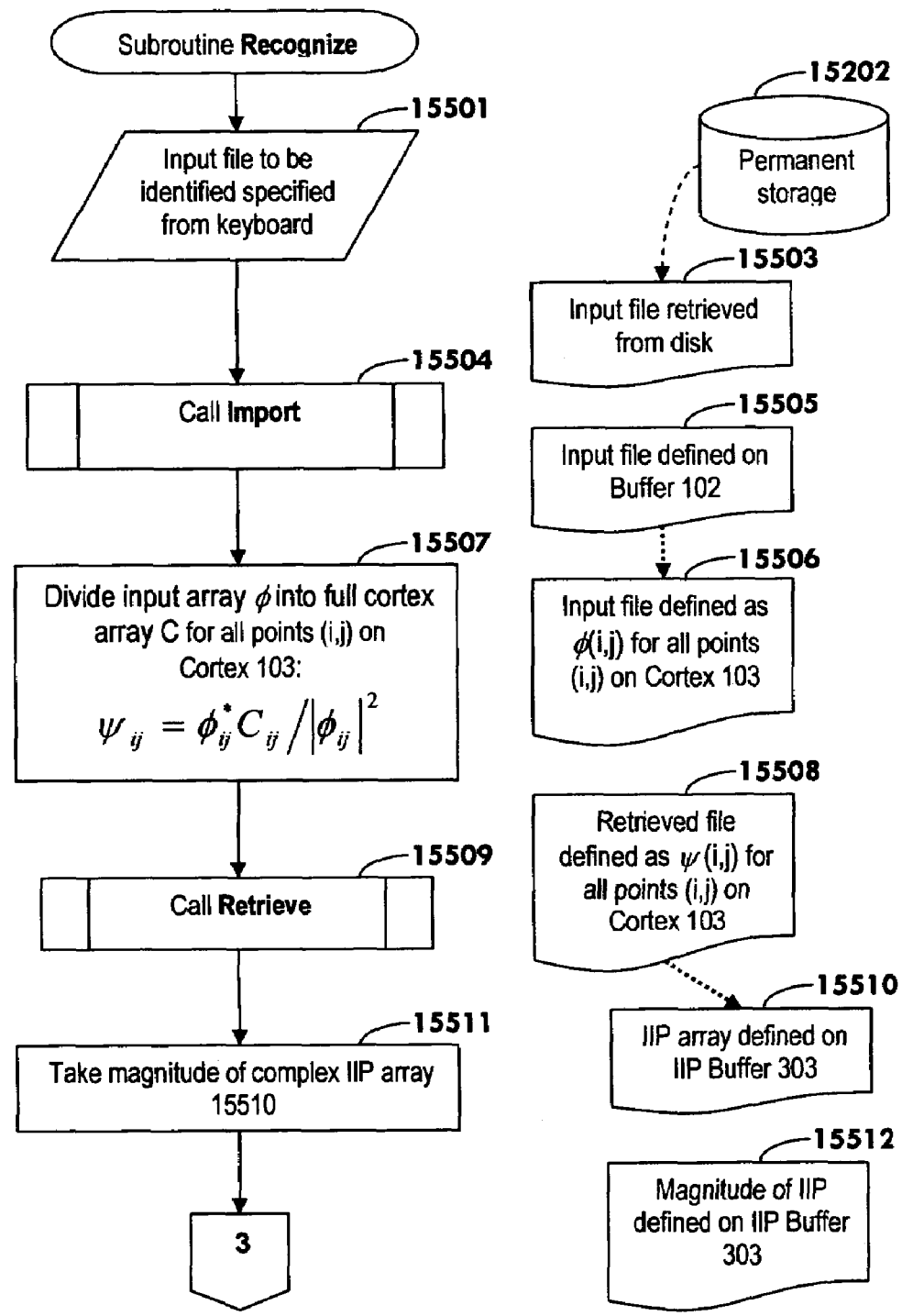
Figure 155B:
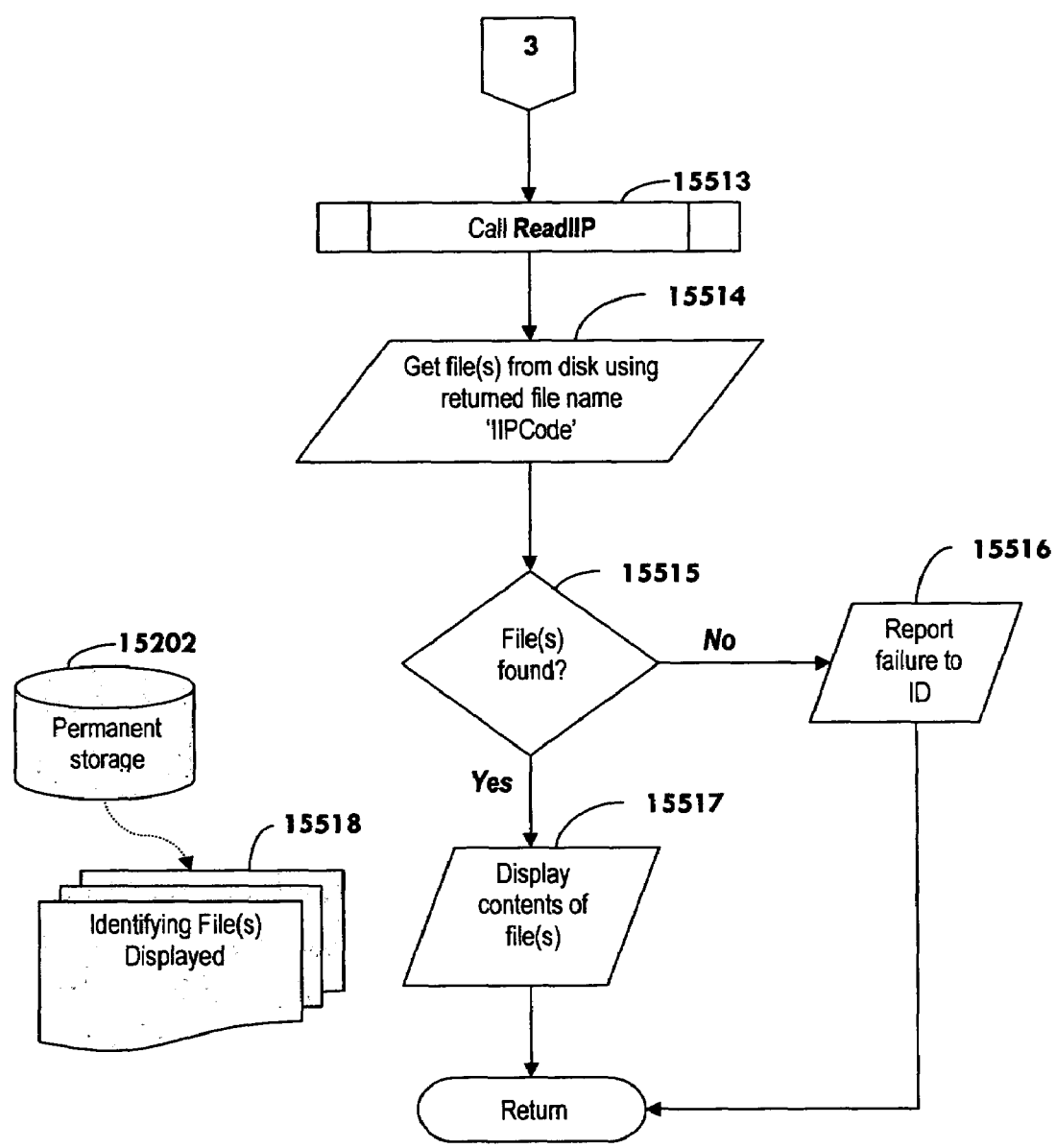

FIGS. 155(*a*) and 155(*b*) illustrate a flow chart for a software embodiment of the present invention for the recognition process using an internal identification pattern (IIP).

Figure 156A:
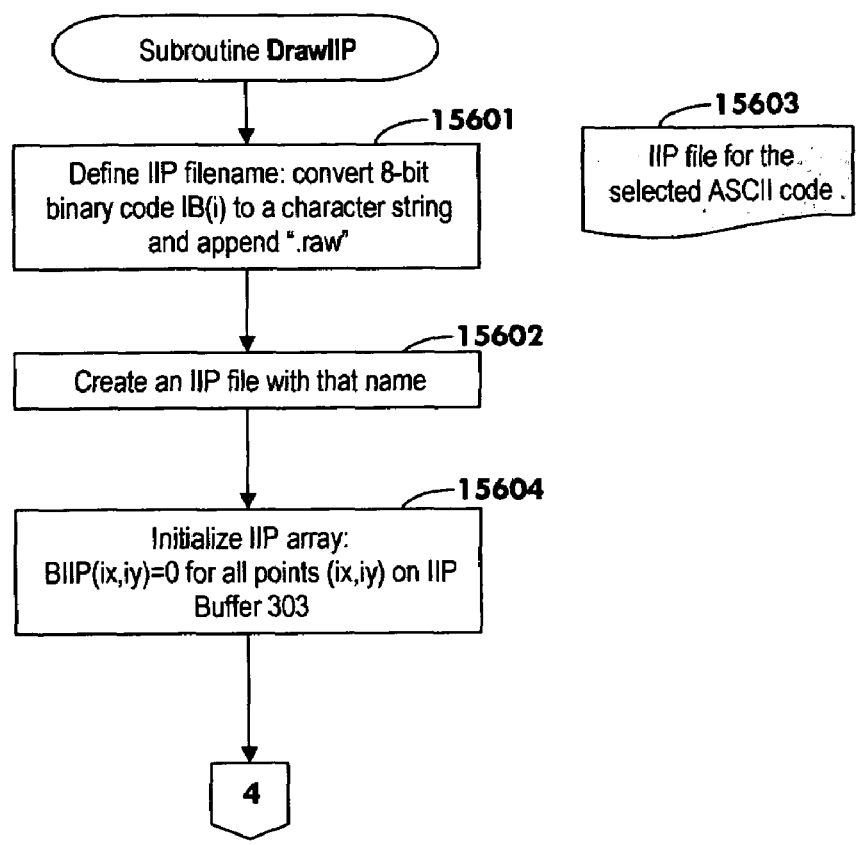
Figure 156B:
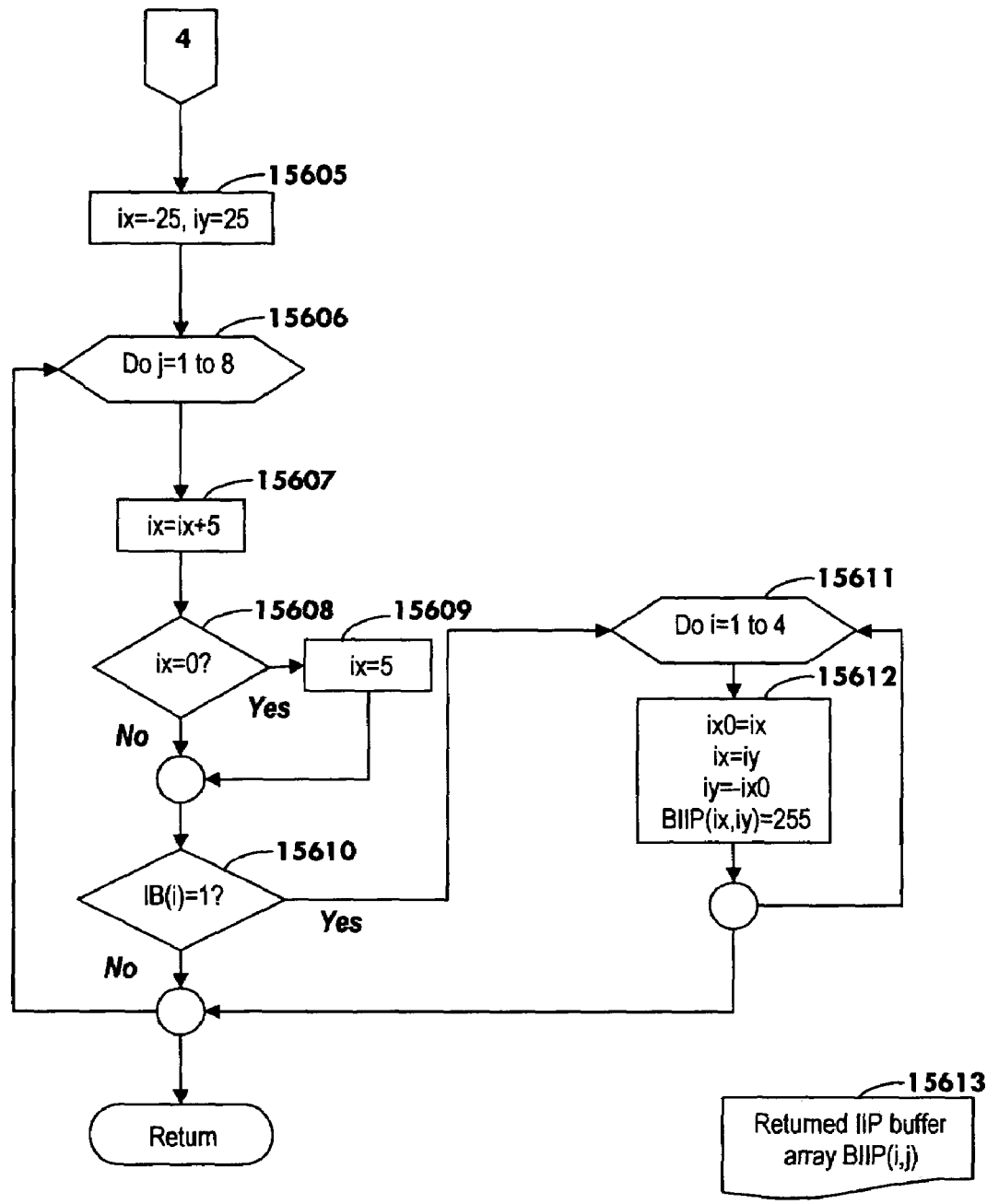

FIGS. 156(*a*) and 156(*b*) illustrate a flow chart for a software embodiment of the present invention for drawing (i.e., creating) an internal identification pattern (IIP).

Figure 157:
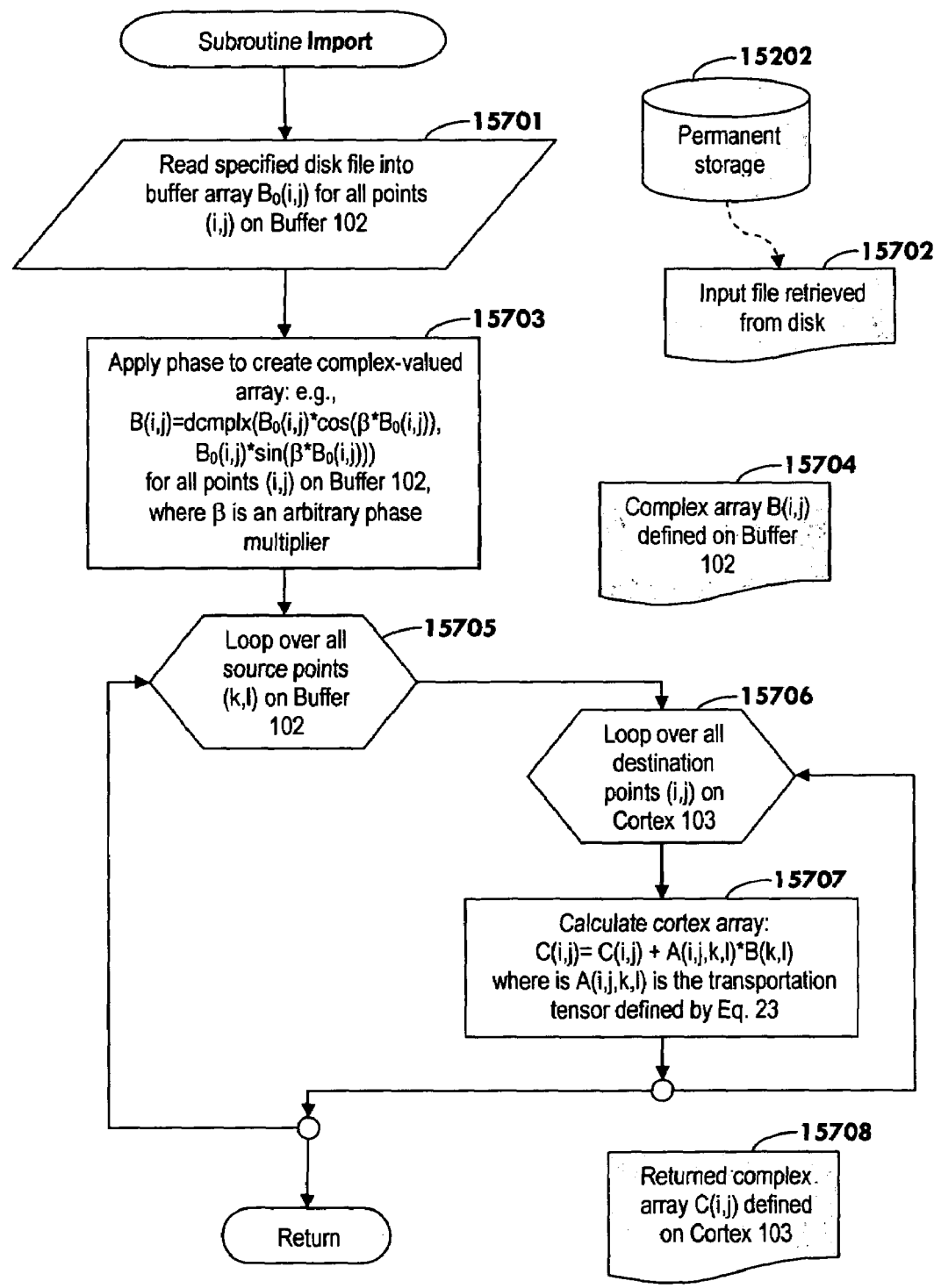

FIG. 157 illustrates a flow chart for a software embodiment of the present invention for the data importation process.

Figure 158:
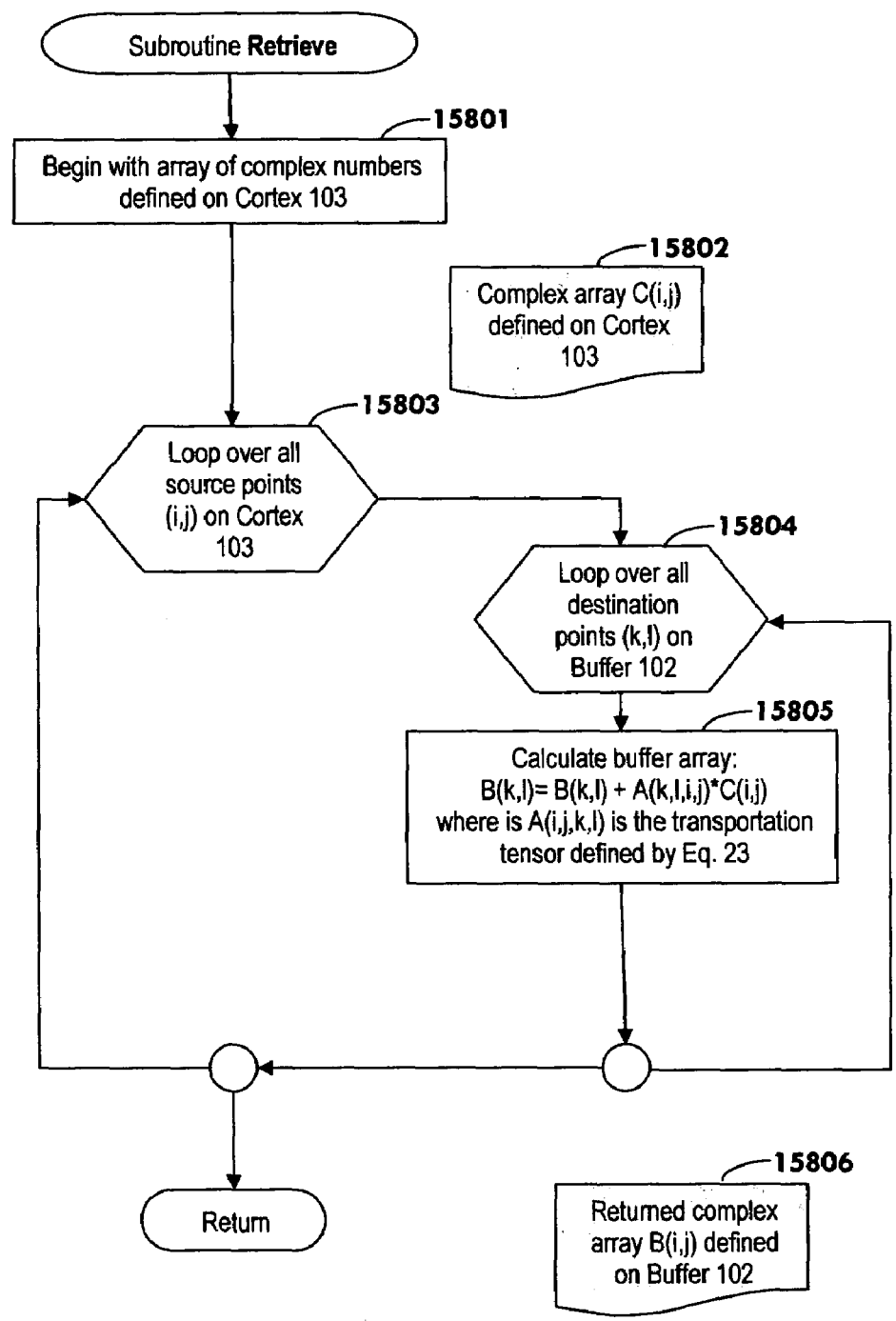

FIG. 158 illustrates a flow chart for a software embodiment of the present invention for the data retrieval process.

Figure 159B:
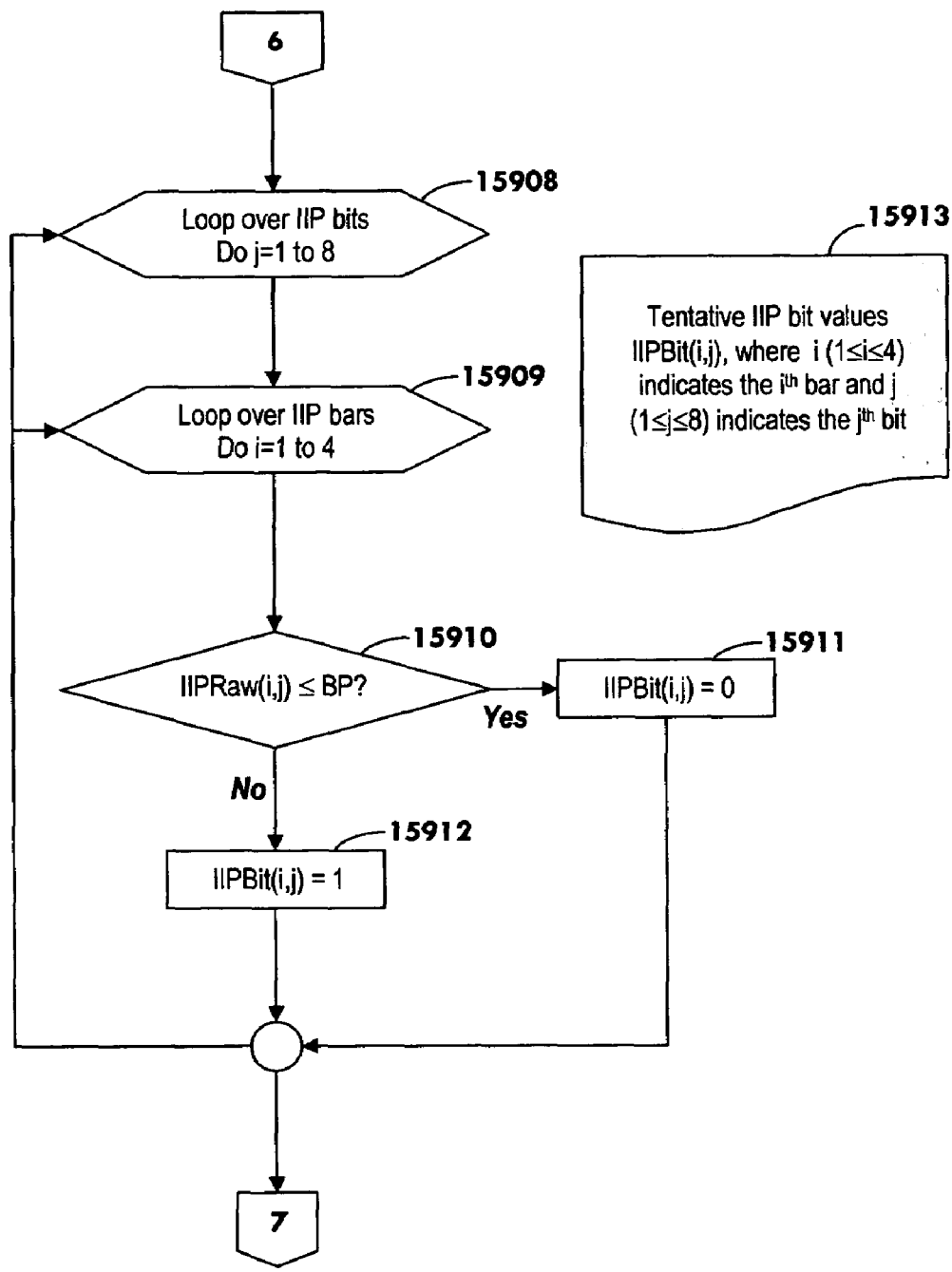
Figure 159C:
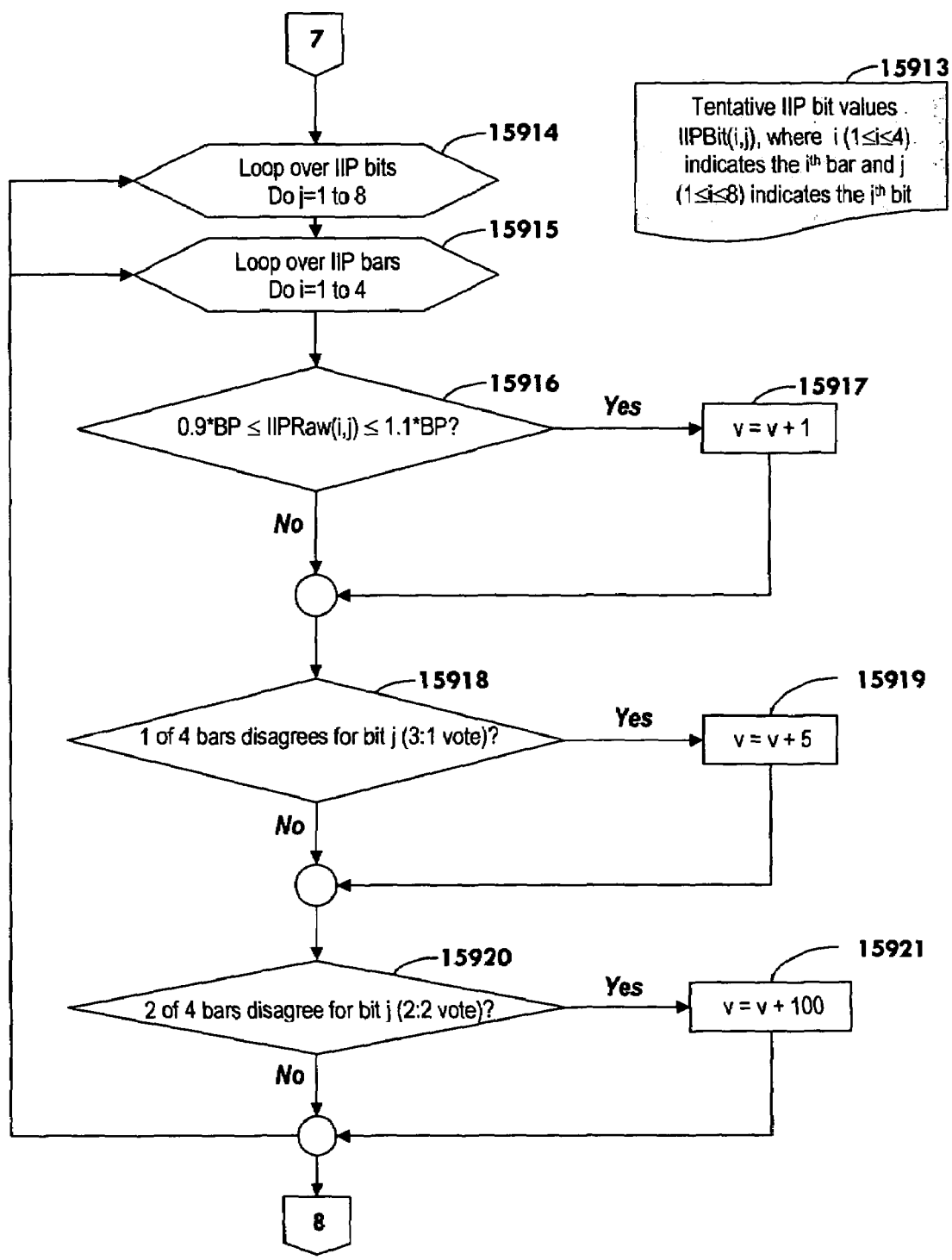
Figure 159D:
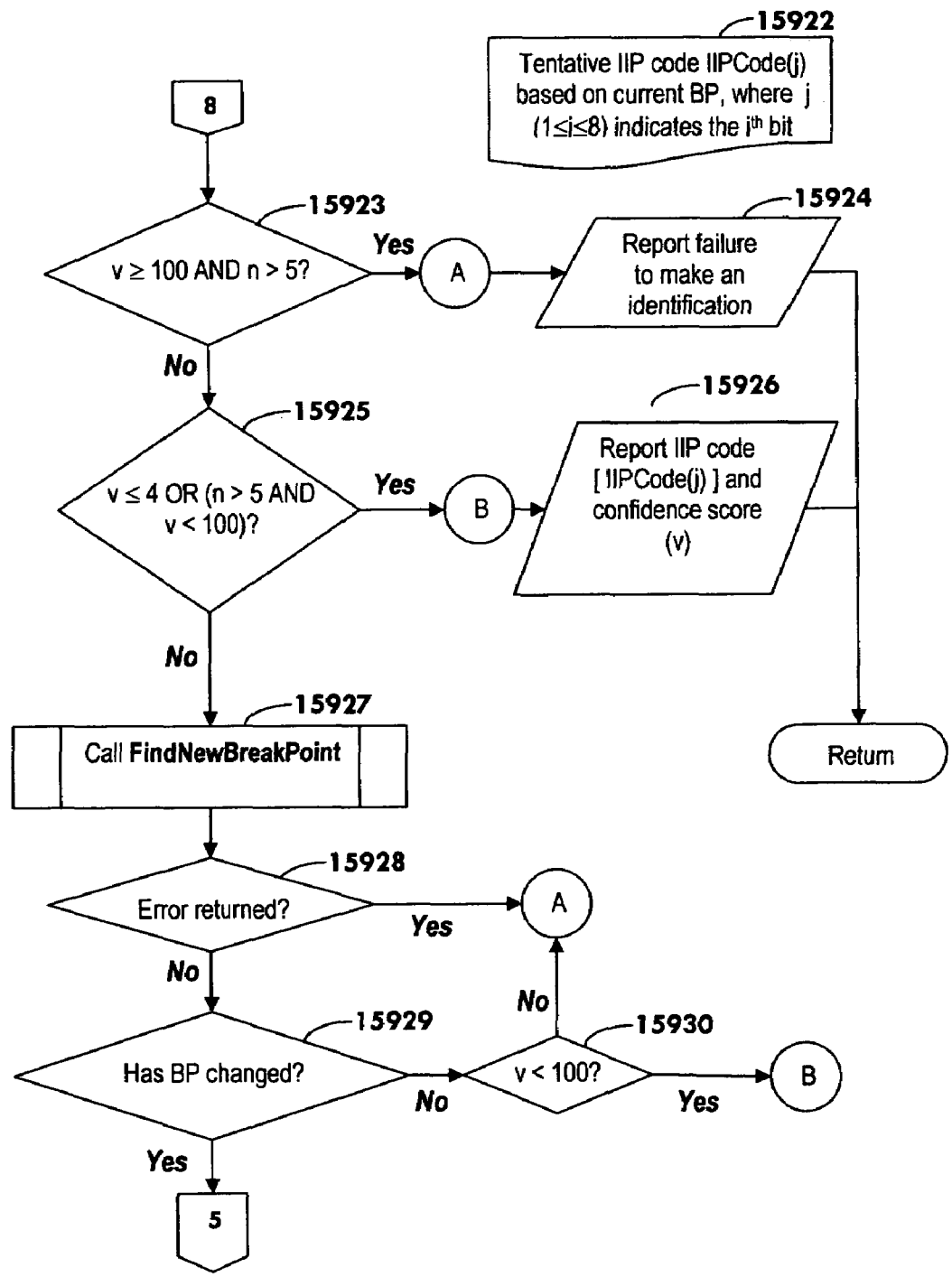

FIGS. 159(*a*) through 159(*d*) illustrate a flow chart for a software embodiment of the present invention for the IIP reading process.

Figure 160:
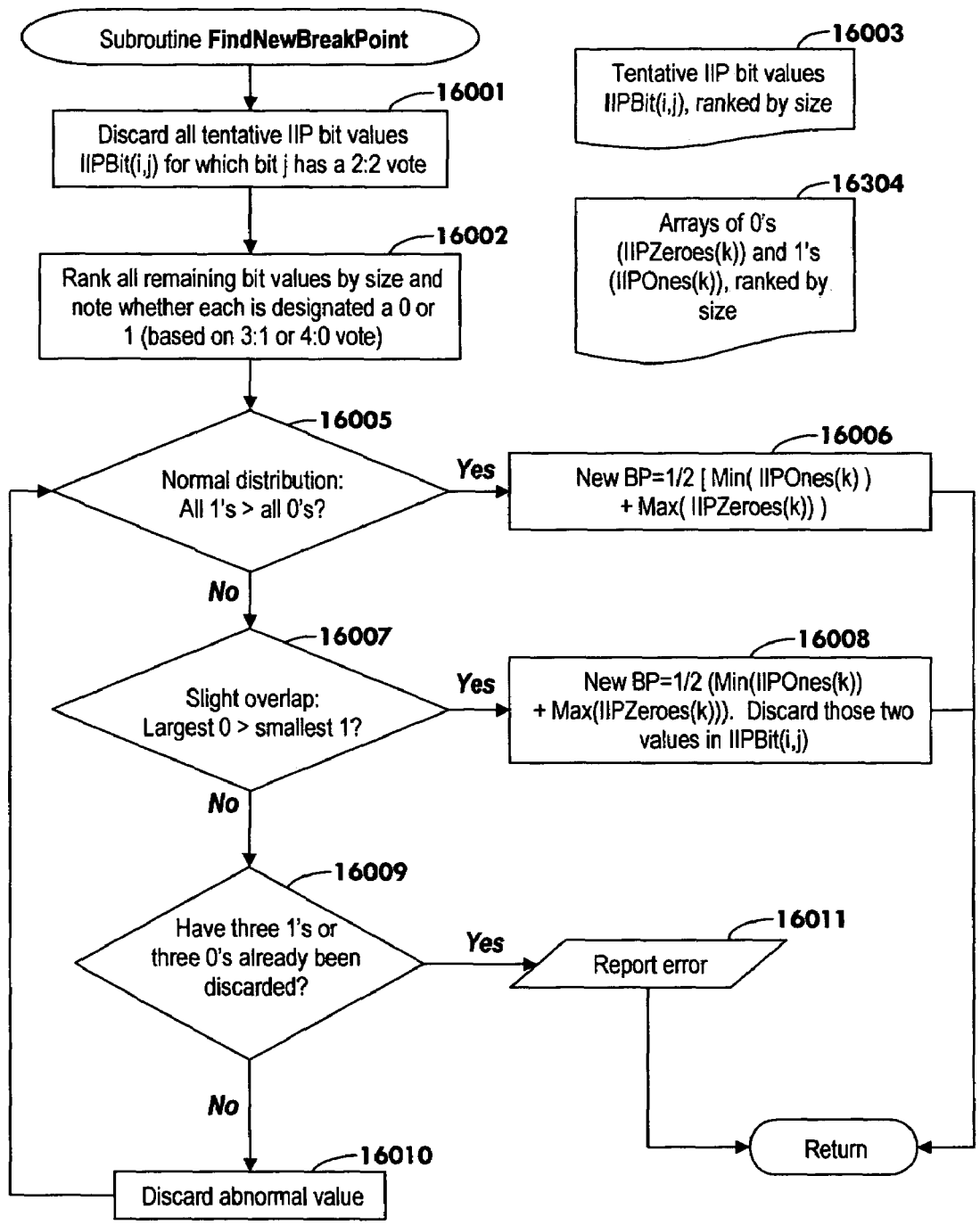

FIG. 160 illustrates a flow chart for a software embodiment of the present invention for a subroutine in the IIP reading process.

DETAILED DESCRIPTION OF THE INVENTION

Structure for General Storage and Retrieval of Patterns

Figure 1:
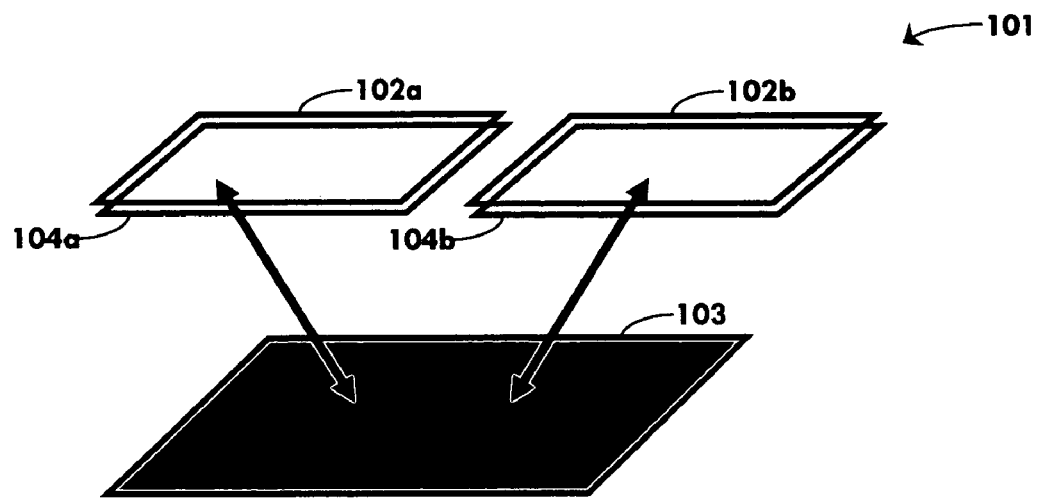
FIG. 1 is a schematic representation of the internal structures of the present invention in its general storage and retrieval mode.

A schematic representation of the internal structures of the present invention of an associative memory device 101 in its general storage and retrieval mode is displayed in FIG. 1. The buffers 102 and 104 serve as the input and output interfaces to the cortex 103 respectively. As used herein, the input/output functions performed by buffers 102 and 104 could occur in a plurality of buffers with each acting as an input buffer, an output buffer, or both simultaneously, or in a single buffer that can perform each of these functions. For purposes of clarity input buffers are identified by the number 102, followed by a letter: a, b, c, . . . if there are more than one. Similarly, output buffers are identified with the number 104 followed by a letter when a plurality of output buffers exist. It is to be understood that in some emulations of the present invention, the input and output functions can be performed by the same buffer element and in those instances the numbers 102 and 104 differentiate the operation, input or output, of said element.

The buffers handle the transformation and transfer of files or information into and out of the present invention. As described herein, input/output functions of the associative memory device 101 usually occur between a digital computer, representing the external world, and the associative memory device. However, the associative memory device and method could accept information from any sensor or detector, whether digital or analog. In some instances of a physical embodiment of the present invention, if the input source is an emitter or reflector of coherent waves that are received at the location of the cortex, then the input source itself would effectively become an input buffer 102.

Figure 2:
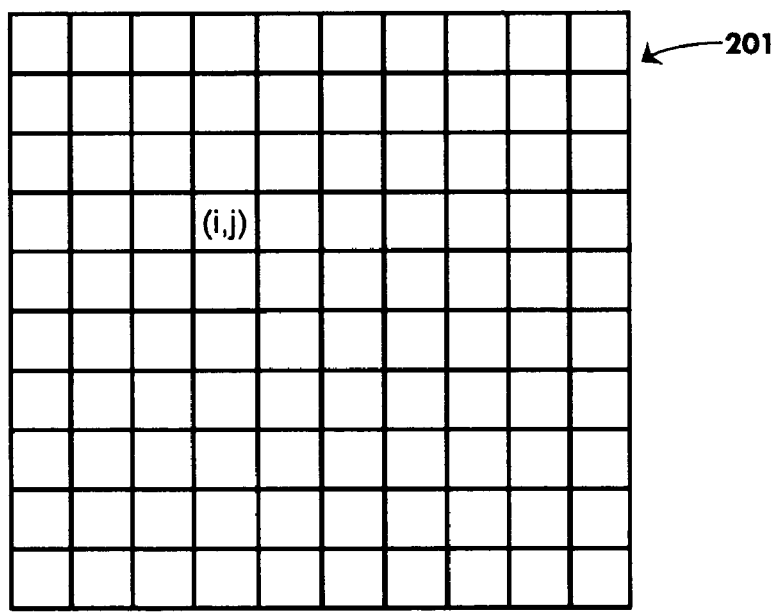
FIG. 2 illustrates each buffer's two-dimensional spatial grid, or array.

As an interface with a computer or other digital device, each buffer is defined to have a two-dimensional spatial grid, or array, 201 as shown in FIG. 2. At each grid point (i, j) on each buffer, a complex value, with a real and an imaginary component, is assigned. What the complex value represents will vary based on the input source of the file, for example a pixel within an image, a tone within a sound file, or a chemical component in an odor. The buffers provide an interface to the attached digital computer in that the data within binary files on the computer are interpreted by the present invention as discretized values of wave fields evaluated on each buffer's surface. In this way, the input information on each buffer is "imprinted" on the wave's amplitude and phase. An input data file looks like generic computer words from "above," in the external world, and the data file looks like a discretized complex wave from "below," within the associative memory device. As noted, four buffers 102*a*,*b* and 104*a*,*b* are shown in FIG. 1, but, depending on the specific embodiment and application chosen, there could be a single buffer or a plurality of buffers used in the present invention.

The cortex 103 is the recording medium, or structure, within which associations are formed, stored, and from which files are retrieved. As described herein, information is transported by wave propagation from the buffers 102, 104 to the cortex 103 and then associated and stored. A stored memory in the cortex 103 is then de-associated and reverse-propagated from the cortex 103 to one or more buffers 102, 104 for retrieval purposes. A single cortex 103 is shown in FIG. 1, but, depending on the specific embodiment and application chosen, a single cortex or a plurality of cortices could be used in the present invention.

Structure for Storage, Retrieval, and Autonomous Identification of Patterns

Figure 3:
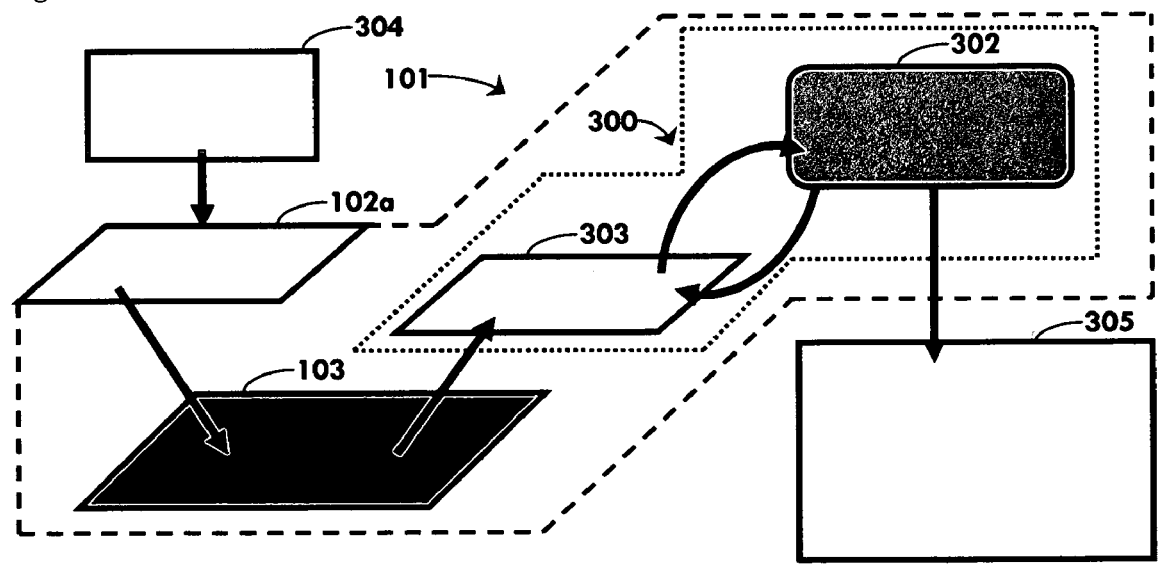
FIG. 3 illustrates a block diagram of internal structure of the present invention in its storage, retrieval, and autonomous identification mode.

FIG. 3 illustrates the internal structure of the present invention 101 in its storage, retrieval, and autonomous identification mode using an IIP module 300. The functions of general storage and retrieval, with input buffer 102a acting as an interface through which input data 304 is inputted and the cortex 103 acting as a recording medium for association and de-association operations, are similar to that described with respect to FIG. 1. However, FIG. 3 differs from the schematic of FIG. 1 in that an IIP buffer 303 is shown as the output buffer. The IIP buffer 303 is used internally within the associative memory device. The use of the IIP module 300 requires the addition of a new component, the IIP reader 302, which is responsible for decoding retrieved wave patterns to determine an identifier code and for calculating a confidence estimate in the resulting identification. As seen in FIG. 3, the IIP reader 302 outputs results to systems 305 which receive identification, confidence estimates, and associated information. One input buffer 102a and one output IIP buffer 303 are shown in FIG. 3, but, depending on the specific embodiment and application chosen, a plurality of input buffers and/or IIP buffers could be used in the present invention. Further, other output buffers 104, not shown in FIG. 3, could be used in the present invention where the associative memory device takes action based upon the IIP code read. Examples of possible action would be output to a video monitor with text, to a speaker to communicate verbally with an operator or person being identified, or output to a digital computer to launch some action or set of actions such as unlocking a door or setting off an alarm.

Theoretical Background

An associative memory operates in a stimulus-response manner. It may have many capabilities, but it must perform at least two elementary operations, storage, also referred to as association, and retrieval, also referred to as recall or identification. The associative memory and device disclosed herein is able to define the association of two or more inputs as the forming of some invertible mathematical relation between them. Though any number of inputs is possible, the operation of the present invention using two inputs is described herein for simplicity.

In describing the operation of the present invention, an input, or some arbitrary data set, is denoted with a lower case Greek letter. The following can then be mathematically described: the associative recall of a previously learned input, $\psi$, as the action of an operator C, representing the memory, on a function $\phi$, the prompt, or stimulus associated with $\psi$ is shown as:

$$C\phi = \psi \qquad (1a)$$

Variations on this operation are also acceptable:

$$C\phi = \psi + \phi \qquad (1b)$$

or the more general:

$$C\phi = \psi + \phi + \text{other things} \qquad (1c)$$

as long as the "other things" can be separated out. The operator C contains all recorded information and performs the retrieval operation.

The recall process uses a prompt to (1) find the appropriate association among other stored inputs in the memory, (2) separate the files sought from those recorded with it, presumably used as the prompt, and (3) retrieve the now-separated files. Operations are defined which are inverse to those used for learning. As used herein and as further described below, learning means an operation in which wave fields are associated. Retrieval involves the recall of information and so requires an operation inverse to that for association. If association were done by adding $\psi$ and $\phi$, then recall would require subtracting $\phi$ from $\psi$. If multiplication were used, then the inverse operation could be division. The notation $\phi^{-1}$ will mean perform the operation inverse to that used for storage with the file designated by $\phi$.

C contains the associations of the inputs. One possible construction of C is:

$$C = \psi \phi^{-1} \qquad (2)$$

meaning C removes $\phi$ and creates $\psi$. However, a more general and useful construction would allow either function to be used as input:

$$C = \psi \phi I \qquad (3)$$

where I is an operator that takes the inverse of the prompting function. The recall process would become:

$$C\phi = \psi \phi I \phi = \psi \phi \phi^{-1} \qquad (4)$$

The description so far is independent of any particular choice of mathematical operation to perform association and de-association.

In order to store more than one associated pair:

$$C = \sum_m \alpha_m \psi_m \phi_m I \qquad (5)$$

where the subscript m denotes a particular association, the sum is over all stored associations, and $\alpha_m$ is an arbitrary weighting factor for the $m^{th}$ association. So input $\psi_1$ is connected to input $\phi_1$; $\psi_2$ to $\phi_2$; etc. The recall procedure given a prompt $\phi_n$ would then be:

$$C\phi_n = \sum_m \alpha_m \psi_m \phi_m I \phi_n \qquad (6)$$

$$= \sum_m \alpha_m \psi_m \phi_m \phi_n^{-1}$$

$$= \alpha_n \psi_n + \sum_{m \neq n} \alpha_m \psi_m \phi_m \phi_n^{-1}$$

There are two expressions: (1) the desired recall $\psi_n$ (multiplied by its weighting factor) and (2) the rest of the terms on the right-hand side (RHS), which is referred to as recall noise. The present invention is able to discern the wanted recall from the noise. The operation is described below. Finally, the symbol $\psi_j$ could denote multiple inputs—images, sounds, odors, tastes—associated with $\phi_j$. Then the prompt of $\phi_j$, which recalls $\psi_j$, in fact, simultaneously recalls each and every input which makes up $\psi_j$. Similarly, the prompt $\phi_j$ could denote a multiplicity of prompting inputs.

Explicit Construction

An essential element of the present invention is the use of waves. Information is transported within the present invention by waves. Thus, input information must be impressed onto a wavefront to be imported into the cortex, and it must be read off a wavefront propagated from the cortex for it to be output. As noted above, learning involves an association of wave fields. Recall involves reconstruction of these wave fields.

Waves are continuous, analog phenomena. If continuous, analog information is available, it can be impressed onto a wavefront by means known to those well-skilled in the art, whether physical, such as electro-optic or other modulation; or mathematical means, such as integration. If, as is more likely the case, the information is digital, it can be written as an array, a matrix of discrete values, that, in some manner, would have to be expressed in a representation consistent with a wave format.

Whatever an input data set represents, such as a picture, sound, or odor, it is assumed that it can be measured and supplied by a digital device. In such event, a data file exists which constitutes a digital sampling of an analog signal. The present invention can take a digital file and transform it into a new analog form, that of a wavefront. If the associative memory device as disclosed herein is expressed in a digital medium, it performs an emulation of the analog, or wave, behavior.

A wave is represented mathematically as a complex function, a function defined at each point by a magnitude such as brightness, loudness or amplitude, and a phase, representing some part of the wave, such as a crest, trough, node, etc. Waves are distributed phenomena. Even when they are confined, they are defined on the boundaries and everywhere within. To be complete and unique, information must be impressed on the wavefront in both amplitude and phase. All inputs to the present invention, then, necessarily involve complex numbers, whether the original input is complex or if an algorithm is used to generate a pseudo-phase.

Wave-like behavior in an electronic medium can be specifically accomplished by computer modeling the behavior of waves. The present invention uses a mathematical formalism of the inventor as previously described.

For purposes hereof, a digital input is represented as a matrix of values. For a visual input, the individual elements are preferably pixels. For an audio input, elements could be time values of the amplitude, written in a matrix form. But for the purposes of the present invention, all the elements are computer words comprising numbers of constant binary length. The components of the associative memory device disclosed herein are assigned a location and spatial extent, just as if they were laid out on a table. Their description and operation, whether actual or simulated by computer means, constitute the functioning of the system.

Inputs to and outputs from the associative memory device, in whatever manifestation, occur at the buffer surfaces. These are the interfaces between the associative memory device and whatever it communicates with. Input information, either retrieved from a disk or directly from input/output ("I/O") devices, is written on the buffers, each element of the file matrix going into a corresponding element of the buffer. On each buffer, a mathematical function, created from the input file, constitutes a wave field which carries the information. (In the special case of a physical emulation of the present invention, a reflecting or emitting object, the radiation from which is received directly at a surface coincident with the cortex, can itself constitute an input buffer.)

The present invention also includes one or more recording structures, referred to as the cortex. The cortex records wave information propagated from the buffers, associations of multiple, propagated wave fields and linear combinations of associations. Further, the cortex is where de-associations are formed when a prompt probes the cortex to make a retrieval and constitutes the source of waves that propagate to output buffers.

The ability to determine the values of the waves is critical to the ability to store and retrieve information. There are three principal ways to obtain wave values. First, they can be measured experimentally. Secondly, if the functional form of the wave is known, such as in a mathematical function, they can be evaluated. Finally, if the functional form is not known, but wave values are known on some appropriate surface, it is possible to calculate the wave values elsewhere with an equation called the Kirchhoff integral.

Kirchhoff Integral

For the simple example of the association of pairs of input patterns, the following defines the sets of functions, $\{\psi_i\}$, $\{\phi_i\}$, which carry the input information, denoted generically by the symbol $\xi$, to be time-harmonic solutions to the wave equation:

$$(\nabla^2 + k^2)\xi_i(r) = 0 \quad (7)$$

The functions $\psi_i$ and $\phi_i$ are monochromatic, three-dimensional, scalar waves (though vector waves, that is, waves with a polarization, could also be used). When the functional form of a wave is not known, but the wave values on an appropriate surface, like a buffer or the cortex, are known, and it is an objective to reproduce the behavior of that wave at points away from that surface, the Kirchhoff equation can be used. Propagation of any wave is formally and exactly described by the integral:

$$\xi_i(r) = \oint dS_0 \cdot \{\xi_i(r_0)\nabla_0 G(r, r_0) - G(r, r_0) \nabla_0 \xi_i(r_0)\} \quad (8)$$

where the surface $S_0$ is closed and completely surrounds point r. $S_0$ is the surface which contains the source points $r_0$; r is a point being propagated to. If waves are propagating to the cortex, $S_0$ would include the buffer as part of it, and the point r would be on the cortex. The wavefront is defined as zero everywhere on $S_0$ except on the buffer. $G(r,r_0)$ is a Green's function. The gradient operates only on coordinates $r_0$ on the source surface $S_0$.

The array of numbers which constitute the input file is viewed within the present invention as the digitized elements of a wavefront defined on a surface, here, the input buffer, whether the numbers represent pixels in a photograph or any other digitized signal. With a phase assignment, when necessary, and proper spacing, they are treated as the digital sampling of a wavefront that carries the information in the input file to or from the cortex. Except on the buffers where it is read in or out, it is of no particular concern to the performance of the present invention what the information on the wave represents. Within the space that the buffers demark, that is, the region between the buffers and cortex, the functioning of the present invention is to store and reproduce waves. The surfaces, buffers and cortex, are considered to be composed of fixed elements, usually referred to as "the points," where arriving waves are evaluated as to amplitude and phase, and from which departing waves are launched, effectively as from an array of point sources. On a buffer, input or output, to the "outside world," the points could correspond to pixels in an image, elements in a data file, or any result of digitizing a real-world input. Within the operation of the present invention, the points are locations where the wave is evaluated, launched, and received.

The spacing and distribution of the points are a function of the resolution necessary to mathematically depict the wave with accuracy sufficient for a digital representation to emulate the continuous mathematical function which defines the wavefront. Consequently, it is possible that a data array written on an input buffer would be written with a multiplicity of points assigned to each data array element. For example, a photograph of $N^2$ pixels might be considered as a wave described by $mN^2$ points, m points to each pixel. Thus, the wave carrying the information in the photograph would be defined with finer spatial resolution than the photograph itself, to satisfy mathematical requirements as to rigor. Within a specific embodiment, such as are detailed below in this document, the points of the buffers and cortex would be receiving or broadcast antennae, or storage locations of an array in RAM, or circuit terminations. But they always represent locations where the value of the wave in use is known.

Appropriately summed over the buffer, every point on the buffer contributes to (that is, sends information to) every point on the cortex. As a result, the value of each wave is known at every point on the cortex. Information is distributed. Usually, this information has lost the appearance it had on the buffer. It is now non-localized and written in the wave pattern that arrived at the cortex. As discussed above, within a digital representation, the values would make up an array, whose elements constitute a sampling of the waves' spatial distribution on the cortex.

Learning (Association) and Recognition (Retrieval)

For learning, once waves have propagated to the cortex from the buffer, they are associated, i.e. some mathematical relationship is defined for them, at every point on the cortex, that is, at each of the locations deemed sufficient to accurately model the wave as expressed in the equations presented herein. In one embodiment of the present invention, the association of two inputs, $\psi_m$ and $\phi_m$, is accomplished by the multiplication of the complex values of the two functions, point by point, at each location $r_C$ in the cortex. The resulting product can be added to any values already stored, with, if desired, an arbitrary weighting factor, $\alpha_m$. The operator C maps the contents. It can be written as the sum of associations:

$$C(r_C) = \sum_m \alpha_m \psi_m(r_C) \phi_m(r_C) I \tag{9}$$

where $r_C$ is any point on the surface and I is the inversion operator defined above.

The recall process is begun by a prompt, $\phi_n$, a wave carrying information from a buffer, illuminating the entire cortex, just as if the wave were a light beam shining from the buffer to the cortex. With the prompting wave defined at all points, the mathematical procedure inverse to that used for association is applied. Several constructions by which retrieval can be implemented are described herein, when association has been performed by multiplication. Additional analyses are then provided, frequently using the association and de-association method first referenced above.

Direct Division

The inverse of the prompting wave, $\phi_n$, must be created. For the first construction, let the associating operation be multiplication and the inverse of the function be defined as division by the value of the prompting function. That is, at each point on which C is defined, the value of C, which contains the sum of all associations, is divided by the value of $\phi_n$. Then the retrieved wave at the cortex is:

$$\begin{aligned} C\phi_n &= \sum_m \alpha_m \frac{\psi_m \phi_m}{\phi_n} \\ &= \alpha_n \psi_n + \sum_{m \neq n} \alpha_m \frac{\psi_m \phi_m}{\phi_n} \\ &= \alpha_n \psi_n + \sum_{m \neq n} \alpha_m \frac{\psi_m \phi_m \phi_n^*}{|\phi_n|^2} \end{aligned} \tag{10}$$

It is necessary to "pull out" the correct association $\psi_n$ from the other terms in the summation and then to identify just what $\psi_n$ is. In the present invention, this is accomplished by propagating the waves off the cortex, where, if done properly, the signals will separate, with the de-associated wave $\psi_n$ going to an output buffer where the information can be read and utilized.

The Kirchhoff equation is used to describe the propagation of the wave off the cortex. The input is re-formed by propagating the complex conjugate of the expression in equation (10). When inserted in the Kirchhoff integral, the complex conjugate of the first term on the right hand side ("RHS") of the equation, the retrieved wave, $\psi_n$, will propagate back to the specific buffer(s) where all inputs of the form $\psi_m$ originated.

The remainder of the terms on the RHS of the equation, the summation for the terms $m \neq n$, except in some very special cases, do not propagate. Consider a single term, the $m^{th}$, in that summation:

$$\frac{\psi_m(r_C) \phi_m(r_C)}{\phi_n(r_C)} \tag{11}$$

The multiplication and division at every point $r_C$ destroys any resemblance this expression might have to the waveforms that originally were defined at the buffers. In fact, the quotient does not even satisfy the wave equation:

$$\begin{aligned} (\nabla^2 + k^2) \frac{\psi \phi}{\chi} &= \frac{2}{\chi^2} [\chi \nabla \psi \cdot \nabla \phi - \phi \nabla \psi \cdot \nabla \chi - \psi \nabla \phi \cdot \nabla \chi + \frac{\psi \phi}{\chi} (\nabla \chi)^2] \\ &= 2 \frac{\psi \phi}{\chi} \left( \frac{\nabla \psi}{\psi} - \frac{\nabla \chi}{\chi} \right) \cdot \left( \frac{\nabla \phi}{\phi} - \frac{\nabla \chi}{\chi} \right) \end{aligned} \tag{12}$$

which must equal zero for the Helmholtz equation to be satisfied, requiring a very special (and unfortunate) choice of wave function. In almost all normal situations, the expression, $$\frac{\psi \phi}{\chi},$$

will not propagate, and:

$$\oint dS_C \cdot \{[C(r_C)\phi_n(r_C)]^* \nabla_C G(r,r_C) - G(r,r_C) \nabla_C [C(r_C)\phi_n(r_C)]^*\} = \psi_n^*(r) \tag{13}$$

where r is an arbitrary destination point on the buffer used for output. Hence, propagating the complex conjugate of the entire linear combination of associated pairs off the cortex, once divided by the prompting function, separates out and retrieves only the desired recall.

Modulation

When probing a cortex by division with an essentially correct, but partial or otherwise imperfect, prompt, it is possible to get very large quotients at a few points, which can generate a great deal of noise on retrieval. As an additional consideration, it is highly unlikely that mathematical division is used in recall in a biological cortex, which is being mimicked here. More probably, a modulation occurs (in electrical conductivity at synapses) which effectively multiplies a prompting signal. Finally, though not required, a probe by multiplication ensures a symmetry where the function $\phi'$ probing $\phi$ produces the same result as $\phi$ probing $\phi'$. Symmetry does not exist when division is used.

As implemented in one manifestation of the present invention, if an input that has been transformed into a wave at the input buffer is divided by its own magnitude at each point on the cortex, so that at every point only phase information is retained, or, equivalently stated, the magnitude has unit value everywhere, the inverse function operator I could take the complex conjugate, and the cortex could be probed by multiplication. Although this procedure discards amplitude information, the reconstruction will generate a wavefront of about the same shape as the original input and, in many instances, there is virtually no loss of generality. For example, input information is transformed at the input buffer into a wave and is expressed in terms of its magnitude and phase:

$$\phi(r_C) = |\phi(r_C)| \exp[i Arg(\phi(r_C))] \qquad (14)$$

Then the retrieval operator for retrieving with that input can be expressed:

$$C(r_C) = \sum_m \alpha_m \frac{\psi_m}{|\psi_m|} \frac{\phi_m}{|\phi_m|} I \qquad (15)$$

$$= \sum_m \alpha_m \exp[i Arg(\psi_m(r_C))] \exp[i Arg(\phi_m(r_C))] I$$

and retrieval would be:

$$C\phi_n = \sum_m \alpha_m \frac{\psi_m}{|\psi_m|} \frac{\phi_m}{|\phi_m|} \frac{\phi_n^*}{|\phi_n|} \qquad (16)$$

$$= \sum_m \alpha_m \exp[i Arg(\psi_m)] \exp[i Arg(\phi_m)] \exp[-i Arg(\phi_n)]$$

$$= \alpha_n \exp[i Arg(\psi_n)] + \sum_{m \neq n} \alpha_m \exp(i[Arg(\psi_m) + Arg(\phi_m) - Arg(\phi_n)])$$

The first term on the RHS is the function that is desired. Its complex conjugate, when summed over all points on the cortex, will propagate back to the location of the buffer of origin, where an output buffer can be used for output. The remaining summation is recall noise. The phase at each point is effectively random for each term m and is summed over all stored associations. As noted above, except in some very unusual circumstances, the recall noise does not satisfy the wave equation. For the product of three functions, each of which individually satisfies the wave equation (7):

$$(\nabla^2 + k^2)\psi\phi\chi = 2[\chi\nabla\psi\nabla\phi + \phi\nabla\psi\nabla\chi + \psi\nabla\phi\nabla\chi - k^2\psi\phi\chi] \qquad (17)$$

which, in general, does not vanish and so does not propagate. If any part of the noise does propagate, that is, if there is an occurrence where the RHS of equation (17) does happen to vanish, the random phase distribution will cause it to be dispersed, as light going through ground glass, and it will act only as a slight background haze at the buffer. The retrieval will be successful.

A variation on this construction retains full amplitude information for the output file. Files would be separated into two classes, those being identified, here represented by $\phi$, and those used for output, represented by $\psi$. The latter would include machine-readable patterns which, once decoded, would carry instructions to be followed by the associative memory itself or to be passed to a CPU or elsewhere. The retrieval operator would be:

$$C(r_C) = \sum_m \alpha_m \psi_m \frac{\phi_m}{|\phi_m|} I = \sum_m \alpha_m \psi_m(r_C) \exp[i Arg(\phi_m(r_C))] I \qquad (18)$$

and the retrieval would be written:

$$C\phi_n = \sum_m \alpha_m \psi_m \frac{\phi_m}{|\phi_m|} \frac{\phi_n^*}{|\phi_n|} \qquad (19)$$

$$= \sum_m \alpha_m \psi_m \exp[i Arg(\phi_m)] \exp[-i Arg(\phi_n)]$$

$$= \alpha_n \psi_n + \sum_{m \neq n} \alpha_m \psi_m \exp(i[Arg(\phi_m) - Arg(\phi_n)])$$

Again, the last summation is recall noise and should not propagate. If any terms do, they will be widely dispersed. The phase terms, serving as coefficients multiplying the unwanted fields $\{\psi_m\}$, are random and act as diffusive modulation, like ground glass would to a visual scene.

Expression for Computation

Appropriately modified, in discrete form to accommodate digital inputs, outputs, and computation, the Kirchhoff integral becomes:

$$\xi(r) = \sum_{\text{all source points}} \Delta S_C \cdot \{\xi(r_C) \nabla_C G(r, r_C) - G(r, r_C) \nabla_C \xi(r_C)\} \qquad (20)$$

for some wave, $\xi(r_C)$, propagating off surface $S_C$. Each array element constitutes one or more of the points being summed over, depending on the resolution of the summation. That is, a pixel in a picture will normally constitute one array element on the buffer, but might constitute four or six or some other number if greater definition is required.

The propagation equation should be expressed so that it may be evaluated quickly and accurately. The Green's function, $G(r, r_C)$, is analytically differentiable. As long as the assigned geometry of the buffers and cortex doesn't change, terms in $G(r, r_C)$ are constant. So, only the values of the wave function and its normal derivative on the source surface need be specified in order to evaluate equation (20).

For retrieval, the values of the prompted recall on the cortex are required in this operation. They can be obtained directly, by reading each value, after applying the appropriate inverse operation with the value of the arriving, prompting wave, at its location $r_C$. The terms in the summation that constitute recall noise will not propagate, but will exist nonetheless. The terms all lie on top of each other and cannot be separated except by propagation.

The value of the normal derivative of the recall, also needed for the Kirchhoff equation, is a bit more problematic. On a buffer, where the digital form of the wave is known on that surface, it might be possible to take a numerical gradient. But on the cortex, where multiple associations lie superposed and, for example, a division to perform de-association has been performed, the numerical error could be significant. As it turns out, there is a way to circumvent this difficulty and actually increase the accuracy and speed of the calculation.

Of the two terms in the integrand of the Kirchhoff equation, one of the effects of the second, involving the function's normal derivative, is to "kill" waves that are propagating in the wrong direction. That is, given a wave specified on a surface, the second term in the Kirchhoff integral is the one which gives the direction in which the wave will propagate off that surface, producing a zero result when the integral is evaluated for the "wrong" side of the surface.

If the direction of propagation is known in advance and there is no intention of calculating values opposite to that, the calculation can be greatly simplified and the accuracy increased. Consider an arbitrary wave impinging on a flat surface. The functional form of that wave, evaluated on the surface (only in that plane), is the same, regardless of the direction the wave takes through the surface. But, the sign of the normal component of the propagation vector, and so, of the normal component of the gradient of the function as well, reverses with change of direction.

Thus, two sets of prompted waves can be formed on the cortex. One is due to the recorded associated pairs of inputs, the other due to a mirror image of these inputs, as if they had arrived from behind, through buffers located where the mirror images of the real buffers would be. If these two contributions are summed, from the real and virtual sets of buffers, the values on the cortex are just exactly double the values of the actual recorded pairs. But the normal derivatives of the two different sets of pairs are identical in magnitude and opposite in sign so their sum is exactly zero. Putting this into the Kirchhoff integral for the case of retrieval produces:

$$2 \sum_{Cortex} \Delta S_C \{C(r_C)\phi_n(r_C)\} \frac{\partial G(r, r_C)}{\partial n_C} = \psi(r) \quad (21)$$

Only the values of the retrieved wave functions have to be specified, not the normal derivatives. This expression creates two sets of propagating waves, one coming off the front surface of the cortex, the other radiating off the back. It is not important that the extra propagating wave appears because observations are not taken from behind the cortex. The expression will accurately and efficiently calculate the one wave, the recalled function, $\psi_m(r)$, using only the values of the prompted wave on the cortex as input.

The normal derivative of the Green's function is:

$$\frac{\partial G(r, r_C)}{\partial n_C} = \frac{1}{4\pi}\left(ik - \frac{1}{|r-r_C|}\right)\frac{n-n_C}{|r-r_C|}\frac{e^{ik|r-r_C|}}{|r-r_C|} \quad (22)$$

All quantities in equation (21) multiplying the retrieved value, $C(r_C)\phi_n(r_C)$, are functions only of the geometry of the modeled associative memory surfaces. A matrix in r, the element locations on the buffers, and $r_C$, the locations on the cortex, can be defined, yielding the transportation tensor:

$$a(r, r_C) = \frac{\Delta S_C}{2\pi}\left(ik - \frac{1}{|r-r_C|}\right)\frac{n-n_C}{|r-r_C|}\frac{e^{ik|r-r_C|}}{|r-r_C|} \quad (23)$$

which may be pre-evaluated, and stored. The propagation equation (21) then takes on a very simple form. For retrieval, propagation off the cortex is given by:

$$\psi_n(r) = \sum_{source\ pts} a(r, r_C)C(r_C)\phi_n(r_C) \quad (24)$$

The expression is computationally completely parallel; operation should be extremely quick. The expression for propagation from buffer to cortex is analogous:

$$\phi_n(r_C) = \sum_{buffer\ pts} a(r_C, r)\phi_n(r) \quad (25)$$

Though mathematically rigorous, equation (24) is, nonetheless, a numerical emulation of an integral. Where recall noise would not propagate in the continuous integral form, it might here, depending on the spacing between elements. If the spacing is sufficiently small, fractions of a wavelength, it is anticipated that random amplitude, and especially phase, variation would not support propagation beyond round-off error. Where there are elements that do accidentally coordinate to produce computed propagation, it should rarely be a problem. Where the desired retrieval is targeted to focus back at its buffer of origin, the phase variation of the noise will be effectively random and therefore dispersive, even where propagation is not forbidden. In most situations, the recall noise will contribute, at worst, a haze on the output buffer.

The formal theory defining the present invention, in its differential and integral form, imposes no limit on the number of associations that can reside together superposed in a single cortex. However, this assumes a cortex that completely surrounds the output buffer, or alternatively is infinite in extent, and assumes infinitely fine resolution, because the theory itself is analog.

In practice, the cortex is of finite dimension and is sampled at some discrete rate, measured in fractions of a wavelength. Some information that is input could potentially be lost because it might miss the cortex. Proper design of the geometry of input buffer and cortex will minimize this, and information loss should not be a problem in the vast majority of situations. The finite sampling will probably impose two difficulties. First, recall noise might persist because it was not completely cancelled, although it should generally be dispersed and relatively low in amplitude. Second, as new associations are superposed, the resolution of the sampling grid may be overwhelmed so that retrieval is inhibited. The solution to both conditions would be to sample more finely.

Real-World Recognition

An identification system should be able to tolerate some variation in inputs. In voice, face, handwriting recognition, etc., the system should accept some difference in how a word is pronounced, or a signature is written, or in how a person looks.

In the present invention, recognition is said to occur if there is a retrieval of the record associated with the input. The clarity and strength of the retrieval contribute to confidence in the identification. Features which may be anticipated in a retrieval, such as the maximum value, minimum value, contrast ratio, location and shape of some elements, may be evaluated by elements of the present invention, such as the IIP reader, for computation of a confidence measure.

Before confidence can be assessed, identification must be made. Because the present invention is wave-based and comparison of input to stored records begins at the cortex, similarities are measured between wave patterns generated by the inputs, rather than between the details of the inputs themselves. The distributed nature of waves and the integration of information, which occurs as a result of propagation from every buffer element to every cortex element, effectively make the point-by-point comparison of the retrieval process a whole-input to whole-input comparison at each cortex point. If a sufficient number of these comparisons are positive, the retrieval will be successful. For example, a horizontal line and a horizontal line segment, or a broken line, would produce substantially similar patterns at the cortex and thereby produce a successful retrieval and recognition. It would not matter which points are missing in the second input, only that sufficient features existed to constitute a recognizable segment of a line. Further, all points in the cortex contribute to the recognition process, in distinction to the detail-by-detail comparison that would occur for the actual files as they appear on the buffer. So, the recognition capability of the present system provides an entirely new way for a device to compare inputs.

Effects of File Variation

Records exist within the present invention in multiple formats. They exist at the input buffer both in original form and, when appropriate, after a pseudo-phase has been assigned. They exist on the cortex after propagation, after association, after retrieval. They exist on the output buffer after retrieval. And, they exist in transit between these surfaces.

Consider an input $\phi'$ at the input buffer which differs in some way from the "correct" input $\phi$ that was previously learned. Let $\chi(r)$ denote the difference between the functions at each point:

$$\phi'(r)=\phi(r)+\chi(r) \qquad (26)$$

The values on the input buffer for $\phi$ and $\phi'$ can be separated into two groups. Those places where $\chi(r)$ is zero, or at least relatively small, contribute to sending a wave to the cortex with the value of $\phi(r_C)$, or of a function that is very close. But at points where $\chi(r)$ is sufficiently large the value on the buffer at that point effectively has no relation to $\phi(r)$. Although at any single point, $r$, $\chi$ could be quite large, it is assumed that it is not so large, or large at so many points, that the definition of $\phi$ across the whole buffer loses its character.

So there are two sources on the buffer: (1) a set of points representing $\phi(r)$ (at least approximately) and (2) a set of points which are very different from $\phi(r)$. The first will propagate to all points on the cortex effectively as $\phi(r_C)$. If there are sufficient numbers of them, good definition is expected. The second set of sources may send some spurious wave to the cortex. Much may travel in some other direction than toward the cortex, and what does arrive is assumed to be weaker than $\phi(r_C)$ if recognition is to occur.

$\phi'$ can also be considered after it has propagated to the cortex:

$$\phi'(r_C)=\phi(r_C)+\chi(r_C) \qquad (27)$$

where $\chi(r_C)$ is a propagated function which represents the integrated effect of the variation from $\phi(r)$ for all points on the input buffer. Equation (27) can also be interpreted to represent the arrival of two waves from different sources on the same input buffer.

If $\phi'$ on the input buffer is not too different from the form of the original, learned input, then the propagated (integrated) values at the cortex will not be too far from those of $\phi(r_C)$ and the result of the recall operation performed at the cortex may be written:

$$\frac{\psi(r_C)\phi(r_C)}{\phi'(r_C)} = \frac{|\phi(r_C)|^2\psi(r_C) + \phi(r_C)\chi^*(r_C)\psi(r_C)}{|\phi(r_C)+\chi(r_C)|^2} \qquad (28)$$

$$\equiv \psi(r_C) + \lambda(r_C)$$

where $\lambda(r_C)$ represents the difference at each point $r_C$ on the cortex that the retrieval varies from the correct recall, $\psi(r_C)$. At many points $\lambda(r_C)$ can be zero. But, as a general statement, the effect of $\chi(r_C)$ has been integrated over all buffer source points and is distributed over all cortex points. Thus, so should the effects of $\lambda(r_C)$.

When the complex conjugate of the recall is propagated from the cortex back to the buffer, the following relation is given:

$$\oiint dS_C \{[\psi(r_C)+\lambda(r_C)]\nabla G(r,r_C)-G(r,r_C)\nabla[\psi(r_C)+(r_C)]\}=\psi(r)+\Delta(r) \qquad (29)$$

where $\Delta(r)$ represents the part of $\lambda(r_C)$ which propagated back (not all will) and complex conjugation notation is suppressed for clarity. The success of a retrieval lies in the ability of the present invention to discern $\psi(r_C)$ from the retrieved noise $\Delta(r_C)$.

So, the mathematical expressions for (1) the altered prompt on the input buffer, (2) the altered (integrated and distributed) prompt after propagating to the cortex, (3) the values on the cortex after division by the prompting function, and (4) the retrieved function after propagating back to the original buffer are provided. When $\phi'$ is too different from $\phi$, the recall should fail; otherwise, a false positive identification would result. But, if the prompt is close in value to the original pattern, the retrieval should succeed.

Specific Variations

Variations can be of several forms. A prompt on the buffer can be incomplete, i.e., some of it is missing, as in a partial fingerprint. A prompt can contain extra or altered information, such as a change in hair color or style or the addition or subtraction of glasses. Or, there can be clutter—extraneous images in the input field, like extra people in a photo or background noise in a sound file. Each will be discussed.

Altered Prompt

Consider the case of an input that varies in some very general way, but not too extremely, from the learned file already associated and stored on the cortex. The stored file will be defined to be composed of two functions: $\phi=\beta+v$, but let the prompt constitute a slightly different input, $\tilde{\phi}=\beta+\gamma$. So $\beta$ is a function which represents what files $\phi$ and $\tilde{\phi}$ have in common. $v$ and $\gamma$ are functions that represent how they differ from each other. Then the expression for retrieval is:

$$\frac{\psi\phi}{\tilde{\phi}} = \frac{\psi(\beta+v)}{\beta+\gamma} = \frac{\psi(\beta+v)(\beta+\gamma)^*}{|\beta+\gamma|^2} \quad (30)$$

The retrieval is occurring on the cortex, where the differences, which might vary from point to point on the buffer, have been integrated. Expanding, the following is provided:

$$\frac{\psi\phi}{\tilde{\phi}} = \frac{|\beta|^2\psi}{|\beta+\gamma|^2} + \frac{\psi(\beta^*v+\beta\gamma^*+\gamma^*v)}{|\beta+\gamma|^2} \quad (31)$$

$\beta$, $v$, and $\gamma$ are all functions which have propagated to the cortex and operations are understood to be performed at each point $r_C$, where the three functions are evaluated. It is assumed that $\phi$ and $\tilde{\phi}$ are close to each other in appearance so that $v$ and $\gamma$ are about the same size and are smaller than $\beta$. The first term on the RHS of equation (31) involves the complex, propagating function $\psi$ multiplied by a real, positive-definite function which varies with position but has a value close to the correct one as long as the value of $\gamma$ is small with respect to $\beta$. The second term involves products of three non-related functions which are effectively recall noise. If any of these latter terms propagate, their effects at the output buffer will be small, and $\psi$ should be retrieved.

Missing Information

Sometimes an input will be subject to recall, but it will not have the whole record with which it was associated. Perhaps the sight and fragrance of a rose was recorded with the name, but now only the fragrance is available. Perhaps certain facial features are available, but not the whole face, or only a partial fingerprint is found. Or a key musical phrase is all that is available. The present invention might be able to find the unique association and make an identification, or at least find a group of candidate associations.

Consider a previously learned association of two inputs, $\psi$ and $\phi$. Now a prompt with only a portion of $\phi$ is to be undertaken. Define $\phi$ to be the sum of two functions:

$$\phi(r)=\beta(r)+v(r) \quad (32)$$

so:

$$\psi(r)\phi(r)=\psi(r)[\beta(r)+v(r)]=\psi(r)\beta(r)+\psi(r)v(r) \quad (33)$$

These functions are evaluated on the cortex. The single association resides just as if there were two separate ones. The associations completely overlap at every point in the cortex and retrieval by a fragment, say $\beta(r)$, is like a parallel search probing all associations stored:

$$\frac{\psi\phi}{\beta} = \psi + \frac{\psi v}{\beta} \quad (34)$$

$\psi$ is retrieved. The remaining terms are what amounts to recall noise, which should not propagate. This would be valuable for identification, where a key distinguishing feature may occur. But $\beta$ must be definitive (i.e., unique) enough or erroneous recalls will also occur, overlying the correct recall. That is, if $\beta$ is sufficiently non-unique, it will occur in many recorded inputs. The more unique the prompt, and the larger the piece, the clearer the recall is expected to be.

There is a further application of interrogating a cortex with a partial prompt or any prompt for which multiple retrievals will occur. When a group of associations, which shares a common feature, used as the prompt, has been identified, the present invention has determined a pattern of similarity, a class. This is the essence of data mining.

Clutter

There are at least two ways to treat the problem of finding an object against a cluttered background (and foreground). Consider the stored image on the cortex, sought to be identified in the input field, to be represented by:

$$\phi=\beta+v \quad (35)$$

and the input field including the object sought given by:

$$\phi'=\beta+\chi \quad (36)$$

$\beta$ represents that part of the original input which is not obscured or changed since registration when it was associated and stored. $\chi$ represents variations in the original input from the registered form, plus extra, extraneous images in the field—additional persons behind, beside, and in front, for example. Here $\chi$ is generally larger than $\beta$, perhaps even substantially so. Retrieval at the cortex would then be given by:

$$\frac{\psi(\beta+\gamma)}{\beta+\chi} = \frac{(\beta+\gamma)(\beta+\chi)^*}{|\beta+\chi|^2}\psi \quad (37)$$

$$= \left|\frac{\beta}{\beta+\chi}\right|^2\psi + \frac{\beta^*\gamma+\chi^*(\beta+\gamma)}{|\beta+\chi|^2}\psi$$

The success of the attempted recall depends on the strength of the function $\chi$. The retrieval will generally produce mostly noise as long as $\chi$ dominates. However, there will be points on the cortex where $\beta$ dominates, and the division retrieves $\psi$. If there are enough of these points, then $\psi$ will be reconstructed at the output buffer. Note that the points where $\psi$ is retrieved on the cortex do not have to be contiguous. It is only required that there be a sufficient number that a good reconstruction is created on the buffer.

There is a second way to deal with clutter, reversing the normal procedure. This approach works in the 1:1 (1:a few) scenario where the system knows in advance what to search for. The field being searched, $\phi'$, can be associated with some other file, $\psi$, then the system can retrieve with the stored image, $\phi$. Using the same notation for the two fields, provides as follows:

$$\frac{\psi(\beta+\chi)}{\beta+\gamma} = \frac{|\beta|^2}{|\beta+\gamma|^2}\psi + \frac{\beta^*\chi + \beta\gamma^* + \gamma^*\chi}{|\beta+\gamma|^2}\psi \qquad (38)$$

The last term on the RHS is recall noise. The first term will retrieve $\psi$, provided $\beta$ is sufficiently large, which would be expected because it is the part of $\phi$ that is visible within the clutter. If this is not the case, then there is not a sufficient amount of $\phi$ visible for recognition to occur. Note that the main difference between equations (37) and (38) is the denominator, which is the function used to probe the cortex. In the latter case, the real coefficients of the function $\psi$ which are being retrieved are close to unity and should vary little. In the former case, a retrieval is expected, but the coefficients are smaller, the propagating signal may be weaker, and there could be more noise.

Translation, Rotation, and Size Variation

If the features of the prompt have not changed substantially from when they were learned by the present invention, but the input's position or orientation are altered in some manner, then the wave pattern on the cortex is altered in the same way the input was on the buffer. If the input was displaced slightly, the wave pattern on the cortex is displaced exactly the same amount in exactly the same direction, but is otherwise substantially identical to the stored pattern. If the features of the input wave on the cortex vary sufficiently slowly, then the point by point division, for example, involved in retrieval will produce a good reconstruction. Aside from the specific features of the input pattern, the features of the wave pattern on the cortex are a function of the wavelength used and the distance from buffer to cortex. As either increases, the pattern on the buffer is more tolerant of changes in position and orientation.

Consider a prompt whose position has varied by some amount a. It can be expressed mathematically by expanding the altered prompt in a Taylor series:

$$\phi(r+a) = \sum_m \frac{1}{m!}(a\cdot\nabla)^m \phi(r) = \phi(r) + a\frac{\partial\phi(r)}{\partial x} + \qquad (39)$$

where x is the coordinate in the direction of a. The displacement is only significant to retrieval if the second term is non-negligible. This depends on the size of the shift a and on how quickly the function $\phi$ varies. Equation (39) applies both at the input buffer and at the cortex. For rotation of the prompt, the Taylor series expansion can be done in polar coordinates, in which case:

$$\phi(r+a) = \phi(r) + \theta\frac{\partial\phi(r)}{\partial\theta} + \qquad (40)$$

Here, $\phi$ is the angle rotated. Retrieval will occur if the second term is sufficiently small—in angle and/or in the size of the derivative. The axis of rotation is irrelevant. If perpendicular to the cortex, the pattern will rotate rigidly in the plane of the cortex. If the pattern consists of an image of a 3-D object and the rotation axis is parallel to the plane of the cortex, the image will change due to the three-dimensionality. A frontal view of a face will move slightly toward profile. Regardless of the axis of rotation, retrieval will occur if the first term in the expansion dominates.

There is another type of rotation, that due to parallax. The present invention is three-dimensional in the way it "views" the world. If an object moves to the side, it exposes part that may not have been visible. Though not, strictly speaking, a rotation, it has the same effect, and is addressed by the present invention in the same way.

Size variation is a third type of alteration in an image. This would be expected to occur if an object, presumably three-dimensional, were too close to or too far from the camera relative to the distance at registration time. It could also occur in a signature, in character recognition where different fonts are used, etc. For purposes of analysis there are two areas to consider—size on the input buffer and wave pattern on the cortex. If buffer-to-cortex distance does not change, then changes in cortex pattern can be due only to variations in the image on the buffer. That buffer image is presumed, in most anticipated usage, to be a digital sampling of the analog signal which is the object's appearance. Within the present invention, that appearance is a wavefront whose definition is the record on the buffer. If the sampling is accurate, the wave created will be essentially the same regardless of the relative size of the source, an enormous advantage that the present invention has over digital systems. It evaluates by the entirety of features rather than bit by bit. Thus, the difference to this system should be only how apparently close, if too large, or far, if too small, the wave source is, not the form of the wave. Beyond a certain distance, the wave pattern will not change appreciably. However, if the type of object being sought is known and can be isolated (a head, an alphanumeric, a gun, a signature) for identification, then a size constancy on the input buffer can be imposed by computationally magnifying or demagnifying the image. For example, this could be accomplished if a person is anticipated to be standing in front of the camera, and it is reasonably assumed that the feature on top is the face, or if the character against the known background is an alphanumeric. This is a straightforward procedure known to those skilled in the art by which an image is assigned a size of a certain number of pixels.

Alignment can generally be handled in pre-processing the image prior to propagation to the cortex. This can be accomplished with pre-processing software. Any object can be centered if it can be delimited, which is easily accomplished if the background is known or some property of the target, such as its color, is known. A rectangle, circle, or other border can be drawn around it, then oriented and made a uniform size. If alignment is more critical, longer wavelengths will provide a pattern on the cortex that will vary more slowly and can be used.

Another method to satisfy alignment requirements is to use multiple copies of the learned pattern in the cortex. That is, a pattern could be learned, centered on the buffer. Then it could be learned again, this time located in the upper left corner, etc. These multiple patterns can overlap and, in fact, will on the cortex because of the distributed nature. This technique can be used rotationally, about any axis, as well as translationally.

A further technique to overcome alignment concerns is to work in another space. For example, the magnitude of the Fourier transform of an image is translationally invariant. Thus, an object can be identified, and then by measuring phase, can be brought into spatial alignment for additional identification. The same can be done for rotation, where the expansion would be in polar coordinates. The magnitude would then be rotationally invariant. Most often, rotational and translational offset would both occur. If an object is rotated, its spatial Fourier transform is similarly rotated. To use a Fourier or other representation, the transformed image would be used as the input, the coefficients occupying elements on the input buffer, and learned. When identifying, the input on the buffer is transformed and replaces the direct space image. The present invention is capable of identifying both representations simultaneously, either with a transformed image probing a cortex of transformed images separate from the "direct" cortex, or with both representations present in the same cortex.

Confidence Estimates

When making an identification, the present invention retrieves the input originally associated with the prompt offered for recognition. As alluded to herein, it is anticipated that the prompt will differ in some ways from the original input. That variation will affect the quality of the retrieval—in brightness, sharpness, noise, etc. Any expectation that relates to the retrieval can be used to assess how closely the prompt matches the original input and so to a confidence that what is being identified is done correctly.

Consider the example that inputs are associated with an IIP constructed from a binary code, so that it is machine-readable and -interpretable. The general pattern expected is known, for example bars or dots, as well as where on the buffer they are expected to be found. Areas in the retrieval buffer where no retrieval is anticipated to occur, where it should be black, are known as well. By assessing to what extent these expectations are met, a confidence estimate of the accuracy of the identification can be calculated.

Parameters which can be used to judge confidence include contrast ratio, maximum values, minimum values, noise, resolution of reproduced shapes, and consistency among redundant parts.

A script by which the behavior of the present invention is a function of the confidence estimate can be implemented. The system could be programmed to request additional information, assign a level of security, or perform arbitrary commands.

Adaptive Learning

Consider an input:

$$\psi_1 = \beta + \nu \tag{41}$$

associated with some other input, $\phi_1$, and variations on the first input:

$$\psi_2 = \beta + \gamma \tag{42}$$

and $$\psi_3 = \beta + \mu \tag{43}$$

As discussed above, if the functions $\nu$, $\gamma$, and $\mu$ have values which generally are sufficiently smaller than $\beta$, each version of $\psi$ should competently retrieve $\phi_1$. However, consider where such retrieval is less than optimum. $\psi_2$ can be associated with $\phi_1$ such that:

$$<\psi_1,\phi_1> + <\psi_2,\phi_1> = <\psi_1+\psi_2,\phi_1> \tag{44}$$

where the symbol: <, > denotes that included terms are associated, those before the comma with those following it. The association in equation (44) has the property that it accentuates those features of $\psi$ which are common or essential to all versions of the input, because those common features are included twice, and diminishes those features which exist in only one version of $\psi$ because they are only mentioned once. The combination constitutes a generalization in that it contains the properties of several versions of the input and effectively defines a stereotype. Any linear combination of features can occur, for example:

$$<0.7\psi_1 + 0.5\psi_2, \phi_1> \tag{45}$$

Suppose further that there is a false positive, an erroneous retrieval with some function $\eta$. That is, there is some element of at least some versions of $\psi$ that is also contained in $\eta$. The erroneous response can be weakened by subtracting some amount of $\eta$. For example:

$$<0.7\psi_1 + 0.5\psi_2 - 0.1\eta, \phi_1> \tag{46}$$

This process strengthens the essential elements and diminishes the non-essentials, such as hairstyle in facial recognition, or erroneous, such as seeing some too-common feature as essential.

Within the cortex, the adaptively modified stored record appears as a single association since it could as easily have been generated with a single input on the buffer. In fact, it is formed through multiple learning operations, and forms with or without an intentional plan to do so. One general example of how this might function would be for the present invention to experience various animals and be told which are and which are not birds. Then the sequence: sparrow+eagle−dog+owl+parakeet−butterfly=bird, creates a concept which can be expanded and refined with additional learning operations.

Descriptions and Flow Charts of the Operations

The macro operations of the present invention are summarized below. In some figures used for illustration, which display the elements of the associative memory device, it is to be understood that certain features which are part of the present invention, and which have been described herein, may not be explicitly shown for purposes of clarity in the discussion of specific operations. It is further to be understood that, for clarity, inputs and outputs on buffers will often be referred to as patterns to encompass all possible records: pictures, sounds, data files, etc.

Learn

Figure 4:
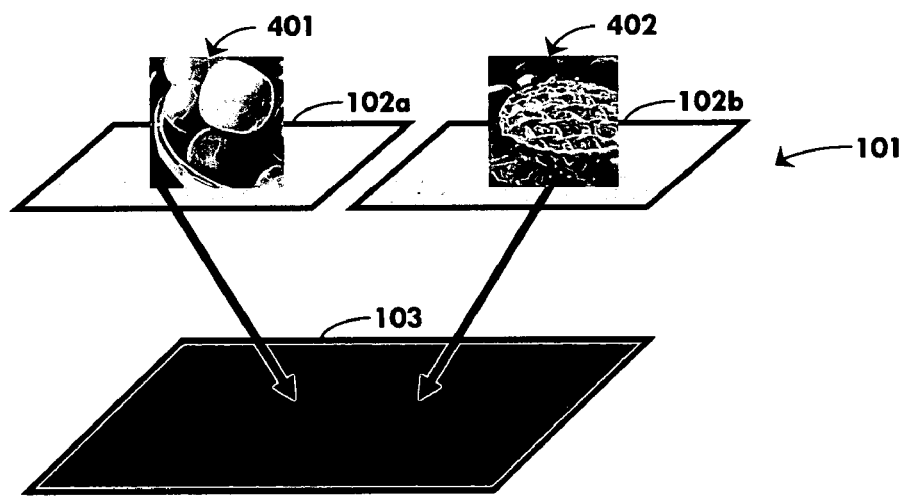
FIG. 4 illustrates the associative memory device being presented with data on two input buffers.

The first macro operation of the present invention is for the associative memory device 101 to input two or more patterns and associate them with each other on the cortex. In the example shown in FIG. 4, the associative memory device 101 is presented with data on two input buffers 102a and 102b, an image of apples 401 and an image of an apple pie 402. Those inputs are then associated with each other on the cortex 103 and stored as a new association in the memory of the system. As noted earlier, the type of input source is immaterial; the input data could have also originated from sounds, odors, or any other kind of signal which is convertible to computer words.

Recognize

Figure 5:
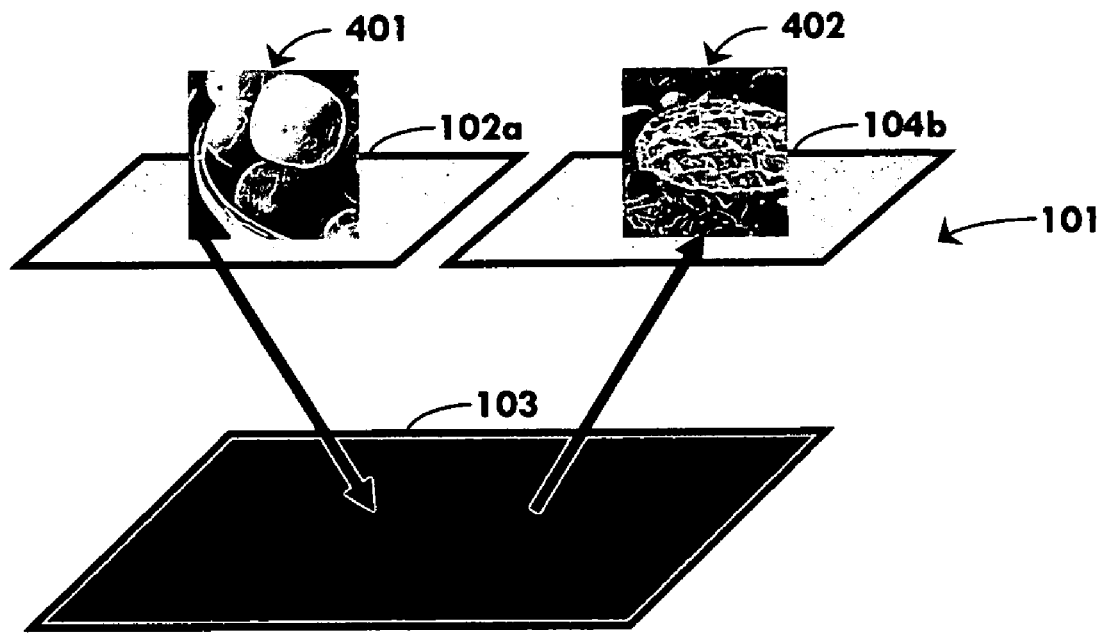
FIG. 5 illustrates an image being re-introduced on the left or input buffer and the response-image being re-formed on the right or output buffer.
Figure 6:
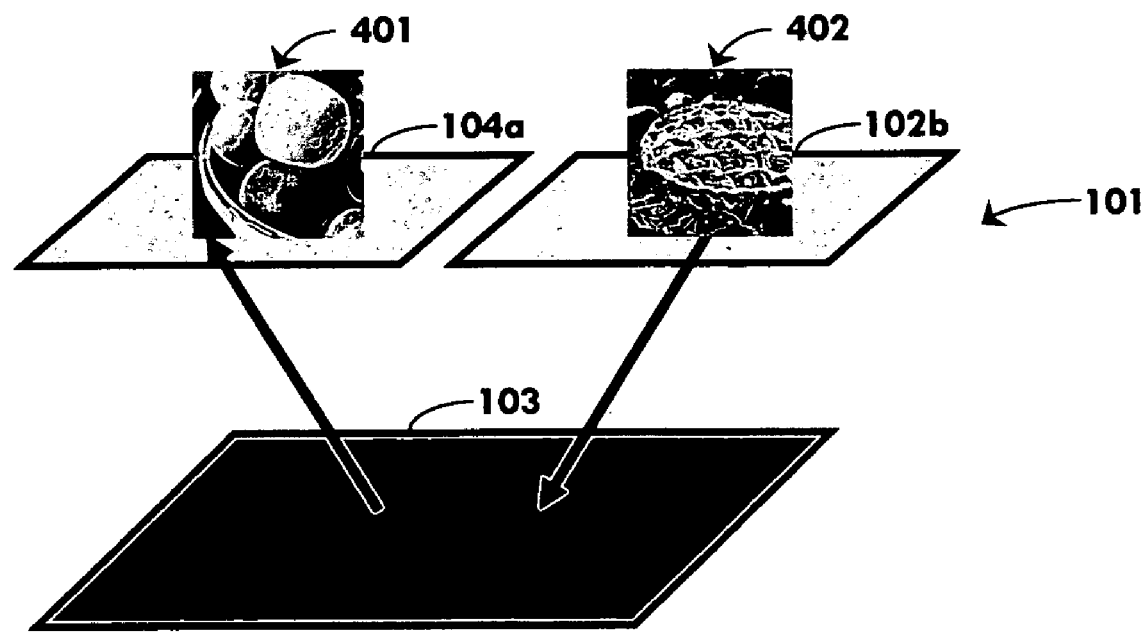
FIG. 6 illustrates an image being re-introduced on the right or input buffer and the response-image being re-formed on the left or output buffer.

The second macro operation of the present invention is for the associative memory device 101 to recognize, or retrieve, one or more stored patterns when a previously learned pattern is re-introduced to the system. In the example shown in FIG. 5, an image of apples 401 is re-introduced on the left or input buffer 102a. That signal is used to de-associate memories stored on the cortex 103, and the resulting wave is defined, propagated, and re-forms on the right or output buffer 104*b* the image of the apple pie 402 that was originally associated with the image of the apples 401. If the apple pie image 402 is re-introduced on the right or input buffer 102*b*, the image of the apples 401 will be re-formed on the left or output buffer 104*a*, as shown in FIG. 6.

Learn for Autonomous Identification

The third macro operation of the present invention is for the associative memory device 101 to learn using one or more machine-readable patterns, called IIPs, as inputs in such a way as to enable it to employ those patterns autonomously later. In the example shown in FIG. 7, the associative memory device 101 is presented with data on one input buffer 102, an image of apples 401, and with an identifier code 702 (e.g., 01100011). In addition, the associative memory device 101 could be supplied with one or more files 703 to store in binary form on a hard drive or other device, which (1) can subsequently be looked up using the identifier code and (2) can contain additional information related to the retrieval, or identification, such as photographs, documents, references to other stored records, instructions, or applications to be executed by an output device, such as a computer. In this example, the associated information consists of the descriptive text string "apples" 703. The associative memory device 101 internally generates a pattern, the IIP 704, based on the code 702, which it writes on the right IIP input buffer 301. An IIP buffer is differentiated from an ordinary buffer in that the IIP buffer interacts only with the associative memory device and does not interface directly with the outside world whereas an ordinary buffer interfaces with an input/output device such as a camera, a microphone, or a computer. The present invention then propagates both the input pattern 401 and the IIP 704 to the cortex 103, associates them, and stores that association.

Identify and Respond Autonomously

The fourth macro operation of the present invention is for the associative memory device 101 to use the internally defined and machine-readable code to identify a learned pattern and respond autonomously based on user-defined commands and parameters. In the example shown in FIG. 8, an image of apples 401 is re-introduced as a prompt on the left or input buffer 102. The pattern is modeled as a wave which propagates to the cortex as a prompt which de-associates the information stored on the cortex 103. The resulting wave re-forms on the right, or output IIP buffer 303, the associated IIP 704. The IIP reader 302, seen in FIG. 3, then decodes the IIP generating the identifier code 702, here a binary string which constitutes a machine identification of the input that can be used to look up appropriate files. The IIP reader 302 also produces a confidence estimate in its identification 801. Based on the user-defined instructions and parameters, the associative memory device can then transmit the identification, the confidence estimate, any associated sets of information, and any appropriate commands to any attached output device awaiting the identification.

Adaptively Improve Identification Performance Through Experience

The fifth macro operation of the present invention for the associative memory device 101 is to modify its stored memories in response to feedback on the correctness of its identifications. In this operation, modifications can be made to the cortex 103 in response to false positive or false negative identifications, such as those that might be noted by an operator of the present invention or by the associative memory device 101 itself, if it is operating in a multiple input mode. That is, the associative memory device can self-correct a false identification from one input (e.g., a fingerprint) based on consistent identifications from other inputs, such as a voiceprint, facial scan, and/or signature.

Elementary Operations

The elementary operations of the present invention are presented in detail below. These operations form the functional building blocks of the disclosed invention.

The notation that is used in the present section differs from that used in the preceding theoretical section on the mathematical basis for the present invention. The theoretical description tends to be more abstract. There, files were considered mathematical functions and were designated by lower case Greek letters. They were treated as generic regardless of whether they represented inputs for storage, for recognition, or outputs. The particular letter denoted an input/output channel, such as a camera, microphone, etc., and a subscript differentiated among files of that type. So if the letter $\phi$ generically represents a picture of a face, then $\phi_3$ might belong to one person and $\phi_7$ to another. A text file, being of a different type, might be represented by the letter $\psi$, etc. The action of the system to make an identification was denoted by the operator C.

In the present section, much greater differentiation is made. All input files are termed "patterns" once they have been written on the input buffer 102 or the output buffer 104. Those patterns used for learning are designated by the letter P. Once the file has propagated to the cortex 103, the fact that it is now defined at the cortex 103 is designated by P'. The input channel—that is, whether it is a photograph or a sound or a fingerprint, etc.—is denoted by a first subscript, i. A counter, whose value, m, increments with each new association or recall by the present invention is used as a second subscript. Thus, file $P_{i,m}$ is a pattern on input buffer 102 which came from channel i and was associated with other input patterns from other channels in the $m^{th}$ operation of the present invention since the device was first turned on. Should two files to be associated come through the same channel, two photographs, say, they will be treated as coming through separate channels, photo 1 and photo 2.

Figure 7:
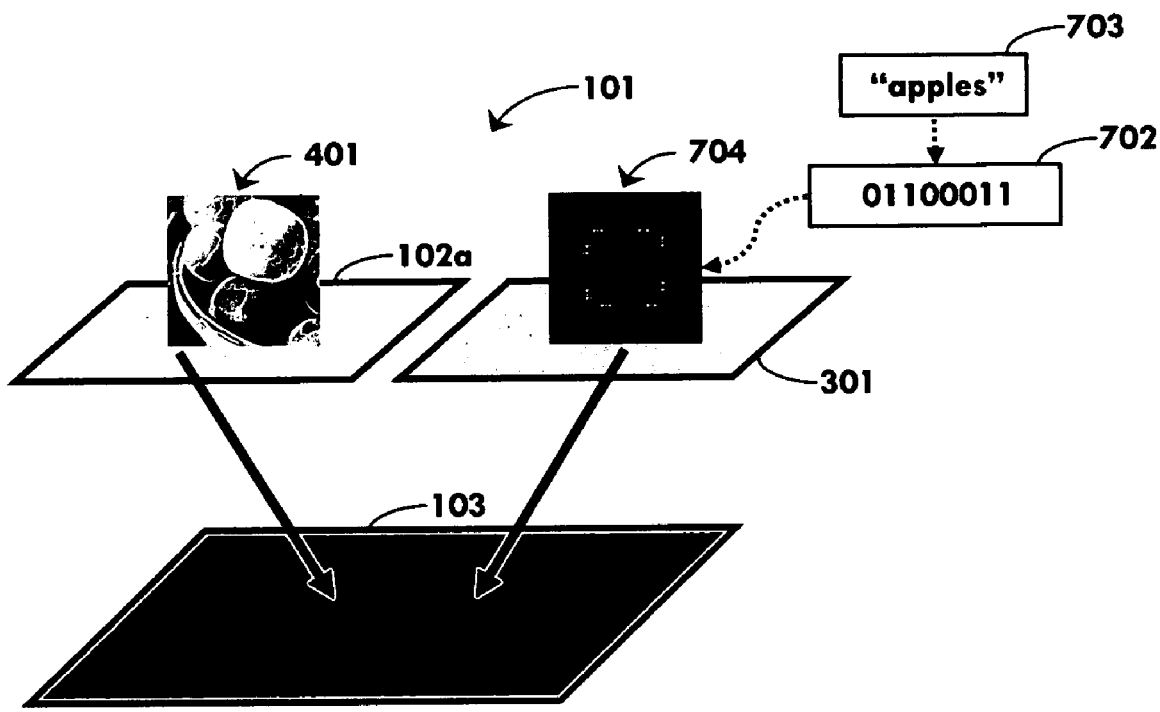
FIG. 7 illustrates the associative memory device being presented with data on one input buffer with an identifier code (e.g., 01100011) on the other buffer.
Figure 8:
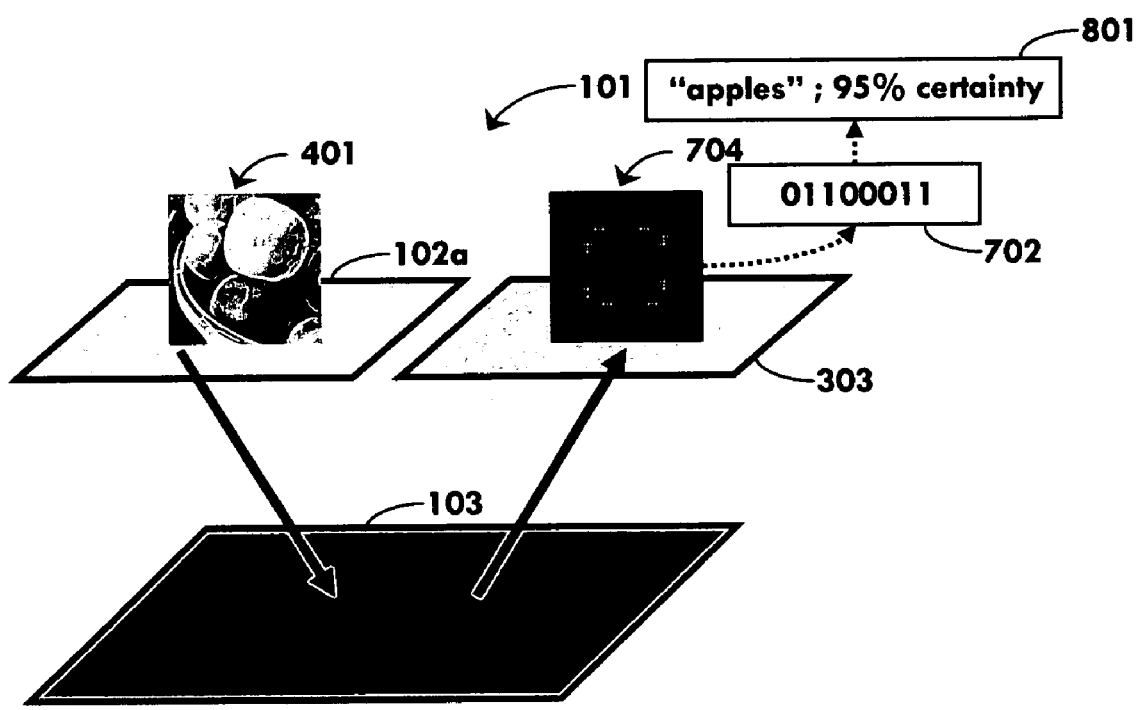
FIG. 8 illustrates an image being re-introduced on the left or input, buffer and the identifier code being re-formed on the right or output buffer.

For autonomous operation, the machine readable code 702 is designated by L. The IIP 704 generated from it and used for input is designated by I. A retrieved IIP 704 is designated by J. And the confidence estimate 801 generated by the associative memory device 101 and its IIP reader 302 is designated by E, as seen in FIGS. 7 and 8.

Files associated with each other are denoted by angle brackets, so the $m^{th}$ association of files from channels i and j on the cortex 103 is $<P'_{i,m}, P'_{j,m}>$. If subscript i has the value 2 when it denotes a face and learning the identity of someone named Fred is the $307^{th}$ operation of the associative memory device 101, then Fred's picture is represented by $P_{2,\,307}$. On the cortex 103, the same pattern, now propagated, is $P'_{2,\,307}$. Note that in this notation, the same picture would be considered a different pattern each time it is introduced. So, if it were used as an input again in the $512^{th}$ operation of the present invention, it would be denoted $P_{2,\,512}$. Sometimes, if an input to the system is discussed without specific reference to a particular association or retrieval, the second subscript will be suppressed for purposes of clarity.

A file submitted to the present invention for retrieval follows the same formalism except that it is denoted by the letter R. The symbol C, here, is a function containing the sum of all stored associations on the cortex 103. It is the one exception to the notation used in that it is not primed, even though it resides on the cortex 103. Once the cortex 103 has been probed by R' the value of the stored cortex 103 is denoted by the symbol D'. The act of probing the cortex 103 is denoted by a vertical bar, so D'=C|R'. In relation to a single association, the vertical bar will occur within angle brackets separating the probing patterns from the associated patterns: $<P'_{i,m}, P'_{j,m}|R'_{k,n}>$. When the probed cortex 103 is propagated to the output buffer 104 or 303, the retrieved pattern is denoted by D.

Input Information to A Buffer

Figure 9:
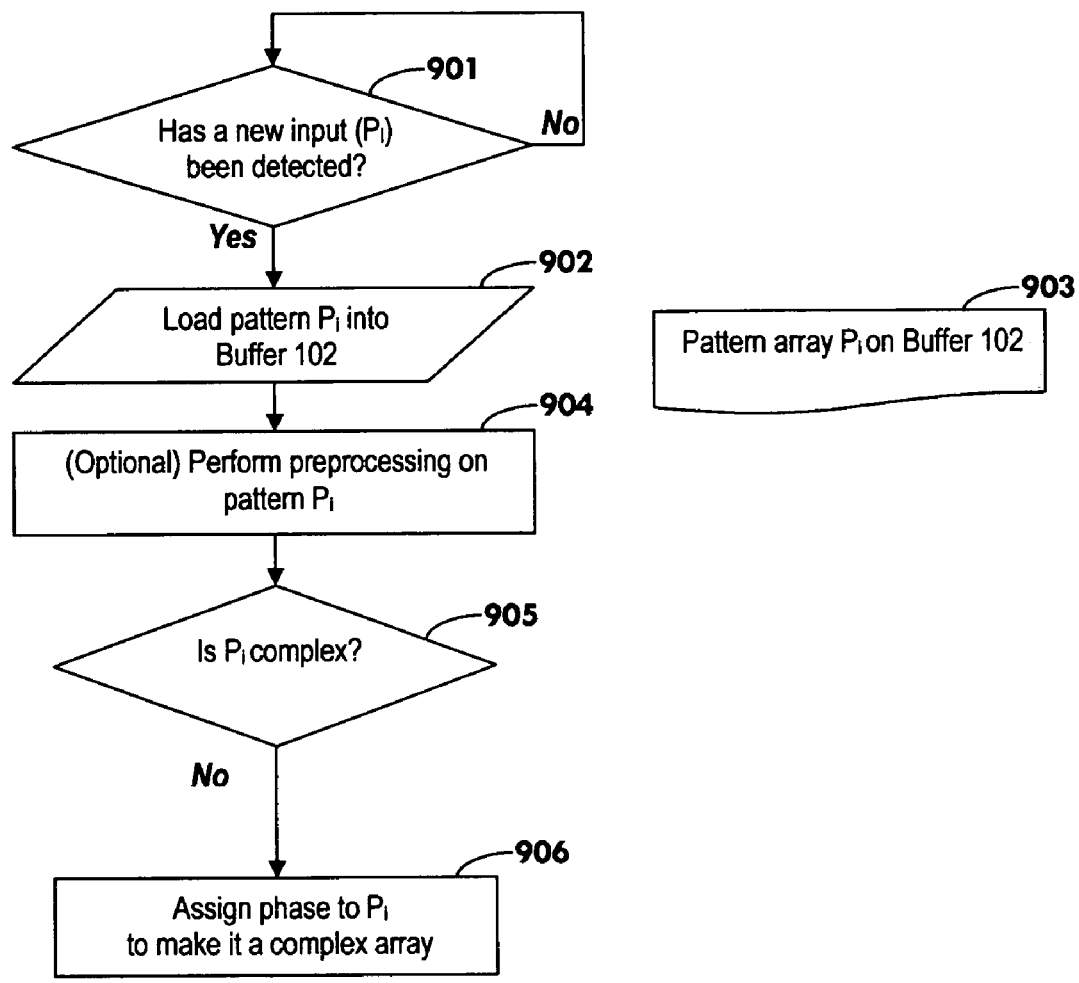
FIG. 9 illustrates a flow chart of input of information to an input buffer.

The following steps describe the flowchart as shown in FIG. 9, as further illustrated in the computer program flow chart of FIG. 157.

In Step 901, the present invention monitors for the presence of a new input and proceeds with the steps that follow when an arbitrary input pattern, denoted here by $P_i$, has been detected in the input channel designated by the index i.

As seen in step 902, if an input to the system has occurred, the present invention loads the data $P_i$ into input buffer 102

In step 903 the input file, now designated as pattern $P_i$ within the system, resides as an array on input buffer 102.

In optional step 904, depending on the specific field of use intended for the present invention, it might be desirable to perform one or more types of preprocessing operations on the input pattern. For example, contrast or brightness adjustments, automated quality checks, alignment shifts, or rotational transformations on visual images could be applied to the input. For audio files, noise reduction or equalization of frequencies could be performed. Other types of inputs would have their own characteristic preprocessing techniques. General changes of representation such as Fourier transforms might be performed.

In step 905, pattern $P_i$ is analyzed to determine whether it consists of amplitude information only (real values) or of both amplitude and phase information (complex values with both real and imaginary components).

In step 906, if $P_i$ does not contain phase information, then the associative memory device and method will assign phase values, which define the directionality or "shape" of the wavefront. There are many possible methods for calculating phase variations, given the amplitude of a field.

Steps 901 to 906 are implemented in blocks 15701 to 15704 of the computer program flow chart of the present invention, as shown in FIG. 157.

Transport Information between Buffer and Cortex

Figure 10:
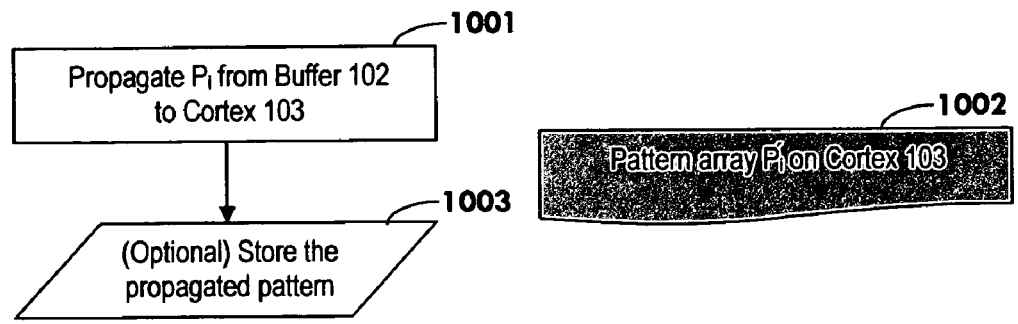
FIG. 10 illustrates a flow chart of transport of information between buffer and cortex.

The following steps describe the flowchart shown in FIG. 10.

Figure 11:
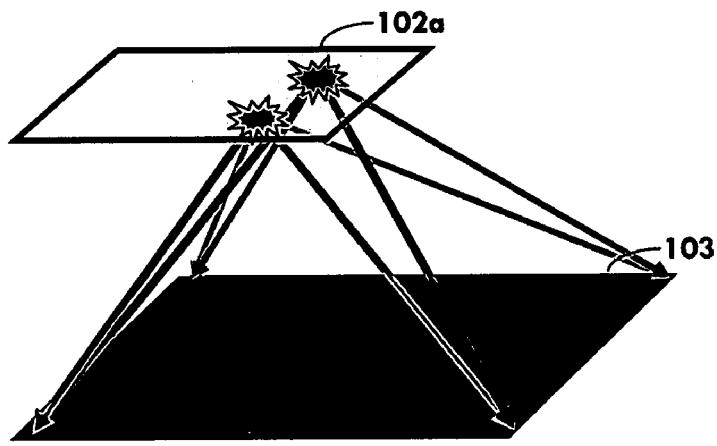
FIG. 11 illustrates buffer to cortex operations.
Figure 12:
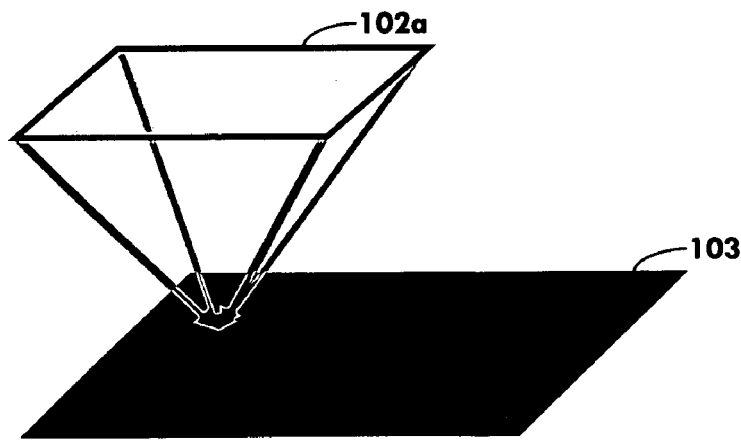
FIG. 12 illustrates buffer to cortex operations.

In step 1001, a complex field, that is, one for which an amplitude and phase are defined at each point, is propagated from one surface to another, either from input buffer 102 or input IIP buffer 301 to cortex 103, or from cortex 103 to output buffer 104 or to output IIP buffer 303. Each source point on the first surface propagates to each point on the destination surface, as shown in FIG. 11, and so each destination point receives contributions from each source point, as displayed in FIG. 12. The specific method for this wave propagation step depends on the particular embodiment, as discussed in detail in the Embodiments section of this disclosure.

In step 1002, the propagated form of the pattern is evaluated at cortex 103 and is denoted by $P'_i$.

In optional step 1003, the propagated pattern $P_i$ can be saved to permanent storage such as a hard disk or another storage medium. If multiple transportation operations will be performed in sequence, step 1003 may be skipped until all of the pending input patterns have been processed.

Steps 1001 to 1003 are shown in blocks 15705 to 15708 of the computer program flow chart of the present invention, as illustrated in FIG. 157.

Associate Two or More Patterns

Figure 13:
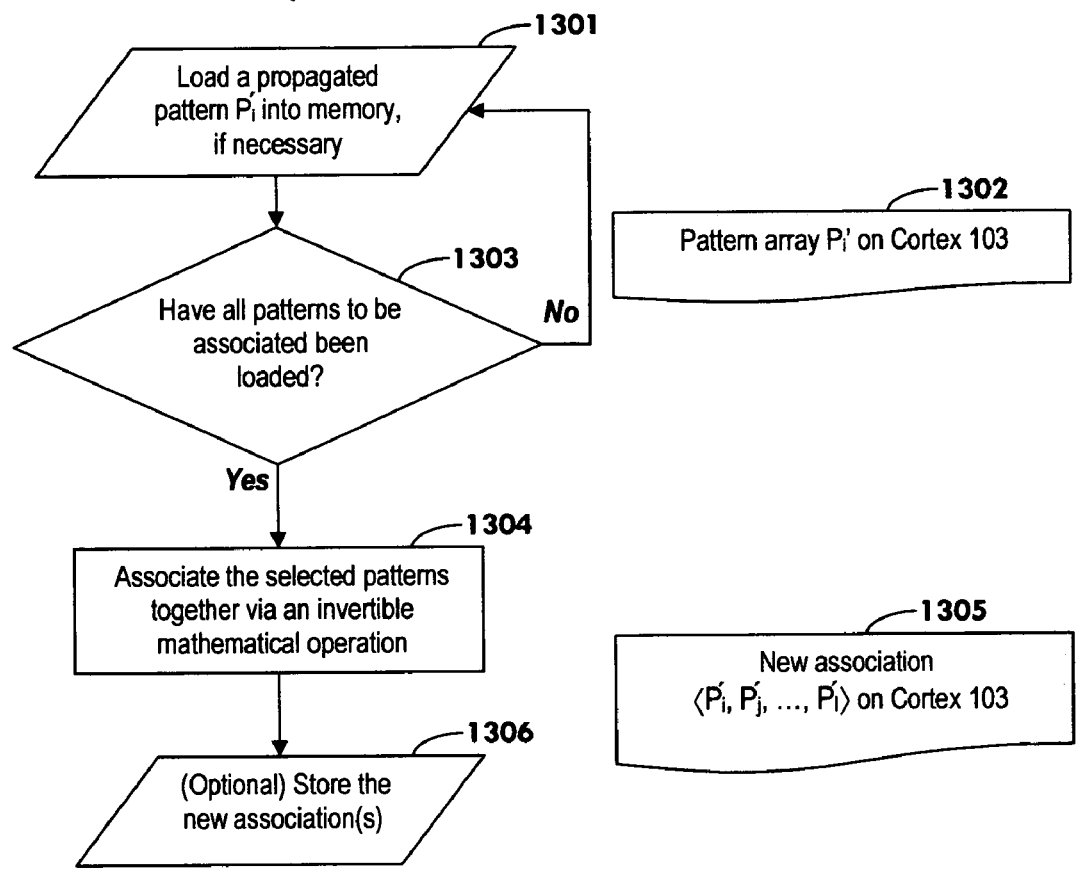
FIG. 13 illustrates a flow chart of the association of two or more patterns.

The following steps describe the flowchart shown in FIG. 13.

In step 1301, if necessary, the present invention loads $P_i$, the first of the wave patterns that have propagated to the cortex 103 and that are to be associated together, into cortex memory.

In step 1302 the propagated pattern $P_i$ is defined at the cortex 103.

In step 1303, the associative memory device 101 then checks whether further patterns to be associated together with $P_i$ remain to be loaded into memory. If not all patterns have been loaded, execution returns to step 1301. Once all the appropriate patterns have been loaded, the present invention continues to step 1304. At least two patterns ($P'_i$ and $P'_j$, in this example) are required for association purposes; however, there is no intrinsic upper bound on the number of patterns that can be associated together. The arbitrary set of patterns to be associated are referred to as $P'_i, P'_j, \ldots, P'_l$.

Figure 14:
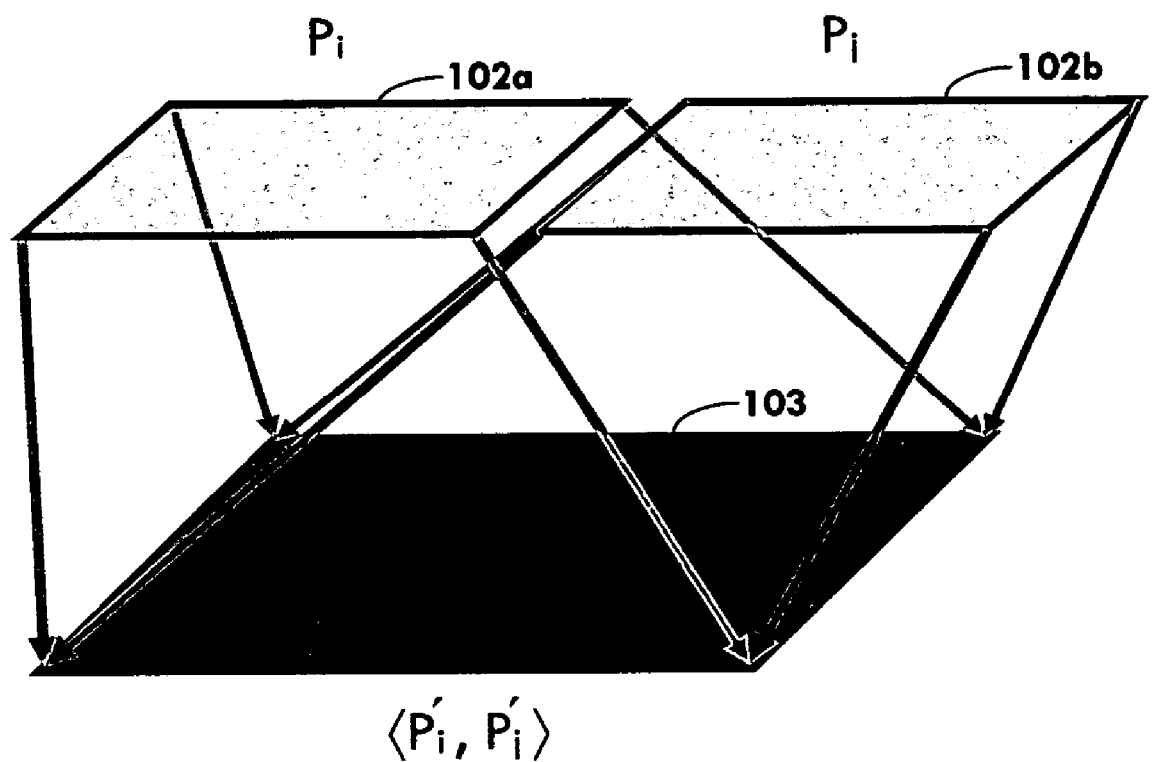
FIG. 14 illustrates buffer to cortex operations.

In step 1304, the propagated input fields $P'_i, P'_j, \ldots, P'_l$ are "associated" at each element of the Cortex 103 through some mathematical operation denoted by the function f. The function f should satisfy the requirement that it has an inverse function, $f^{-1}$, so that, for retrieval, the association can be undone, or, as is used herein, de-associated. As disclosed herein, an association is sometimes denoted by angle brackets < >. Thus, the new association is given by $<P'_i, P'_j, \ldots, P'_l> \equiv f(P'_i, P'_j, \ldots, P'_l)$. In one prototype software embodiment of the present invention, the function f used is multiplication, indicated by f(x,y)=x*y, but any other function satisfying the condition noted above may be used. The case of the association of $P'_i$ and $P'_j$, in this example, $<P'_i, P'_j>$, is depicted schematically in FIG. 14.

In step 1305 the association of all input files now resides as a distinct file on the cortex.

In optional step 1306, the new association can be saved to permanent storage such as a hard disk or another storage medium. If multiple associations will be performed in sequence, step 1306 may be skipped until all of the pending associations have been processed. Also, any single association or any combinations of associations may be saved, as desired by the user of the system.

Steps 1301 to 1306 are shown, in the case where one of the input patterns is an IIP, in blocks 15401 to 15413 of the computer program flow chart of the present invention, as illustrated in FIG. 154.

Superpose Two or More Associations

Figure 15:
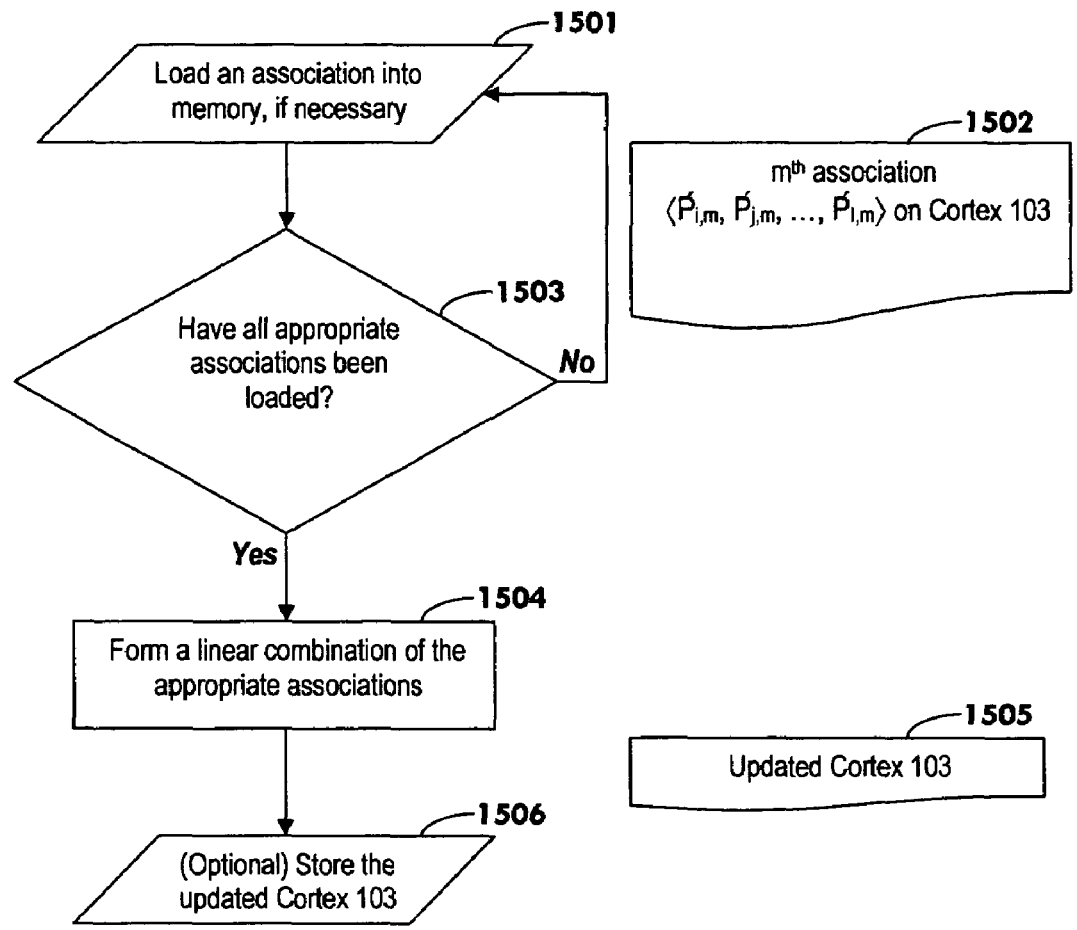
FIG. 15 illustrates a flow chart where two or more associations are superposed.

The following steps describe the flowchart shown in FIG. 15.

In step 1501, if necessary, the present invention loads into cortex memory, the first of the associations to be superposed.

In step 1502, association m is denoted by $<P'_{i,m}, P'_{j,m}, \ldots, P'_{l,m}>$ and resides at the cortex 103. In the notation being defined, the first subscript of each pattern in the brackets identifies the input channel—face, fingerprint, sound, keyboard, etc.; the second subscript identifies the association by denoting the identifying number of the operation of the associative memory device, 101. For example, if this were the first operation performed, m would have the value of 1.

In step 1503, the associative memory device then checks whether further associations remain to be loaded into memory. If not all associations have been loaded, execution returns to step 1501. Once all the appropriate associations have been loaded, the present invention continues to step 1504.

In step 1504, the associative memory forms a linear combination of associations, $\Sigma_m \alpha_m <P'_{i,m}, P'_{j,m}, \ldots, P'_{l,m}> = \Sigma_m \alpha_m f(P'_{i,m}, P'_{j,m}, \ldots P'_{l,m})$, where $\alpha_m$ is an arbitrary weighting factor for association m.

In step 1505, once this linear combination is added to cortex 103, the cortex 103 is now updated. The updated cortex can be expressed mathematically as $C_{new} = C_{old} + \Sigma_m \alpha_m f(P'_{i,m}, P'_{j,m}, \ldots P'_{l,m})$. For example, if two associations of pairs of patterns have been saved to an initially empty cortex and $\alpha_1 = \alpha_2 = 1$, the value of the cortex 103 can be given by $C = f(P'_{1,1}, P'_{2,1}) + f(P'_{1,2}, P'_{2,2})$. Note, however, that any linear combination of arbitrary sets of patterns can be associated together on the cortex 103. As a result of adding two new associations to a cortex that already contained a superposition of associations denoted by $C_{old}$, one could also have the updated cortex value defined by $$C_{new} = C_{old} + 0.46f(P'_{1,1}, P'_{2,1}) - 0.96f(P'_{1,2}, P'_{2,2}, P_{3,2}))$$

In optional step 1506, the updated cortex 103 can be saved to permanent storage such as a hard disk or another storage medium. If multiple memory associations will be performed in sequence, step 1506 may be skipped until all of the pending input patterns have been processed. Any single association or any combinations of associations may be saved, as desired by the user of the system.

Steps 1501 to 1506 are shown in blocks 15413 to 15418 of the computer program flow chart of the present invention, as illustrated in FIG. 154(*b*).

Probe the Cortex with a Prompting Input

Figure 16:
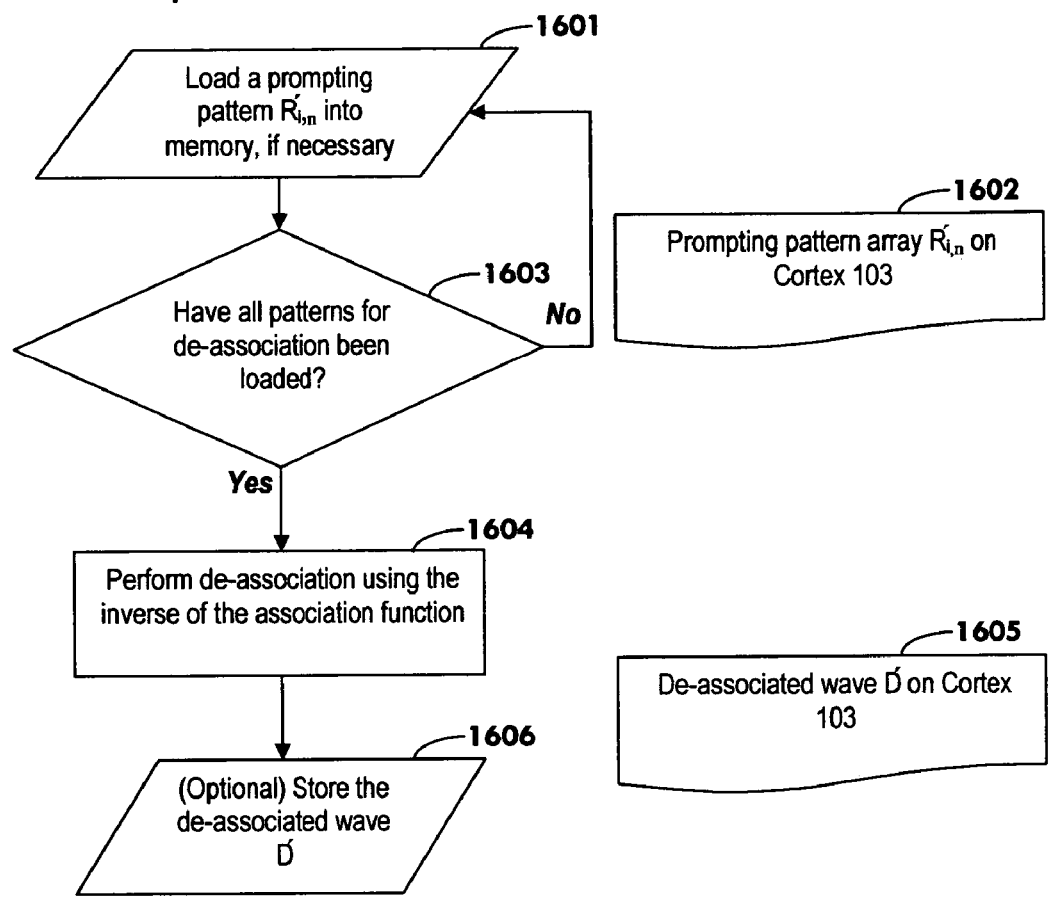
FIG. 16 illustrates a flow chart of the probe of the cortex with a prompt.

The following steps describe the flowchart shown in FIG. 16.

In step 1601, if necessary, the present invention loads $R'_{i,n}$, the first of the propagated, prompting wave patterns into cortex memory to probe a cortex of stored associations. The subscript i denotes the input channel and the subscript n denotes that this is the $n^{th}$ operation of the system 101.

In step 1602, the propagated form of the prompting pattern $R_{i,n}$ resides at the cortex 103, and is denoted by $R'_{i,n}$. This notation differentiates a prompting pattern, $R_i$, which probes and deassociates previously learned associations, from an input pattern, to be associated with other patterns, designated as $P_i$ on the input buffer in step 903 of FIG. 9 and as $P'_i$ on the cortex 103 in step 1302 of FIG. 13. This is strictly a matter of notation. There is no substantive difference in patterns used for learning, that is, association, and those used for retrieval.

In step 1603, the associative memory device checks whether further patterns to probe cortex 103 remain to be loaded into memory. If not all patterns have been loaded, execution returns to step 1601. Once all the appropriate patterns have been loaded, the present invention continues to step 1604. At least one pattern ($R'_{i,n}$, in this example) is required for de-association purposes; however, there is no intrinsic upper bound on the number of patterns that can theoretically be used to simultaneously probe a cortex. The arbitrary set of prompting patterns used for de-association shall be referred to as $R'_{i,n}, R'_{j,n}, \ldots, R_{l,n}$.

In step 1604, the propagated, prompting fields $R'_{1,n}, R'_{j,n}, \ldots, R'_{l,n}$ probe the stored associations at each element on the cortex 103 using mathematical operation $f^{-1}$, the inverse of the function used originally to form the associations. As disclosed herein, a de-association is sometimes denoted by angle brackets with a vertical bar separating the first argument (s), the entity being probed, from the second argument, the set of one or more prompting fields. In the case of cortex 103 being probed by the propagated, prompting input fields $R'_{i,n}, R'_{j,n}, \ldots, R'_{l,n}$, the resulting de-associated wave D' is denoted by $D' = <C|R'_{i,n}, R'_{j,n}, \ldots, R'_{l,n})$ where C represents the full contents of the cortex 103. Expressed in terms of the inverse function, $f^{-1}$, this equation becomes $$D' = f^{-1}(C|R'_{i,n} R'_{j,n}, \ldots, R'_{l,n}),$$

where the contents of the cortex 103 can be written in the form $$C = \Sigma_m \alpha_m f(P'_{i,m}, P'_{j,m}, \ldots, P'_{l,m}).$$

Thus, $D' = f^{-1}(\Sigma_m \alpha_m f(P'_{i,m}, P'_{j,m}, \ldots P'_{l,m})|R'_{i,n}, R'_{j,n}, \ldots, R'_{l,n})$.

Figure 17:
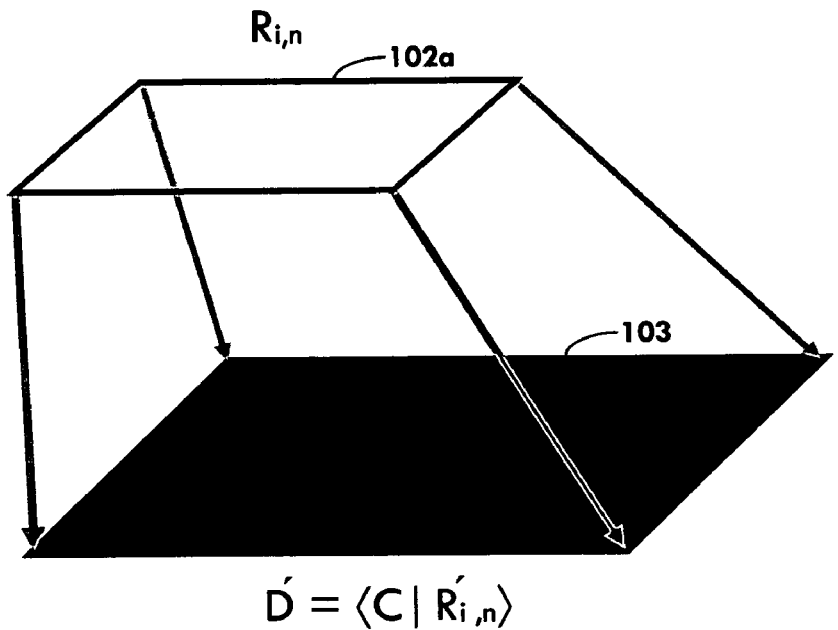
FIG. 17 illustrates buffer to cortex operations.

The case of the probing of cortex 103 with a single prompting wave $R'_{i,n}$ is depicted schematically in FIG. 17.

In step 1605, the de-associated wave D' is the result of probing a cortex using a prompting input. By way of example, if the associating function used, f, was multiplication, $f(x,y) = x*y$, and if cortex 103 is probed through division by a single prompting wave $R'_{i,n}$, then $D' = \Sigma_m \alpha_m P'_{i,m} * P'_{j,m} \cdots * P'_{l,m} / R'_{i,n}$. As a further simplification for this example, if C consists of a sum of pairs of associated patterns, then $$D \Sigma_m \alpha_m P'_{i,m} * P'_{j,m} / R'_{i,n}.$$

If the prompting pattern $R'_{i,n}$ approximates learned pattern $P'_{i,q}$, then $P'_{i,q}/R'_{i,n} \approx 1$ and D' can be expressed as $$D = \alpha_q P_{j,q} + \Sigma_{m \neq q} \alpha_m P'_{i,m} * P'_{j,m} / R'_{i,n}.$$

The de-associated wave D' effectively recalls $P'_{j,q}$, as discussed hereinabove.

In optional step 1606, the de-associated wave D' can be saved to permanent storage such as a hard disk or another storage medium.

Steps 1601 to 1606 are shown in block 15507 of the computer program flow chart of the present invention, as illustrated in FIG. 155(*a*).

Export Buffer Information

Figure 18:
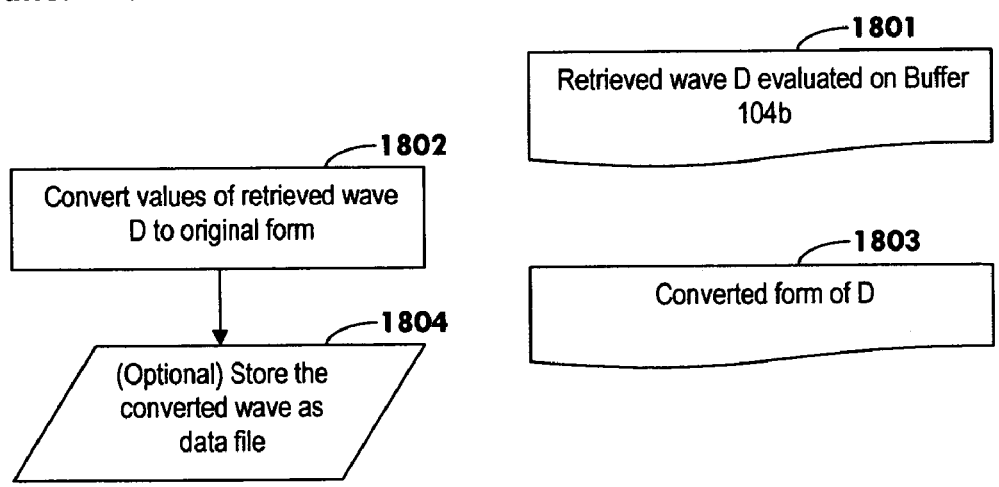
FIG. 18 illustrates a flow chart of the export of buffer information.

The following steps describe the flowchart shown in FIG. 18.

In step 1801, the wave D has arrived at the output buffer 104 or 303 and must be converted back to the form possessed by the file that was originally introduced to the associative memory device 101. To accomplish this, the procedure used to transform the input file to a wave in elementary operation steps 901 to 906, is reversed. If the input was analog and complex, no action need be taken. If it was analog and real, the magnitude of the arrival could be taken. If it was digital, then the complex wave values comprising retrieved pattern D on output buffer 104 or 303 are interpreted as the digital sampling of the arriving wave. These values constitute the output if the initial values were complex. If the original file was real, the retrieval is converted to a set of pure real numbers.

In step 1802, to make comparisons to an original, real-valued input data file, one preferred conversion process involves forming |D|, the magnitude of D; however, other methods for converting a complex-valued field to a real-valued field would be known to those skilled in the art. For an arbitrary complex number z=a+i b, where i is the square root of −1, the magnitude is $|z|=(a^2+b^2)^{1/2}$.

In step 1803, the data type of the output file has been converted to the input form. In the case of a conversion of an analog, complex wave to a digital, real valued file, the resulting real-valued field can then be interpreted as a set of binary data for standard digital computers.

In optional step 1804, the converted field (for example, |D|) can be saved as a binary data file to permanent storage such as a hard disk or another storage medium.

Steps 1801 to 1804 are shown in blocks 15511 to 15512 of the computer program flow chart of the present invention, as illustrated in FIG. 155(*a*).

Generate an Internal Identification Pattern (IIP)

Figure 19:
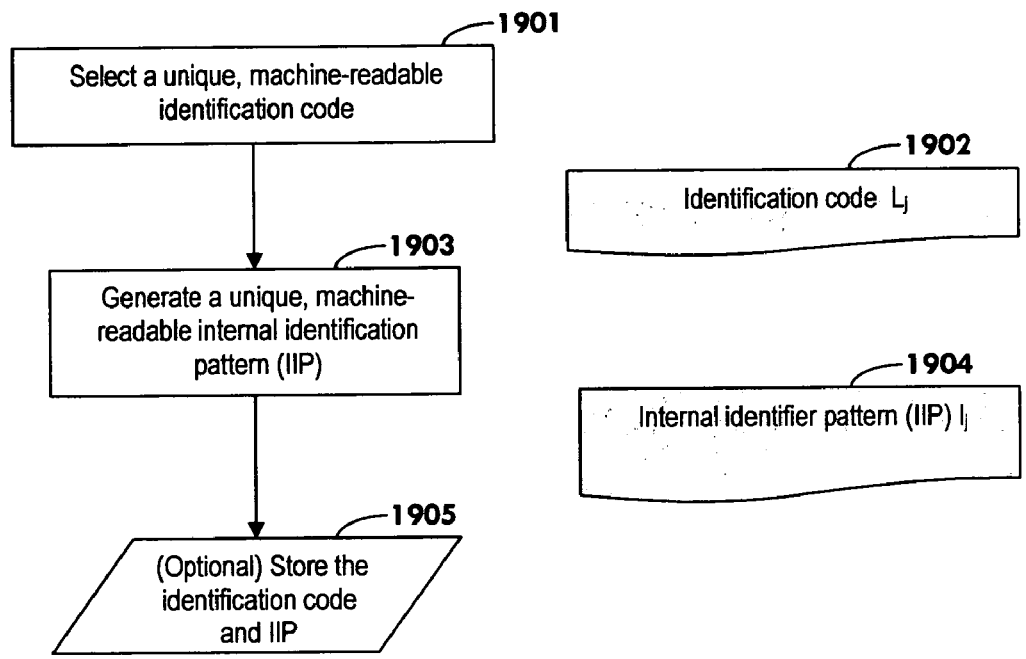
FIG. 19 illustrates a flow chart to generate an IIP

The following steps describe the flowchart shown in FIG. 19.

The present invention can communicate directly to a computer or other device that can operate without human intervention. In step 1901, to work in autonomous mode, a machine-readable output 702, such as the binary code 01100011, is necessary. Either a user can choose an identification code manually or the associative memory device 101 can generate an identification code automatically, based on the next available value on a list, or perhaps generated in some other manner known to those skilled in the art. In any case, the associative memory device 101 could use standard lookup techniques to verify the uniqueness of the selected identification code.

In step 1902, the identification code 702 selected is denoted by $L_j$.

Figure 20:
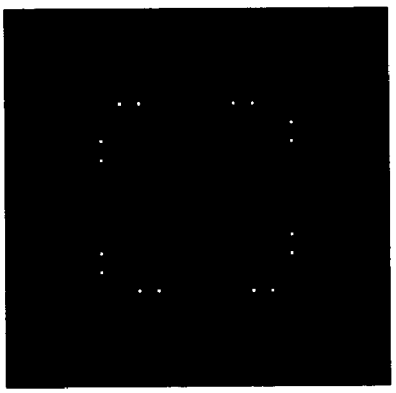
FIG. 20 illustrates the example of an eight-bit binary code (01100011) with four-fold redundancy.

In step 1903, the identification code 702 $L_j$ chosen in step 1902 is used to generate a unique, corresponding pattern, the internal identification pattern (IIP) 704 $I_j$. The IIP will be used as an input to the present invention to be associated with other inputs such as pictures, sounds, fingerprints, etc. The algorithm to generate the IIP 704 should be reversible so that it is possible to go from an IIP 704 back to the corresponding code 702 (that is, a retrieved pattern should be machine-decodable). Redundancies may be built into the IIP 704 to facilitate confidence estimations 801. For example, in one embodiment of the present invention, the identification code 702 is an 8-bit binary code. The field 704 calculated from that code has amplitude variations, dark and bright regions, that correspond to whether a digit is a 0 or 1, respectively. These variations can be repeated in some redundant fashion, in order to allow for a more accurate retrieval process. The example of an eight-bit binary code (01100011) with four-fold redundancy is shown in FIG. 20. This particular example is simply one possible mapping from identification codes 702 to their respective IIPs 704. As is well-known to those skilled in the art, multiple alternative methods exist and could be used equally well.

In step 1904, the internal identification pattern (IIP) 704 is denoted by $I_j$.

In optional step 1905, the identification code 702 $L_j$ and the IIP 704 $I_j$ can be saved to permanent storage such as a hard disk or another storage medium. If multiple IIP generations will be performed in sequence, step G5 may be skipped until all of the pending IIPs have been created.

Steps 1901 to 1905 are shown in blocks 15301 to 15311 and 15601 to 15613 of the computer program flow chart of the present invention, as illustrated in FIGS. 153 and 156(*a*) and (*b*), respectively.

Decode a Retrieved Internal Identification Pattern (IIP)

Figure 21:
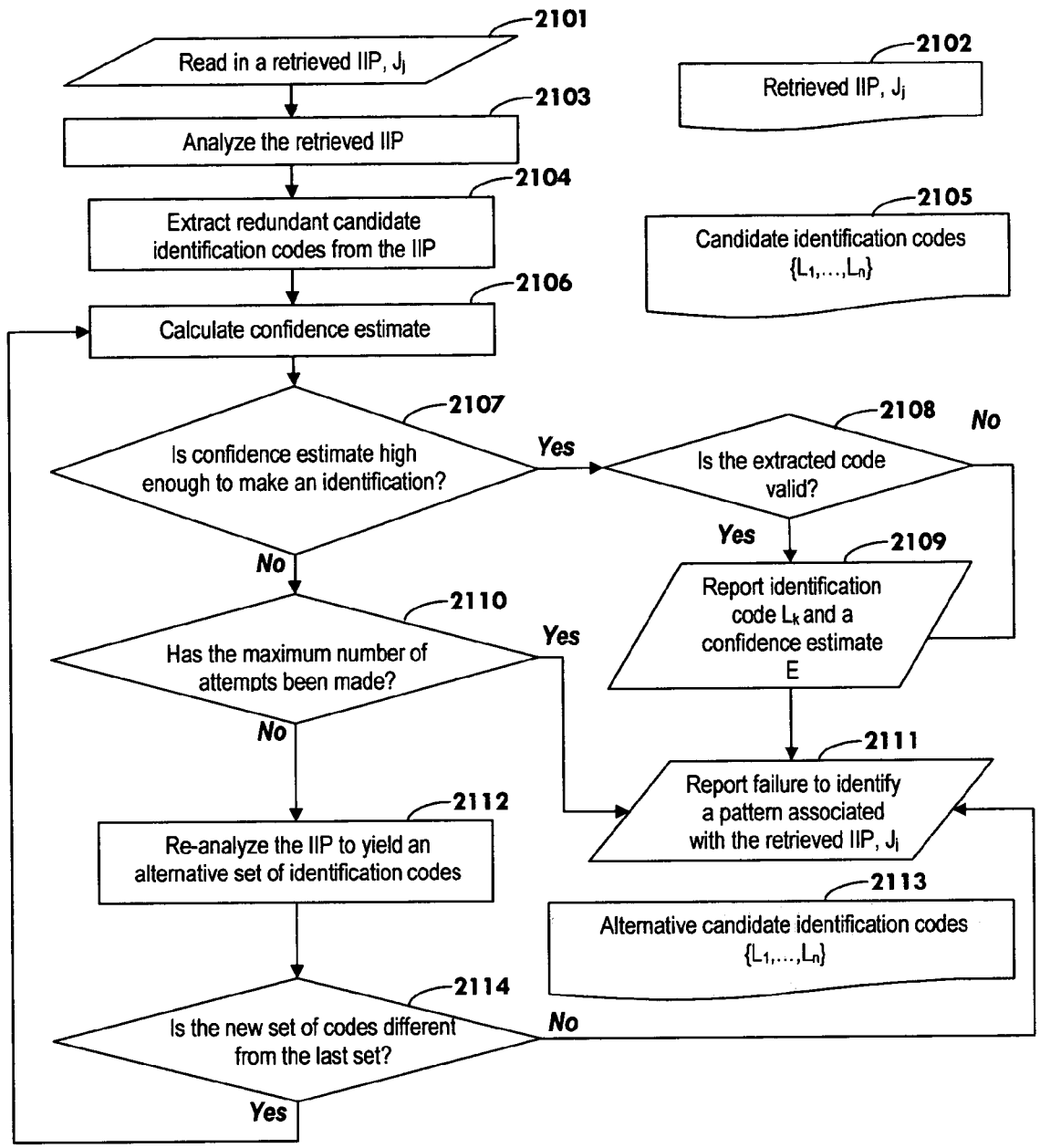
FIG. 21 illustrates a flow chart of the decoding of a retrieved IIP.

The following steps describe the flowchart shown in FIG. 21.

In step 2101, if the retrieved internal identification pattern 704 $J_j$ is not already in memory, then it should be loaded from the hard drive or other medium on which it was saved.

In step 2102, as noted earlier, when a prompting pattern $R_i$ is a sufficiently close match to a previously input pattern $P_i$, which was associated with an IIP 704 $I_j$ and stored in the cortex 103, then the retrieved IIP 704 $J_j$ on the IIP output buffer 303 will approximate the IIP 704 $I_j$.

In step 2103, the retrieved IIP 704 $J_j$ is analyzed by the IIP reader 302 of the associative memory device 101. For example, in one embodiment of the present invention, the maximum and minimum field values of the output pattern 704 $J_j$ on the IIP output buffer 303 are calculated for normalization purposes.

In step 2104, the system extracts any redundant candidate identifier codes 702 from $J_j$ 704. This process is the inverse of that used in step 2103 when the associative memory device 101 calculated an IIP 704 given an identification code 702. Following the binary digit mapping example cited in step 2103, the inverse process consists of reading the continuous values of $J_j$ 704 at the redundant encoding locations and making an initial assertion as to the cutoff to separate 0's from 1's. For instance, the initial cutoff value can be a function of the minimum and maximum field values read from each of the redundant encoding locations, as in the four-fold redundant IIP 704 shown in FIG. 20.

In step 2105, the associative memory device 101 now has a number of initial sets of identifier codes 702, $\{L_1, \ldots, L_n\}$, one for each redundant copy in the IIP 704.

In step 2106, the associative memory device 101 determines a confidence estimate 801 in the proposed identification. One parameter that could be used involves analysis for consistency among the multiple sets of identifier codes 702. Another could involve contrast ratio. Yet a third, how well amplitudes or shapes within the pattern 704 are reproduced. As is known to those skilled in the art, there are multiple methods of calculating confidence based on evaluation of the retrieved data. If all sets of identifier codes are reproduced perfectly, then the confidence estimate might be 100%. As inconsistency and other deviations from the expected form increase within the code sets, the confidence estimate would decrease correspondingly.

In step 2107, if the confidence estimate 801 calculated in 2106 is greater than or equal to some specified value, perhaps selected by a system operator, then a positive identification might be possible.

In step 2108, the system 101, 302 should check whether the identifier code 702 retrieved corresponds to one of the valid codes 702 previously stored. For example, if no retrieval in fact occurred at the IIP output buffer 303, the IIP reader 302 might have consistently read the value 00000000. Or there may not be sufficient agreement among the redundant codes 702 for the machine 101, 302 to have a candidate for a retrieved code.

In step 2109, if the code 702 $L_k$ is valid, then a positive identification has been made by the associative memory device 101. The identifier code 702 itself could be reported along with the confidence estimate 801, or the system could execute a set of actions 703 contingent on the identification In step 2110, if the system 101, 302 has failed to correctly read a retrieved code 704 or if the latest confidence estimate 801 is worse than the required minimum, then the associative memory system 101 checks whether additional iterations are available. The administrator of the system can set a parameter to define the maximum number of iteration attempts to be run.

In step 2111, if no positive identification was possible, then the failure to make an identification is reported, including the latest (insufficient) confidence estimate 801 and any desired logs of the identification process.

In step 2112, the system 101, 302 will calculate a new, alternative set of candidate identifier codes 702 from $J_j$ 704 with the aim of finding a more consistent set of codes 702. In the binary digit mapping example cited earlier, this task involves choosing new cutoff values to distinguish 0's from 1's.

In step 2113, based upon the repeated analysis, a new set of candidate identifier codes 702 $\{L_1, \ldots, L_n\}$ is produced.

In step 2114, if the new set of codes 702 is different from the previous set, a new confidence estimate 801 will be calculated via step 2106. If there has been no change (that is, no further possible improvements), then the process will be terminated via the failure-reporting process in step 2111.

Steps 2101 to 2114 are shown in blocks 15901 to 15930 and 16001 to 16011 of the computer program flow chart of the present invention, as illustrated in FIGS. 159(a) and (b) and 160 respectively.

Detailed Descriptions of Macro-Operations Learn

Figure 22:
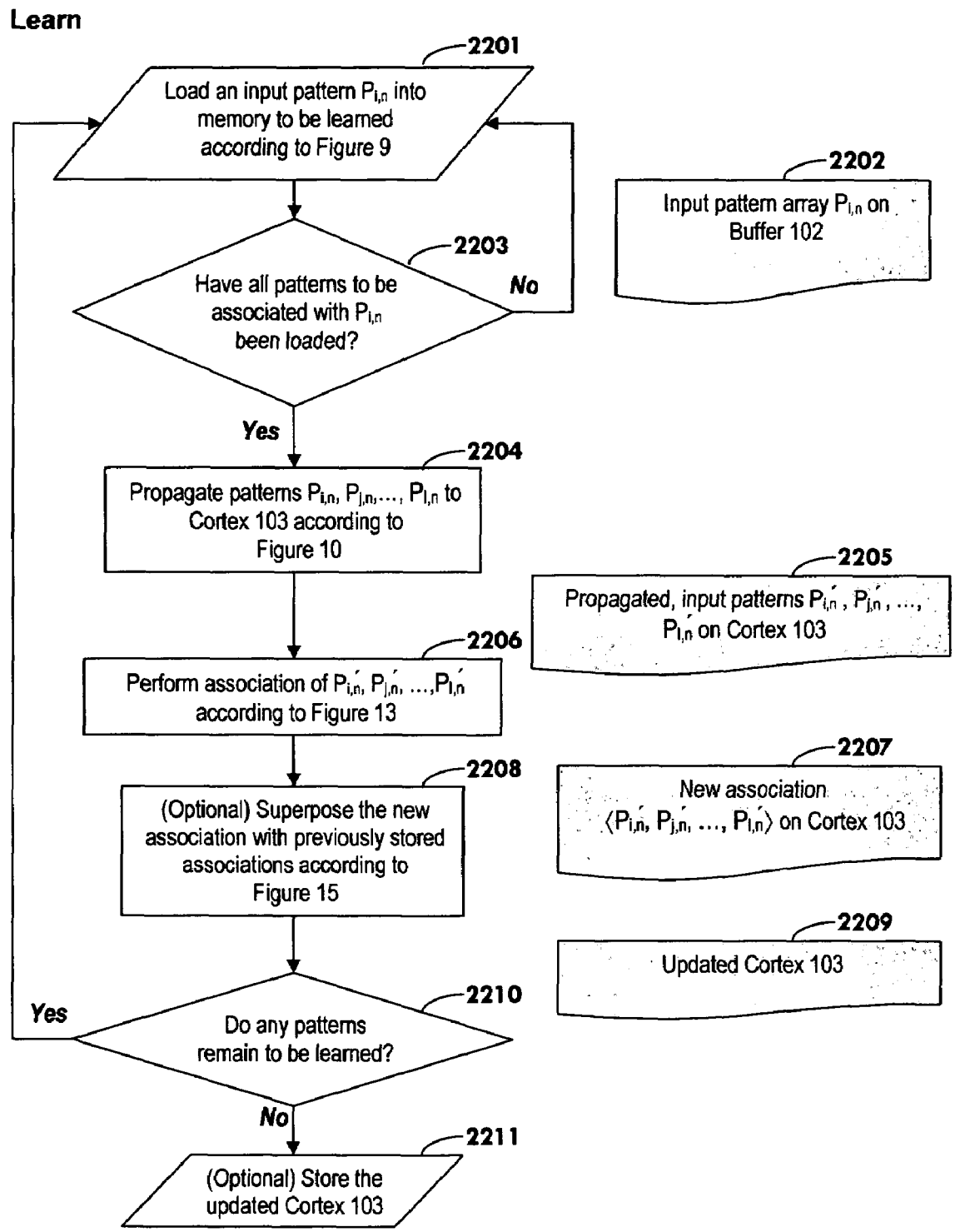
FIG. 22 illustrates a flow chart of the detailed description of the macro-operation for learning.

The following steps describe the flowchart shown in FIG. 22.

In step 2201, if necessary, the present invention loads $P_i$, the first of the input patterns to be learned, into the memory for input buffer 102 according to the steps depicted in FIG. 9. If this is the $n^{th}$ operation of the associative memory device 101, then the pattern is designated $P_{i,n}$.

In step 2202, the input pattern $P_{i,n}$ is defined at its appropriate input buffer 102.

In step 2203, the associative memory device checks whether further patterns to be learned remain to be loaded into memory. If not all patterns have been loaded, execution returns to step 2201. Once all the appropriate patterns have been loaded, the present invention continues to step 2204. At least two patterns ($P_{i,n}$ and $P_{j,n}$, in this example) are required for learning purposes; however, there is no intrinsic upper bound on the number of patterns that can theoretically be learned as a unit. The patterns to be learned are referred to as $P_{i,n}, P_{j,n}, \ldots P_{l,n}$.

In step 2204, the input fields $P_{i,n}, P_{j,n}, \ldots, P_{l,n}$ are transported to cortex 103 according to the steps described in FIG. 10.

In step 2205, the propagated input patterns $P'_{i,n}, P'_{j,n}, \ldots, P'_{l,n}$ are evaluated on cortex 103.

In step 2206, these patterns are associated according to the steps described in FIG. 13.

In step 2207, the new association on cortex 103 is denoted by $<P'_{i,n}, P'_{j,n}, \ldots, P'_{l,n}>$.

In optional step 2208, the new association can be superposed with previously stored associations according to the steps described in FIG. 15.

In step 2209, the complex values across cortex 103 are thus updated.

In step 2210, the associative memory device checks whether further patterns remain to be learned. If not all patterns have been learned, execution returns to step 2201. Once all the appropriate patterns have been learned, the present invention continues to step 2211.

In optional step 2211, the updated cortex 103 can be saved to permanent storage such as a hard disk or another storage medium.

Steps 2201 to 2211 are shown in blocks 15401 to 15418 of the computer program flow chart of the present invention, as illustrated in FIGS. 154(a) and (b).

Recognize

Figure 23:
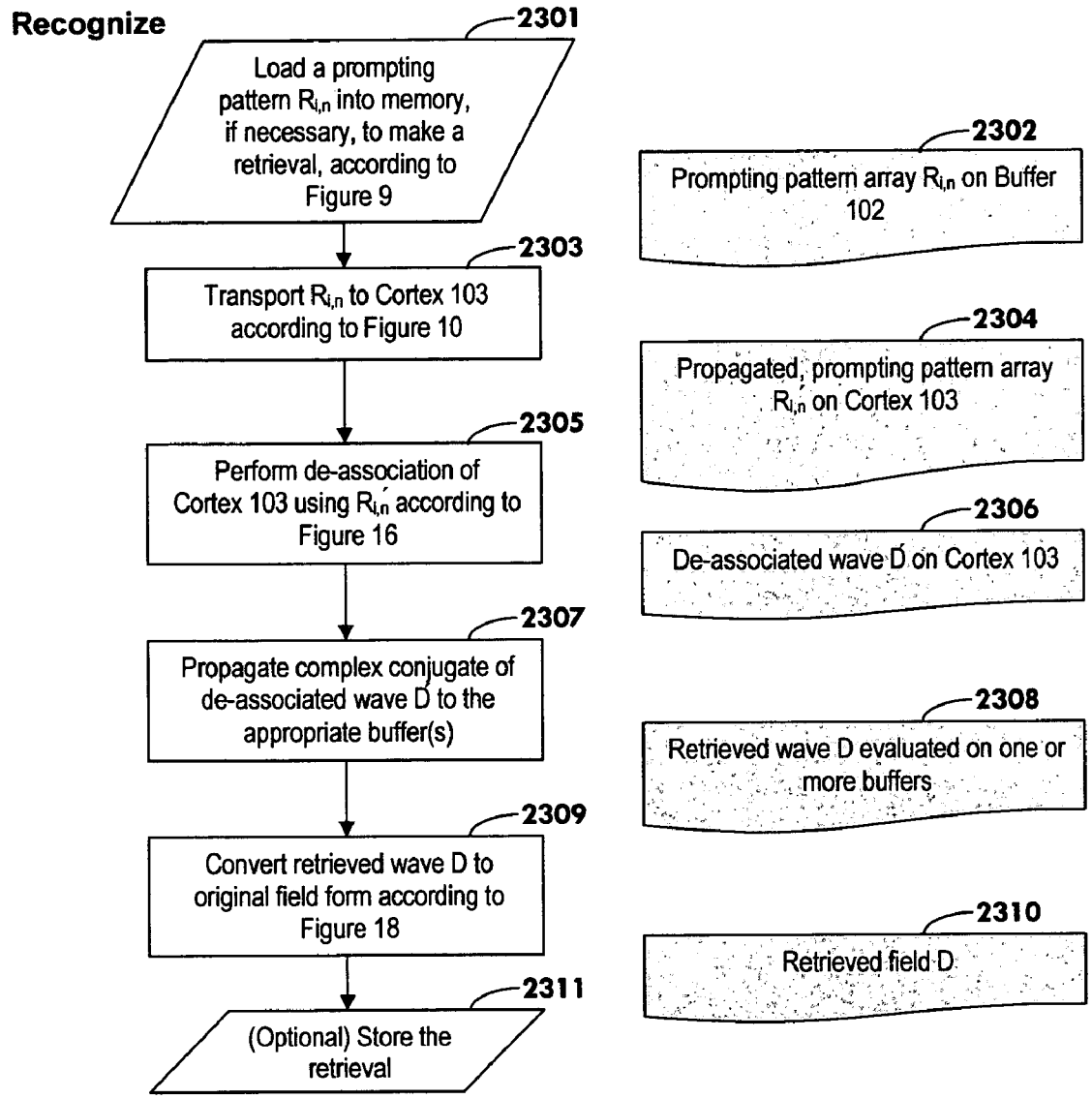
FIG. 23 illustrates a flow chart of the recognition macro-operations.

The following steps describe the flowchart shown in FIG. 23.

In step 2301, if necessary, the present invention loads $R_i$, the prompting wave pattern that will be used to make a retrieval, into the memory for the input buffer 102 according to the steps described in FIG. 9. If this is the $n^{th}$ operation of the associative memory device 101, then the input is designated by $R_{i,n}$.

In step 2302, the prompting wave pattern is now evaluated on the appropriate input buffer 102, in accord with the type of input being presented for retrieval.

In step 2303, $R_{i,n}$ is transported to the cortex 103 according to the steps described in FIG. 10.

In step 2304, as a result, $R'_{i,n}$, the propagated form of the prompting pattern, is defined on cortex 103.

In step 2305, the associative memory device 101 probes cortex 103 using $R'_{i,n}$ according to FIG. 16.

In step 2306, as a result, the de-associated wave D' is defined on cortex 103.

In step 2307, the present invention forms the complex conjugate of D'. For an arbitrary complex number $z=a+ib$, the complex conjugate is $z^*=a-ib$, where i represents the square root of $-1$. This quantity D' is then propagated off the cortex 103 according to the procedures outlined in FIG. 10. Once the propagation is complete, the complex conjugate is again taken, this time of the wave D on appropriate output buffer(s) 104 to external devices or channels, or to output IIP buffer(s) 303.

In step 2308, the back-propagated wave D resides on one or more output buffers 104 and/or output IIP buffers 303 and constitutes a retrieved pattern.

In step 2309, the complex-valued wave field is converted to the form it had on input according to the steps described in FIG. 18. In one embodiment, the present invention forms |D|, the magnitude of D.

In step 2310, the original form of D resides on each of the buffers of interest.

In optional step 2311, the retrieved wave D can be saved to permanent storage such as a hard disk or another storage medium. Any or all facets of the retrieved field can be stored: the real component, the imaginary component, the magnitude, and/or the phase.

Steps 2301 to 2311 are shown in blocks 15501 to 15512 of the computer program flow chart of the present invention, as illustrated in FIG. 155(a).

Learn for Autonomous Identification

Figure 24:
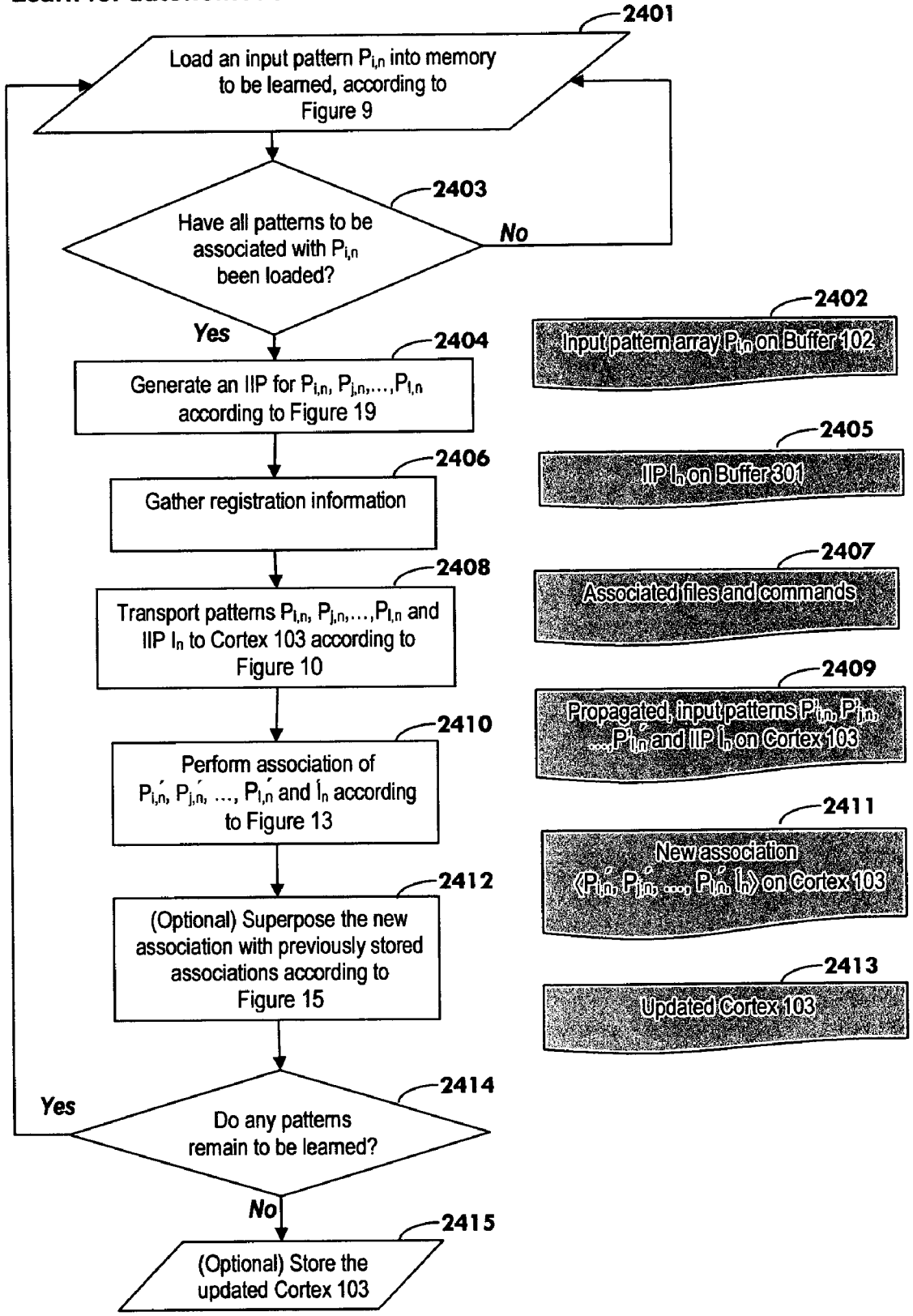
FIG. 24 illustrates a flow chart of the learning macro-operation for autonomous identification.

The following steps describe the flowchart shown in FIG. 24.

In step 2401, if necessary, the present invention loads $P_i$, the first of the input patterns to be learned for autonomous identification, into the memory for input buffer 102 according to the process depicted in FIG. 9. If this is the $n^{th}$ operation of the associative memory device 101, the input is designated by $P_{i,n}$.

In step 2402, the input pattern $P_{i,n}$ is defined at the appropriate input buffer 102.

In step 2403, the associative memory device checks whether further patterns to be learned remain to be loaded into memory. If not all patterns have been loaded, execution returns to step 2401. Once all the appropriate patterns have been loaded, the present invention continues to step 2404. At least one pattern is required for autonomous learning purposes; however, there is no intrinsic upper bound on the number of patterns that can theoretically be learned as a unit. The patterns to be learned are referred to as $P_{i,n}, P_{j,n}, \ldots, P_{l,n}$.

In step 2404, an IIP 704 for $P_{i,n}, P_{j,n}, \ldots, P_{l,n}$ is generated according to the steps described in FIG. 19. Although the current method is described in terms of using a single IIP 704, it is important to note that more than one IIP 704 can be used simultaneously. The single-IIP presentation is provided simply for clarity. The extension of this process to multiple IIPs will be evident to persons skilled in the art.

In step 2405, the IIP 704 to be associated with $P_{i,n}, P_{j,n}, \ldots, P_{l,n}$, denoted by $I_n$, is defined on input IIP buffer 301. As noted above in step 2404, in a multiple-IIP process, additional IIPs $(I_o, \ldots, I_q)$ 704 could be generated and evaluated on a plurality of input IIP buffers 301a, 301b, ...

In step 2406, the present invention may query the system operator, or follow preprogrammed instructions, to complete the registration process by identifying any files to be linked to the IIP 704 $I_n$ and its corresponding identification code 702 $L_n$. The associated files could contain identifying information 703, such as an image of a person's face, his or her Social Security Number, or employee history; links to other files; and a general set of commands to be executed based on the identification made and on the confidence estimate 801 returned. For example, one such command could be, "Unlock the door if the identification is at least 95% certain."

In step 2407, any such files, commands, and their respective confidence criteria are then linked to the input fields $P_{i,n}, P_{j,n}, \ldots, P_{l,n}$ through their IIP 704 $I_n$ and the corresponding identification code 702 $L_n$.

In step 2408, the input fields $P_{i,n}, P_{j,n}, \ldots, P_{l,n}$ and their IIP 704 $I_n$ are transported to the cortex 103 according to the process depicted in FIG. 10.

In step 2409, the propagated input patterns $P'_{i,n}, P'_{j,n}, \ldots, P'_{l,n}$ and the propagated IIP 704 $I_n$ are now defined on cortex 103.

In step 2410, these patterns are associated according to the process depicted in FIG. 13.

In step 2411, the new association on cortex 103 is denoted by $<P'_{i,n}, P'_{j,n}, \ldots, P'_{l,n}, I'_n>$.

In optional step 2412, the new association can be superposed with previously stored associations according to the process depicted in FIG. 15.

In step 2413, the complex values across the cortex 103 are thus updated.

In step 2414, the associative memory device checks whether further patterns remain to be learned. If some remain, execution returns to step 2401. Once all the appropriate patterns have been learned, the present invention continues to step 2415.

In optional step 2415, the updated cortex 103 can be saved to permanent storage such as a hard disk or another storage medium.

Steps 2401 to 2415 are shown in blocks 15401 to 15418 and 15601 to 15613 of the computer program flow chart of the present invention, as illustrated in FIGS. 154(a) and (b) and 156(a) and (b), respectively.

Identify and Respond Autonomously

Figure 25:
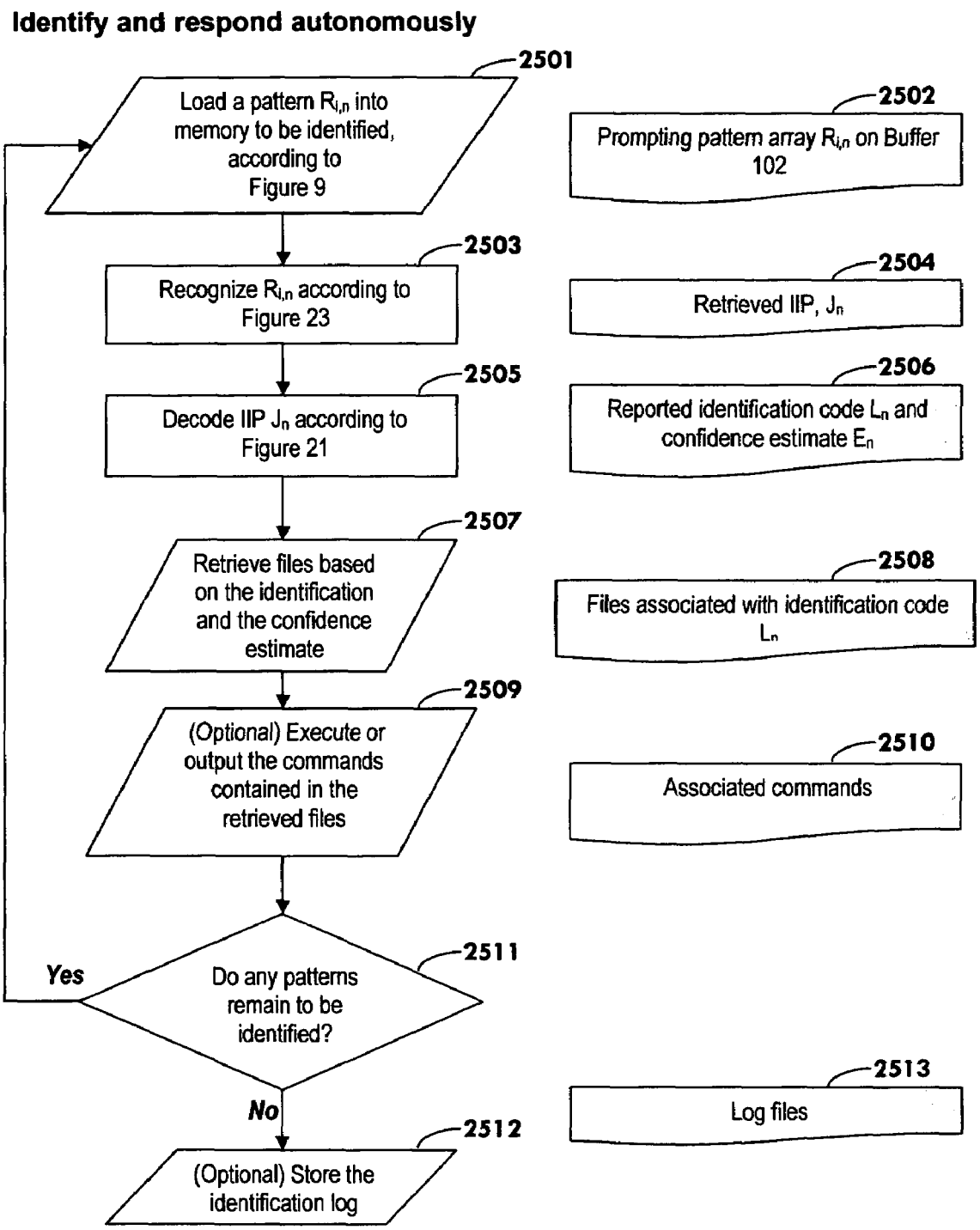
FIG. 25 illustrates a flow chart of identify and respond autonomously operations.

The following steps describe the flowchart shown in FIG. 25.

In step 2501, if necessary, the present invention loads $R_i$, the prompting pattern to be identified, into the memory for input buffer 102 according to the steps described in FIG. 9. If this is the $n^{th}$ operation of the associative memory device 101, the input prompt is designated by $R_{i,n}$.

In step 2502, the prompting pattern $R_{i,n}$ is defined at its appropriate input buffer 102.

In step 2503, the associative memory device 101 recognizes $R_{i,n}$ according to the steps described in FIG. 23.

In step 2504, if the associative memory device 101 has successfully recognized prompt $R_{i,n}$, then there has been a successful propagation and the de-associated wave, now designated D, from step 2310, is evaluated on its appropriate output IIP buffer 303 and constitutes the retrieved IIP 704, $J_n$.

In step 2505, the IIP 704 is decoded according to the steps described in FIG. 21.

In step 2506, as a result, the identification code 702 $L_n$ and a confidence estimate 801 $E_n$ are reported.

In step 2507, the associative memory device retrieves the appropriate files using the identification code 702 $L_n$ determined through the identification made.

In step 2508, any files that were linked to the identification code 702 $L_n$ in step 2406 are then retrieved.

In optional step 2509, the associative memory device 101 executes the appropriate commands based on the identification made, the confidence estimate returned, and the confidence criteria pre-defined for each possible command. It is entirely possible for a command to initiate a recursive call to the identification operation of the present invention. In this fashion, the present invention allows for a completely general and arbitrary set of responses to identifications. One such command might be, "If the fingerprint identification has a confidence of less than 90%, prompt the user to initiate an iris scan."

In step 2510, the associated commands could be executed by the present invention itself or by an attached system that receives the identification and confidence results, depending on the specific embodiment in use.

In step 2511, the associative memory device 101 checks whether patterns remain to be identified. If so, execution returns to step 2501; otherwise, execution continues to step 2512.

In optional step 2512, log files created during the identification operation can be saved to permanent storage such as a hard disk or another storage medium.

In step 2513, the log files contain information such as all the identifications made, their respective confidence estimates, and all commands executed.

Steps 2501 to 2513 are shown in blocks 15501 to 15518 of the computer program flow chart of the present invention, as illustrated in FIGS. 155(a) and (b).

Adaptively Improve Identification Performance Through Experience

Figure 26A:
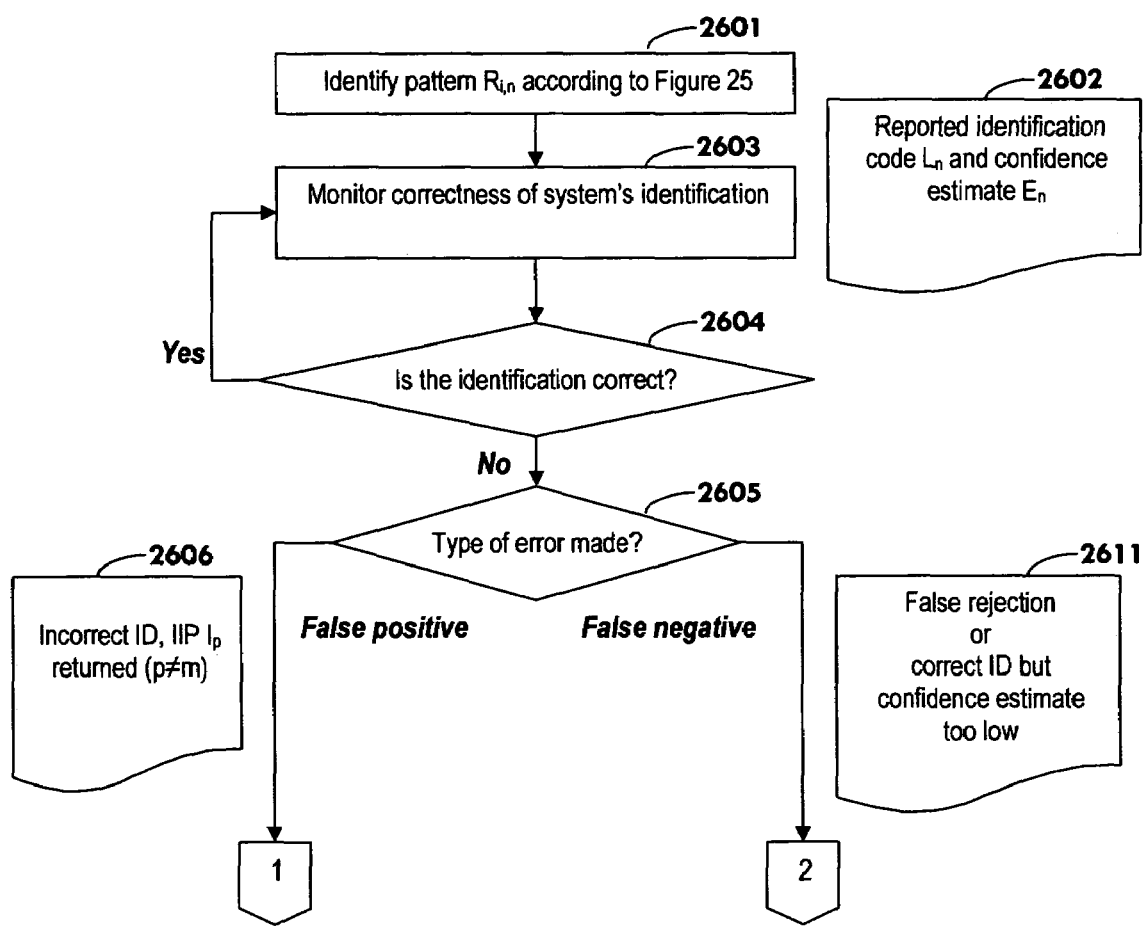
FIG. 26 illustrates a flow chart of adaptively improving identification performance through experience.

The following steps describe the flowchart shown in FIGS. 26(a), (b) and (c).

In step 2601, the pattern $R_{i,n}$ to be identified by the associative memory system 101 is introduced according to the steps described in FIG. 25. This will be considered to be the $n^{th}$ operation performed by the system, wherein a match is sought with some pattern $P_{i,m}$ that was previously input in the $m^{th}$ operation of the system through channel i and was associated in that same step with some IIP 704 $I_m$. Which pattern, if any, will match a test input pattern is not, in general, known but it is assumed that it is known here, perhaps by another identification through an alternate channel. Maybe this is a test of face identification and an ID has already been made through fingerprints. So, it is assumed that the correct identification, given by machine-readable code, $L_m$, was previously stored in the association $<P_{i,m}, I_m>$.

In step 2602, as a result of the previous step, in response to an identification of pattern $R_{i,n}$, the associative memory device has determined a machine-readable code, $L_n$, and a confidence estimate, $E_n$. A device emulating brain function should be capable of self-correction and generalization. Deployments using the present invention might include tuning or testing. Also, the associative memory device could provide corrective feedback itself if it had access to multiple, proven modes of identification. For example, if a multimode biometrics system using the present invention were already tuned for identification via fingerprints and facial scans, then those proven recognition results could be used to adjust the system's performance in a new mode, such as iris scans.

In step 2603, the reported identification code $L_n$, and confidence estimate $E_n$ are monitored against the known correct identification code, $L_m$, and the predetermined minimum confidence estimate, $E_{min}$, that is acceptable in an identification. What that minimum confidence level is could be chosen by the system operator, for example.

In step 2604, either an operator or the system itself monitors the correctness of the identification made for pattern $R_{i,n}$. If the identification is correct, monitoring would continue.

In step 2605, if a misidentification or "not sufficiently confident" identification is made, the mode for corrective adaptation depends on the type of identification error.

In step 2606, in the case of a false positive, an incorrect identification 702 was made ($L_n=L_p$). Equivalently stated, either the incorrect IIP 704 $I_p$ was returned instead of $I_m$, or the IIP was misread by the IIP reader 302.

Figure 26B:
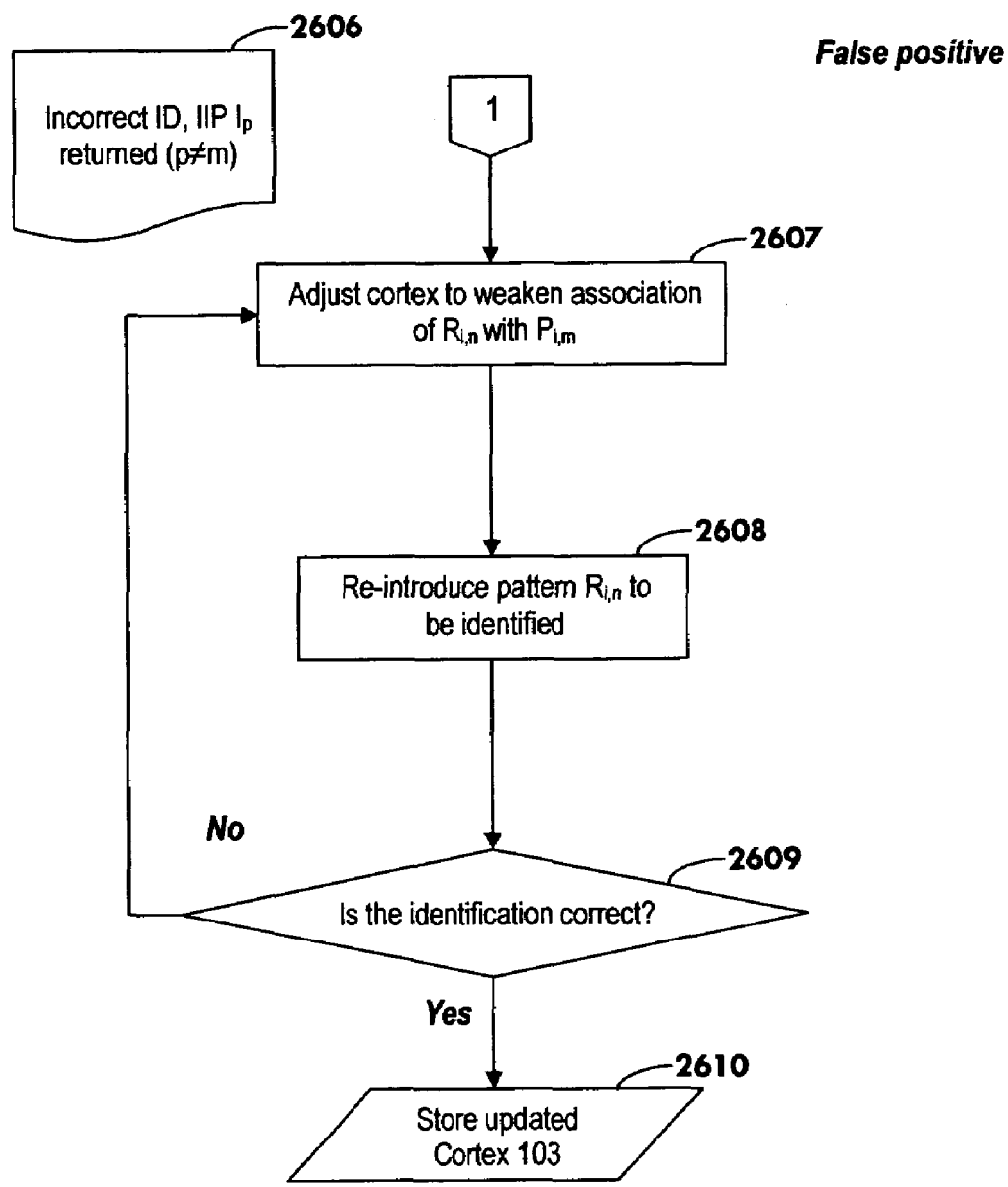

In step 2607 in FIG. 26b, adjustments are made to the stored associations on the cortex 103 to weaken the incorrect, apparent association of $R_{i,n}$ with the IIP 704 $I_m$ that corresponds to original pattern $P_{i,m}$. For example, one could modify the cortex 103 by $C_{new}=C_{old}-\beta_n <R_{i,n}, I_m>$, where $\beta_n$ is a positive weighting factor. What this procedure effectively says to the system is, the next time pattern $R_{i,n}$ is input to be identified, besides what is retrieved for the contents of cortex 103 $C_{old}$, also retrieve a negative amount of IIP 704 $I_m$ of strength $\beta_n$. If $\beta_n$ is the right amount, then the retrieval of IIP $I_m$ will effectively be "killed off" so that there is no retrieval of $I_m$ in response to pattern $R_{i,n}$, which is the desired result.

In step 2608, pattern $R_{i,n}$ is reintroduced to be identified by the associative memory device according to the procedure in FIG. 25 using the adaptively corrected cortex 103.

In step 2609, if the identification is still not correct, another modification of the cortex 103 is made according to step 2607.

In optional step 2610, once the misidentification has been corrected, the updated cortex 103 can be saved to hard disk or other storage media.

Figure 26C:
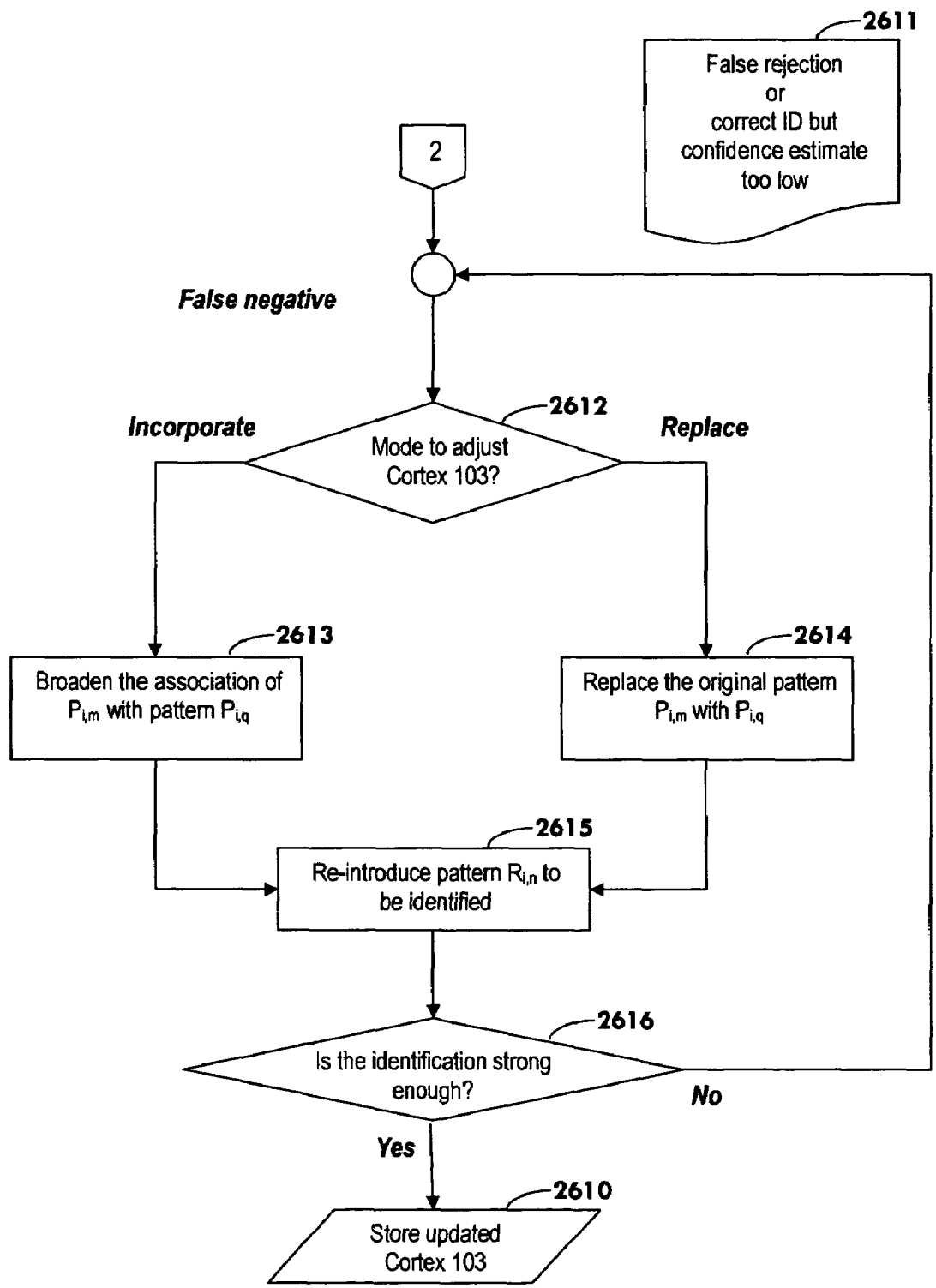

In step 2611 in FIG. 26(c), in the case of a false negative or a too weak positive, either an input was misidentified, or the correct IIP 704 $I_m$ and identification code 702 $L_m$ were returned in response to $R_{i,n}$, but with a confidence estimate 801 $E_n$ less than $E_{min}$, the minimum required. That is, in this second case, the associative memory device 101 correctly identifies $R_{i,n}$ as $P_{i,m}$, but it is not as confident in its assessment as the user would like it to be.

In step 2612, there are two possible methods for treating new pattern data in the case of a false negative. Let $P_{i,q}$ represent a second measurement of the object that created $P_{i,m}$. It could be a photograph taken at another time, a second scan of a fingerprint, a second example of a signature, etc.

In step 2613, if the new input pattern is to be incorporated into the cortex 103, one can broaden the stored association on the cortex by adding an association of $P_{i,q}$ with the IIP 704 $I_m$ that corresponds to the original pattern $P_{i,m}$. So, one can define the adjusted cortex 103 by the equation $C_{new}=C_{old}+\beta_q <P_{i,q}, I_m>$, where $\beta_q$ is a positive weighting factor. This approach could be taken where a natural variation in input patterns is expected, all of which should be accepted as valid identification. For example, the system should be tolerant of different hairstyles or some variations in a signature.

In step 2614, if the new input pattern $P_{i,q}$ is instead to replace the original pattern $P_{i,m}$ in the cortex 103, then one can adjust the cortex to introduce $P_{i,q}$ and then effectively remove $P_{i,m}$. The adjusted cortex 103 can be defined by the equation $C_{new}=C_{old}+\beta_q <P_{i,q}, I_m> - \beta_m <P_{i,m}, I_m>$. This approach could be taken where one expects changes over time in an input pattern. One such example might be images of a person's face as he or she ages.

In step 2615, pattern $R_{i,n}$ is reintroduced to be identified by the associative memory device using the adaptively corrected cortex 103.

In step 2616, if the identification is still not as certain as is desired, another round of modifications of the cortex 103 can be made according to step 2613 or 2614. Otherwise, the updated cortex 103 can be saved, as described in step 2610.

Steps 2601 to 2616 use elements of the Recognize and the Learn functions as shown in blocks 15501 to 1517, and 15401 to 15406 and 15413 to 15418, of the computer program flow chart of the present invention, as illustrated in FIGS. 155(a) and (b) and 154(a) and (b), respectively.

Alternative Embodiments of the Invention

The following section offers several physical embodiments of the present invention that can be used to implement the steps described herein. The embodiments are shown for illustrative purposes and are not meant in any way to limit the scope of the invention.

A cortex is that part of the present invention where information is stored and retrievals occur. Although only a single cortex is depicted in the examples below, there can be any number of cortices, each holding particular information and communicating among themselves. A buffer is that part of the present invention from where and to where information is communicated with the cortex. There are two types of buffers, input/output (i/o) and IIP. An i/o buffer is where files or data are deposited and retrieved by input/output or storage devices. I/o buffers thus form the interface between the real world and the associative memory device. An IIP buffer is entirely internal to the associative memory device, information being written from and read to it as with i/o buffers, but communication occurs within the system. An IIP buffer is used for autonomous operation.

For full generality, the embodiments described herein include the components needed for the system to identify and respond autonomously, including the IIP buffer and the IIP reader. If autonomous operation is not required for a particular application, those components may be omitted from that discussion.

Figure 27:
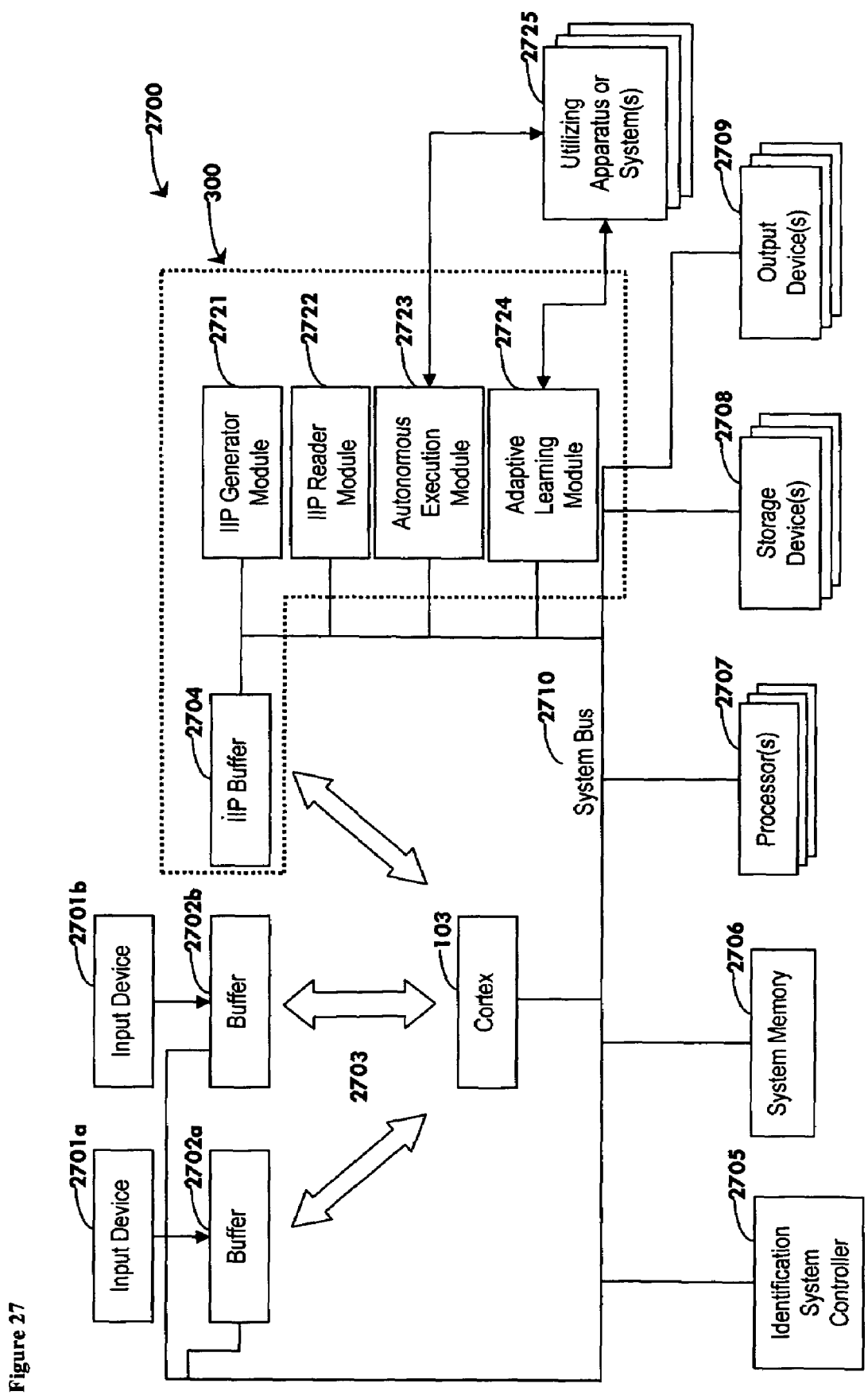
FIG. 27 illustrates a general embodiment of the present invention.

The embodiments are described using block diagrams and the corresponding text below. FIG. 27 is a general block diagram that describes all three embodiments of the associative memory device. The embodiments differ primarily in the way in which the wave propagation process 2703 is implemented. Buffers in all three embodiments are dual purpose, they perform both input and output operations. This is not a necessary attribute and differs from descriptions elsewhere in this application. It occurs here because the specific embodiments use mechanisms for which dual-use is rational and because location overlap is convenient. Thus, the term buffer, as used below, refers to an input/output, dual-use buffer. An IIP buffer will also be understood to have two-way capability, communicating between the IIP reader and the cortex.

Embodiment Utilizing Real, Physical Waves

The first embodiment of the present invention 2700, as described by FIG. 27, implements wave propagation 2703 with actual, physical waves, such as electromagnetic or sound waves. This embodiment consists of the following components. At least one buffer 2702 is needed for collecting data from a corresponding input device 2701. Additional buffers 2702n and their respective input devices 2701n, where n represents letters a, b, c, ..., can also be used. Overall control of the associative memory device is provided by an identification system controller 2705, which can be implemented by a combination of software and hardware, such as a custom chip or computer board, depending upon the deployment requirements. The identification system controller 2705 is responsible for all logic and control functions not delegated to specific components, as described below. Other system components include the system memory 2706, provided, for example, by random access memory ("RAM") cards; one or more processors 2707, which could be standard computer CPUs or custom-built processors; one or more storage devices 2708, such as hard disk drives or CD-RW drives, and one or more output devices 2709, such as graphics displays, terminals, or printers. Data communication among the system components, except between cortex and buffers, is provided by a system bus 2710. Note that all of the components could be implemented within a single architecture or could be distributed across multiple sub-systems, in which case the system bus 2710 would typically consist of a plurality of system buses linked by the appropriate types of network connections. Also, in a distributed system, there would typically be a plurality of identification system controllers 2705.

Figure 28:
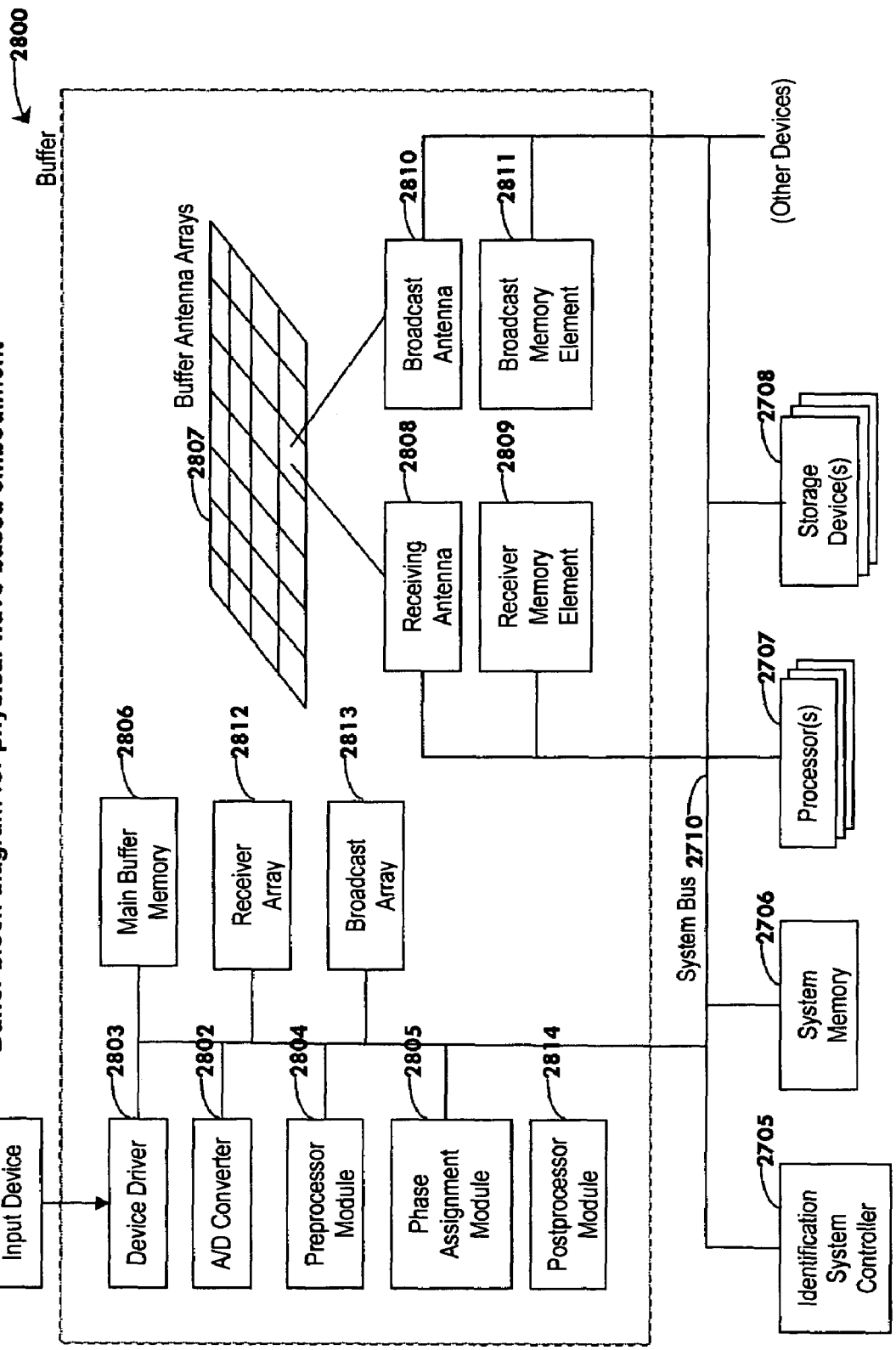
FIG. 28 illustrates an embodiment of the present invention's buffers utilizing real, physical waves.

FIG. 28 shows a typical buffer architecture 2800. Each buffer 2702 consists of the following components, as shown in FIG. 28. The device driver 2803 is responsible for handling input and output tasks with its associated input device 2701. If analog-to-digital conversion is not provided by the device driver, then an analog-to-digital ("A/D") converter 2802 can be used for that purpose. Although the device driver 2803 and A/D converter 2802 are shown in FIG. 28 as being part of the buffer architecture 2800, in some embodiments, those components might already exist as part of the external system with which the present invention is integrated. As a result, a digitized array is made available for subsequent processing. The device driver 2803 and A/D converter 2802 are jointly responsible for executing steps 901 and 902 of FIG. 9. A preprocessor module 2804 and a phase assignment module 2805, respectively, perform steps 904 and 906, the desired preprocessing and phase assignment of the input data, as necessary.

The main buffer memory 2806 can be used to store information for the buffer, such as the original input data, any needed working arrays, and output results.

The buffer architecture 2800 also includes a coupled set of antenna arrays, one for broadcast, one for reception, shown as buffer antenna arrays 2807. The antenna arrays 2807 consist of spatially distributed antenna pairs 2808 and 2810, as shown in FIG. 28. At each array location, the components include a receiving antenna 2808, capable of measuring amplitude and phase; a receiver memory element 2809, operative to store the measured amplitude and phase values; a broadcast antenna 2810, addressable in both amplitude (signal strength) and phase (advance or retard signal in time); and a broadcast memory element 2811, operative to store the amplitude and phase values that control the broadcast functions. A receiver array controller 2812 and a broadcast array controller 2813 control the overall operation of the receiving and broadcast antenna arrays. The specific configuration of the antenna arrays 2807 depends on the type of waves (electromagnetic, sound, etc.) used for information transport and other deployment requirements.

The broadcast components 2810, 2811, and 2813 together execute the information transport process step 1001 of FIG. 10, propagating information from buffer to cortex using physical waves. Similarly, when patterns are submitted to be recognized or identified by the associative memory device, then the receiver components 2808, 2809, and 2812 and the postprocessor module 2814 are used to record the retrieved complex information propagated from cortex 103 to buffer 102, convert to magnitude-only form, and store the retrieval, according to the export buffer information steps of FIG. 18.

Figure 29:
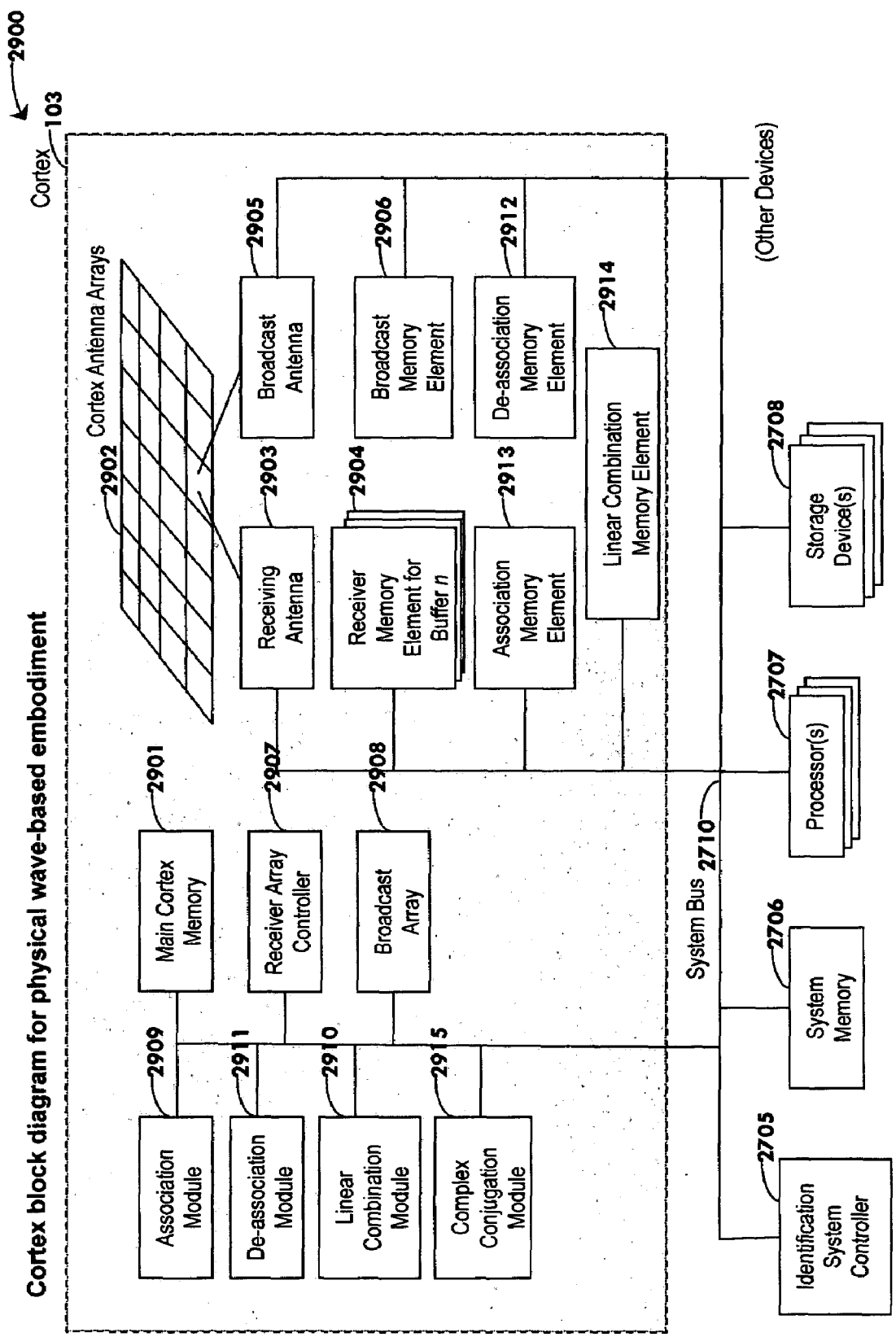
FIG. 29 illustrates an embodiment of the present invention's cortex utilizing real, physical waves.

FIG. 29 illustrates the main cortex 2900 components. There can be a plurality of cortices, but for purposes of illustration, the operation of only one cortex 103 is described. The main cortex memory 2901 can be used to store information for the cortex, such as needed working arrays. As with the buffers, the cortex 103 includes a coupled set of antenna arrays, these being the cortex antenna arrays 2902. The arrays consist of spatially distributed antenna pairs 2903 and 2905. At each array location, the components include a receiving antenna 2903, capable of measuring amplitude and phase; a plurality of memory elements, one for each buffer, referred to as the receiver memory element for buffer n 2904, operable to store the measured amplitude and phase values for information arriving from each respective buffer; a broadcast antenna 2905, addressable in both amplitude (signal strength) and phase (advance or retard signal in time); and a broadcast memory element 2906, operable to store the amplitude and phase values that control the broadcast functions. A receiver array controller 2907 and a broadcast array controller 2908, respectively, control the overall operation of the receiving and broadcast antenna arrays.

When patterns are submitted to be recognized or identified by the associative memory device 101, the cortex receiver components 2903, 2904 and 2907 are used to record the complex wave information propagated from buffer 2702 to cortex 103. For multiple input buffers, this process is completed buffer-by-buffer, with each buffer propagating its information to the cortex 103 and the cortex 103 then storing the results in the appropriate memory elements for the originating buffer (receiver memory element for buffer n 2904).

An association module 2909 handles the association process of step 1304 of FIG. 13, storing the results in the association memory element 2913 for each location on the antenna array 2902. When associations need to be superposed to store multiple memories in the associative memory device, the linear combination module 2910 performs step 1504 of FIG. 15, storing the "running total" results in the linear combination memory element 2914 for each location on the antenna array 2902.

When a pattern is to be recognized, the de-association module 2911 handles the de-association process of step 1604 of FIG. 16, storing the results in the de-association memory element 2912 for each location on the antenna array 2902. Then, when a de-associated pattern is to be back-propagated to the output buffer 2702, the complex conjugation module 2915 acts together with the broadcast components 2905, 2906, and 2908 to perform step 2307 of the recognition process in FIG. 23.

FIG. 27 illustrates the components that relate to the IIP 300. The IIP module 300 provides for autonomous operations. The IIP generator module 2721 is used to generate an IIP from some machine-readable code and gather the appropriate registration information, according to steps 2404 and 2406 of the autonomous learning process defined in FIG. 24. The complex wave values of the generated IIP are assigned to the broadcast memory elements of the IIP buffer 2704. The IIP buffer 2704 then propagates its information to the cortex where the transported IIP is associated with the corresponding input pattern(s), as described earlier. For autonomous identification, information from the input buffer 2702 is propagated to the cortex 103, a de-association is performed, the result is phase-reversed by complex conjugation, and then back-propagated to the IIP buffer 2704. The IIP reader module 2722 is responsible for reading the retrieved pattern to make an identification and produce a confidence estimate, according to step 2505 of FIG. 25. The autonomous execution module 2723 then retrieves the appropriate files and executes or communicates the appropriate commands and results to the utilizing apparatus or system 2725, according to steps 2507 and 2509 of FIG. 25. This could be automated or manned.

The adaptive learning module 2724 operates to provide the adaptive identification performance improvement steps described in FIG. 26, coordinating feedback loops with the system operator or following preprogrammed steps and making the appropriate adjustments to the cortex 103 contents.

Note that each of the modules and controllers discussed above may be implemented by an appropriate combination of software and hardware, such as application-specific integrated circuits ("ASIC"), field programmable gate arrays ("FPGAs"), other types of custom computer chips or boards or microprocessor circuitry, and/or sets of operational amplifiers ("Op-amps"), depending upon the performance, cost, and reliability requirements of each specific deployment employing an embodiment of the present invention.

Embodiment Utilizing Software Emulation of Wave Propagation

In a second embodiment of the present invention, wave propagation 2703 is simulated by software, which can be executed on computer hardware. That is, actual physical waves are not employed. Instead, wave propagation is modeled numerically through computation using a variation of the Helmholtz-Kirchhoff Equation, as described herein. Such modeling is referred to as numerical propagation. This embodiment is described by the block diagram shown in FIG. 27 and consists of the following components. At least one buffer (buffer 2702) is needed for collecting data from a corresponding input device 2701. Overall control of the present invention 101 is provided by the identification system controller 2705, which can be implemented by a combination of software and hardware, such as a custom chip or computer board, depending upon the deployment requirements. The identification system controller 2705 is responsible for all logic and control functions not delegated to specific components, as described below. Other system components include the system memory 2706, provided, for example, by RAM cards; one or more processors 2707, which could be standard computer CPUs or custom-built processors; one or more storage devices 2708, including but not limited to hard disk drives or CD-RW drives; and one or more output devices 2709, including but not limited to graphics displays, terminals, or printers. Data communication among the system components is provided by a system bus 2710. Note that all of the components could be implemented within a single architecture or could be distributed across multiple sub-systems, in which case the system bus 2710 would typically consist of a plurality of system buses linked by the appropriate types of network connections. Also, in a distributed system, there would typically be a plurality of identification system controllers 2705.

Figure 30:
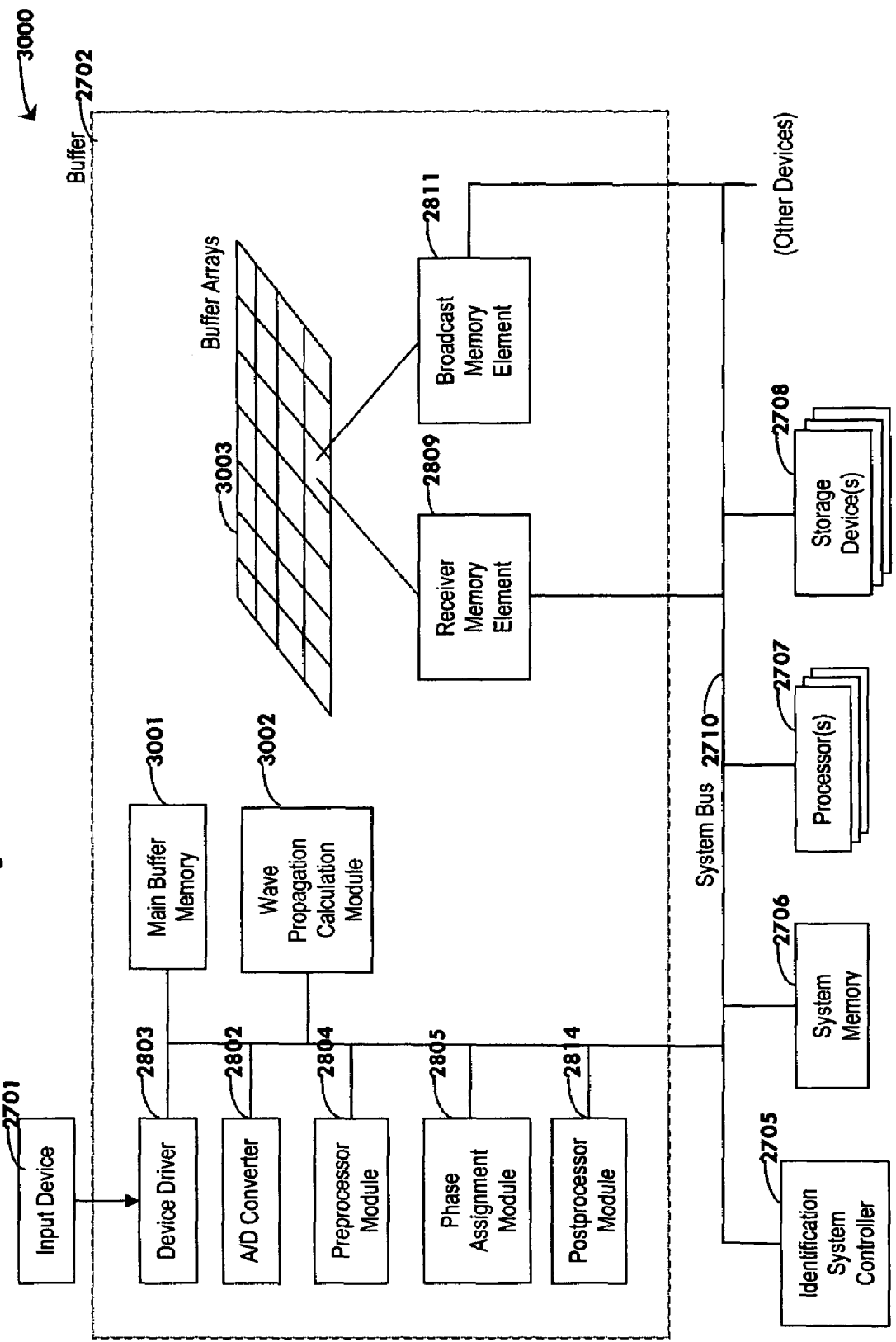
FIG. 30 illustrates a buffer block diagram for software-based implementation.

Each buffer 2702 consists of the following components, as shown in FIG. 30. The device driver 2803 is responsible for handling input and output tasks with its associated input device 2701. If analog to digital conversion is not provided by the device driver, then an A/D converter 2802 can be used for that purpose. As a result, a digitized array is made available for subsequent processing. The device driver 2803 and A/D converter 2802 are jointly responsible for executing steps 901 and 902 of the input steps described in FIG. 9. A preprocessor module 2804 and a phase assignment module 2805, respectively, perform steps 904 and 906, the desired preprocessing and phase assignment of the input data, as necessary. The main buffer memory 3001 can be used to store information for the buffer 2702, such as the original input data, any needed working arrays, and output results.

The contents of the buffer 2702 are represented by one or more arrays of complex numbers, stored in RAM and/or in a storage device 2708, including but not limited to hard drives, floppy drives, or CD-RW drives. At each array location, the components include a receiver memory element 2809, operable to store the received amplitude and phase values as a single complex number; and a broadcast memory element 2811, operable to store, as a single complex number, the amplitude and phase values that control the broadcast functions. The specific configuration of the mathematically modeled buffer 2702 is specified by the three-dimensional (x,y,z) spatial coordinates defined for each array location on the buffer.

The wave propagation calculation module 3002 performs the numerical calculations according to Equation 25 that emulates the propagation of waves from buffer 2702 to cortex 103, starting with the complex wavefront defined on the buffer 2702 by the plurality of broadcast memory elements 2811, one for each array location on the modeled buffer 2702. Thus, the wave propagation calculation module 3002 and broadcast memory elements 2811 together execute the information transport process step 1001 of FIG. 10, propagating information from buffer 2702 to cortex 103 using computationally modeled waves. Similarly, when patterns are submitted to be recognized or identified by the associative memory system, then the plurality of receiver memory elements 2809, one for each array location on the modeled buffer 2702, and the postprocessor module 2814 are used to record the retrieved complex information propagated from cortex 103 to buffer 2702, convert to magnitude-only form if required, and store the retrieval, according to the export buffer information process of FIG. 18.

Figure 31:
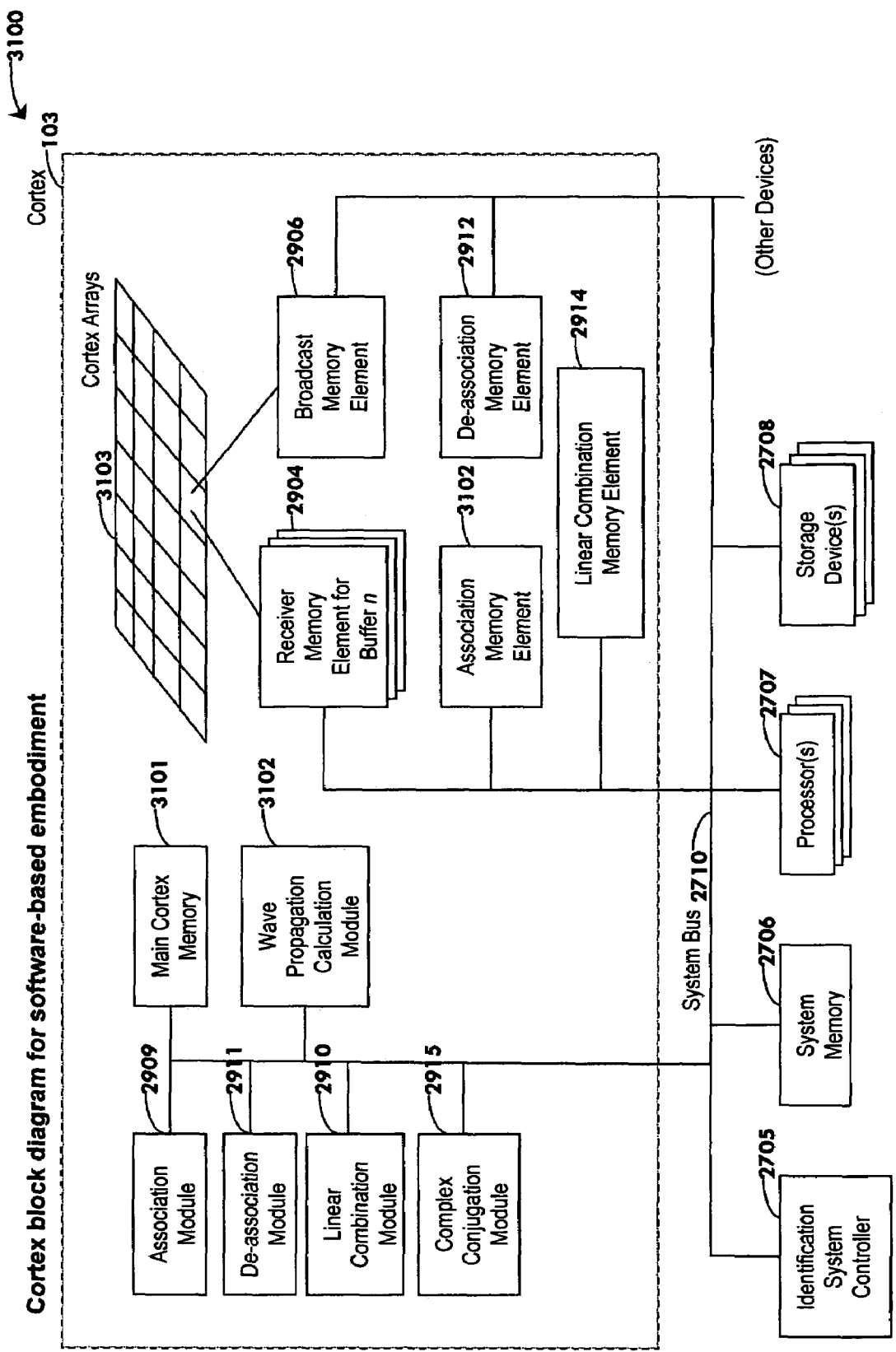
FIG. 31 illustrates a cortex block diagram for software-based implementation

The cortex 103 consists of the following components, as shown in FIG. 31. The main cortex memory 3101 can be used to store information for the cortex 103, such as needed working arrays. As with the buffers 2702, contents of the cortex 103 are represented by one or more arrays of complex numbers, stored in RAM and/or in storage devices 2708 including but not limited to hard drives, floppy drives, or CD-RW drives. At each array location, the components include a plurality of memory elements, one for each buffer (receiver memory element for buffer n 2904), operable to store, as a single complex number, the measured amplitude and phase values for information arriving from each respective buffer; and a broadcast memory element 2906, operable to store the amplitude and phase values that control the broadcast functions. The specific configuration of the mathematically modeled cortex 103 is specified by the three-dimensional (x,y,z) spatial coordinates defined for each array location on the cortex 103.

When patterns are submitted to be recognized or identified by the associative memory device 101, then the plurality of receiver memory element for buffer n 2904 are used to record the complex wave information numerically propagated from buffer 2702 to cortex 103. For multiple input buffers, this process is completed buffer-by-buffer, with each buffer numerically propagating its information to the cortex 103 and the cortex 103 then storing the results in the appropriate memory elements for the originating buffer (receiver memory element for buffer n 2904).

An association module 2909 handles the association process of step 1304 of FIG. 13, storing the results in the association memory element 3102 for each location on the cortex 103. When associations need to be superposed to store multiple memories in the associative memory device, the linear combination module 2910 performs step 1504 of FIG. 15, storing the "running total" results in the linear combination memory element 2914 for each location on the cortex 103.

When a pattern is to be recognized, the de-association module 2911 handles the de-association process of step 1604 of FIG. 16, storing the results in the de-association memory element 2912 for each location on the modeled cortex array 2902. As with the buffers, the wave propagation calculation module 3102 performs the numerical calculations according to Equation (24) that simulates the propagation of wave information from cortex 103 to output buffer 2702, starting with the complex wavefront defined on the cortex 103 by the plurality of broadcast memory elements 2906, one for each array location on the modeled cortex 103. When a de-associated pattern is to be back-propagated to one or more output buffers 2702, the complex conjugation module 2915 acts together with the wave propagation calculation module 3102 and the plurality of broadcast memory elements 2906 to perform step 2307 of the recognition process in FIG. 23.

The IIP 300 components shown in FIG. 27 help provide the functionality for autonomous operations. The IIP generator module 2721 is used to generate an IIP and gather the appropriate registration information, according to steps 2404 and 2406 of the autonomous learning process defined in FIG. 24. The complex wave values of the generated IIP are assigned to the broadcast memory elements of the IIP buffer 301. The IIP buffer 301 then numerically propagates its information to the cortex 103 where the transported IIP is associated with the corresponding input pattern(s), as described earlier. For autonomous identification, information from one or more input buffers 2702 is numerically propagated to the cortex 103, de-associated, phase-reversed by complex conjugation, and then numerically back-propagated to the IIP buffer 301. The IIP reader module 2722 is then responsible for reading the retrieved pattern as well as possible to make an identification and produce a confidence estimate, according to step 2505 of FIG. 25. The autonomous execution module 2723 then retrieves the appropriate files and executes or communicates the appropriate commands and results to the utilizing apparatus or system 2725, according to steps 2507 and 2509 of FIG. 25.

The adaptive learning module 2724 operates to provide the adaptive identification performance improvement steps described in FIG. 26, coordinating feedback loops with the system operator when necessary and making the appropriate adjustments to the cortex 103 contents.

The primary difference between the second embodiment of the present invention just described and the first embodiment is that in the second embodiment of the invention, the wave propagation operations are handled by numerical computation of wave values in software and hardware rather by actual, physical waves broadcast or received by antennas. This embodiment was used to create all examples displayed in this document, shown in FIGS. 35 through 151, and its operation is detailed in the flow charts in FIGS. 152 through 160.

Embodiment Utilizing Hardwired Circuitry to Emulate Wave Propagation

In a third embodiment of the present invention, wave propagation 2703 is emulated by one or more circuit modules, hardwired to modulate electrical signals. As with the second embodiment, this embodiment uses a variation of the Helmholtz-Kirchhoff Equation, as discussed herein. As seen in the block diagram of FIG. 27, this embodiment consists of the following components. Buffer 2702 is used to collect data from a corresponding input device 2701. Overall control of the present invention 101 is provided by the identification system controller 2705, which can be implemented by a combination of software and hardware, such as a custom chip or computer board, depending upon the deployment requirements.

The identification system controller 2705 is responsible for all logic and control functions not delegated to specific components, as described below. Other system components include the system memory 2706, provided, for example, by RAM cards; one or more processors 2707, which could be standard computer CPUs or custom-built processors; one or more storage devices 2708, including but not limited to hard disk drives or CD-RW drives; and one or more output devices 2709, including but not limited to graphics displays, terminals, or printers. Data communication among the system components is provided by a system bus 2710. Note that all of the components could be implemented within a single architecture or could be distributed across multiple sub-systems, in which case the system bus 2710 would typically consist of a plurality of system buses linked by the appropriate types of network connections. Also, in a distributed system, there would typically be a plurality of identification system controllers 2705.

Figure 32:
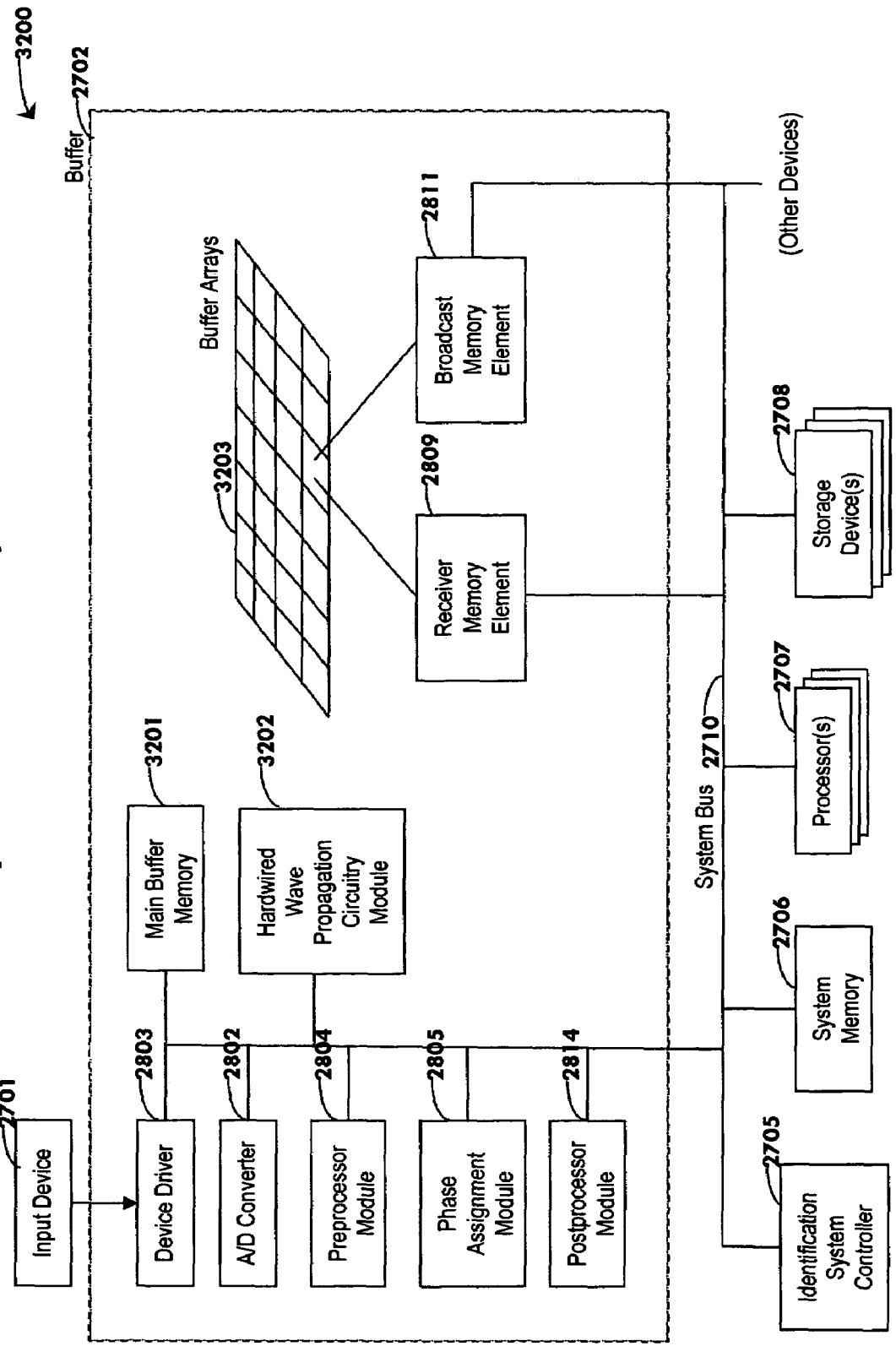
FIG. 32 illustrates a buffer block diagram for hardwired-based implementation
Figure 33:
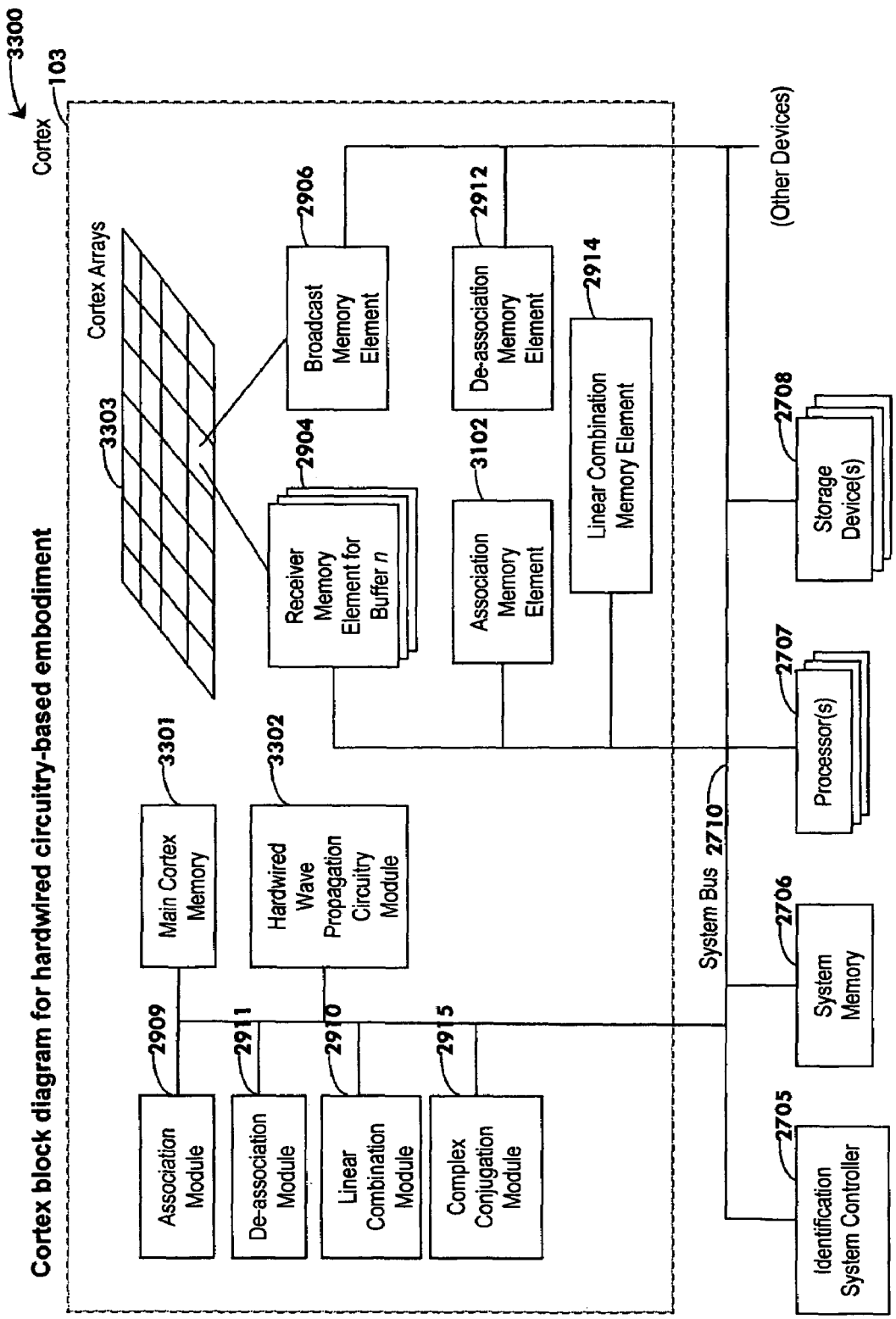
FIG. 33 illustrates a cortex block diagram for hardwired-based implementation

More specifically, as seen in FIG. 32, the buffer 2702 consists of the following components: The device driver 2803 is responsible for handling input and output tasks with its associated input device 2701. If analog to digital conversion is not provided by the device driver, then an A/D converter 2802 can be used for that purpose. As a result, a digitized array is made available for subsequent processing. The device driver 2803 and A/D converter 2802 are jointly responsible for executing steps 901 and 902 of the input steps described in FIG. 9. A preprocessor module 2804 and a phase assignment module 2805, respectively, perform steps 904 and 906, the desired preprocessing and phase assignment of the input data, as necessary. The main buffer memory 3201 can be used to store information for the buffer 2702, such as the original input data, any needed working arrays, and output results.

The contents of the buffer 2702 are represented by one or more arrays 3203 of complex numbers, stored in RAM and/or in a storage device 2708, including but not limited to hard drives, floppy drives, or CD-RW drives. At each array location, the components include a receiver memory element 2809, operable to store the received amplitude and phase values as a single complex number; and a broadcast memory element 2811, operable to store, as a single complex number, the amplitude and phase values that are used to initiate the broadcast functions.

Figure 34:
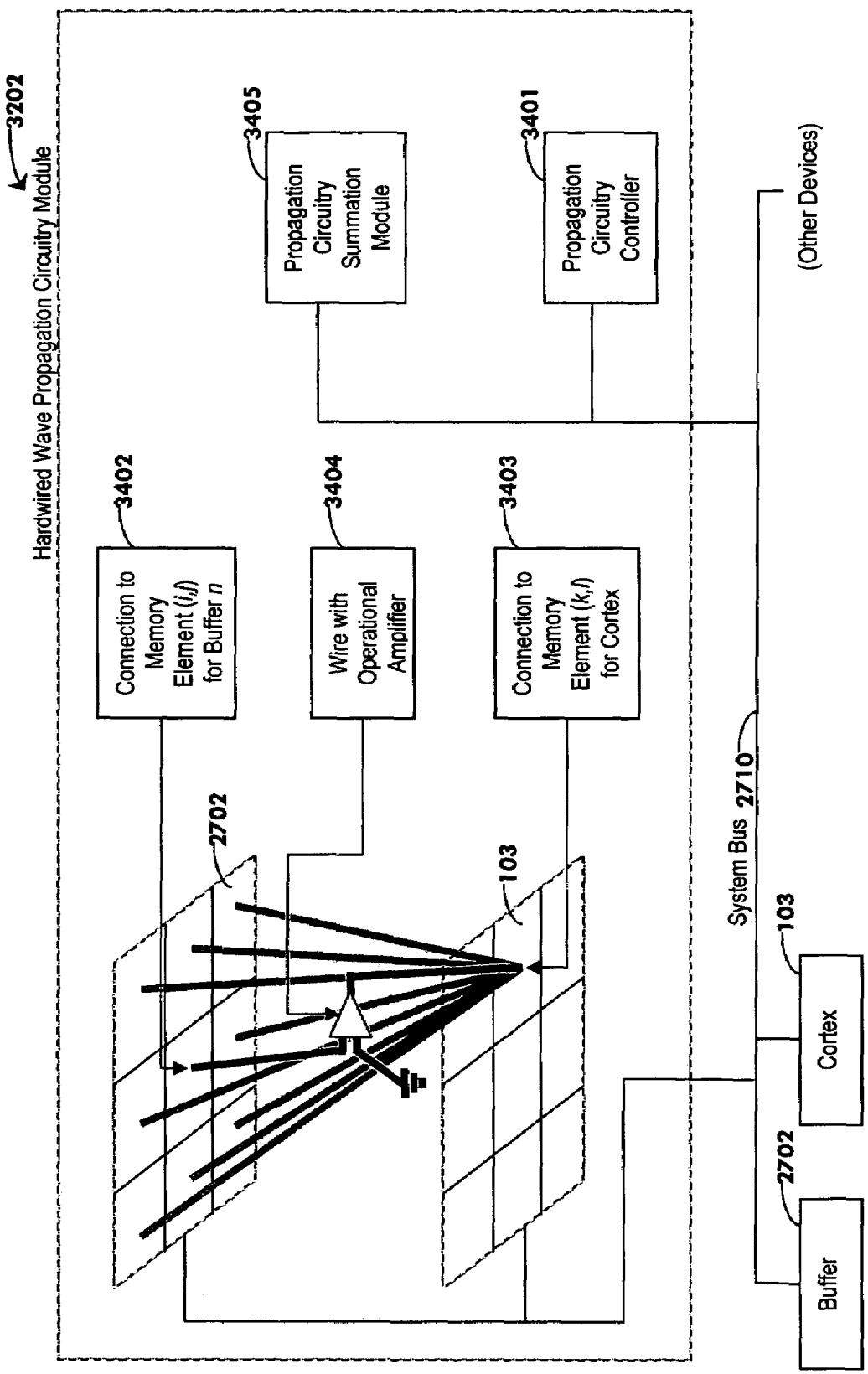
FIG. 34 illustrates the hardwired-based, wave propagation circuitry block diagram.

The hardwired wave propagation circuitry module 3202 performs the wave propagation emulation through modulation of electrical signals. This operation is shown in FIG. 34. The propagation circuitry controller 3401 is responsible for overall control of the module, for example, determining whether information is being propagated from buffer 2702 to cortex 103 or from cortex 103 to buffer 2702. For each receiving memory element 2809 and broadcast memory element 2811 on the buffer, there is a corresponding buffer connection point, to memory element (i,j) for buffer n 3402. Similarly, for each receiving memory element 2904 and broadcast memory element 2906 on the cortex, there is a corresponding cortex connection point, to memory element (k,l) for the cortex 3403. For each possible couple of a buffer connection point to a cortex connection point, there is an interconnecting conducting wire that passes through an individually programmed operational amplifier, shown in black in FIG. 34 as wire with operational amplifier 3404. Remaining wires and op-amps that originate from other buffer connection points and connect to cortex connection point (k,l) are shown in gray. For purposes of clarity in the figure, the op-amps for these remaining connections are not displayed. Similar sets of wires/op-amps exist for the remaining cortex element connection points and are within the present invention but are not shown. The op-amp modulates both the amplitude and phase of the source signal, according to Equations 24 and 25, in which $r_C$ is the position of the connection point on the cortex 103, r is the position of the connection point on the buffer 2702. For the case of propagation from buffer 2702 to cortex 103, the propagation circuitry summation module 3405 combines the transmitted electrical signals according to Equation 25, where $\phi(r)$ is the complex number that represents the amplitude and phase of the wave stored in the broadcast memory element 2811 at each buffer source point, so as to sum the complex-valued, modulated contributions from all the buffer connection points 3402 to each cortex connection point 3403. Upon completion of the modulation and summation, the resultant total complex field values are passed from the cortex connection points 3403 to the appropriate set of cortex receiver memory elements 2904. An analogous process is applied for the case of propagation from cortex to buffer, with the information transport direction reversed and the summations performed on the buffer connection points.

In this way, the hardwired wave propagation circuitry module 3202 emulates the propagation of waves from buffer 2702 to cortex 103, starting with the complex wavefront defined on the buffer 2702 by the plurality of broadcast memory elements 2811, one for each array location on the modeled buffer 2702. Thus, the hardwired wave propagation circuitry module 3202 and broadcast memory elements 2811 together execute the information transport process step 1001 of FIG. 10, propagating information from buffer 2702 to cortex 103.

Similarly, when patterns are submitted to be recognized or identified by the associative memory device 101, then the plurality of receiver memory elements 2809, one for each array location on the modeled buffer 2702, and the postprocessor module 2814 are used to record the retrieved, complex-valued information propagated from cortex 103 to buffer 2702, convert the values to their magnitudes, and store the retrieval, according to the export buffer information process of FIG. 18.

The cortex 103 is illustrated in FIG. 31. The main cortex memory 3101 can be used to store information for the cortex 103, such as needed working arrays. As with the buffers 2702, contents of the cortex 103 are represented by one or more arrays of complex numbers, stored in RAM or in storage devices 2708, including, but not limited to hard drives, floppy drives, or CD-RW drives.

At each array location, the components include a plurality of receiver memory elements for buffer n 2904, one for each buffer 2702, operable to store, as a single complex number, the measured amplitude and phase values for information arriving from each respective buffer 2702; and a broadcast memory element 2906, operable to store the amplitude and phase values that serve as input to the broadcast functions.

When patterns are submitted to be recognized or identified by the associative memory device 101, then the plurality of receiver memory elements for buffer n 2904 are used to record the complex wave information from buffer 2702 to cortex 103. For multiple input buffers, this process is performed buffer-by-buffer, with each buffer propagating its information, by hard-wire and op-amp, to the cortex 103 via the hardwired wave propagation circuitry module 3102 and the cortex 103 then storing the results for that originating buffer in the appropriate cortex memory elements (receiver memory element for buffer n 2904).

An association module 2909 performs the association process of step 1304 of FIG. 13, storing the results in the association memory element 3102 for each location on the cortex 103. When associations need to be superposed to store multiple memories in the associative memory device, the linear combination module 2910 performs step 1504 of FIG. 15, storing the "running total" results in the linear combination memory element 2914 for each location on the cortex 103.

When a pattern is to be recognized, the de-association module 2911 performs the de-association process of step 1604 of FIG. 16, storing the results in the de-association memory element 2912 for each location on the modeled cortex array 2902. As with the buffers, the hardwired wave propagation circuitry module 3102 emulates the propagation of waves from cortex 103 to buffer 2702, starting with the complex wavefront defined on the cortex 103 by the plurality of broadcast memory elements 2906, one for each array location on the modeled cortex 103. When a de-associated pattern is to be back-propagated to one or more buffers, the complex conjugation module 2915 acts together with the hardwired wave propagation circuitry module 3102 and the plurality of broadcast memory elements 2906 to perform step 2307 of the recognition process in FIG. 23.

The IIP 300 components shown in FIG. 27 help provide the functionality for autonomous operations. The IIP generator module 2721 is used to generate an IIP from a machine-readable, identification code and gather the appropriate registration information, according to steps 2404 and 2406 of the autonomous learning process defined in FIG. 24. The complex wave values of the generated IIP are assigned to the broadcast memory elements of the IIP buffer 2704. The IIP buffer 2704 then propagates by hard-wire and op-amps, its information to the cortex 103 where the transported IIP is associated with the corresponding input pattern(s), as described earlier. For autonomous identification, information from one or more input buffers 2702 is propagated to the cortex 103, de-associated, phase-reversed by complex conjugation, and then back-propagated to the IIP buffer 2704. The IIP reader module 2722 is then responsible for reading the retrieved pattern to make an identification and produce a confidence estimate, according to step 2505 of FIG. 25. The autonomous execution module 2723 then retrieves the appropriate files and executes or communicates the appropriate commands and results to the utilizing apparatus or system 2725, according to steps 2507 and 2509 of FIG. 25.

The adaptive learning module 2724 operates to provide the adaptive identification performance improvement steps described in FIG. 26, coordinating feedback loops with the system operator when necessary and making the appropriate adjustments to the cortex 103 contents.

The primary difference between the third embodiment of the present invention and the second embodiment of the present invention is that in the second embodiment, the wave propagation operations are handled by numerical simulation in software and hardware whereas in the third embodiment, the wave propagation calculations are accomplished using the amplitude and phase modulations provided by the hardwired wave propagation circuitry module 3002.

Results of the Present Invention

The particular examples presented herein were performed using a software embodiment of the present invention as described in FIGS. 30 and 31, and in FIGS. 152 through 160. These specific cases are included herein for illustration and demonstration purposes only and are, in no way, meant to limit the scope of the application of the invention. It should be appreciated to those skilled in the art that the present invention is capable of association, storage, retrieval, and identification of a wide variety of inputs and that the examples presented herein are merely representative. The ability of the present invention to recognize a face, fingerprint, or signature is performed in exactly the same manner as would be recognition of a sound, odor, or any other output file from any detector. Further, the present invention could be used to recognize any general data file or to identify any designated features within general files.

Distribution of Information on the Cortex

Figure 35:
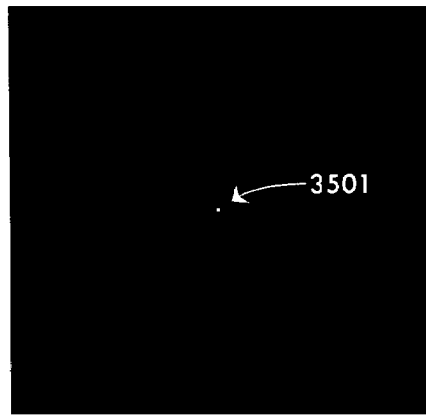
FIG. 35 is an image used to test operation of the software based embodiment of the present invention.
Figure 36:
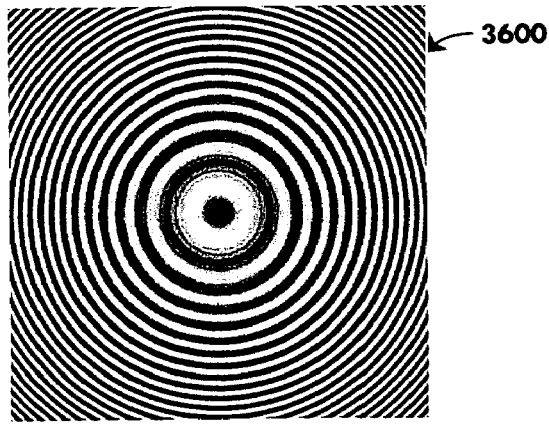
FIG. 36 is an image used to test operation of the software based embodiment of the present invention.
Figure 37:
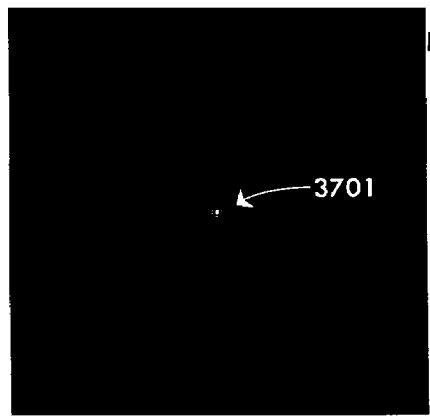
FIG. 37 is an image used to test operation of the software based embodiment of the present invention.

In FIG. 35, the pattern on an input buffer 102 consists of a single bright point 3501 located at the center of the input buffer array 3500. The wave pattern 3600 that results from propagating this single source-point to the cortex 103 is displayed in FIG. 36. The information, limited to one point on the buffer 102, covers the entire cortex 103. When the cortex pattern 3600 of FIG. 36 is back-propagated to the originating buffer 102 or output buffer 104, the original source is reconstructed as seen in FIG. 37, confirming that the wave information stored is sufficient to reconstruct the input, and is therefore equivalent to that of the input. Note that the small diffraction artifacts in FIG. 37 are intrinsic features of the wave-based information transport; however, the amount of diffraction may be made arbitrarily small by adjusting the wavelength and/or the size of the buffer 102 and cortex 103.

Face Recognition

Recognition Results from the Association of Two Intricate Patterns

The present invention can be used to associate a picture of a person's face with that of a person's name. These are characteristic inputs representing any intricate patterns for which association, retrieval, and identification might prove of value. The next set of figures demonstrates that the present invention can store and retrieve detailed patterns and make correct retrievals even when given partial or somewhat erroneous prompts, and when significant portions of the cortex 103 are destroyed. Additionally, higher level processes involving generalization and conceptualization by the present invention are also demonstrated.

Basic Association and Retrieval

Figure 38:
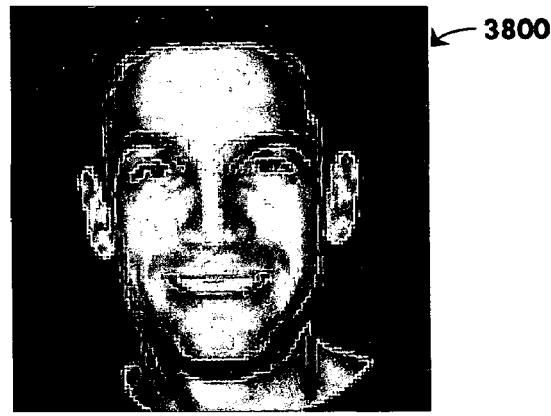
FIG. 38 is an image used to test operation of the software based embodiment of the present invention.
Figure 39:
FIG. 39 is an image used to test operation of the software based embodiment of the present invention.
Figure 40:
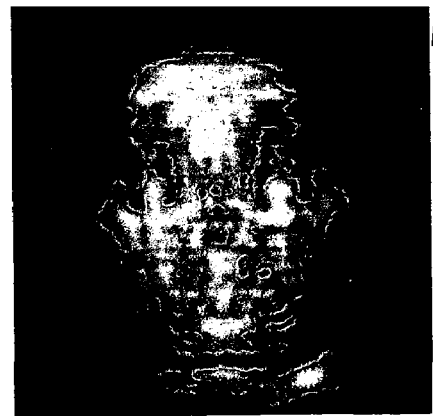
FIG. 40 is an image used to test operation of the software based embodiment of the present invention.
Figure 41:
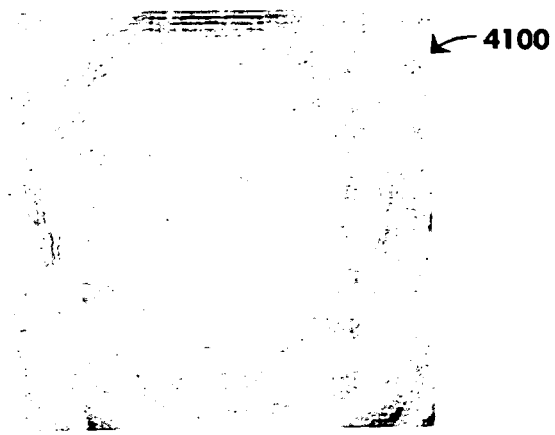
FIG. 41 is an image used to test operation of the software based embodiment of the present invention.

Two images, a face 3800 in FIG. 38, and the corresponding name 3900 in FIG. 39, were input to the cortex 103 and then associated using a multiplicative association function: $f(x,y) = x \times y$. The magnitude of the resulting wave pattern 4000 on the cortex 103 is shown in FIG. 40 and the phase 4100 is shown in FIG. 41. Because the input file is a photograph, the phase, which is a feature that expresses shape, is necessarily constant as the input, a photograph, is flat. The little phase variation that does occur is a result of diffractive effects from amplitude variation on the input buffer 102. Phase may be artificially assigned through an algorithm, effectively defining a "pseudo-shape." Or, input devices 2701 may in some circumstances discern shape and therefore determine phase. The choice of assignment procedure depends on what features one wishes to tune the associative memory device to enhance in its retrieval Several phase choices are used in this document. The phase assignment approaches are simply examples, and, as noted earlier, persons skilled in the art will recognize there are numerous other approaches for assigning phase to wave patterns.

Figure 42:
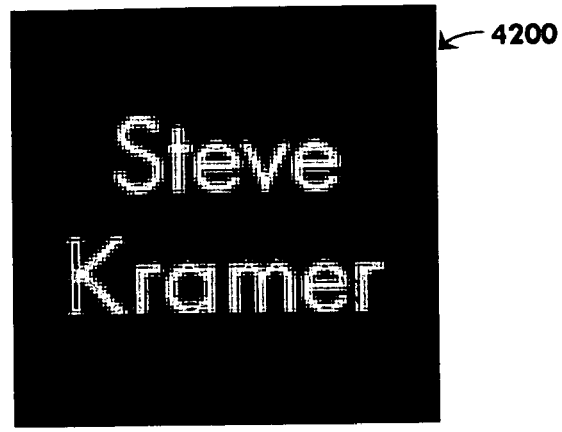
FIG. 42 is an image used to test operation of the software based embodiment of the present invention.
Figure 43:
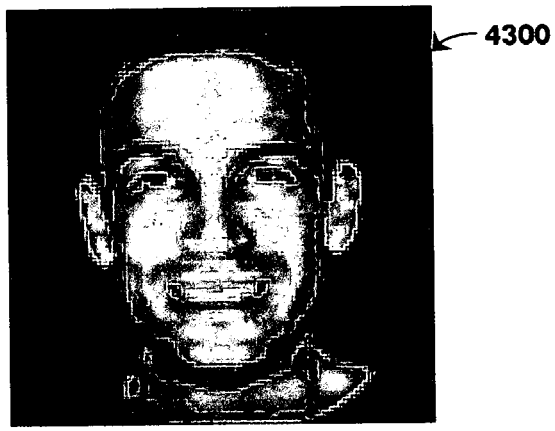
FIG. 43 is an image used to test operation of the software based embodiment of the present invention.

When the original facial image 3800 of FIG. 38 is submitted for recognition, the associative memory device successfully reconstructs the corresponding name 4200, as displayed in FIG. 42. Alternatively, when the name image 3900 of FIG. 39 is submitted for recognition, the associative memory device retrieves the pattern 4300 shown in FIG. 43. In both cases it is observed that detail and amplitude are well reproduced, the only significant distortions due to diffraction from the finite sizes of the input buffer 102 and cortex 103.

Figure 44:
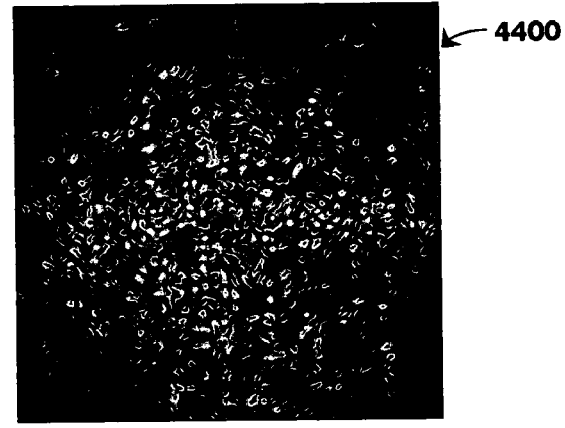
FIG. 44 is an image used to test operation of the software based embodiment of the present invention.
Figure 45:
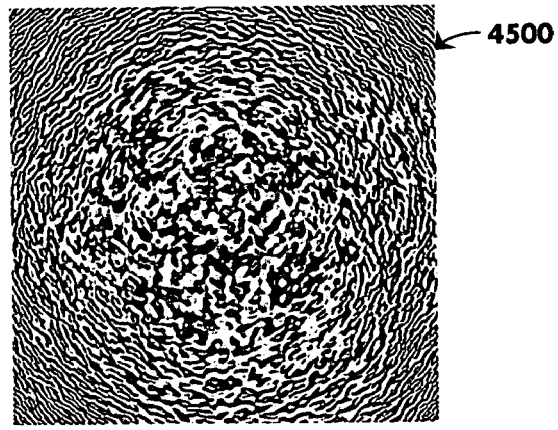
FIG. 45 is an image used to test operation of the software based embodiment of the present invention.
Figure 46:
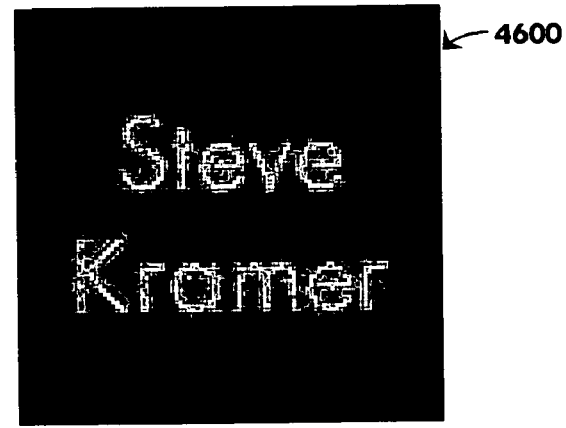
FIG. 46 is an image used to test operation of the software based embodiment of the present invention.
Figure 47:
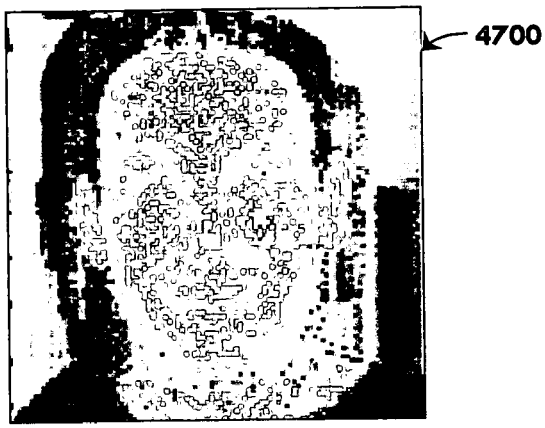
FIG. 47 is an image used to test operation of the software based embodiment of the present invention.

The amount and type of distortion in the reconstructed face can be affected significantly by using a different phase assignment procedure during the pattern input steps described in FIG. 9. One could have chosen a phase assignment procedure which uses an amplitude-dependent algorithm. The image 4400 of FIG. 44 shows the magnitude of this alternative association on the cortex 103, and the image 4500 of FIG. 45 displays its phase. Using this new cortex, reconstruction exhibits more distortion, as seen in FIG. 46 for the retrieved name 4600 when prompted with the face 3800, or for the reconstruction of the face 4700 in FIG. 47 when given the name 3900.

Although the first phase assignment procedure, constant phase, enhances the accuracy of the reconstruction of an input pattern, the second, varied phase, better enables the distinguishing of input patterns from one another, improving the discrimination of the associative memory. The remaining test cases in this section used the latter approach.

Retrievals when Given Erroneous or Partial Prompts

Figure 48A:
FIGS. 48($a$) and 48($b$) are two images used to test operation of the software based embodiment of the present invention.
Figure 48B:
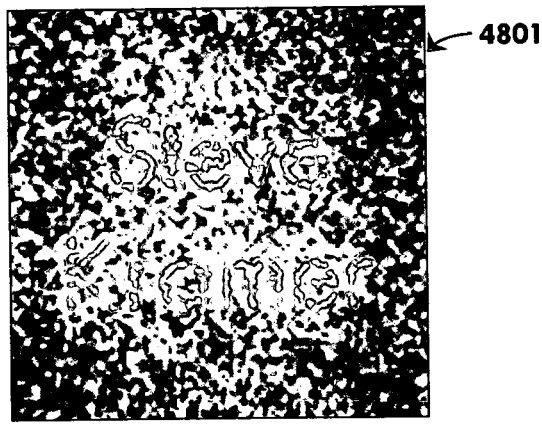
Figure 49A:
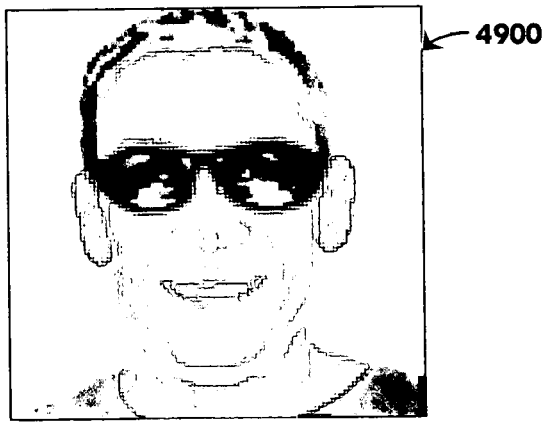
FIGS. 49($a$) and 49($b$) are two images used to test operation of the software based embodiment of the present invention.
Figure 49B:
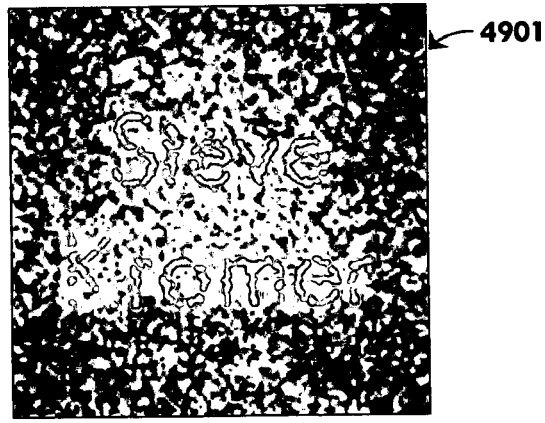
Figure 50A:
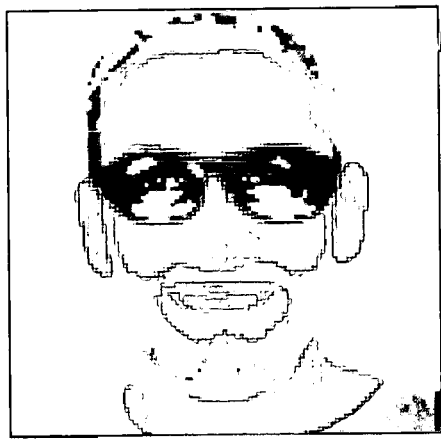
FIGS. 50($a$) and 50($b$) are two images used to test operation of the software based embodiment of the present invention.
Figure 50B:

The next series of images address the capacity of the present invention to make correct retrievals even when presented with an erroneous prompt. The term, erroneous, is used here in the sense that the prompt presented has many of the same features as that learned, that is, for example, it might be the same person, but varies from the input originally learned. In FIG. 48a, the original face 3800 of FIG. 38 is changed to a face wearing light sunglasses 4800. FIG. 48b shows the resulting retrieved pattern 4801. The name is clearly readable, although there is some "snow," or haze, due to the differences between the original stored and prompting images. In FIG. 49a, the original face 3800 of FIG. 38 is changed to a face wearing dark sunglasses 4900. As seen in FIG. 49b, the retrieved name is still easily readable, but with an increased amount of noise in the reconstruction. Even the significant disguise of both dark sunglasses and a beard 5000, as seen in FIG. 50a, results in a still-readable retrieval 5001, as seen in FIG. 50b.

Figure 51A:
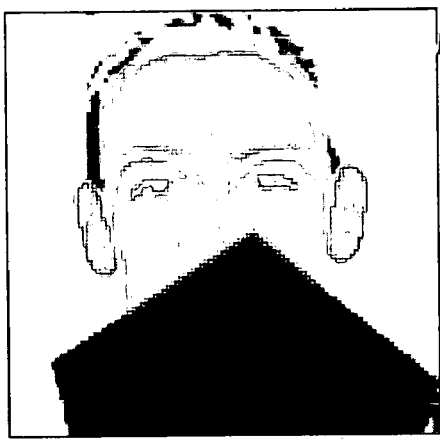
FIGS. 51($a$) and 51($b$) are two images used to test operation of the software based embodiment of the present invention.
Figure 51B:
Figure 52A:
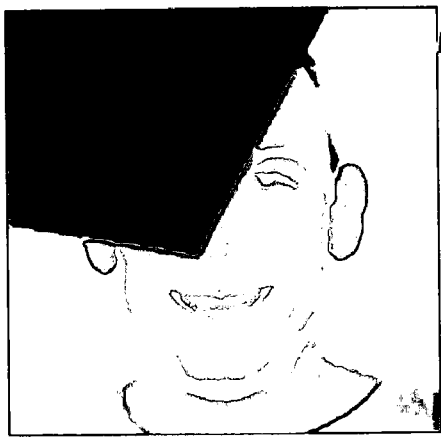
FIGS. 52($a$) and 52($b$) are two images used to test operation of the software based embodiment of the present invention.
Figure 52B:

The present invention also has the ability to retrieve patterns when given incomplete prompts. FIG. 51a shows the original face with a lower portion removed 5100 and the resulting retrieval 5101 in FIG. 51b. When an upper portion of the face is blocked out 5200 as seen in FIG. 52a, the retrieval 5201 displayed in FIG. 52b is produced.

Response to Unknown Prompts

Figure 53A:
FIGS. 53($a$) and 53($b$) are two images used to test operation of the software based embodiment of the present invention.
Figure 53B:
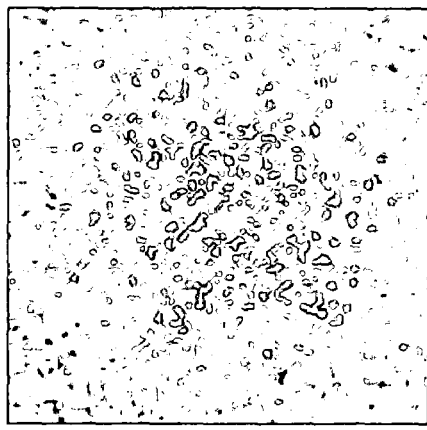
Figure 54A:
FIGS. 54($a$) and 54($b$) are two images used to test operation of the software based embodiment of the present invention.
Figure 54B:
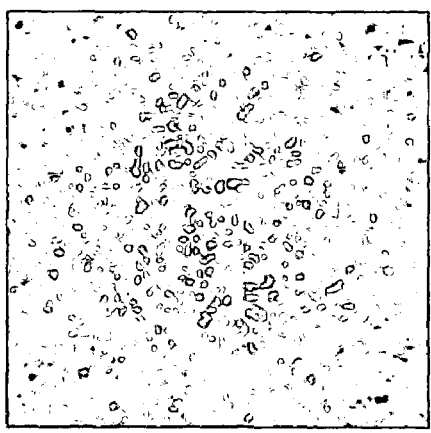
Figure 55A:
FIGS. 55($a$) and 55($b$) are two images used to test operation of the software based embodiment of the present invention.
Figure 55B:
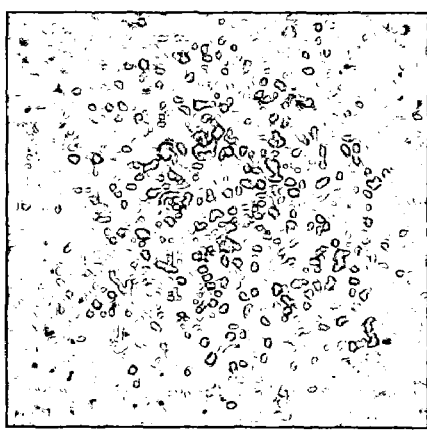

The above examples demonstrate that the present invention is able to make correct retrievals even when presented erroneous or partial prompts, an important property for an associative memory to be able to avoid making false negative identifications and to function in real-world situations where inputs naturally vary in appearance with time and location. When presented with unknown faces 5300, 5400 and 5500 as seen in FIG. 53a, FIG. 54a, and FIG. 55a, respectively, the present invention's retrieval consists of noise with no discemable pattern 5301, 5401 and 5501 as seen in FIG. 53b, FIG. 54b and FIG. 55b, respectively. Thus, the present invention possesses a strong capacity to avoid false positive identifications.

Retrievals when Cortices are Damaged

Figure 56:
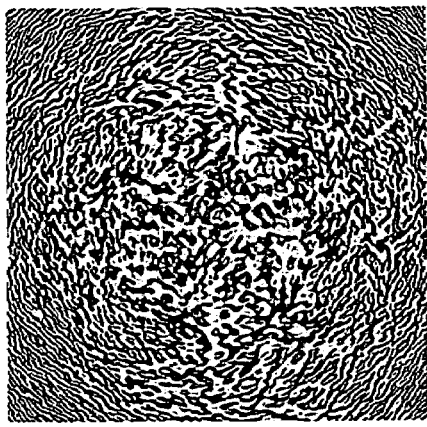
FIG. 56 is an image used to test operation of the software based embodiment of the present invention.
Figure 57:
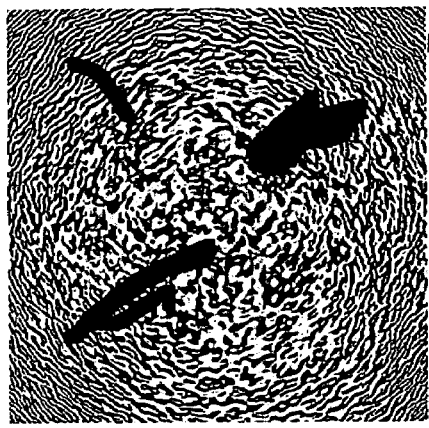
FIG. 57 is an image used to test operation of the software based embodiment of the present invention.
Figure 58A:
FIGS. 58($a$) and 58($b$) are two images used to test operation of the software based embodiment of the present invention.
Figure 58B:
Figure 59A:
FIGS. 59($a$) and 59($b$) are two images used to test operation of the software based embodiment of the present invention.
Figure 59B:
Figure 60A:
FIGS. 60($a$) and 60($b$) are two images used to test operation of the software based embodiment of the present invention.
Figure 60B:
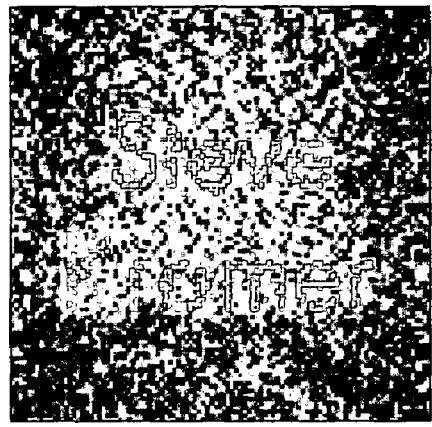
Figure 61A:
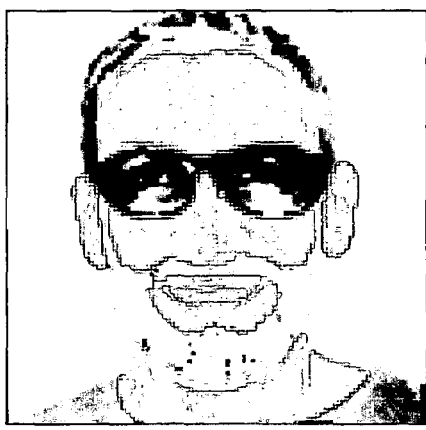
FIGS. 61($a$) and 61($b$) are two images used to test operation of the software based embodiment of the present invention.
Figure 61B:
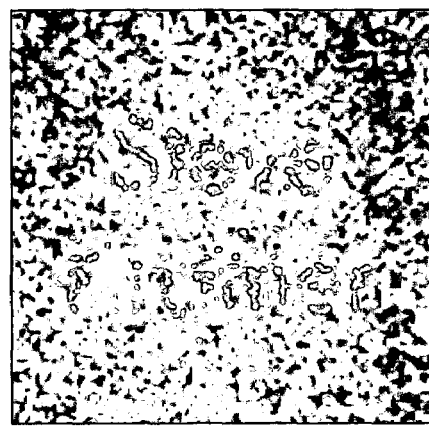
Figure 62A:
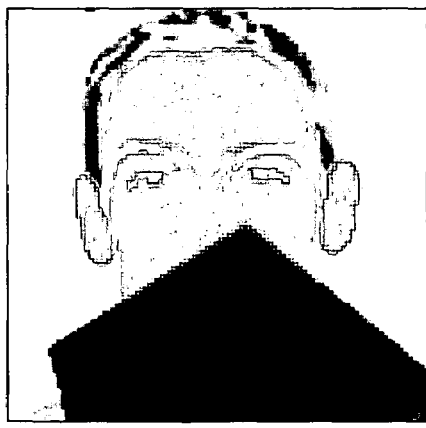
FIGS. 62($a$) and 62($b$) are two images used to test operation of the software based embodiment of the present invention.
Figure 62B:
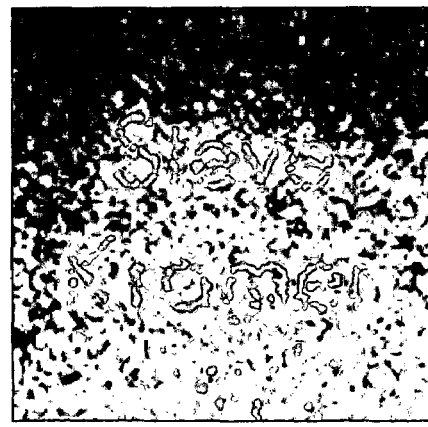
Figure 63A:
FIGS. 63($a$) and 63($b$) are two images used to test operation of the software based embodiment of the present invention.
Figure 63B:
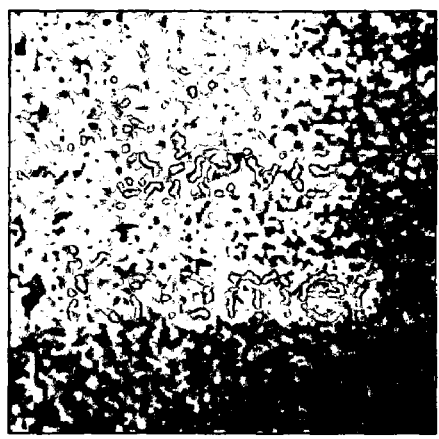
Figure 64:
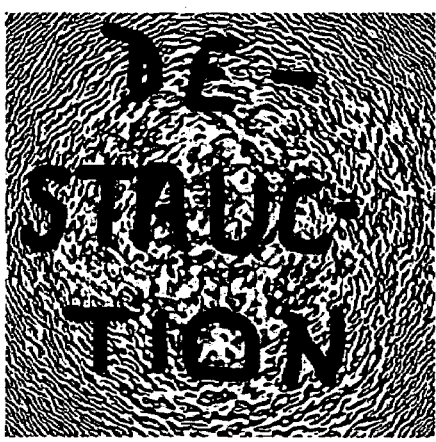
FIG. 64 is an image used to test operation of the software based embodiment of the present invention.
Figure 65A:
FIGS. 65($a$) and 65($b$) are two images used to test operation of the software based embodiment of the present invention.
Figure 65B:
Figure 66A:
FIGS. 66($a$) and 66($b$) are two images used to test operation of the software based embodiment of the present invention.
Figure 66B:
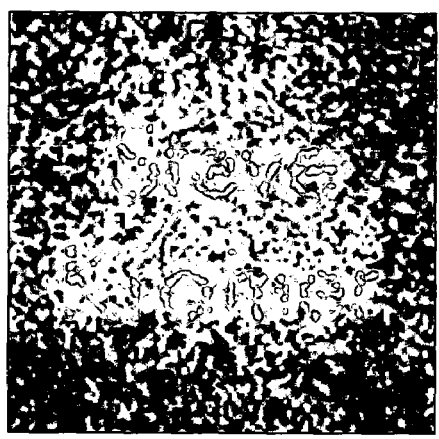
Figure 67A:
FIGS. 67($a$) and 67($b$) are two images used to test operation of the software based embodiment of the present invention.
Figure 67B:
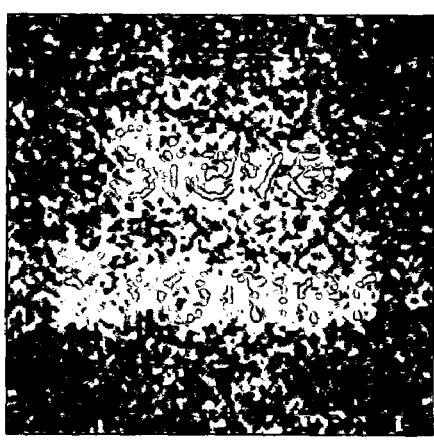
Figure 68A:
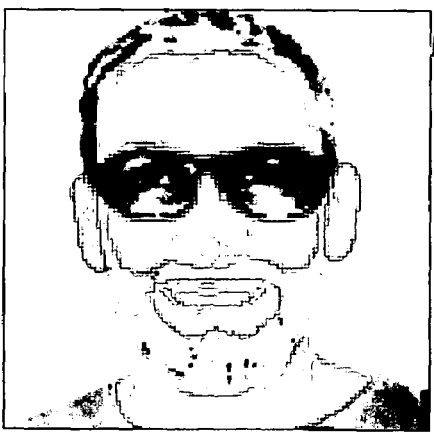
FIGS. 68($a$) and 68($b$) are two images used to test operation of the software based embodiment of the present invention.
Figure 68B:
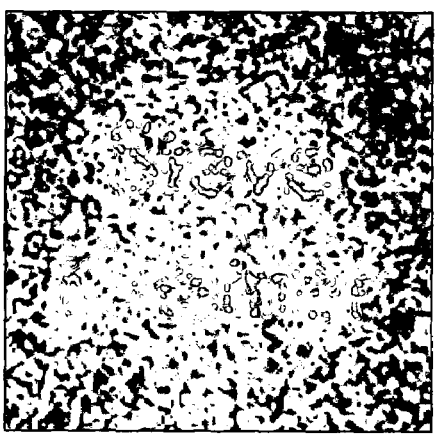
Figure 69A:
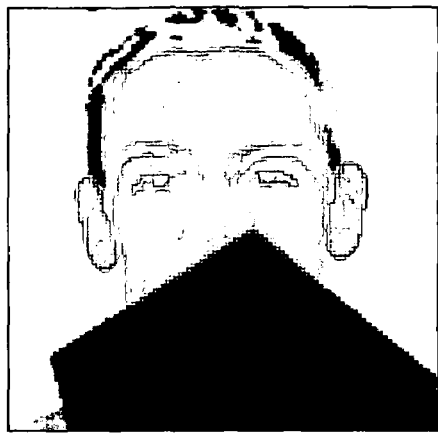
FIGS. 69($a$) and 69($b$) are two images used to test operation of the software based embodiment of the present invention.
Figure 69B:
Figure 70A:
FIGS. 70($a$) and 70($b$) are two images used to test operation of the software based embodiment of the present invention.
Figure 70B:

The present invention has the benefit of being able to make successful retrievals even when parts of its memory, the stored association(s) on the cortex 103, are damaged. FIG. 56 is an image 5600 of the original, undamaged cortex 103, and FIG. 57 shows a first example in which the cortex 103 is damaged by zeroing out ("blacking out") portions of its stored array. That is, for each new black pixel, both the real and imaginary components of the cortex array were set to zero. Even with part of its memory damaged, the present invention is able to make successful identifications of the original and erroneous faces 3800, 4800, 4900, 5000, 5100 and 5200 of FIGS. 58a, 59a, 60a, 61a, 62a and 63a respectively as seen in images 5801, 5901, 6001, 6101, 6201 and 6301 of FIGS. 58b, 59b, 60b, 61b, 62b, and 63b, respectively. FIG. 64 shows an image 6400 of a second example in which the same cortex 103 is damaged more extensively. The present invention is able to make successful identifications of the original and erroneous faces 3800, 4800, 4900, 5000, 5100 and 5200 of FIGS. 65a, 66a, 67a, 68a, 69a and 70a respectively as seen in images 6501, 6601, 6701, 6801, 6901 and 7001 of FIGS. 65b, 66b, 67b, 68b, 69b, and 70b, respectively.

Identification Results using Internal Identification Patterns (IIPs)

Figure 71:
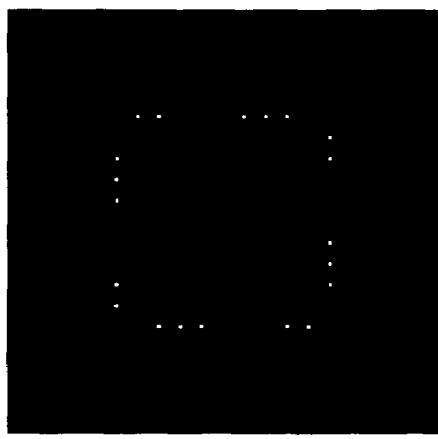
FIG. 71 is an image used to test operation of the software based embodiment of the present invention.
Figure 72:
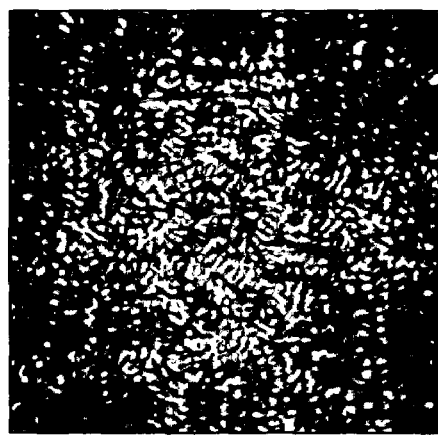
FIG. 72 is an image used to test operation of the software based embodiment of the present invention.
Figure 73:
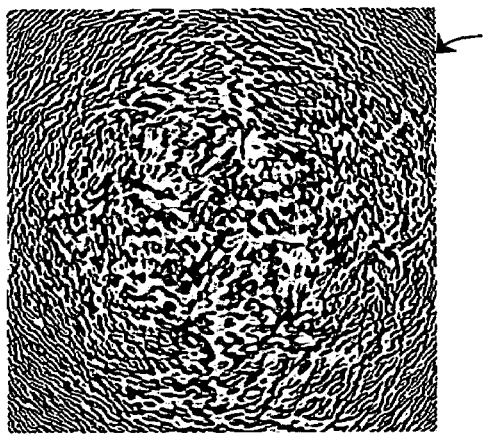
FIG. 73 is an image used to test operation of the software based embodiment of the present invention.

The following set of face recognition samples illustrates the ability of the present invention to perform autonomous identification of prompting patterns through the use of machine-readable IIPs 704, according to the steps described in FIGS. 19, 21, 24, and 25. As a first test, the face 3800 of FIG. 38 is associated with the geometric pattern 7100 of FIG. 71 and stored in an initially empty cortex 103. The pattern 7100 is the IIP, constructed from an identification code 702, selected arbitrarily for this example, of 115, or 0111011 in binary, using one of many possible IIP calculation algorithms, in which the binary code is repeated fourfold, with bright dots indicating 1s and black dots indicating 0s. The association of face 3800 and IIP results in the cortex magnitude pattern 7200 as seen in FIG. 72 and cortex phase pattern 7300 as seen in FIG. 73. This process constitutes registration of an input with its identification code.

Figure 74A:
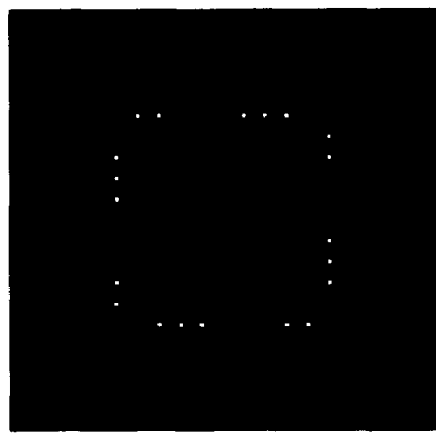
FIGS. 74($a$) and 74($b$) are two images used to test operation of the software based embodiment of the present invention.
Figure 74B:
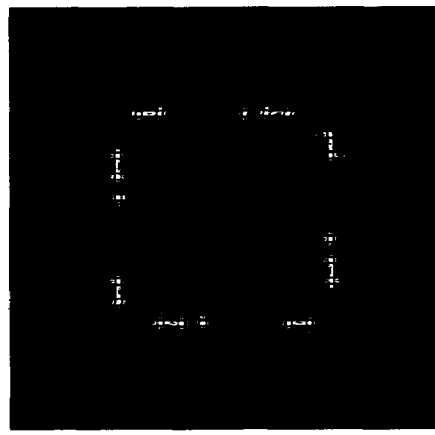

The original face 3800 is re-introduced to the associative memory device for identification. In FIG. 74a, the original IIP 7100 is compared to the nearly identical retrieved IIP 7401 of FIG. 74b. The IIP reader 2722 component of the present invention interprets the retrieved IIP 7401 and identifies the image, with an uncertainty of 0. In the particular software embodiment of the present invention, uncertainty scores are calculated based on contrast ratio and the consistency of the readings of the four redundantly written, binary codes. An uncertainty of 0 indicates that all four sets were in complete agreement. Uncertainty scores increase as contrast and the consistency of the four sets of codes decrease. Generally speaking, scores of less than five (5) were interpreted as very certain in the examples shown. Those skilled in the art will recognize that these are but a few of the many ways that a confidence estimate may be calculated.

Figure 75A:
FIGS. 75(a) and 75(b) are two images used to test operation of the software based embodiment of the present invention.
Figure 75B:
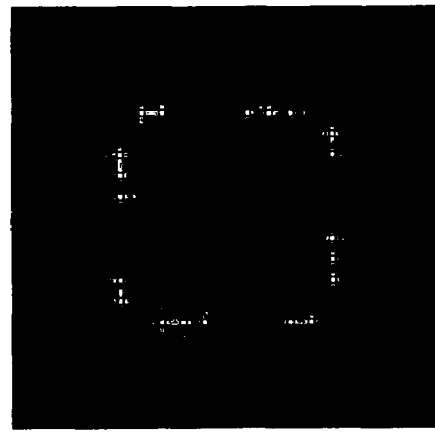
Figure 76A:
FIGS. 76(a) and 76(b) are two images used to test operation of the software based embodiment of the present invention.
Figure 76B:
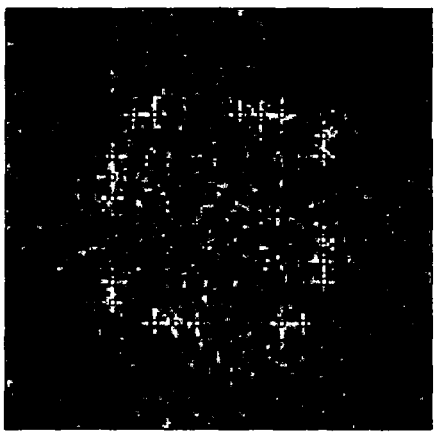
Figure 77A:
FIGS. 77(a) and 77(b) are two images used to test operation of the software based embodiment of the present invention.
Figure 77B:
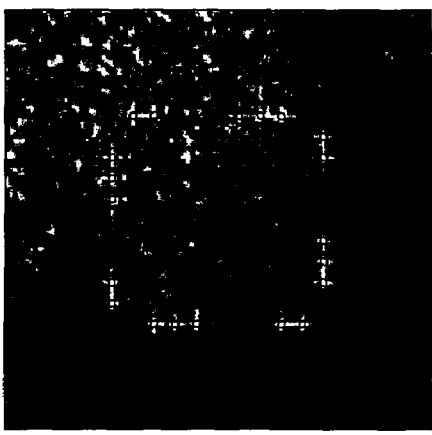

To demonstrate the capacity of the present invention for autonomous identification, several of the erroneous and partial prompts presented earlier are submitted for identification. All of the images, the face with dark sunglasses 4900 as seen in FIG. 75a, the face with dark sunglasses and a beard 5000 as seen in FIG. 76a, and the face with an upper portion blacked out 5200 as seen in FIG. 77a, are correctly identified with an uncertainty of 0, as seen in FIGS. 75b, 76b and 77b, respectively.

Figure 78A:
FIGS. 78(a) and 78(b) are two images used to test operation of the software based embodiment of the present invention.
Figure 78B:
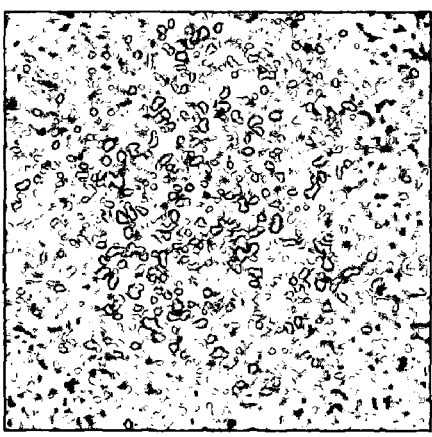

As seen in FIG. 78a, when an unknown pattern 5400 is presented to the present invention for identification, the noisy, retrieved IIP 7801 is completely unreadable as seen in FIG. 78b, and the present invention correctly reports that no identification is possible. The transcript of this registration and identification session is presented in the Text File "Charlie-Patent.txt", created on Jan. 19, 2002 (file size 194,560 bytes (190KB)), under the heading "Table 1", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Figure 79:
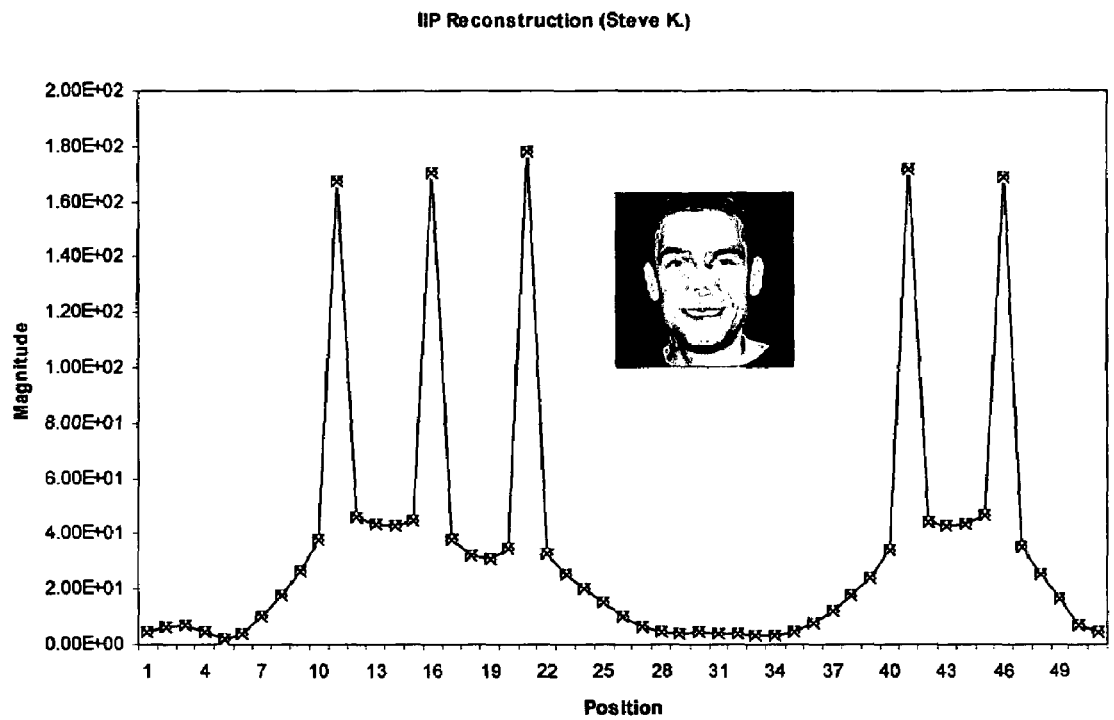
FIG. 79 is a plot showing the quantitative results of certain identification operations.
Figure 80:
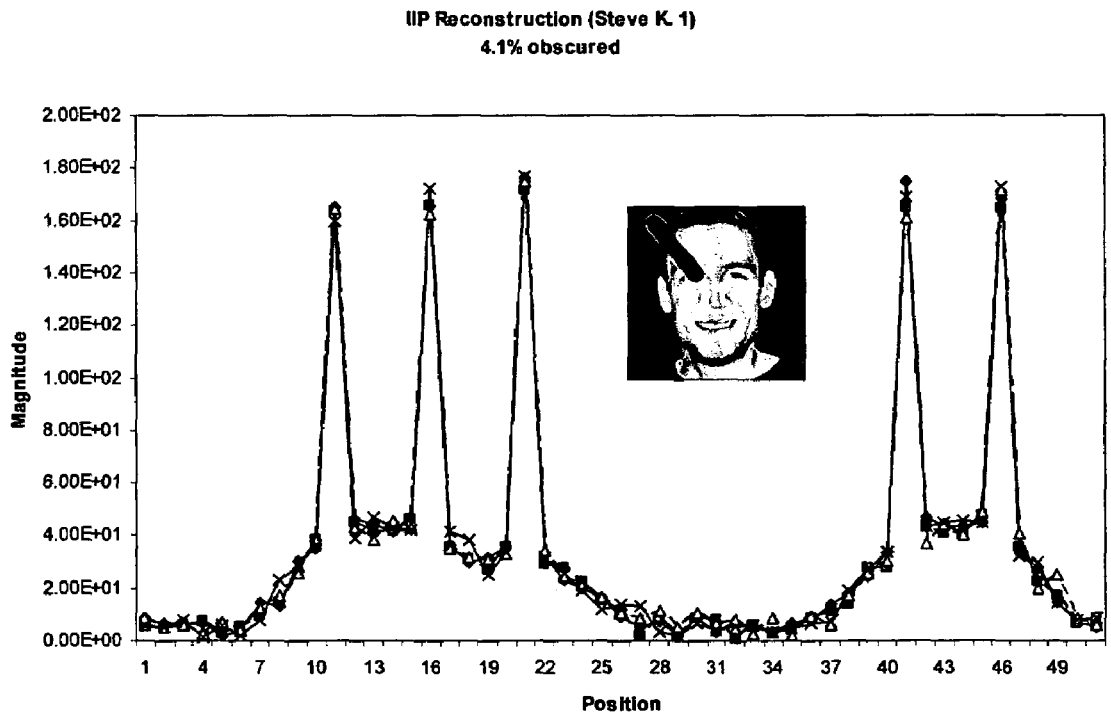
FIG. 80 is a plot showing the quantitative results of certain identification operations.
Figure 81:
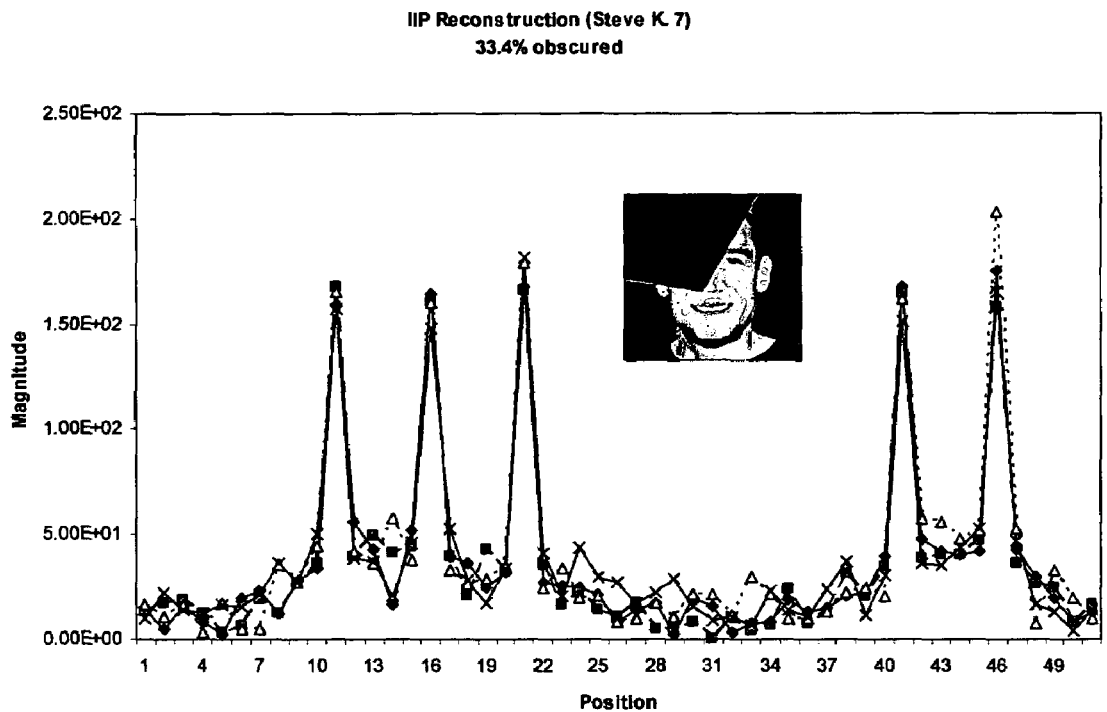
FIG. 81 is a plot showing the quantitative results of certain identification operations.

Quantitative analysis of the robustness of the present invention to correctly identify an input notwithstanding data corruption is shown by the results in FIGS. 79 through 82. FIG. 79 displays the case of "perfect" reconstruction. It is constituted of four plots, one for each of the redundant, eight bit patterns in the IIP, when the original, recorded face image 3800 is used for retrieval. The plots superpose perfectly; they are in complete agreement. FIG. 80 shows the IIP reconstructed when the image 3800 is partially obscured by a black streak, hiding 4.07% of the image. The reconstructed IIP no longer possesses four-fold symmetry, though the patterns are in substantive agreement. The reconstruction varies little from best-case reconstruction seen in FIG. 79; the mean-squared variation between the two is only 1.21%. FIG. 81 plots the reconstruction produced when a more significantly obscured (33.39%) image 3800 is used for retrieval. The mean-squared difference from FIG. 79 has increased, but to only 3.86%.

Figure 82:
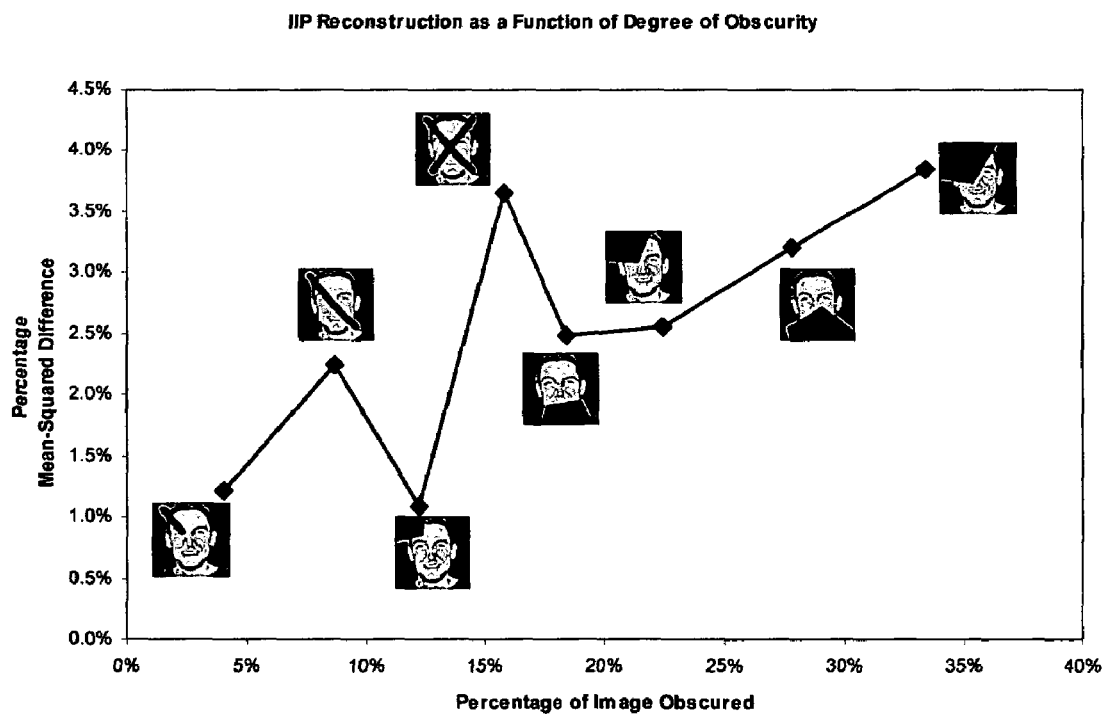
FIG. 82 is a plot showing the quantitative results of certain identification operations.
Figure 83A:
FIGS. 83(a) and 83(b) are two images used to test operation of the software based embodiment of the present invention.
Figure 83B:
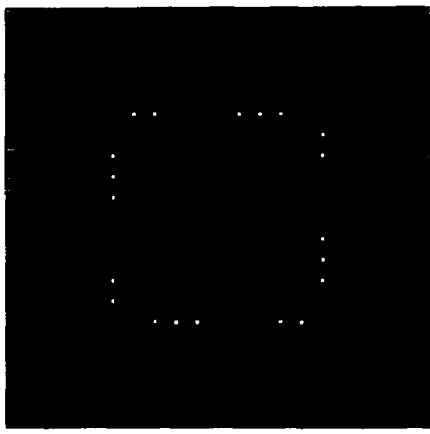
Figure 84A:
FIGS. 84(a) and 84(b) are two images used to test operation of the software based embodiment of the present invention.
Figure 84B:
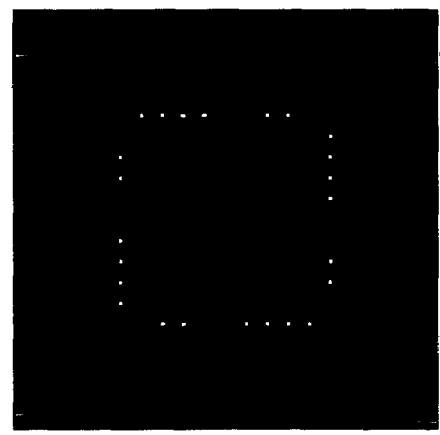
Figure 85A:
FIGS. 85(a) and 85(b) are two images used to test operation of the software based embodiment of the present invention.
Figure 85B:
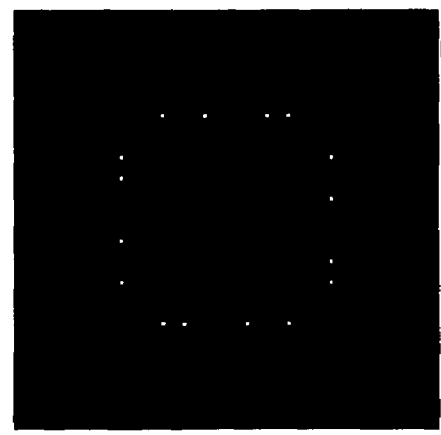
Figure 86A:
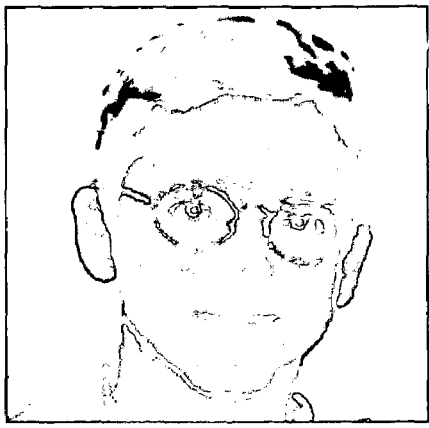
FIGS. 86(a) and 86(b) are two images used to test operation of the software based embodiment of the present invention.
Figure 86B:
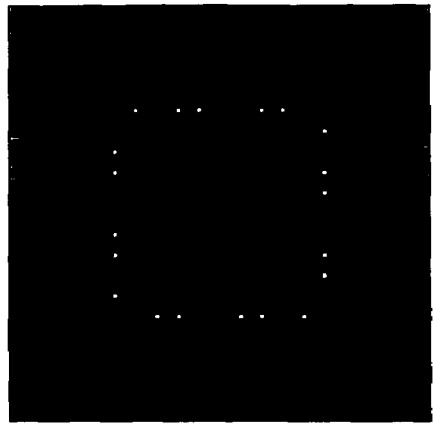
Figure 87A:
FIGS. 87(a) and 87(b) are two images used to test operation of the software based embodiment of the present invention.
Figure 87B:
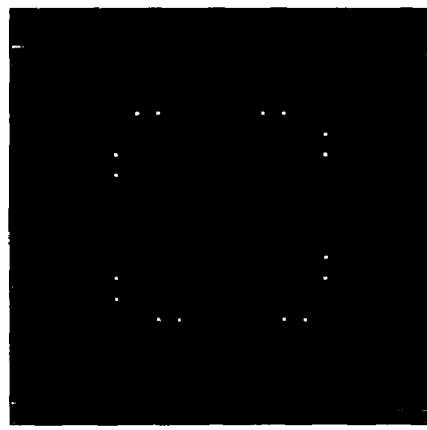
Figure 88A:
FIGS. 88(a) and 88(b) are two images used to test operation of the software based embodiment of the present invention.
Figure 88B:
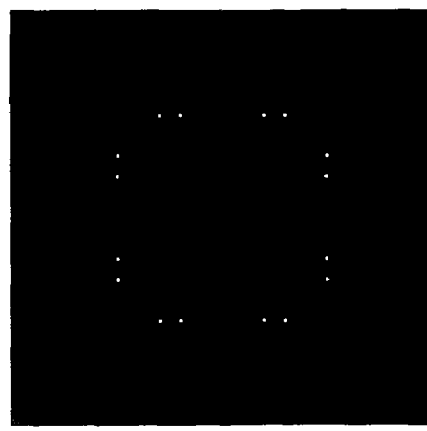
Figure 89A:
FIGS. 89(a) and 89(b) are two images used to test operation of the software based embodiment of the present invention.
Figure 89B:
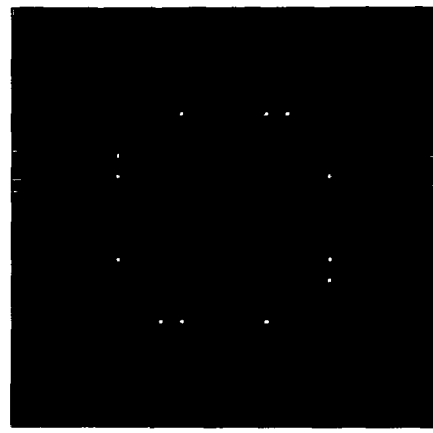

Deviations are plotted for an array of data corruptions in FIG. 82, which displays the mean-squared difference of IIP reconstruction from best-case reconstruction, as a function of percentage of the original image 3800 that is obscured. Interestingly, some information in the image is more important than other information. The third point on the graph, corresponding to a data file with about 13% lost, shows the lowest deviation, and the fourth point, with over 15% of the image 3800 obscured, reconstructs almost as poorly as the worst case with more than twice the lost data. However, even in this worst case, reconstruction shows less than a 4% deviation from that for a pristine prompt. The present invention has a robust capacity for reconstructing IIPs even when there is significant data corruption. In all cases shown, the present invention reported correct identifications with uncertainty scores of 0.

Figure 90:
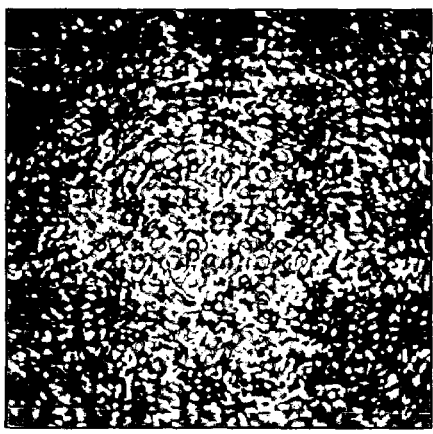
FIG. 90 is an image used to test operation of the software based embodiment of the present invention.
Figure 91:
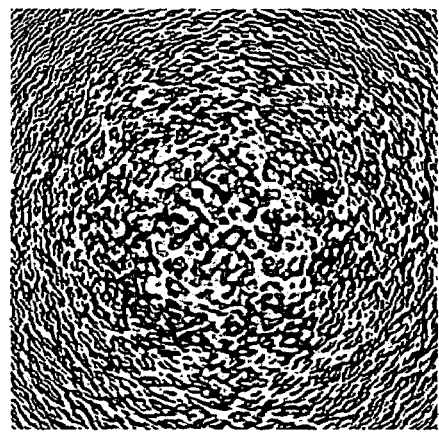
FIG. 91 is an image used to test operation of the software based embodiment of the present invention.
Figure 92A:
FIGS. 92(a) and 92(b) are two images used to test operation of the software based embodiment of the present invention.
Figure 92B:
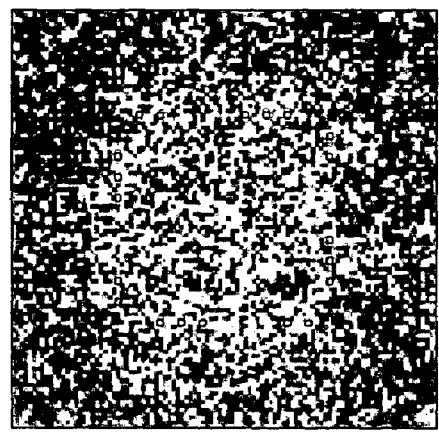
Figure 93A:
FIGS. 93(a) and 93(b) are two images used to test operation of the software based embodiment of the present invention.
Figure 93B:
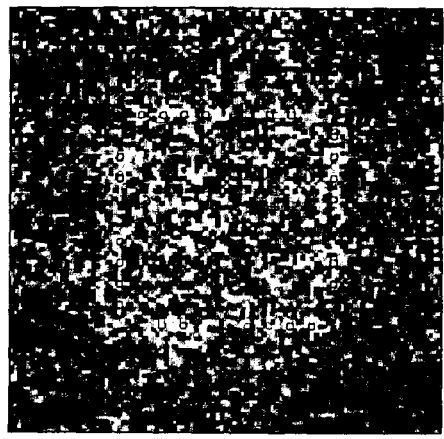
Figure 94A:
FIGS. 94(a) and 94(b) are two images used to test operation of the software based embodiment of the present invention.
Figure 94B:
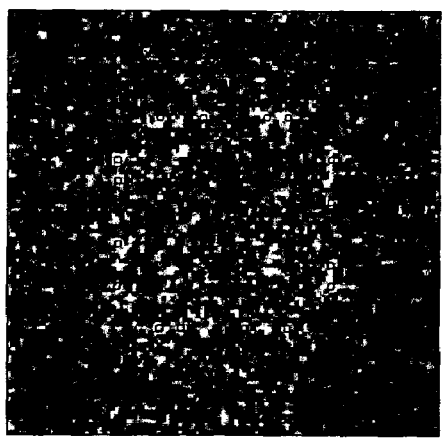
Figure 95A:
FIGS. 95(a) and 95(b) are two images used to test operation of the software based embodiment of the present invention.
Figure 95B:
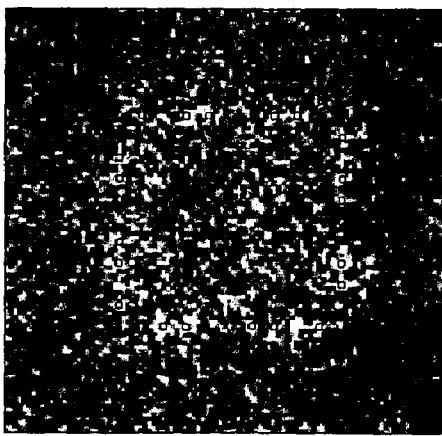
Figure 96A:
FIGS. 96(a) and 96(b) are two images used to test operation of the software based embodiment of the present invention.
Figure 96B:
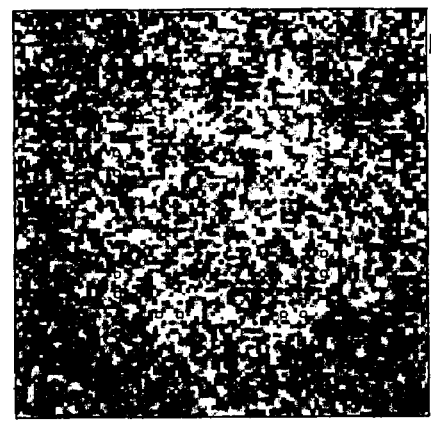
Figure 97A:
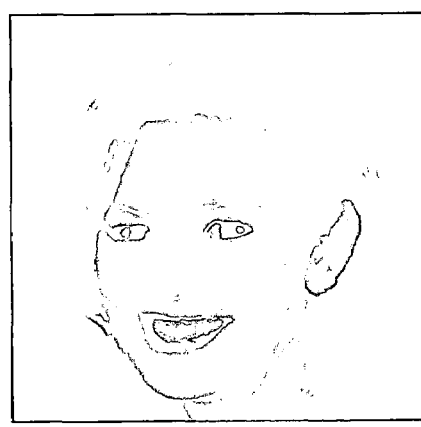
FIGS. 97(a) and 97(b) are two images used to test operation of the software based embodiment of the present invention.
Figure 97B:
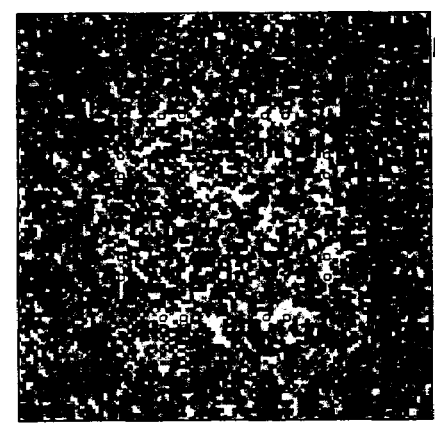
Figure 98A:
FIGS. 98(a) and 98(b) are two images used to test operation of the software based embodiment of the present invention.
Figure 98B:
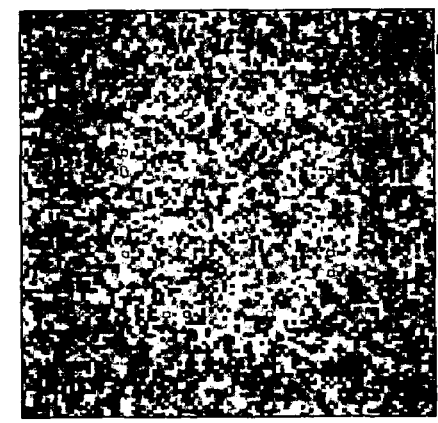

The present invention is capable of superposing associations, one on top of the other in the cortex 103, and then making the correct identification with little, if any, loss of accuracy. Seven different faces 3800, 5300, 8500, 5400, 5500, 8800, and 8900 of FIGS. 83*a*, 84*a*, 85*a*, 86*a*, 87*a*, 88*a*, and 89*a*, respectively, were input to the associative memory device, each associated with its own IIP, 8301, 8401, 8501, 8601, 8701, 8801, and 8901, respectively, as seen in FIG. 83*b*, 84*b*, 85*b*, 86*b*, 87*b*, 88*b*, and 89*b*, respectively. The resulting pattern of associations stored on the cortex 103 is displayed in FIG. 90 (magnitude 9000) and FIG. 91 (phase 9100). Each face 3800, 5300, 8500, 5400, 5500, 8800, and 8900 submitted as seen in FIGS. 92*a*, 93*a*, 94*a*, 95*a*, 96*a*, 97*a* and 98*a*, returned a correct IIP 9201, 9301, 9401, 9501, 9601, 9701 and 9801 as seen in FIGS. 92*b*, 93*b*, 94*b*, 95*b*, 96*b*, 97*b* and 98*b*. The uncertainty estimates were very low (five 0s, one 1, and one 2), indicating that the associative memory device was confident in its identifications.

Figure 99A:
FIGS. 99(a) and 99(b) are two images used to test operation of the software based embodiment of the present invention.
Figure 99B:
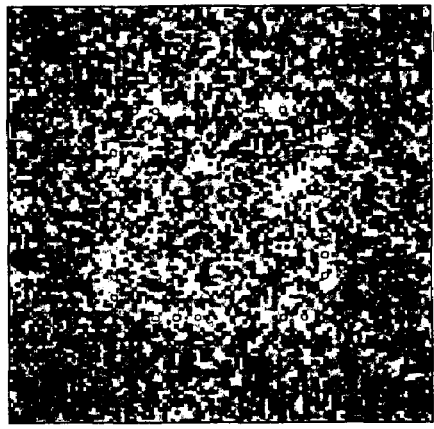
Figure 100A:
FIGS. 100(a) and 100(b) are two images used to test operation of the software based embodiment of the present invention.
Figure 100B:
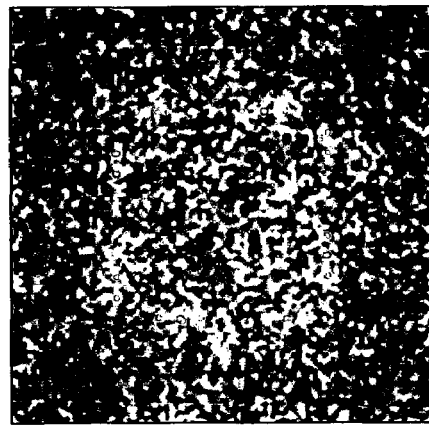
Figure 101A:
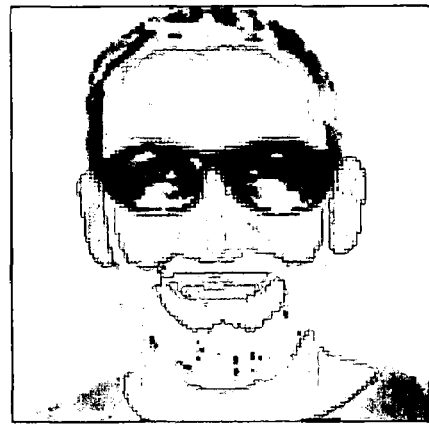
FIGS. 101(a) and 101(b) are two images used to test operation of the software based embodiment of the present invention.
Figure 101B:
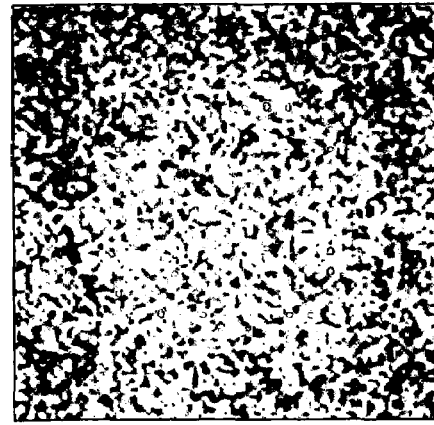
Figure 102A:
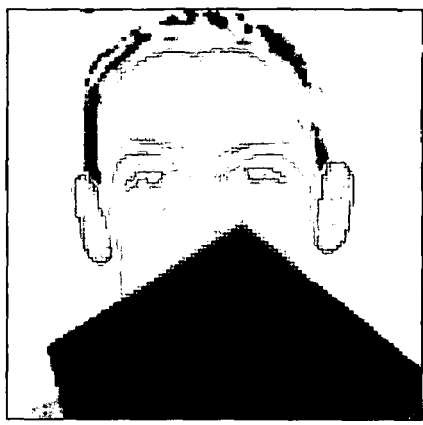
FIGS. 102(a) and 102(b) are two images used to test operation of the software based embodiment of the present invention.
Figure 102B:
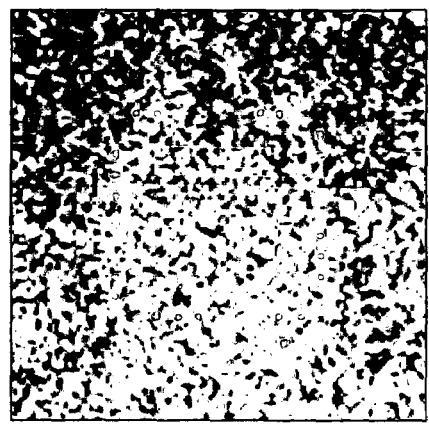
Figure 103A:
FIGS. 103(a) and 103(b) are two images used to test operation of the software based embodiment of the present invention.
Figure 103B:
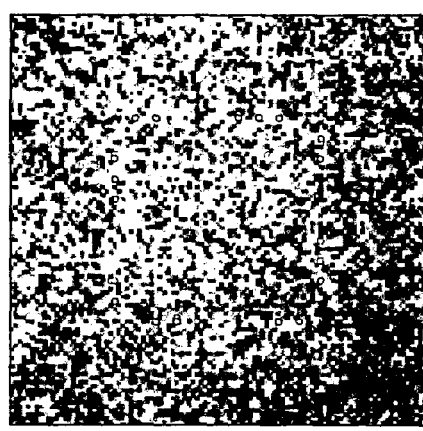
Figure 104A:
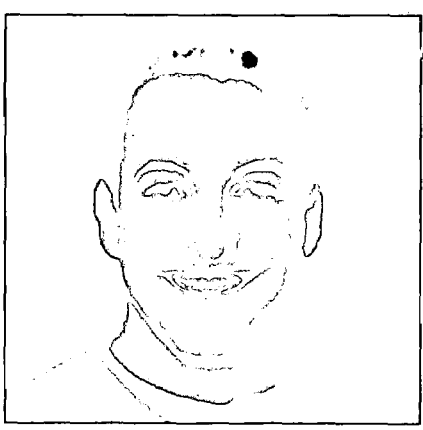
FIGS. 104(a) and 104(b) are two images used to test operation of the software based embodiment of the present invention.
Figure 104B:
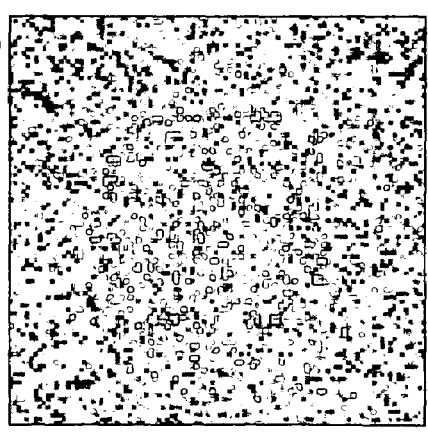

Even in a superposed cortex 103, the present invention is capable of correctly identifying, even when the input file is incomplete or contains errors. The full set of erroneous and partial versions of the image of face 3800 was submitted and identified with strong confidence. The version with light sunglasses 4800 of FIG. 99*a* had an uncertainty of 0 as seen in FIG. 99*b*, dark sunglasses 4900 as seen in FIG. 100*a*, an uncertainty of 1 as seen in FIG. 100*b*, dark sunglasses and a beard 5000 as seen in FIG. 101*a* had an uncertainty of 6 as seen in FIG. 101*b*. The faces with missing lower and upper portions 5100 and 5200 were correctly identified with uncertainty scores of 0 as seen in FIGS. 102*a* and 102*b* and FIGS. 103*a* and 103*b*, respectively. Finally, a completely unknown face 10400 was supplied to the associative memory for identification as seen in FIG. 104*a*. The retrieved IIP 104*b* is unreadable as seen in FIG. 104*b*, the associative memory device rightly determining that the input pattern had not been stored in its memory. The presence of multiple, stored faces does not encourage false positive identification either.

The transcript of this registration and identification session is presented in the Text File "CharliePatent.txt", created on Jan. 19, 2002 (file size 194,560 bytes (190KB)), under the heading "Table 2", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Adaptive Improvements in Identification Performance

Figure 105:
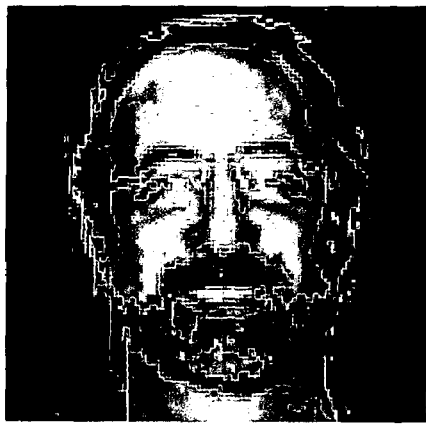
FIG. 105 is an image used to test operation of the software based embodiment of the present invention.
Figure 106:
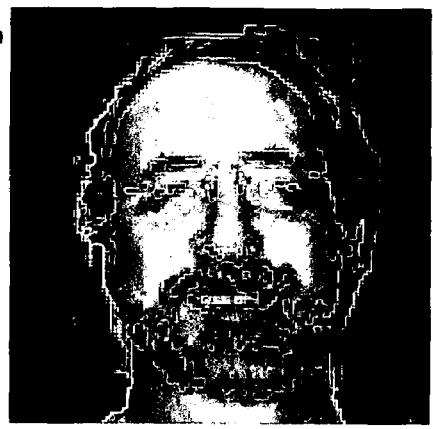
FIG. 106 is an image used to test operation of the software based embodiment of the present invention.

The present invention has the capacity to improve its identification performance by modifying its stored associations in response to feedback, according to the process defined in FIG. 26. A new face 10500 as seen in FIG. 105 is input to an initially empty cortex 103 and registered with an identifier code 702 of 01110000. As expected, when the original face 10500 is submitted for identification, the present invention identifies it correctly, with an uncertainty of 0.

Four other separate photographs 10501, 10502, 10503 and 10504 of the person shown in 10500, taken on different days, are shown in FIGS. 106 through 109. Despite the variations in facial expression, head position, and eyewear, the associative memory device makes correct identifications, with uncertainty estimates of 1, 8, 1, and 1, respectively.

Figure 114:
FIG. 114 is an image used to test operation of the software based embodiment of the present invention.

Pictures of other individuals 11000, 11100, 11200, 11300 and 11400, submitted to the associative memory device for identification as shown in FIGS. 110 through 114, produce uncertainty scores of 109, 136, 134, 19, and 13, respectively. The device correctly rejects four out of the five faces as unknown, but does report a weak false positive identification (uncertainty=13) for FIG. 114, is in the Text File "Charlie-Patent.txt", created on Jan. 19, 2002 (file size 194,560 bytes (190KB)), under the heading "Table 3", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Figure 115:
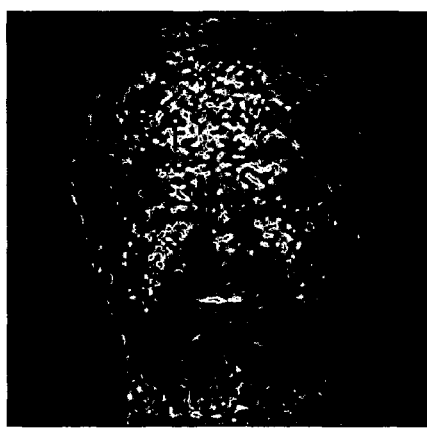
FIG. 115 is an image used to test operation of the software based embodiment of the present invention.

The present invention can use adaptive improvement to correct this false positive. Image 11400 is associated with the IIP for 10500, and this new association is combined with the previous cortex using a factor of −0.1. (That is, this new association is divided by ten to weaken it and is subtracted from the cortex. The weakening constitutes the degree of correction desired.) The effect is to discourage the incorrect response of the present invention to face 114000. The effective generalization, or abstraction, of the face 10500 in the modified cortex, produced by retrieving with the IIP, is shown in FIG. 115 11500. The first four images of face 10500 and that of face 11400 as seen in FIGS. 105 through 108 and FIG. 114, when resubmitted for identification to the associative memory device, produce uncertainty scores of 0, 0, 12, 7, and 21, where the latter score corresponds to the system producing a non-existent (and nonsensical) identification code and thus rejecting 11400 as an unknown person.

Figure 107:
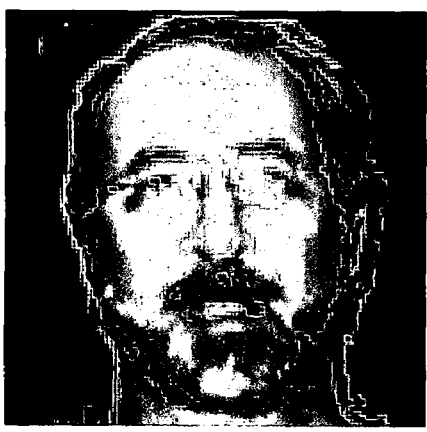
FIG. 107 is an image used to test operation of the software based embodiment of the present invention.
Figure 108:
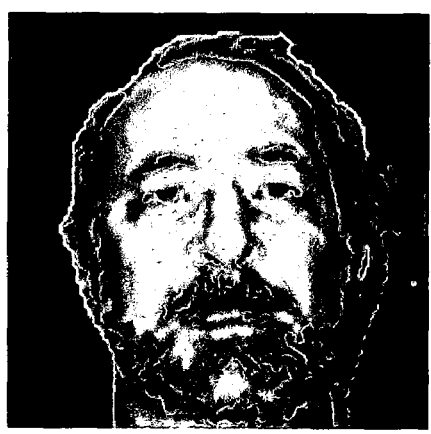
FIG. 108 is an image used to test operation of the software based embodiment of the present invention.
Figure 109:
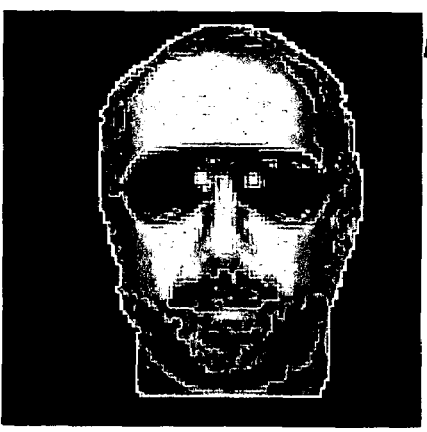
FIG. 109 is an image used to test operation of the software based embodiment of the present invention.
Figure 110:
FIG. 110 is an image used to test operation of the software based embodiment of the present invention.
Figure 111:
FIG. 111 is an image used to test operation of the software based embodiment of the present invention.
Figure 112:
FIG. 112 is an image used to test operation of the software based embodiment of the present invention.
Figure 113:
FIG. 113 is an image used to test operation of the software based embodiment of the present invention.
Figure 116:
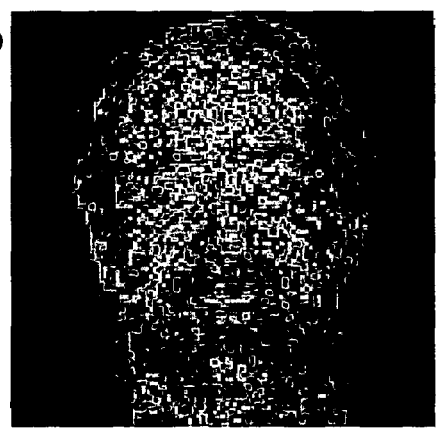
FIG. 116 is an image used to test operation of the software based embodiment of the present invention.

The false positive has been corrected, but, in the process, the latter two identifications of face 10500, though still correct, have weakened, in that their uncertainty scores are higher. In a second iteration of adaptive modification, the image 10502 of FIG. 107 is associated with the IIP of 10500, and the new association is added to the cortex with a strength of +0.25. The new generalization, or abstraction, of the face of 10500 is shown as 11600 in FIG. 116. When resubmitted for identification, the images are all correctly identified, with respective uncertainty scores of 0, 2, 0, and 0. The second modification has significantly reduced the uncertainty scores, even that of 10503 of FIG. 108, which wasn't directly addressed in the corrective process. All unregistered inputs continue to be confidently rejected. The present invention is forming a better concept of the appearance of image 10500, which is manifest in the general trend of scores. The present invention has a powerful capacity to improve its identification performance in response to feedback. A summary of the adaptive test results is presented in the Text File "CharliePatent.txt", created on Jan. 19, 2002 (file size 194,560 bytes (190KB)), under the heading "Table 3", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad. An annotated log of this set of runs is shown in the Text File "CharliePatent.txt", created on Jan. 19, 2002 (file size 194, 560 bytes (190KB)), under the heading "Table 4", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Identifying a Face within a Cluttered Field

Figure 117:
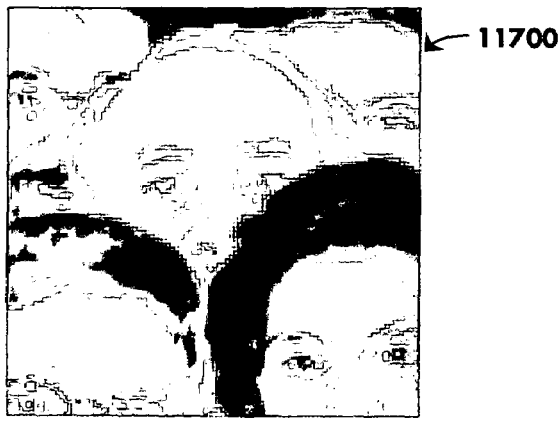
FIG. 117 is an image used to test operation of the software based embodiment of the present invention.

A round of recognition tests demonstrates the present invention's capacity to identify a varying target (in this case, a face) within a cluttered field. The face 10500 of FIG. 105 is learned by the associative memory device. A completely different image 10503 of the same person as that shown in FIG. 105, now completely surrounded (and significantly obscured by) four other faces, is shown in FIG. 117. The present invention is able to correctly identify it. The log for this set of runs is shown in the Text File "CharliePatent.txt", created on Jan. 19,2002 (file size 194,560 bytes (190KB)), under the heading "Table 5", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Handling Translational Shifts

Figure 118A:
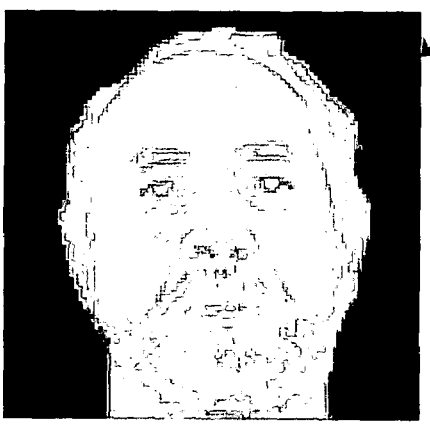
FIGS. 118(a) and 118(b) are two images used to test operation of the software based embodiment of the present invention.
Figure 118B:
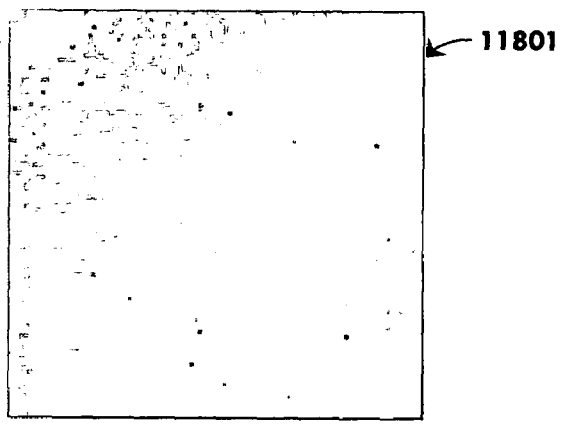
Figure 119A:
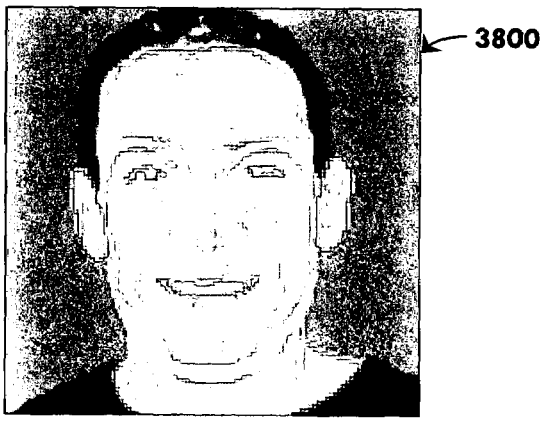
FIGS. 119(a) and 119(b) are two images used to test operation of the software based embodiment of the present invention.
Figure 119B:
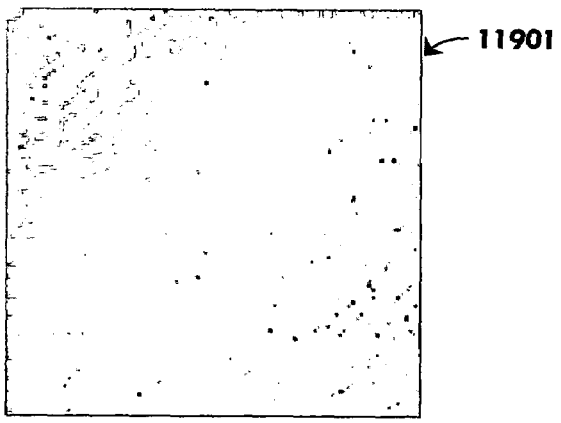

The present invention has the capacity to make correct identifications even when a learned image is substantially shifted in position. For these runs, a Fast Fourier Transform ("FFT") is applied to the input images as a preprocessing step as previously described herein. FIG. 118*a* shows the original image 10503 and FIG. 118*b* shows the pattern 11801 resulting from the preprocessing, which is then used as the input to be learned by the associative memory device and method. The device and method correctly identifies the original image with an uncertainty of 0, and correctly rejects an unknown face 3800 as seen in FIG. 119*a* with an uncertainty of 127. The original image 10503 is then severely shifted, partially truncating it, as seen in FIG. 120*a*. The associative memory device correctly identifies the face with an uncertainty of only 2 as seen in FIG. 120*b*. The log for this set of runs is shown in the Text File "CharliePatent.txt", created on Jan. 19, 2002 (file size 194,560 bytes (190KB)), under the heading "Table 6", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 12 1306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad.

Identifying Rotated Faces

Three dimensional objects look different when viewed from varied directions. The present invention is tolerant of these variations. Images of a face 12100 oriented at angles from 0 to 90 degrees are shown in FIGS. 121 through 130. Each pose angle was learned separately by the present invention and tested against the full angular range of views. So, the associative memory device learned the face at 0 degrees and then was asked to identify all ten images from 0 to 90 degrees, and so on. Even with just a single learned orientation, the present invention was able to identify throughout a significant range of angles. For instance, learning the face at 5 degrees enabled the invention to identify it accurately for all poses between 0 and 45 degrees.

As a further example of the adaptive ability of the present invention, the device and method learned the face at orientations of 0 12100, 60 12700, and 90 13000 degrees. With those three memories registered, the device and method was able to identify the face accurately for all of the supplied poses between 0 and 90 degrees. The log for this set of runs is shown in the Text File "CharliePatent.txt", created on January 19, 2002 (file size 194,560 bytes (190KB)), under the heading "Table 7", on CD-ROM/CD-R compact disc Copy 1 or Copy 2, each of which have the following identifying information on the label: "Associative Memory Device and Method Based on Wave Propagation", "Inventor: Paul Rudolf", "Attorney: Mike Cameron", "Docket: 121306.00002". The machine format is IBM-PC and the operating system is MS-DOS or MS-Windows. The ASCII file can be read through a word processor using the plain text encoding format. Alternatively, the ASCII file can be read using a standard text editor, such as MS-NotePad. incorporated herein by reference. In this table, correct identifications are highlighted with a gray background.

Fingerprint Identification

As previously mentioned, the present invention has the capacity to identify any input that can be written as an array on an input buffer 102. This is essentially any input that can be detected by some device. As an example of the associative memory device and method's capabilities for robust recognition of images other than faces, the results for fingerprint identification are presented, including cases where there is significant data corruption. Six fingerprints as seen in FIGS.

131 through 136 are each associated with their own IIP and are registered superposed by the present invention. The associative memory device and method is able to recognize each with great confidence, calculating an uncertainty of 0 in every instance.

Common, troublesome corruptions of fingerprints are then used to challenge the identification capability of the associative memory device and system. A scar is simulated 13700 as seen in FIG. 137, by imposing a white region on a significant portion, approximately 9% of the total image size, of the image 13100 of FIG. 131. An ink-stained print 13800 is simulated as shown in FIG. 138. Approximately 16% of the original print is covered by the smudges. A partial print 13900 as seen in FIG. 139 is created by blacking out approximately 41% of the original print. FIG. 140 shows a contaminated print 14000 in which a foreign print overlays part of the original. The associative memory device and system is able to identify the print correctly, with an uncertainty of 0 in each case. Details of this set of fingerprint runs are provided in Table 8, which is set forth on a CD-ROM under the filename "Associative Memory Device and Method Tables" filed herewith and incorporated herein by reference.

Signature Recognition

Another example of the general applicability of the present invention is provided by addressing the problem of machine recognition of written signatures. The problem here is that there is some similarity each time a signature is written, but there is also a variability. A recognition system must be able to identify the relevant features which are common to the signature, and to "forgive" those features which vary. The present invention is able to discern those features by itself.

Ten different examples of authentic, written signatures of the name "Stephen" are shown in FIGS. 141 through 150 along with a foreign signature in FIG. 151. In the initial run, the signature 14100 of FIG. 141 is registered with the associative memory device. The ability of the device to correctly identify the other signatures is generally poor, presumably due to normal variability and an inability on the part of the present invention to discern the significant features to "concentrate on." The present invention's adaptive learning capacity allows it to generate an abstraction, or generalization, of what the signature looks like. In a second run, the first 14100 and fourth 14400 "Stephen" signatures are registered in the system with better results. By the third run, the first 14100, fourth 14400, and sixth 14600 "Stephen" signatures are learned with perfect performance, and the signature of the name "Paul" 15100 is correctly rejected. The associative memory device has determined, through experience, what features of each signature are relevant and which are not. The present invention's adaptive capabilities are shown to be well-suited to learning what variability is acceptable in input patterns in general. The results of these signature tests are provided in a summary table as Table 9 which is set forth on a CD-ROM under the filename "Associative Memory Device and Method Tables" filed herewith and incorporated herein by reference, where correct identifications and rejections are highlighted with a gray background, and in a detailed log as shown on Table 10, which is set forth on a CD-ROM under the filename "Associative Memory Device and Method Tables" filed herewith and incorporated herein by reference.

For these examples, only the visual appearance of the signatures was used for identification purposes. The present invention is capable of considering a wide variety of features. To further reduce the possibility of error, it is eminently feasible to use multiple inputs such as visual appearance of the signature, timing data taken during the signature (i.e., velocities), and pen-up/pen-down times and locations to make the verification process even more rigorous. Similar generalities to other types of input are apparent to those skilled in the art.

The essential elements of an associative memory device and method have been disclosed herein, including its structure, the supporting theoretical background, flowcharts and descriptions for its operations, and multiple possible embodiments. Results from a working computer emulation of the present invention were also provided.

In some embodiments of the present invention, the methods described are used to output predictions as to one or more attributes of patterns whose characteristics are stored in the cortex 103. In other embodiments of the present invention, other methods are used to correlate inputted patterns to data stored on the cortex 103. Although certain specific embodiments are described hereinabove with reference to image recognition applications, those skilled in the art will appreciate the wide range of applications of and variations on the methodology described herein, all of which are within the scope of the present invention. It will thus be appreciated that the embodiments described above are cited by way of example, and the full scope of the invention is limited only by the claims.

No Copyright License is Implied

A portion of the disclosure of this patent contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

What is claimed is:

1. An associative memory device, comprising:
   an input device for accepting a set or a plurality of sets of input information;
   one or a plurality of input buffers;
   the input device being coupled to, or integrated into, the input buffer;
   a means for transporting the input information to the input buffer;
   the input buffer being adapted to transform the input information into corresponding sets of complex-valued wave fields as wave-modeled input data;
   one or a plurality of recording structures, referred to as a cortex;
   the input buffer being further adapted to propagate the wave-modeled input data to the cortex;
   the cortex being adapted to associate the desired sets of wave-modeled input data through an invertible mathematical function or operation, thus creating one or a plurality of associations within the cortex;
   the cortex being further adapted to store the associations in a distributed manner across a cortex surface with other previously stored associations;
   the cortex being further adapted to form and store linear combinations of associations;
   an input device being operable to accept one or a plurality of retrieval prompts, referred to as a prompt;
   the input buffer being operable to transform the prompt into a corresponding set of complex-valued wave fields, as a wave-modeled prompt;
   the input buffer being operable to propagate the wave-modeled prompt to the cortex;

the cortex being operable to cause the wave-modeled prompt to mathematically operate upon the previously stored associations using a de-association operation that is the inverse of that originally used to form the associations;

the cortex being adapted to store the wave-modeled prompt with other previously stored associations and wave modeled prompts;

a means for the result of the mathematical de-association operation, representing a wave-modeled retrieval, to propagate from the cortex to one or a plurality of output buffers, said output buffer being referred to with the input buffer as the buffers;

the output buffer being operable to transform the wave-modeled retrieval into output data; and a means for using control data to provide overall control of the associative memory device.

2. The associative memory device of claim 1, wherein the input device further comprises a module for pre-processing the input information.

3. The associative memory device of claim 2, wherein the pre-processing module is adapted to assign phase information to the input information.

4. The associative memory device of claim 1, further comprising a module for performing post-processing on the wave-modeled retrieval or output data.

5. The associative memory device of claim 1, further comprising a means for exporting the wave-modeled retrieval or output data to one or more output devices.

6. The associative memory device of claim 1, further comprising a means for retaining input information, wave-modeled input data, prompts, wave modeled prompts, wave modeled retrieval and output data in a volatile memory structure.

7. The associative memory device of claim 1, further comprising a means for processing the input information, wave-modeled input data, prompt, wave-modeled prompt, wave-modeled retrieval, output data or control data.

8. The associative memory device of claim 1 further comprising a permanent storage device for saving the input information, wave-modeled input data, prompt, wave-modeled prompt, wave-modeled retrieval, output data or control data.

9. The associative memory device of claim 1, wherein physical or electronic stimuli comprise the input information.

10. The associative memory device of claim 9, wherein the physical or electronic stimuli that are processed further comprises images, fingerprints, signatures, faces, sounds, gas molecules, liquids or chemical compositions.

11. The associative memory device of claim 9, wherein a sensor or plurality of sensors are operable to accept the physical or electronic stimuli.

12. The associative memory device of claim 11, wherein the sensors further comprise a camera, scanner, keyboard, computer, mouse, analog recorder, digital recorder, odor detector, digital signature capture apparatus, or microphone.

13. The associative memory device of claim 1, wherein the input buffer is operable to:
transform input information into corresponding sets of complex-valued wave fields;
transform prompts into corresponding sets of complex-valued wave fields;
propagate wave-modeled input data to the cortex; and
propagate wave-modeled prompts to the cortex.

14. The associative memory device of claim 1, wherein output buffer is operable to:
accept the wave-modeled retrieval propagated from the cortex;
transform the wave-modeled retrieval from a complex-valued wave fields to a data format.

15. The associative memory device of claim 1, wherein the input buffer and the output buffer further comprise a single buffer unit adapted to operate in either an input mode, an output mode, or both simultaneously.

16. The associative memory device of claim 1, wherein the cortex further comprises a plurality of interconnected modules to perform associated memory operations further comprising:
a module to receive and store sets of complex-valued wave fields propagated from the input buffer;
a second module to form and store associations with propagated wave fields using an invertible mathematical operation;
a module to form and store linear combinations of associations;
a module to receive a wave-modeled prompt;
a module to mathematically operate upon the previously stored associations using a de-association function that is the inverse of that originally used to form the associations;
a module to generate the complex conjugate of the de-associated wave fields; and
a module to propagate the results of the operation to the output buffer.

17. The associative memory device of claim 1, wherein the buffers further comprise:
physical antenna arrays;
computer hardware which is coupled to the physical antenna arrays; and
computer software being adapted to program the computer hardware to perform wave modeling, wave propagation, wave reception and wave transformation operations.

18. The associative memory device of claim 17, wherein the physical antenna arrays further comprise:
multiple receiving antennas with corresponding receiver memory elements;
multiple broadcast antennas with corresponding broadcast memory elements;
a receiver array controller; and
a broadcast array controller.

19. The associative memory device of claim 17, wherein the computer hardware further comprises;
an analog-to-digital converter with an input and output;
a device driver coupled to the input of the analog-to-digital converter;
a preprocessor module with an input and output;
the input to the preprocessor module coupled to the output of the analog-to-digital converter;
a phase assignment module with an input and an output;
the output of the preprocessor module coupled to an input of the phase assignment module;
a central processing unit (CPU);
the CPU having a main buffer memory;
the output of the phase assignment module being coupled to or integral to the CPU;
a post-processor module with an input and output; and
the CPU being coupled to the input of the post-processor module.

20. The associative memory device of claim 1, wherein the buffer further comprises:
computer hardware with an input and output;
computer software adapted to program the computer hardware;

a device driver, with an input and an output, the output of the device driver being coupled to the input of the computer hardware;
an analog-to-digital converter being integral to the computer hardware operable to convert analog input information into digital input information;
a pre-processor module, the pre-processor module being integral to the computer hardware or configured therein with the computer software and being operable to process input information;
a phase assignment module, the phase assignment module being integral to the computer hardware or configured therein with the computer software, and being operable for conditioning the input information into wave-modeled input data;
a post-processor module, the post-processor module being integral to the computer hardware or configured therein with the computer software and being operable to transform the wave-modeled retrieval into output data;
a wave propagation calculation module, the wave propagation calculation module being integral to the computer hardware or configured therein with the computer software and being operable to calculate wave propagation properties;
the computer hardware having a main buffer memory for storing the input information, wave-modeled input data, prompt, wave-modeled prompt, wave-modeled retrieval, output data or control data; and
buffer data arrays comprising both receiver memory elements and broadcast memory elements being integral to the computer hardware.

21. The associative memory device of claim 1, wherein the buffers further comprise:
an application-specific integrated circuit (ASIC) or a field programmable gate array (FPGA) with an input and output;
a device driver, with an input and an output, the output of the device driver being coupled to the input of the ASIC or FPGA;
an analog-to-digital converter being integral or external to the ASIC or FPGA operable to convert analog input information into digital input information,
a pre-processor module, the pre-processor module being integral or external to the ASIC or FPGA and being operable to process input information;
a phase assignment module, the phase assignment module being integral or external to the ASIC or FPGA and being operable to condition the input information into wave-modeled input data;
a post-processor module, the post-processor module being integral or external to the ASIC or FPGA and being operable to transform the wave-modeled retrieval into output data;
a wave propagation calculation module, the wave propagation calculation module being integral or external to the ASIC or FPGA and being operable to calculate wave propagation properties;
the ASIC or FPGA having a main buffer memory for storing the input information, wave-modeled input data, prompt, wave-modeled prompt, wave-modeled retrieval, output data or control data; and
buffer data arrays comprising both receiver memory elements and broadcast memory elements being integral or external to the ASIC or FPGA.

22. The associative memory device of claim 1, wherein the buffers further comprise:
an analog computer system utilizing a plurality of operational amplifiers, said analog computer having an input and output;
a device driver, with an input and an output;
the output of the device driver being coupled to the input of the analog computer;
a pre-processor module, the pre-processor module being integral or external to the analog computer and being operable to process input information;
a phase assignment module, the phase assignment module being integral or external to the analog computer and being operable to condition the input information into wave-modeled input data;
a post-processor module, the post-processor module being integral or external to the analog computer and being operable to transform the wave-modeled retrieval into output data;
a wave propagation calculation module, the wave propagation calculation module being integral or external to the analog computer and being operable to calculate wave propagation properties;
the analog computer having a main buffer memory for storing the input information, wave-modeled input data, prompt, wave-modeled prompt, wave-modeled retrieval, output data or control data; and
buffer data arrays comprising both receiver memory elements and broadcast memory elements being integral to the analog computer.

23. The associative memory device of claim 1, wherein the cortex further comprises:
a physical antenna array;
a processing unit with an input and output;
the physical antenna array being coupled to the input of the processing unit;
the physical antenna array having a receiver array controller, a broadcast array controller, multiple receiving antennas with corresponding receiver memory elements, one set of receiver memory elements for each buffer element in the associative memory device, and multiple broadcast antennas with corresponding broadcast memory elements;
an association module, the association module being integral to the processing unit;
a de-association module, the de-association module being integral to the processing unit;
a linear combination module, the linear combination module being integral to the processing unit;
a complex conjugation module, the complex conjugation module being integral to the processing unit;
a main cortex memory being integral to the processing unit, the main cortex memory further comprising association memory elements; de-association memory elements; and linear combination memory elements.

24. The associative memory device of claim 23, wherein the cortex further comprises:
a wave propagation calculation module, the wave propagation calculation module being integral to the processing unit and being operable to calculate wave propagation properties; and
cortex data arrays comprised of receiver memory elements, one set of receiver memory elements for each buffer in the associative memory system, broadcast memory elements, association memory elements, de-association memory elements, and linear combination memory elements.

25. The associative memory device of claim 23, wherein the processing unit further comprises a programmable computer hardware and computer software system, an application-specific integrated circuit (ASIC) or a field programmable gate array (FPGA).

26. The associative memory device of claim 23, wherein the processing unit further comprises an analog computer system utilizing a plurality of operational amplifiers.

27. The associative memory device of claim 23, wherein the processing unit further comprises a programmable computer hardware and computer software system, an application-specific integrated circuit (ASIC) a field programmable gate array (FPGA) or an analog computer system utilizing a plurality of operational amplifiers.

28. The associative memory device of claim 1, wherein the implementation of the associative memory device is mathematically modeled with wave-modeled input data on the buffer being denoted by:

$P_i, P_j, \ldots, P_l$;

the propagated forms of the wave-modeled input data on the cortex being denoted by:

$P'_i, P'_j, \ldots, P'_l$;

an association formed from the wave-modeled input data being denoted by:

$<P'_i, P'_j, \ldots, P'_l> \equiv f(P'_i, P'_j, \ldots, P'_l)$, in which the association operation is defined by an invertible mathematical function $f$ and a linear combination of associations being denoted by:

$\Sigma_m \alpha_m <P'_{i,m}, P'_{j,m}, \ldots, P'_{l,m} 22 = \Sigma_m \alpha_m f(P'_{i,m}, P'_{j,m} \ldots P'_{l,m})$, where $\alpha_m$ is a weighting factor for the $m^{th}$ association.

29. The associative memory device of claim 28, wherein the association function $f$ corresponds to the mathematical operation of multiplication such that two propagated input patterns $P'_i = \psi_m$ and $P'_j = \phi_m$ are associated by multiplying the complex amplitudes of the two wave functions, point by point, at each location $r_C$ in the cortex, with the association represented mathematically as:

$\psi_m(r_C)\phi_m(r_C)$ and with all associations previously stored, C, written as the linear combination of associations:

$$C(r_C) = \sum_m \alpha_m \psi_m(r_C)\phi_m(r_C).$$

30. The associative memory device of claim 28, wherein the association function $f$ corresponds to the mathematical operation of multiplication of wave fields, one or more of which may be point-wise normalized, the rest non-normalized, such that two propagated input patterns $P'_i = \psi_m$ and $P'_j = \phi_m$ are associated by multiplying the point-wise complex amplitudes of the two wave functions, at each location $r_C$ in the cortex with the association represented mathematically as:

$\exp[i \, Arg(\psi(r_C))]\exp[i \, Arg(\phi(r_C))]$ or $\psi(r_C)\exp[i \, Arg(\phi(r_C))]$.

where $Arg(z)$ is the phase angle for a complex value z, and with all associations previously stored written as the linear combination of associations:

$C(r_C) = \Sigma_m \alpha_m \exp[i \, Arg(\psi_m(r_C))]\exp[i \, Arg(\phi_m(r_C))]$ or $C(r_C) = \Sigma_m \alpha_m \psi_m(r_C) \exp[i \, Arg(\phi_m(r_C))]$ 31. The associative memory device of claim 1, wherein the implementation of the associative memory device is mathematically modeled with the wave-modeled prompt on the input buffer being denoted by:

$R_i, R_j, \ldots, R_l$;

the respective propagated forms of the wave-modeled prompt on the cortex being denoted by:

$R'_i, R'_j, \ldots, R'_l$;

the wave-modeled prompt being operable to probe the plurality of previously stored associations using $f^{-1}$, the inverse of the function used originally to form the associations; and the resulting de-associated wave D' being denoted by:

$$D' = <C|R'_i, R'_j, \ldots, R'_l> = f^{-1}(C|R'_i, R'_j, \ldots, R'_l) = f^{-1}(\Sigma_m \alpha_m f(P'_{i,m}, P'_{j,m} \ldots P'_{l,m})|R'_i, R'_j, \ldots, R'_l);$$

where $\alpha_m$ is a weighting factor for the $m^{th}$ association, a de-association is denoted by angle brackets with a vertical bar separating the first argument, the entity being probed, from the second argument, the set of one or more prompting fields; and D represents the retrieval formed when the complex conjugate of the de-association (D'*) is propagated from the cortex to the output buffer.

32. The associative memory device of claim 31 further comprising multiplication for the association operation, and the inverse function, $f^{-1}$, division for the retrieval operation, wherein if a wave field $\phi_n$ is used to probe the previously stored associated pairs in the cortex, then the retrieval process is denoted by:

$$C\phi_n = \sum_m \alpha_m \psi_m \phi_m I \phi_n$$
$$= \sum_m \alpha_m \psi_m \phi_m \phi_n^{-1}$$
$$= \alpha_n \psi_n + \sum_{m \neq n} \alpha_m \psi_m \phi_m \phi_n^{-1},$$

further, given that the inverse operator I corresponds to division, the retrieval process is more specifically denoted by:

$$C\phi_n = \sum_m \frac{\alpha_m \psi_m \phi_m}{\phi_n} = \alpha_n \psi_n + \sum_{m \neq n} \frac{\alpha_m \psi_m \phi_m}{\phi_n}$$

where C contains the linear combination of previously stored associations, and, at each point on the cortex $r_c$ on which C is defined, the value of C is divided by the value of $\phi_n$, with the retrieval, $\alpha_n \psi_n$, being propagated to the output buffer and then to the output device.

33. The associative memory device of claim 30, further comprising:

a retrieval operation, multiplication corresponding to the association operation, using complex conjugation as the inverse function $f^{-1}$, such that if the point-wise normalized wave field $\phi_n$, is used to probe the previously stored associated pairs in the cortex;

the probe process being denoted by:

$$C\phi_n = \sum_m \alpha_m \exp[i Arg(\psi_m)]\exp[i Arg(\phi_m)]I\exp[i Arg(\phi_n)]$$
$$= \sum_m \alpha_m \exp[i Arg(\psi_m)]\exp[i Arg(\phi_m)]\exp[i Arg(\phi_n)]^{-1}$$

-continued or $$C\phi_n = \sum_m \alpha_m \psi_m \exp[i\text{Arg}(\phi_m)] I \exp[i\text{Arg}(\phi_n)]$$
$$= \sum_m \alpha_m \psi_m \exp[i\text{Arg}(\phi_m)] \exp[i\text{Arg}(\phi_n)]^{-1}$$

further, given that the inverse operator I, which embodies the inverse function $f^{-1}$, corresponds to complex conjugation, the probe process more specifically by:

$$C\phi_n = \sum_m \alpha_m \exp[i\text{Arg}(\psi_m)] \exp[i\text{Arg}(\phi_m)] \exp[-i\text{Arg}(\phi_n)]$$
$$= \alpha_n \exp[i\text{Arg}(\psi_m)] + \sum_{m \neq n} \alpha_m \exp(i[\text{Arg}(\psi_m) + \text{Arg}(\phi_m) - \text{Arg}(\phi_n)])$$

or $$C\phi_n = \sum_m \alpha_m \psi_m \exp[i\text{Arg}(\phi_m)] \exp[-i\text{Arg}(\phi_n)]$$
$$= \alpha_n \psi_n + \sum_{m \neq n} \alpha_m \psi_m \exp(i[\text{Arg}(\phi_m) - \text{Arg}(\phi_n)])$$

where C contains the linear combination of previously stored associations, and, at each point $r_c$ on the cortex on which C is defined, the value of C is multiplied by the complex conjugate of the exponential of the phase angle of the prompt $\phi_n$, with the retrieval being propagated to the output buffer and to the output device.

34. The associative memory device of claim 1, wherein the means of transport of input information, a prompt and a retrieval is through the propagation of physical waves by antenna arrays and supporting computer hardware and computer software.

35. The associative memory device of claim 1, further comprising computer hardware and computer software operable to transport input information, prompt and retrieval through the simulation of wave propagation in which sets of data representing input information, prompt and retrieval are input, pre-processed, and then represented as wave functions $\xi_i(r)$ that are time-harmonic solutions to the wave equation:

$$(\nabla^2 + k^2)\xi_i(r) = 0;$$

in which the propagation of a wave away from a surface (for example, a buffer or a cortex) is formally and exactly described by the Kirchhoff integral:

$$\xi_i(r) = \oiint dS_C \cdot \{\xi_i(r_C)\nabla_C G(r,r_C) - G(r,r_C)\nabla_C \xi_i(r_C)\}$$

where the surface $S_C$ is closed and completely surrounds a destination point r, the gradient operates only on coordinates on the source surface $S_C$, and $G(r,r_C)$ is a Green's function; and in which the above continuous integral is discretized for numerical implementation as:

$$\xi(r) = \sum_{\text{all source points}} \Delta S_C \cdot \{\xi(r_C)\nabla_C G(r, r_C) - G(r, r_C)\nabla_C \xi(r_C)\}$$

thus enabling digital input, output, and computation.

36. The associative memory device of claim 35, wherein said computer hardware and computer software comprises a combination of hardwired wave propagation circuitry and software running on computer hardware.

37. The associative memory device of claim 1, wherein the wave-modeled retrieval and output data corresponds to any of the sets of wave-modeled input data propagated to the cortex and associated with other data.

38. An associative memory device, comprising:
one or a plurality of input devices;
one or a plurality of input buffers;
one or a plurality of recording structures, referred to as a cortex;
one or a plurality of output buffers, referred to with the input buffer as the buffers;
one or a plurality of output devices;
one or a plurality of overall system controllers;
one or a plurality of volatile memory units;
one or a plurality of permanent storage devices, and one or a plurality of processing units;
the input device operable to sense input information comprising physical or electronic stimuli;
the input device being coupled to the input buffer and being further operable to transport the input information to the input buffer;
the input buffer operable to transform the input information into corresponding sets of complex-valued wave fields;
the input buffer being further operable to pre-process the input information and assign phase information;
the input buffer being further operable to propagate the sets of complex-valued wave fields representing the input information and referred to as wave-modeled input data to the cortex;
the cortex being operable to accept the wave-modeled input data;
the cortex being adapted to retain the wave-modeled input data from the input buffer in a distributed manner across a cortex surface;
the cortex being further operable to associate the desired sets of wave-modeled input data through an invertible mathematical function or operation, thus creating one or more associations within the cortex;
the cortex being further operable to create and store linear combinations of associations;
the input device, when enabled, being further operable to sense additional sets of input information comprising physical or electronic stimuli or other input data to act as a prompt or prompts to make a retrieval or retrievals;
the input buffer being further operable to transform the prompting set of input information into corresponding sets of complex-valued wave fields, referred to as the wave-modeled prompt;
the input buffer being further operable to preprocess the prompting set of input information and assign phase information;
the input information to be retrieved from the cortex comprising any of the sets of physical or electronic stimuli stored in previously created associations, as determined by the operator;
the input buffer, when enabled, being further operable to propagate the wave-modeled prompt to the cortex;
the cortex being operable to accept a probe from the input buffer carried by a wave-modeled prompt using a de-association function or operation that is the inverse of that originally used to form the association;
the cortex being further operable to propagate the results of the de-association, representing a retrieval, to the output buffer;

the output buffer being adapted to receive, post-process, and export the retrieval to one or more output devices in human or machine-readable form.

39. The associative memory device of claim 38, the buffer and cortex are operable to generate and propagate wave fronts within the associative memory device.

40. The associative memory device of claim 38, wherein a first set of buffers processes images, a second set of buffers processes sounds, a third set of buffers processes representations of gas molecules and a fourth set of buffers processes chemical compositions.

41. The associative memory device of claim 38, wherein the cortex is adapted to store a plurality of sensed physical or electronic data in a distributed manner.

42. The associative memory device of claim 38, wherein the input buffer, cortex and output buffer are adapted to receive and process a plurality of sensed physical or electronic stimuli simultaneously.

43. The associative memory device of claim 38, adapted to perform autonomous pattern recognition or identification operations.

44. The associative memory device of claim 43, further comprising:
- an internal identification pattern (IIP) buffer, operable to store unique, machine-readable patterns for autonomous identification purposes;
- an IIP generator module, operable to create a unique, machine-readable pattern given a unique identification code chosen automatically or supplied by a system operator;
- the IIP generator module, further operable to link each specific IIP to sets of information (such as data files) to be recalled, sets of commands to be executed or communicated upon a positive identification, and threshold confidence levels required for execution of each particular command or sets of commands;
- an IIP reader module, operable to read autonomously a retrieved pattern and deduce an identification code that corresponds to a previously created IIP;
- the IIP reader module further operable to provide a confidence estimate based on relative certainty or uncertainty of its identification;
- an autonomous execution module, operable to receive the identification result and confidence estimate from the IIP reader module, to recall the associated files or other information related to the reported identification code, and further to execute or communicate the appropriate commands based on the identification code, the reported confidence estimate, and the predefined confidence levels required for the relevant commands;
- an adaptive learning module, operable to modify the plurality of associations stored in the cortex in response to feedback on the accuracy of its identification, so as to improve its recognition performance, in which the general adaptation process is defined by the following equation for the case of a false positive identification of prompting pattern $R_i$:

$$C_{new} = C_{old} - \beta_i < R_i, I_j >$$

where $C_{old}$ is the original cortex value, $C_{new}$ is the cortex value after adaptive learning, $\beta_i$ is a positive weighting factor, and $I_j$ is the incorrectly retrieved IIP;

and where the general adaptation process is defined by the following equation for the case of a false negative or overly weak positive identification of prompting pattern $R_i$:

$$C_{new} = C_{old} + \beta_i < R_i - \gamma_i P_i, I_i >$$

where $C_{old}$ is the original cortex value, $C_{new}$ is the cortex value after adaptive learning, $\beta_i$ is a positive weighting factor, $I_i$ is the desired IIP, $P_i$ is the original pattern associated with $I_i$, and $\gamma_i$ is 0 for augmentation mode and 1 for replacement mode.

45. The associative memory device of claim 44, further comprising computer hardware and software.

46. The associative memory device of claim 44, further comprising one or a plurality of application-specific integrated circuits (ASICS) or field programmable gate arrays (FPGAs).

47. The associative memory device of claim 44 further comprising an analog computer system utilizing a plurality of operational amplifiers.

48. The associative memory device of claim 44, wherein the pattern recognized is an image, human face, fingerprint, signature, gas molecule, substance, liquid or chemical composition.

49. The associative memory device of claim 43, wherein a sensor or plurality of sensors comprise the input device.

50. The associative memory device of claim 49, wherein the sensor comprises a film still or moving picture camera, still or moving video camera, scanner, a device to convert gas molecules into signals, or a microphone.

51. The associative memory device of claim 50, wherein the device to convert gas molecules into signals comprises directly heated short chromatography columns, cooled sample traps, surface acoustic wave (SAW) interferometric vapor detectors.

52. The associative memory device of claim 43, wherein the input data representing physical stimuli comprises analog or discrete electrical signals.

53. The associative memory device of claim 43, wherein the means of information transport is through the propagation of physical waves by antenna arrays and supporting hardware and software.

54. The associative memory device of claim 43, wherein the means of information transport is through the simulation of wave propagation in computer software operating on computer hardware, in which sets of data are input, pre-processed, and then represented as wave functions $\xi_i(r)$ that are time-harmonic solutions to the wave equation:

$$(\nabla^2 + k^2)\xi_i(r) = 0;$$

in which the propagation of a wave away from a surface such as a buffer or the cortex is formally and exactly described by the Kirchhoff integral:

$$\xi_i(r) = \oint dS_C \cdot \{\xi_i(r_C)\nabla_C G(r,r_C) - G(r,r_C)\nabla_C \xi_i(r_C)\}$$

where the surface $S_C$ is closed and completely surrounds a destination point r, the gradient operates only on coordinates on the source surface $S_C$, and $G(r,r_C)$ is a Green's function; and in which the above continuous integral is discretized for numerical implementation as $$\xi(r) = \sum_{all\ source\ points} \Delta S_C \cdot \{\xi(r_C)\nabla_C G(r, r_C) - G(r, r_C)\nabla_C \xi(r_C)\}$$

thus enabling digital input, output, and computation.

55. The associative memory device of claim 43, wherein said computer hardware and computer software comprises a combination of hardwired wave propagation circuitry and software running on computer hardware.

56. The associative memory device of claim 43, wherein the wave-modeled retrieval and output data corresponds to any of the sets of wave-modeled input data propagated to the cortex and associated with other data.

57. The associative memory device of claim 43, wherein the buffers further comprise:
   physical antenna arrays;
   computer hardware which is coupled to the physical antenna arrays; and
   computer software being adapted to program the computer hardware to perform wave modeling, wave propagation, wave reception and wave transformation operations.

58. The associative memory device of claim 57, wherein the physical antenna arrays further comprise:
   multiple receiving antennas with corresponding receiver memory elements;
   multiple broadcast antennas with corresponding broadcast memory elements;
   a receiver array controller; and
   a broadcast array controller.

59. The associative memory device of claim 57, wherein the computer hardware further comprises:
   an analog-to-digital converter with an input and output;
   a device driver coupled to the input of the analog-to-digital converter;
   a preprocessor module with an input and output;
   the input to the preprocessor module coupled to the output of the analog-to-digital converter;
   a phase assignment module with an input and an output;
   the output of the preprocessor module coupled to an input of the phase assignment module;
   a central processing unit (CPU);
   the CPU having a main buffer memory;
   the output of the phase assignment module being coupled to or integral to the CPU;
   a post-processor module with an input and output; and
   the CPU being coupled to the input of the post-processor module.

60. The buffers of claim 43, further comprising:
   computer hardware with an input and output;
   computer software adapted to program the computer hardware;
   a device driver, with an input and an output, the output of the device driver being coupled to the input of the computer hardware;
   an analog-to-digital converter being integral to the computer hardware operable to convert analog input information into digital input information,
   a pre-processor module, the pre-processor module being integral to the computer hardware or configured therein with the computer software and being operable to process input information;
   a phase assignment module, the phase assignment module being integral to the computer hardware or configured therein with the computer software, and being operable for conditioning the input information into wave-modeled input data;
   a post-processor module, the post-processor module being integral to the computer hardware or configured therein with the computer software and being operable to transform the wave-modeled retrieval into output data;
   a wave propagation calculation module, the wave propagation calculation module being integral to the computer hardware or configured therein with the computer software and being operable to perform wave propagation calculations;
   the computer hardware having a main buffer memory for storing the input information, wave-modeled input data, prompt, wave-modeled prompt, wave-modeled retrieval, output data or control data; and
   buffer data arrays comprising both receiver memory elements and broadcast memory elements being integral to the computer hardware.

61. The associative memory device of claim 43, wherein the buffers further comprise:
   an application-specific integrated circuit (ASIC) or a field programmable gate array (FPGA) with an input and output;
   a device driver, with an input and an output,
   the output of the device driver being coupled to the input of the ASIC or FPGA;
   an analog-to-digital converter being integral or external to the ASIC or FPGA operable to convert analog input information into digital input information,
   a pre-processor module, the pre-processor module being integral or external to the ASIC or FPGA and being operable to process input information;
   a phase assignment module, the phase assignment module being integral or external to the ASIC or FPGA and being operable to condition the input information into wave-modeled input data;
   a post-processor module, the post-processor module being integral or external to the ASIC or FPGA and being operable to transform the wave-modeled retrieval into output data;
   a wave propagation calculation module, the wave propagation calculation module being integral or external to the ASIC or FPGA and being operable to perform wave propagation calculations;
   the ASIC or FPGA having a main buffer memory for storing the input information, wave-modeled input data, prompt, wave-modeled prompt, wave-modeled retrieval, output data or control data; and
   buffer data arrays comprising both receiver memory elements and broadcast memory elements being integral or external to the ASIC or FPGA.

62. The associative memory device of claim 43, wherein the buffers further comprise:
   an analog computer system utilizing a plurality of operational amplifiers, said analog computer having an input and output;
   a device driver, with an input and an output;
   the output of the device driver being coupled to the input of the analog computer;
   a pre-processor module, the pre-processor module being integral or external to the analog computer and being operable to process input information;
   a phase assignment module, the phase assignment module being integral or external to the analog computer and being operable to condition the input information into wave-modeled input data;
   a post-processor module, the post-processor module being integral or external to the analog computer and being operable to transform the wave-modeled retrieval into output data;
   a wave propagation calculation module, the wave propagation calculation module being integral or external to the analog computer and being operable to perform wave propagation calculations;
   the analog computer having a main buffer memory for storing the input information, wave-modeled input data, prompt, wave-modeled prompt, wave-modeled retrieval, output data or control data; and buffer data arrays comprising both receiver memory elements and broadcast memory elements being integral to the analog computer.

63. The cortex of claim 43, further comprising:
a physical antenna array;
a processing unit with an input and output;
the physical antenna array being coupled to the input of the processing unit;
the physical antenna array having a receiver array controller, a broadcast array controller, multiple receiving antennas with corresponding receiver memory elements, one set of receiver memory elements for each buffer element in the associative memory device, and multiple broadcast antennas with corresponding broadcast memory elements;
an association module, the association module being integral to the processing unit;
a de-association module, the de-association module being integral to the processing unit;
a linear combination module, the linear combination module being integral to the processing unit;
a complex conjugation module, the complex conjugation module being integral to the processing unit;
a main cortex memory being integral to the processing unit, the main cortex memory further comprising association memory elements; de-association memory elements; and linear combination memory elements.

64. The associative memory device of claim 63, wherein the cortex further comprises:
a wave propagation calculation module, the wave propagation calculation module being integral to the processing unit and being operable to perform wave propagation calculations; and
cortex data arrays comprised of receiver memory elements, one set of receiver memory elements for each buffer in the associative memory system, broadcast memory elements, association memory elements, de-association memory elements, and linear combination memory elements.

65. The associative memory device of claim 64, wherein the processing unit further comprises a programmable computer hardware and computer software system, an application-specific integrated circuit (ASIC) or a field programmable gate array (FPGA).

66. The associative memory device of claim 64, wherein the processing unit further comprises an analog computer system utilizing a plurality of operational amplifiers.

67. The associative memory device of claim 64, wherein the processing unit further comprises a programmable computer hardware and computer software system, an application-specific integrated circuit (ASIC) a field programmable gate array (FPGA) or an analog computer system utilizing a plurality of operational amplifiers.

68. The associative memory device of claim 43, wherein the implementation of the associative memory device is mathematically modeled with wave-modeled input data on the buffer being denoted by:
$P_i, P_j, \ldots, P_l$;
the propagated forms of the wave-modeled input data on the cortex being denoted by:
$P'_i, P'_j, \ldots, P'_l$;
an association formed from the wave-modeled input data being denoted by:
$<P'_i, P'_j, \ldots, P'_l> \equiv f(P'_i, P'_j, \ldots, P'_l)$,
in which the association operation is defined by an, invertible mathematical function $f$ and a linear combination of associations being denoted by:

$\Sigma_m \alpha_m <P'_{i,m}, P'_{j,m}, \ldots, P'_{l,m}> = \Sigma_m \alpha_m f(P'_{i,m}, P'_{j,m} \ldots P'_{l,m})$, where $\alpha_m$ is a weighting factor for the $m^{th}$ association.

69. The associative memory device of claim 43, wherein the association function $f$ corresponds to the mathematical operation of multiplication such that two propagated input patterns $P'_i = \psi_m$ and $P'_j = \phi_m$ are associated by multiplying the complex amplitudes of the two wave functions, point by point, at each location $r_C$ in the cortex, with the association represented mathematically as:

$\psi_m(r_C)\phi_m(r_C)$ and with all associations previously stored, C, written as the linear combination of associations:

$$C(r_C) = \sum_m \alpha_m \psi_m(r_C)\phi_m(r_C).$$

70. The associative memory device of claim 69, wherein the association function $f$ corresponds to the mathematical operation of multiplication of wave fields, one or more of which may be point-wise normalized, the rest non-normalized, such that two propagated input patterns $P'_i = \psi_m$ and $P'_j = \phi_m$ are associated by multiplying the point-wise complex amplitudes of the two wave functions, at each location $r_C$ in the cortex with the association represented mathematically as:

$\exp[i\, Arg(\psi(r_C))]\exp[i\, Arg(\phi(r_C))]$.

or $\psi(r_C)\exp[i\, Arg(\phi(r_C))]$ where $Arg(z)$ is the phase angle for a complex value z, and with all associations previously stored written as the linear combination of associations:

$C(r_C) = \Sigma_m \alpha_m \exp[i\, Arg(\psi_m(r_C))]\exp[i\, Arg(\phi_m(r_C))]$ or $C(r_C) = \Sigma_m \alpha_m \psi_m(r_C)\exp[i\, Arg(\phi_m(r_C))]$.

71. The associative memory device of claim 43, wherein the implementation of the associative memory device is mathematically modeled with the wave-modeled prompt on the input buffer being denoted by:
$R_i, R_j, \ldots, R_l$;
the respective propagated forms of the wave-modeled prompt on the cortex being denoted by:
$R'_i, R'_j, \ldots, R'_l$,
the wave-modeled prompt being operable to probe the plurality of previously stored associations using $f^{-1}$, the inverse of the function used originally to form the associations; and the resulting de-associated wave D' being denoted by:

$D' = <C | R'_i, R'_j, \ldots, R'_l> = f^{-1}(\Sigma_m \alpha_m f(P'_{i,m}, P'_{j,m} \ldots P'_{l,m}) | R'_i, R'_j, \ldots, R'_l)$;

where $\alpha_m$ is a weighting factor for the $m^{th}$ association, a de-association is denoted by angle brackets with a vertical bar separating the first argument, the entity being probed, from the second argument, the set of one or more prompting fields; and D represents the retrieval formed when the complex conjugate of the de-association (D'*) is propagated from the cortex to the output buffer.

72. The associative memory device of claim 71 further comprising multiplication for the association operation, and the inverse function, $f^{-1}$, division for the retrieval operation, wherein if a wave field $\phi_n$ is used to probe the previously stored associated pairs in the cortex, then the retrieval process is denoted by:

$$C\phi_n = \sum_m \alpha_m \psi_m \phi_m I \phi_n$$
$$= \sum_m \alpha_m \psi_m \phi_m \phi_n^{-1}$$
$$= \alpha_n \psi_n + \sum_{m \neq n} \alpha_m \psi_m \phi_m \phi_n^{-1},$$

further, given that the inverse operator I corresponds to division, the retrieval process is more specifically denoted by:

$$C\phi_n = \sum_m \frac{\alpha_m \psi_m \phi_m}{\phi_n} = \alpha_n \psi_n + \sum_{m \neq n} \frac{\alpha_m \psi_m \phi_m}{\phi_n}$$

where C contains the linear combination of previously stored associations, and, at each point on the cortex $r_c$ on which C is defined, the value of C is divided by the value of $\phi_n$, with the retrieval, $\alpha_n \phi_n$, being propagated to the output buffer and then to the output device.

73. The associative memory device of claim 72, further comprising:
a retrieval operation, corresponding to the association operation, using complex conjugation as the inverse function $\mathcal{F}^{-1}$, such that if the point-wise normalized wave field $\phi_n$ is used to probe the previously stored associated pairs in the cortex;
the probe process being denoted by:

$$C\phi_n = \sum_m \alpha_m \exp[i\text{Arg}(\psi_m)]\exp[i\text{Arg}(\phi_m)]I\exp[i\text{Arg}(\phi_n)]$$
$$= \sum_m \alpha_m \exp[i\text{Arg}(\psi_m)]\exp[i\text{Arg}(\phi_m)]\exp[i\text{Arg}(\phi_n)]^{-1}$$

or $$C\phi_n = \sum_m \alpha_m \psi_m \exp[i\text{Arg}(\phi_m)]I\exp[i\text{Arg}(\phi_n)]$$
$$= \sum_m \alpha_m \psi_m \exp[i\text{Arg}(\phi_m)]\exp[i\text{Arg}(\phi_n)]^{-1}$$

further, given that the inverse operator I, which embodies the inverse function $\mathcal{F}^{-1}$, corresponds to complex conjugation, the probe process more specifically by:

$$C\phi_n = \sum_m \alpha_m \exp[i\text{Arg}(\psi_m)]\exp[i\text{Arg}(\phi_m)]\exp[-i\text{Arg}(\phi_n)]$$
$$= \alpha_n \exp[i\text{Arg}(\psi_n)] + \sum_{m \neq n} \alpha_m \exp(i[\text{Arg}(\psi_m) + \text{Arg}(\phi_m) - \text{Arg}(\phi_n)])$$

or $$C\phi_n = \sum_m \alpha_m \psi_m \exp[i\text{Arg}(\phi_m)]\exp[-i\text{Arg}(\phi_n)]$$
$$= \alpha_n \psi_n + \sum_{m \neq n} \alpha_m \psi_m \exp(i[\text{Arg}(\phi_m) - \text{Arg}(\phi_n)])$$

where C contains the linear combination of previously stored associations, and, at each point $r_c$ on the cortex on which C is defined, the value of C is multiplied by the complex conjugate of the exponential of the phase angle of the prompt $\phi_n$, with the retrieval being propagated to the output buffer and to the output device.

74. A method of autonomous pattern recognition, comprising:
sensing physical or electronic stimuli with a sensor;
interfacing the output of the sensor to one or a plurality of input buffers;
converting the sensed physical or electronic stimuli at the input buffer into wave-modeled input data in the form of complex-valued wave fields;
contemporaneously pre-processing the input information and assigning phase values at the input buffer;
generating a unique internal identification pattern (IIP) based on a unique identification code assigned automatically or by a system operator to each specific set of input data;
storing the IIP in one or more IIP buffers;
linking each specific IIP to sets of information such as data files to be recalled, sets of commands to be executed or communicated upon a positive identification, and threshold confidence levels required for execution of each particular command or sets of commands;
using wave propagation to transport the wave-modeled input data and IIPs from their respective buffers to one or a plurality of recording structures, referred to as a cortex;
associating the desired sets of wave-modeled input data and their respective IIPs through an invertible mathematical function or operation, thus creating one or more associations within the cortex;
retaining the associations in a distributed manner across the cortex;
creating and storing linear combinations of associations;
inputting prompting data into the input buffer;
converting the prompting data at the input buffer into complex-valued wave fields as wave-modeled prompting data;
contemporaneously pre-processing the prompting data and assigning phase values;
using wave propagation to transport the wave-modeled prompting data to the cortex to prompt a response from the cortex;
mathematically operating upon the previously stored associations at the cortex using a de-association function that is the inverse of that originally used to form the associations;
propagating the result of the mathematical de-association operation, representing a retrieval, to one or more IIP buffers;
autonomously reading a retrieved pattern as accurately as possible;
deducing an identification code that could correspond to a previously created IIP;
generating a confidence estimate based on a relative certainty or uncertainty of the identification made;
recalling the associated files or other information related to the reported identification code and displaying the results in human or machine-readable form;
executing or communicating the appropriate commands based on the identification code, the reported confidence estimate, and the predefined confidence levels required for the relevant commands;

adaptively improving identification performance in response to feedback on the accuracy of past identifications, using the following equation for the case of false positive identifications:

$$C_{new}=C_{old}-\beta_i<R_iI_j>$$

where $C_{old}$ is the original cortex value, $C_{new}$ is the revised cortex value, $\beta_i$ is a positive weighting factor, $R_i$ is the prompting pattern, and $I_j$ is the incorrectly retrieved IIP and using the following equation for the case of false negative or overly weak positive identifications:

$$C_{new}=C_{old}+\beta_i<R_i-\gamma_iP_i,I_i>$$

where $C_{old}$ is the original cortex value, $C_{new}$ is the revised cortex value, $\beta_i$ is a positive weighting factor, $R_i$ is the prompting pattern, $I_i$ is the desired IIP, $P_i$ is the original pattern associated with $I_i$, and $\gamma_i$ is 0 for augmentation mode and 1 for replacement mode.

75. The method of autonomous pattern recognition of claim 74, wherein the method of information transport is by propagating physical waves using antenna arrays and supporting hardware and software.

76. The method of autonomous pattern recognition of claim 75, wherein the method of information transport is by simulating wave propagation in computer hardware configured by computer software or wave propagation circuitry in which sets of data are input, pre-processed, and then represented as wave functions $\xi_i(r)$ that are time-harmonic solutions to the wave equation:

$$(\nabla^2+k^2)\xi_i(r)=0;$$

in which the propagation of a wave away from a surface such as a buffer or the cortex is formally and exactly described by the Kirchhoff integral:

$$\xi_i(r)=\oiint dS_C\cdot\{\xi_i(r_C)\nabla_C G(r,r_C)-G(r,r_C)\nabla_C\xi_i(r_C)\}$$

where the surface $S_C$ is closed and completely surrounds a destination point r, the gradient operates only on coordinates on the source surface $S_C$, and $G(r,r_C)$ is a Green's function; and in which the above continuous integral is discretized for numerical implementation as:

$$\xi(r)=\sum_{\text{all source points}}\Delta S_C\cdot\{\xi(r_C)\nabla_C G(r,r_C)-G(r,r_C)\nabla_C\xi(r_C)\}$$

thus enabling digital input, output, and computation.

77. The method of autonomous pattern recognition of claim 75, wherein the patterns recognized represent physical or electronic stimuli.

78. The method of autonomous pattern recognition of claim 77, wherein the physical or electronic stimuli represent images, human faces, sounds, fingerprints, signatures, gas molecules, or chemical compositions.

* * * * *